US007865169B2

(12) United States Patent
Okazaki et al.

(10) Patent No.: US 7,865,169 B2
(45) Date of Patent: Jan. 4, 2011

(54) MULTIPLE ACCESS APPARATUS AND METHOD USING POWER LINE

(75) Inventors: Hideaki Okazaki, Kakamigahara (JP); Takuji Kawamoto, Ogaki (JP)

(73) Assignees: Ibeden company, Ltd. (JP); Shonan Institute of Technology (JP); Hideaki Okazaki (JP)

( * ) Notice: Subject to any disclaimer, the term of this patent is extended or adjusted under 35 U.S.C. 154(b) by 958 days.

(21) Appl. No.: 11/594,021

(22) Filed: Nov. 7, 2006

(65) Prior Publication Data
US 2008/0107134 A1 May 8, 2008

(51) Int. Cl.
*H04L 12/28* (2006.01)
(52) U.S. Cl. ...................... 455/402; 370/479
(58) Field of Classification Search ............. 455/402; 370/338, 400, 214, 466, 478, 479, 487; 340/310.12; 307/3
See application file for complete search history.

(56) References Cited

U.S. PATENT DOCUMENTS

| 6,194,996 B1 | 2/2001 | Okazaki et al. |
| 6,775,596 B2 | 8/2004 | Takeuchi |

FOREIGN PATENT DOCUMENTS

| EP | 0963058 A2 | 12/1999 |
| JP | 3-254526 A | 11/1991 |
| JP | 11088239 A | 3/1999 |
| JP | 11-346178 A | 12/1999 |
| JP | 2001-144653 A | 5/2001 |
| JP | 2002-111554 A | 4/2002 |
| JP | 2003-087160 A | 3/2003 |
| JP | 2003-332950 A | 11/2003 |

OTHER PUBLICATIONS

Kawamoto, Takuji, "Construction of Powerline Communications Newtwork Environment Employing a Code Division Multiple Access Method", *Shonan Institute of Technology, IBI Tech Co.*, vol. 8, (2004), 25 Pages.

Okazaki, Hideaki, "Construction of Powerline communications network Environment Employng a Code Divison Multiple Access Method", *System and Communication Engineering Department of Shonan Institute of Technology*, (2004), 3 Pages.

Okazaki, Hideaki, "Simulink based model realization for CDMA Communication over Power Lines", *Circuits and Systems, IEEE International Sympsoium*, (2005), 4509-4512.

"Japanese Application Serial No. 2004-234911, Notice of Rejection Grounds dated Sep. 8, 2009", 5 pgs.

*Primary Examiner*—Dwayne D Bost
*Assistant Examiner*—Myron Wyche
(74) *Attorney, Agent, or Firm*—Schwegman, Lundberg & Woessner, P.A.

(57) ABSTRACT

Provided is a telecommunication apparatus and a telecommunication method accomplishing a one-to-many, many-to-one, and many-to-many simultaneous accesses in a power line telecommunication of a code division multiple access (CDMA) by using an AC power line (including the ground).

16 Claims, 126 Drawing Sheets

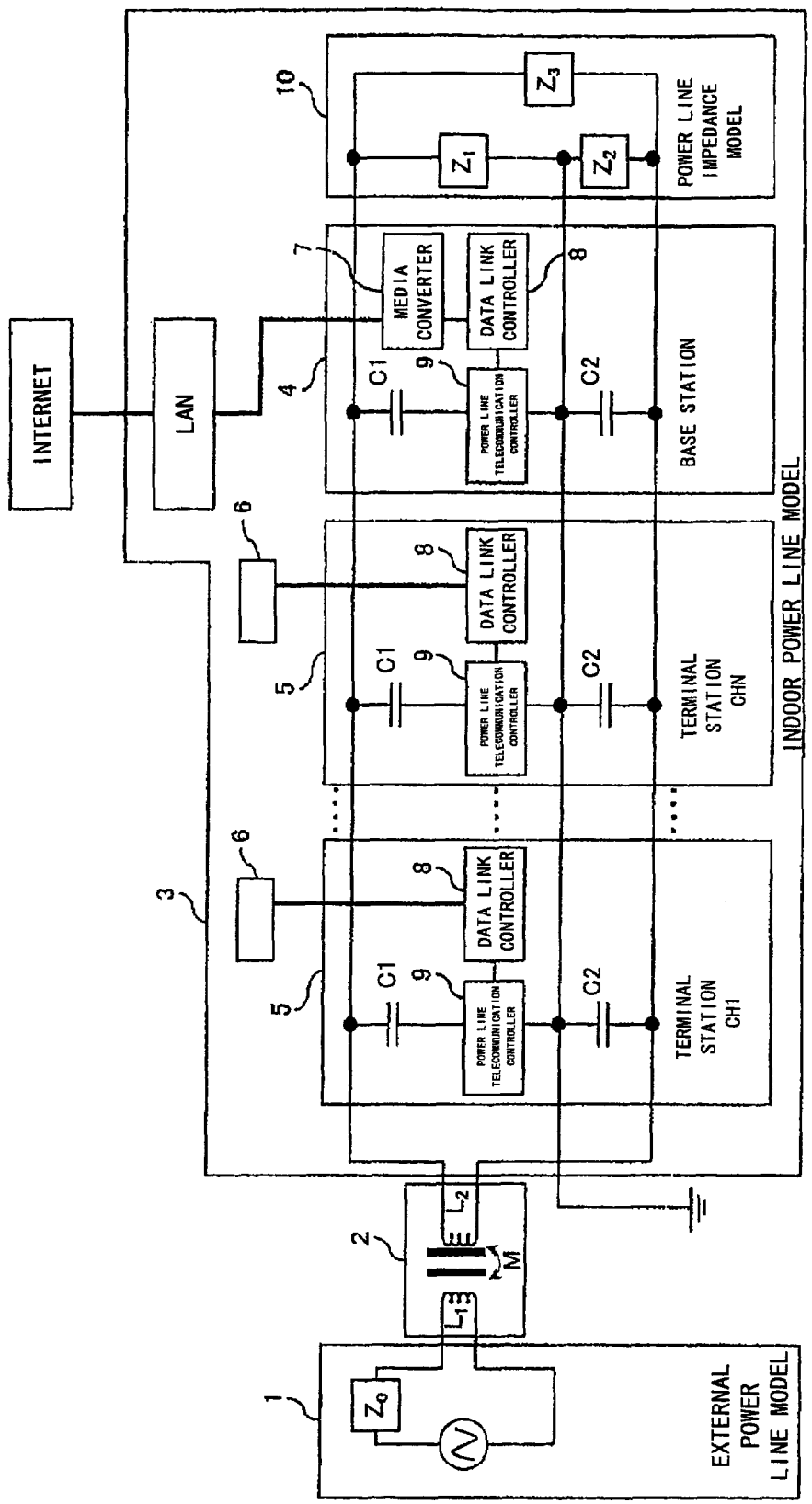
F I G. 1

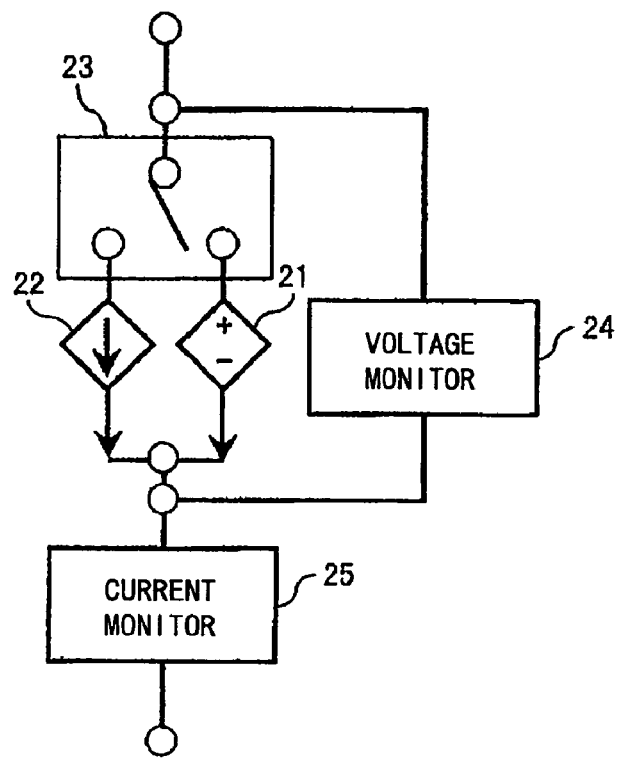
F I G. 2

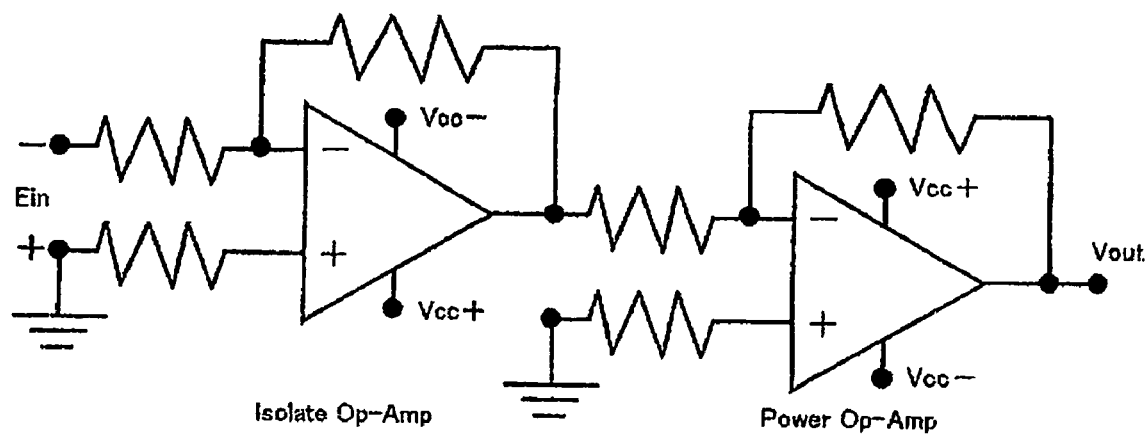
F I G. 4

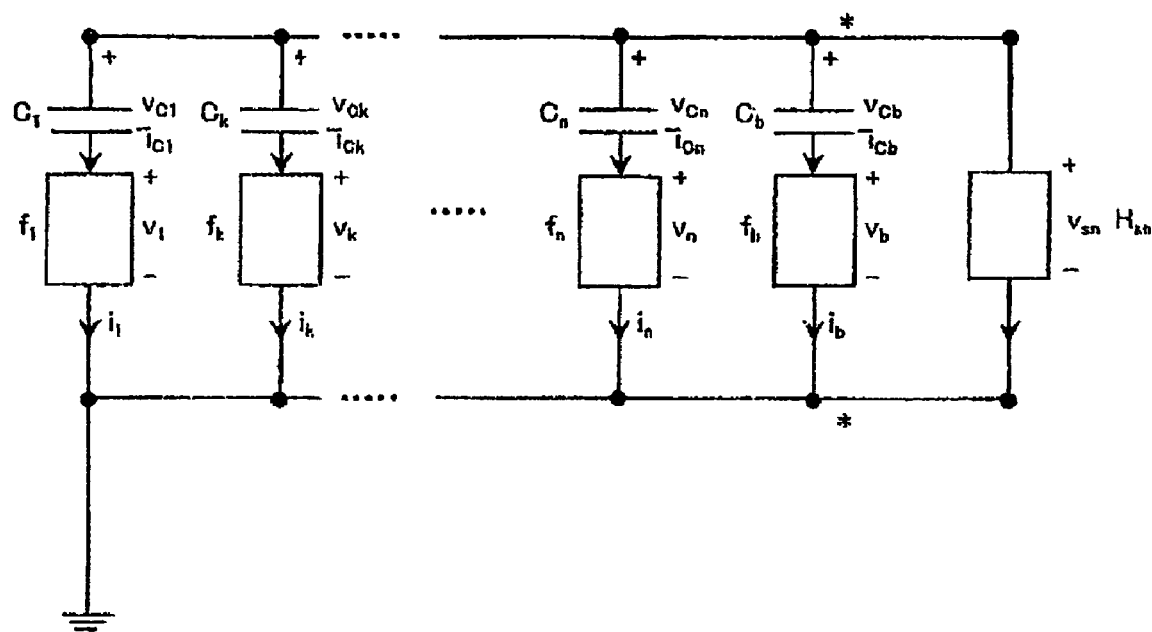
F I G. 1 2

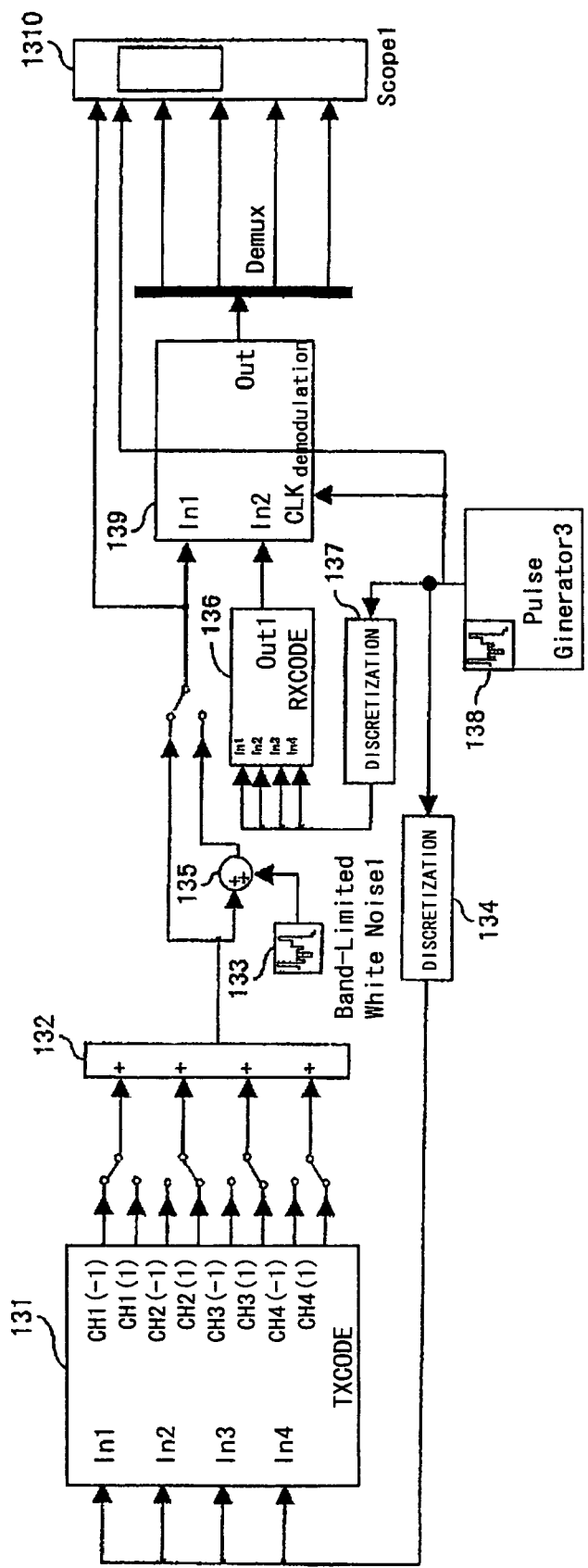
F I G. 13

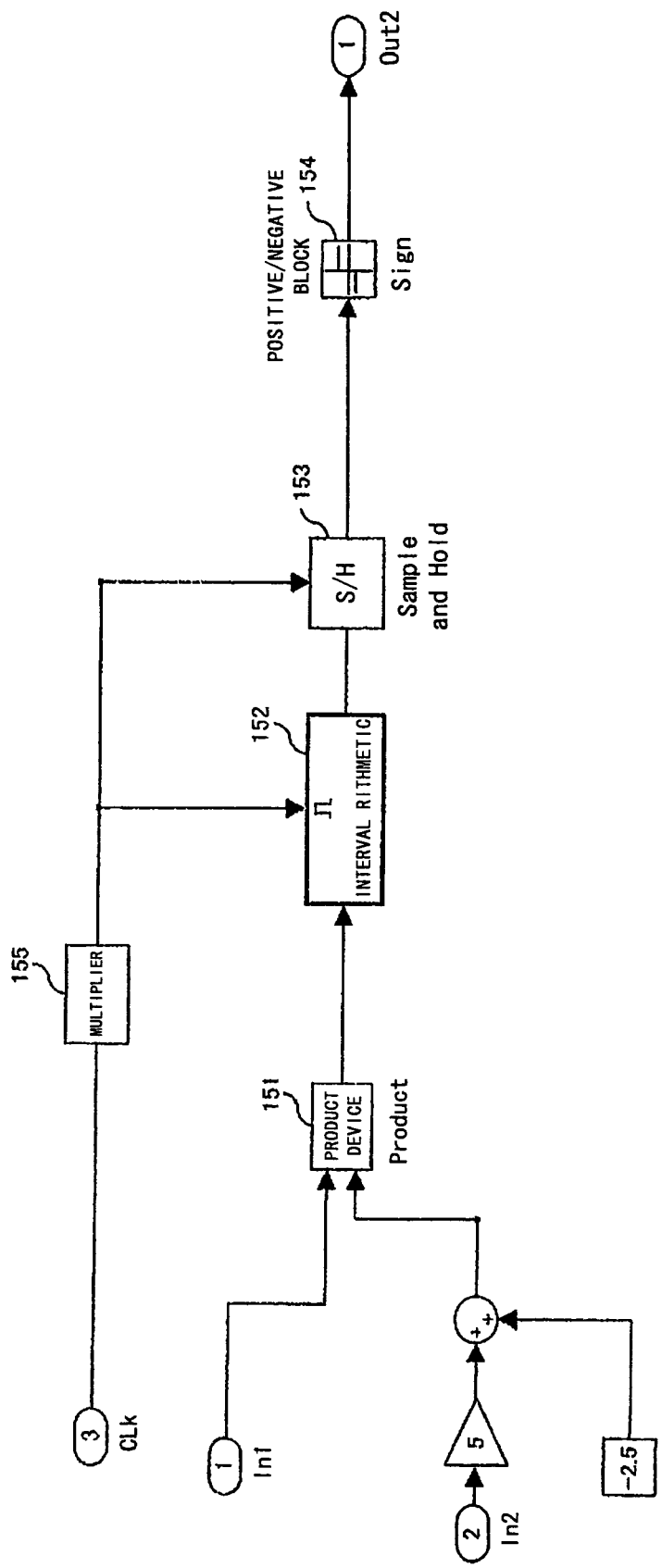
F I G. 1 5

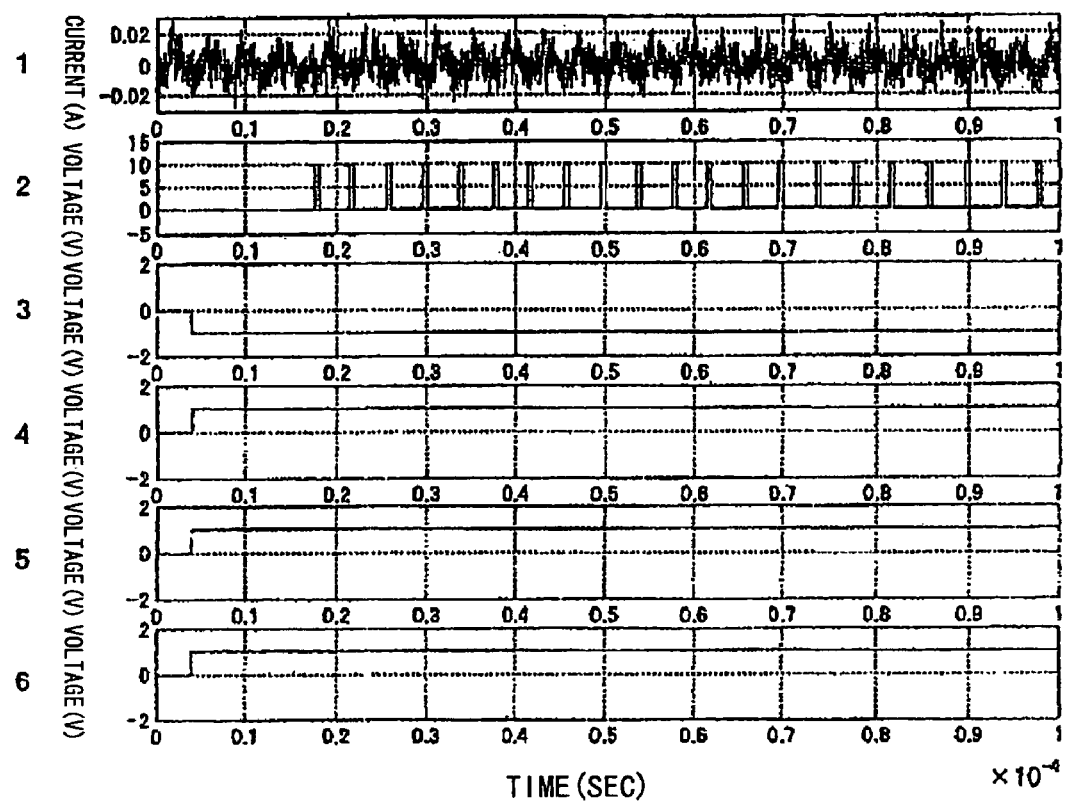
F I G. 16

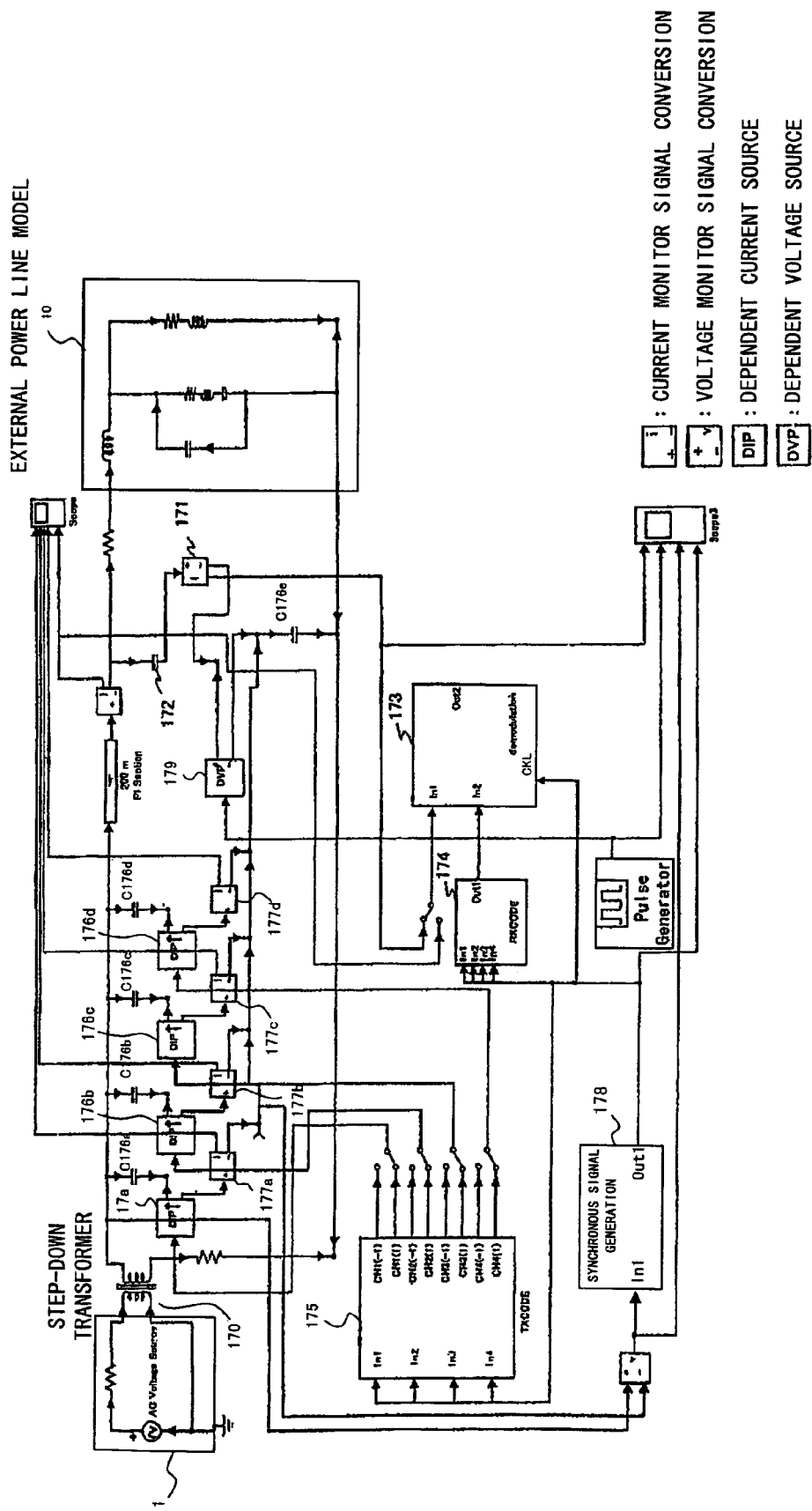
F I G. 17

GOOD EXAMPLE

BAD EXAMPLE (-1, -1, 1, -1)

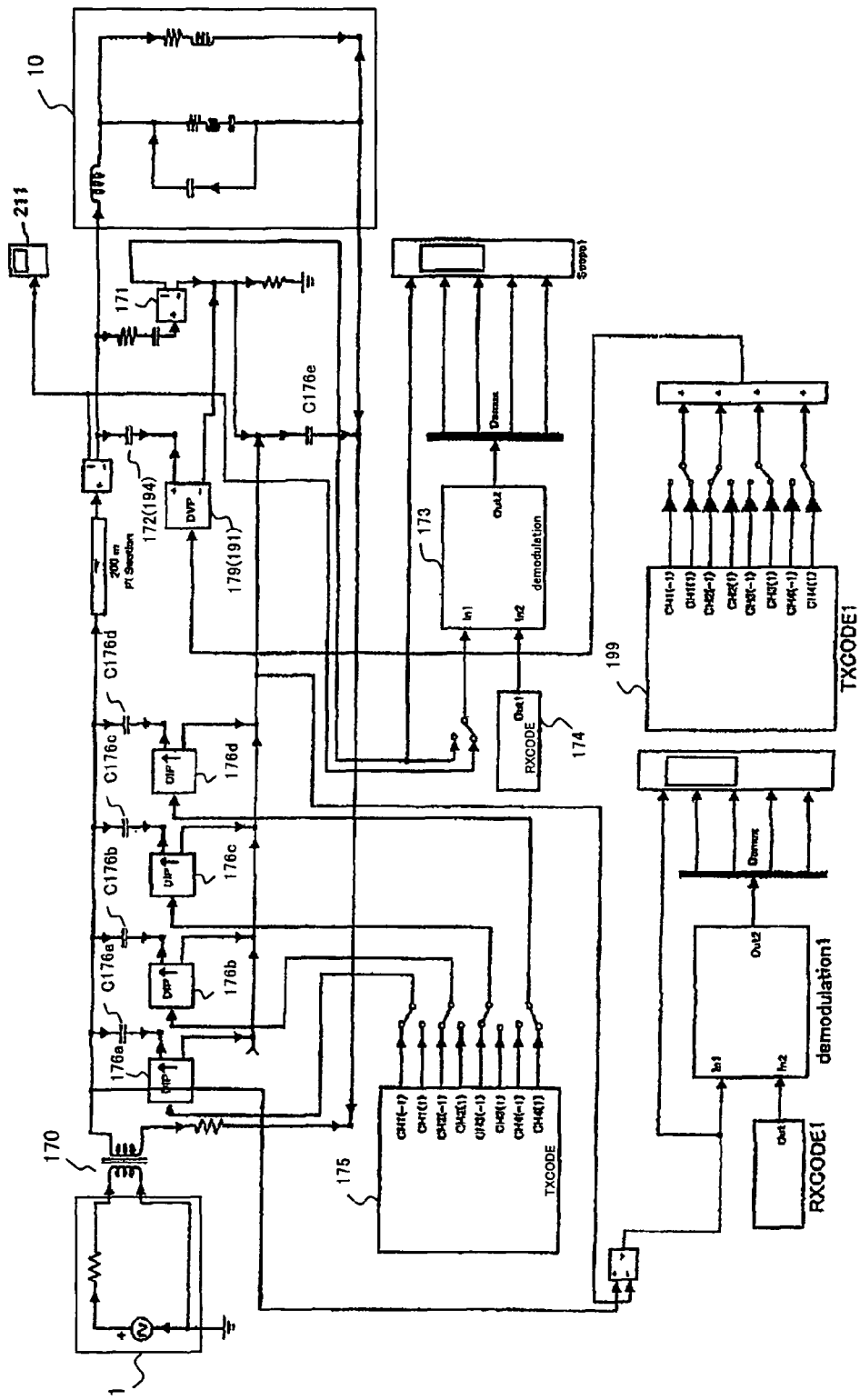
F I G. 21

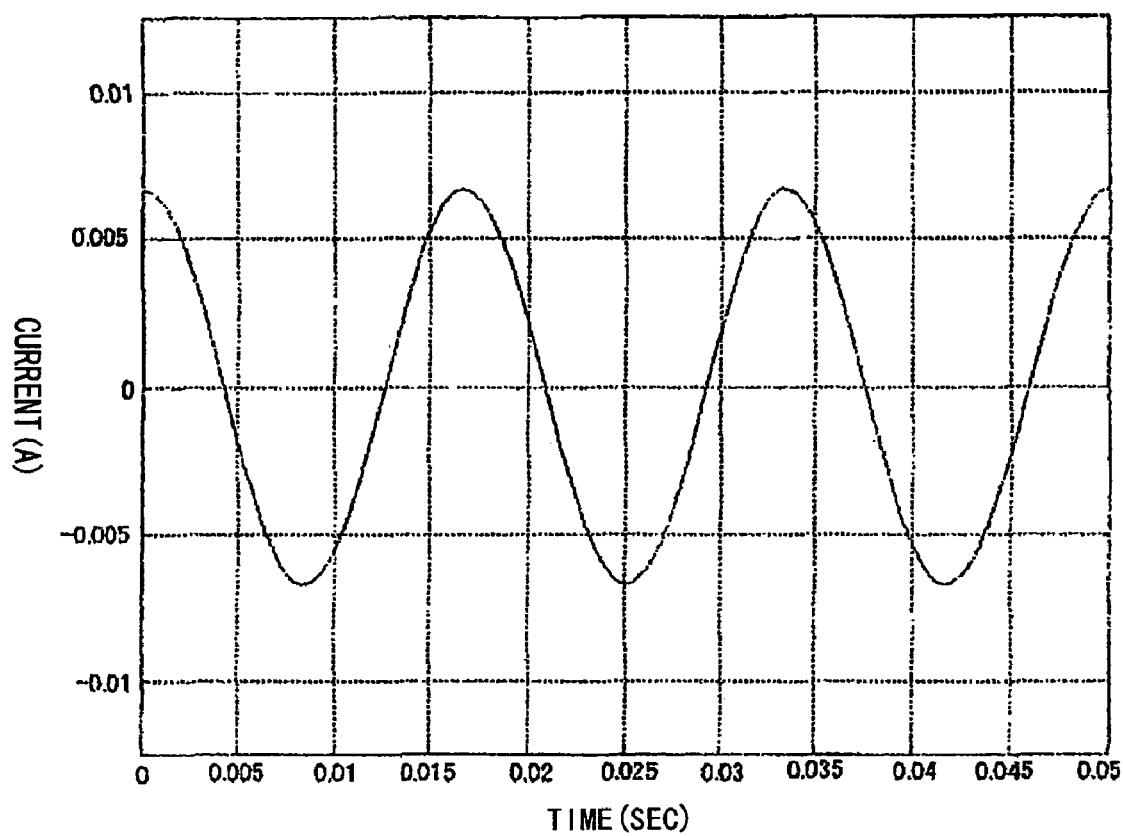
F I G. 2 8

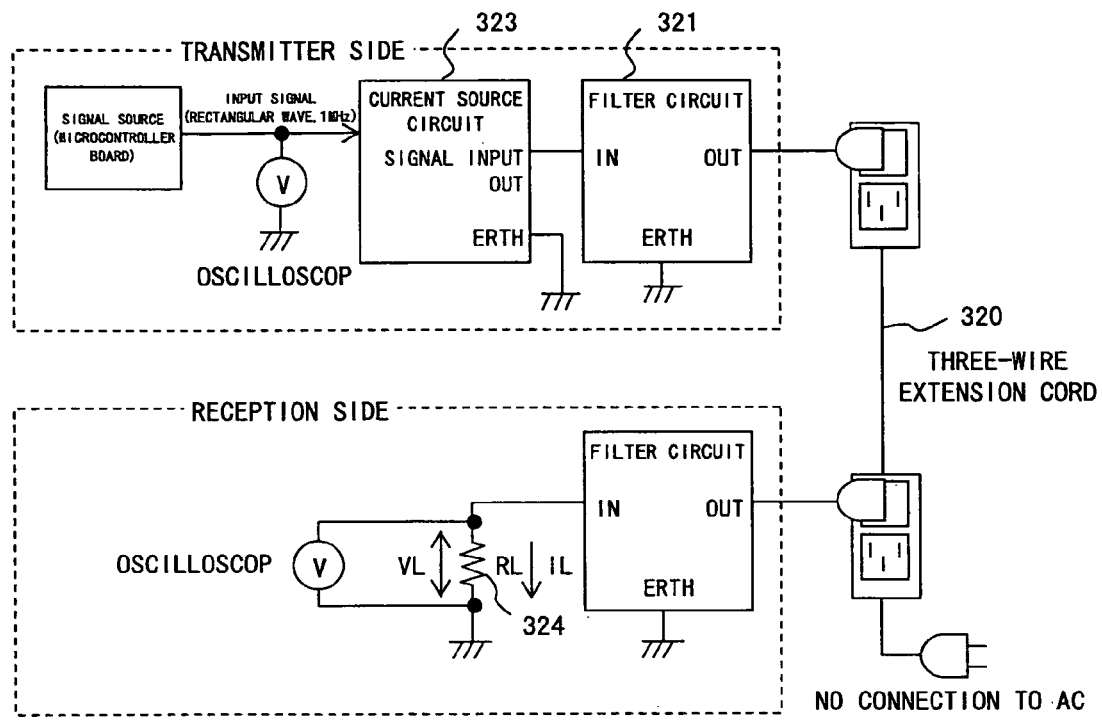
F I G. 3 2

[LOAD RESISTANCE $R_L$=330 Ω]

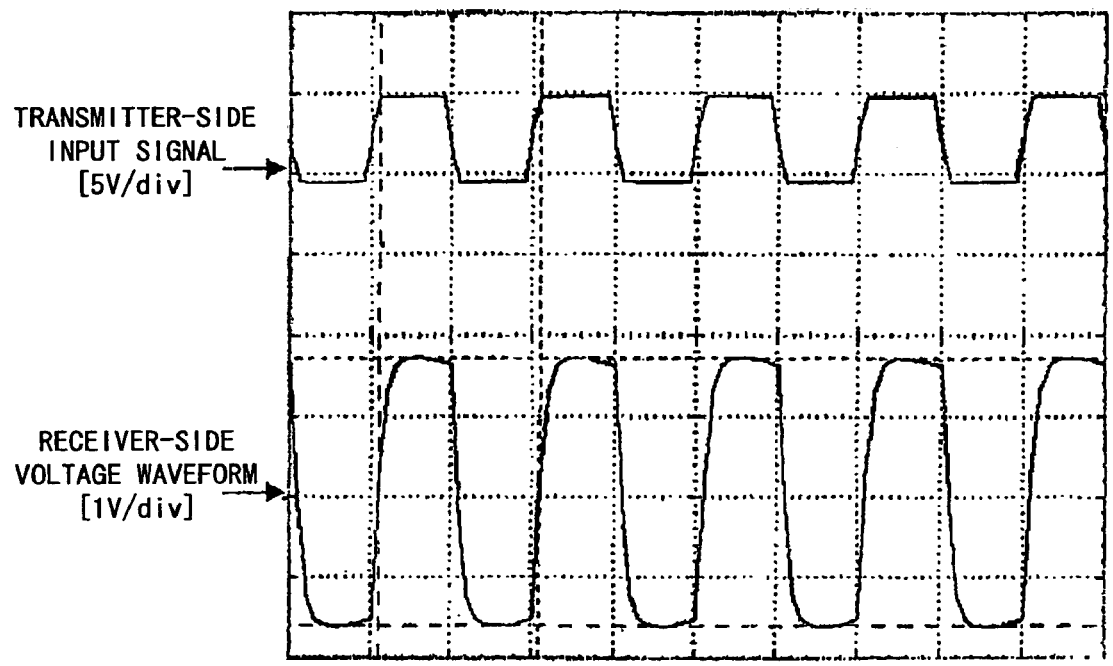
F I G. 38

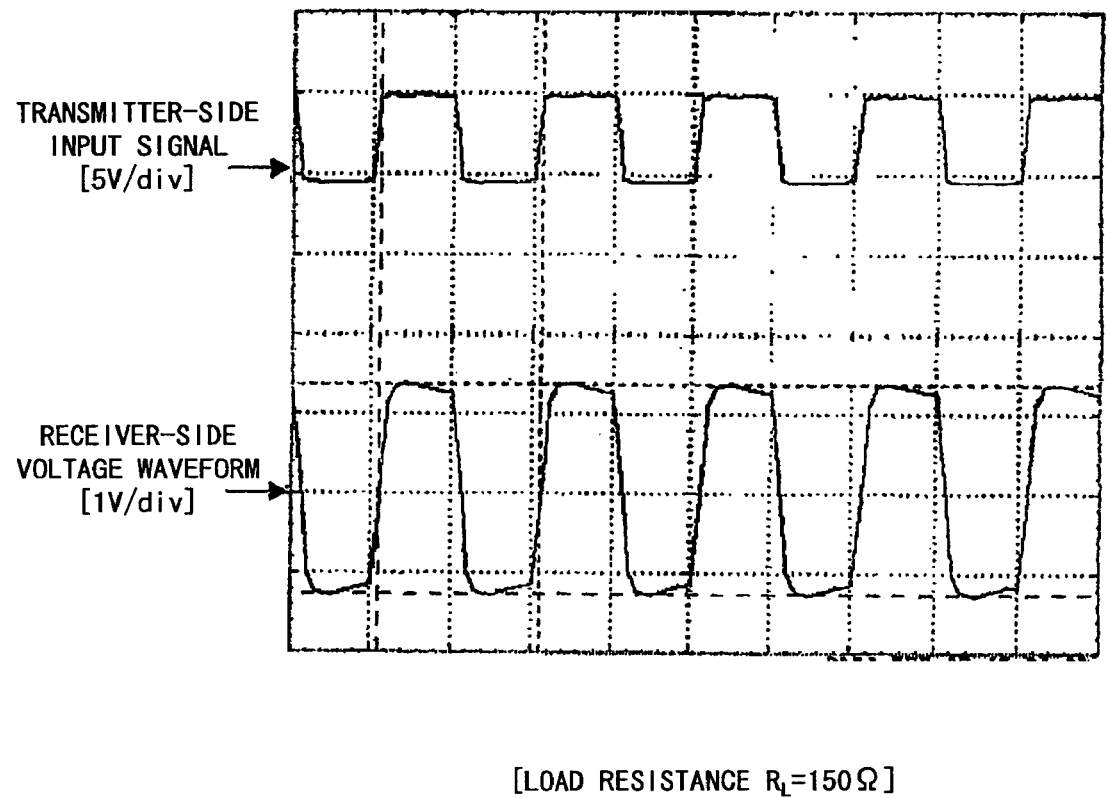
F I G. 39

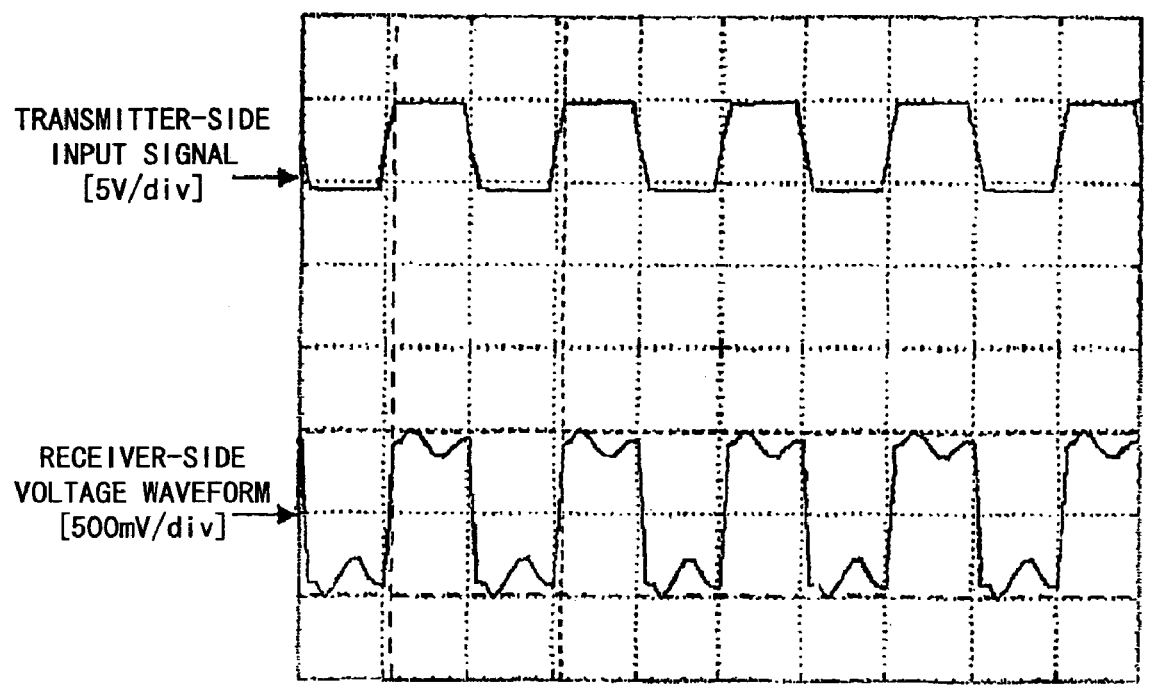
F I G. 4 2

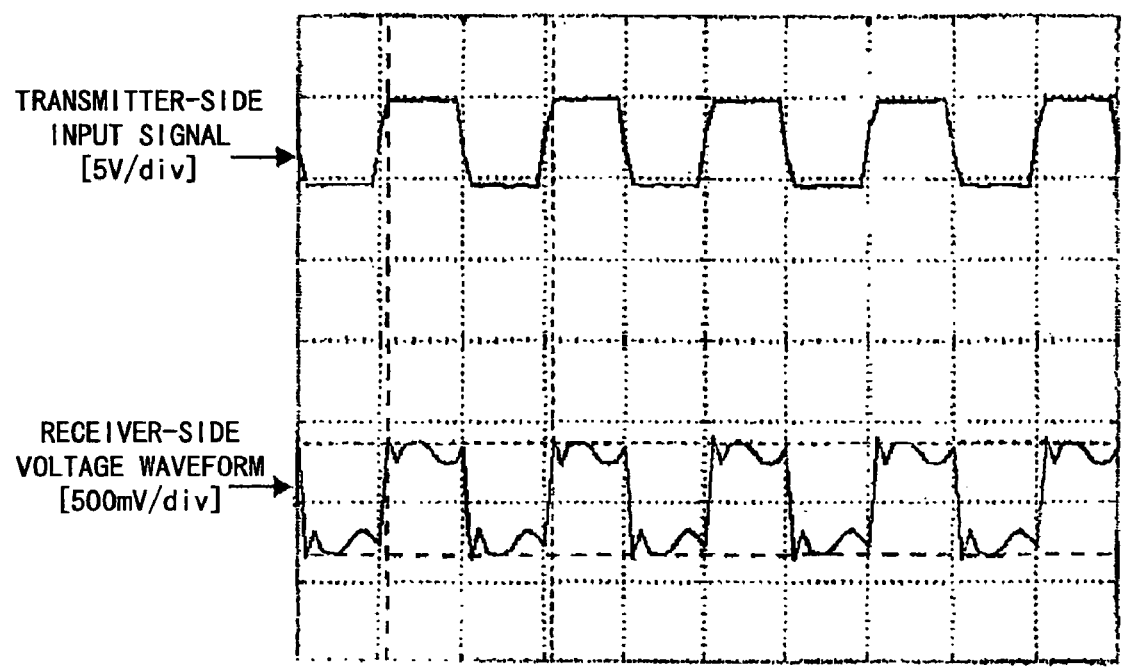
[LOAD RESISTANCE $R_L$=22Ω]
F I G. 4 3

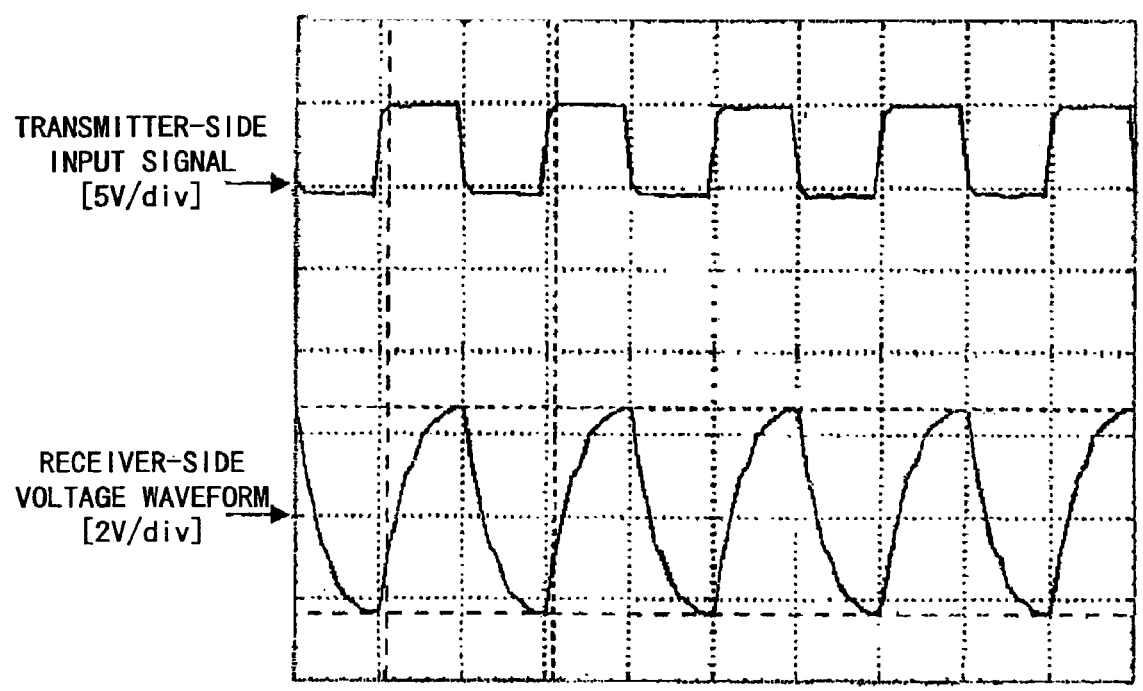
F I G. 45

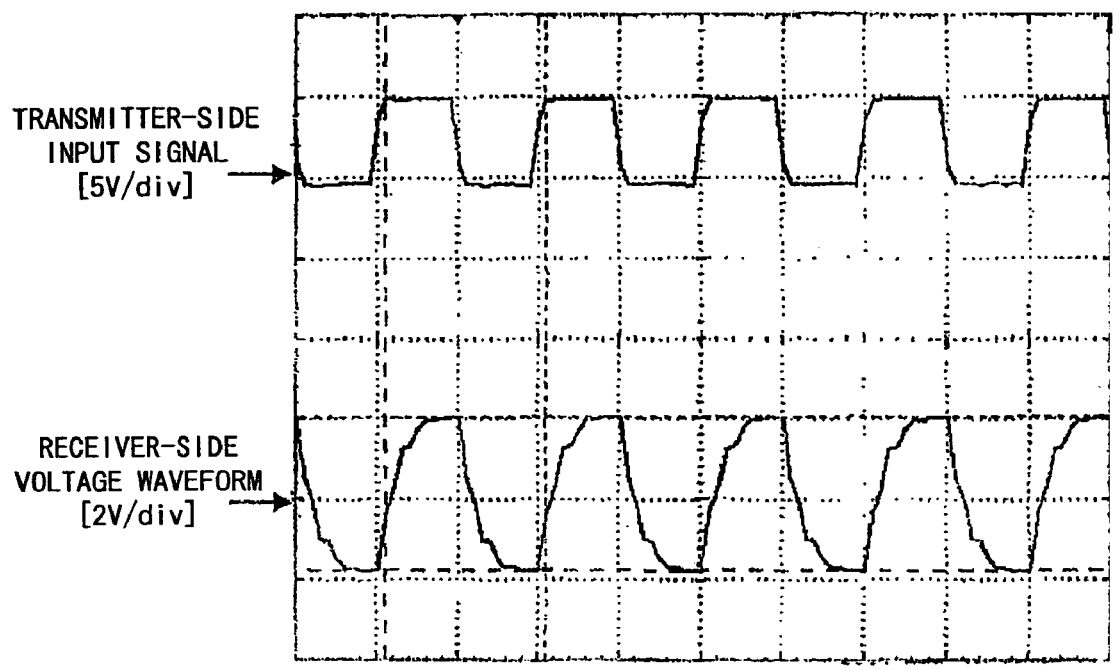
[LOAD RESISTANCE $R_L$=330Ω]
F I G. 4 7

[LOAD RESISTANCE $R_L$=220Ω]

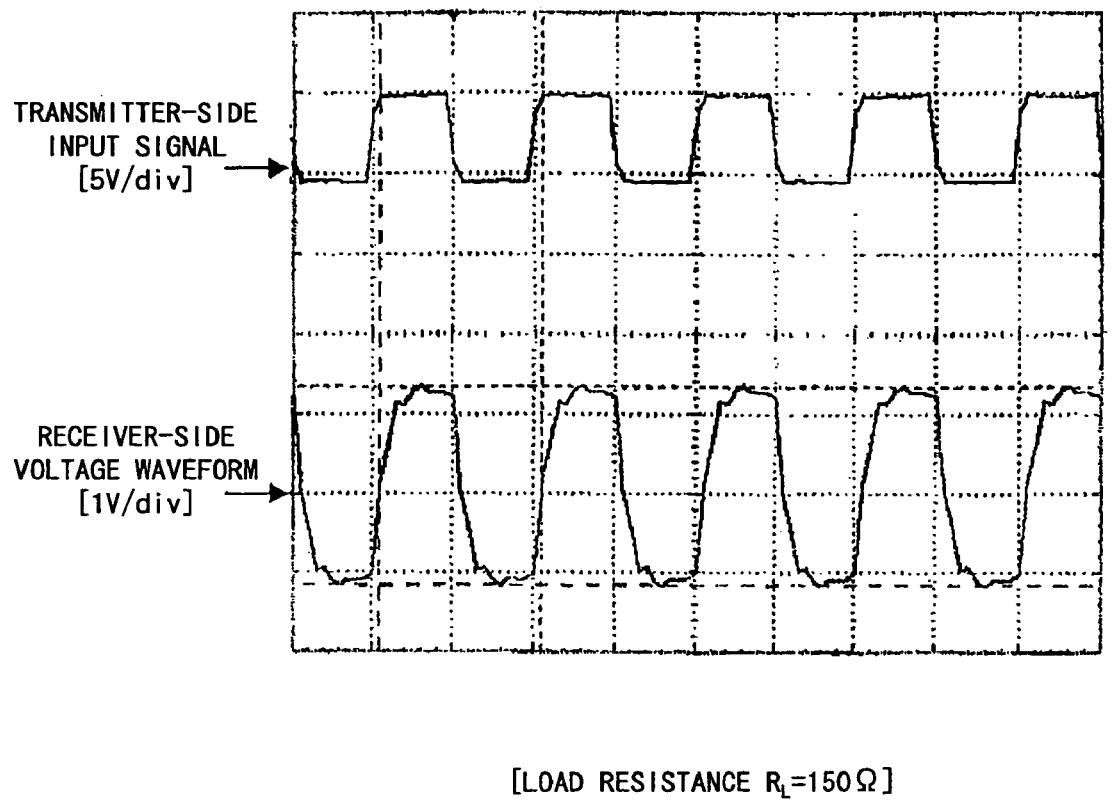
F I G. 49

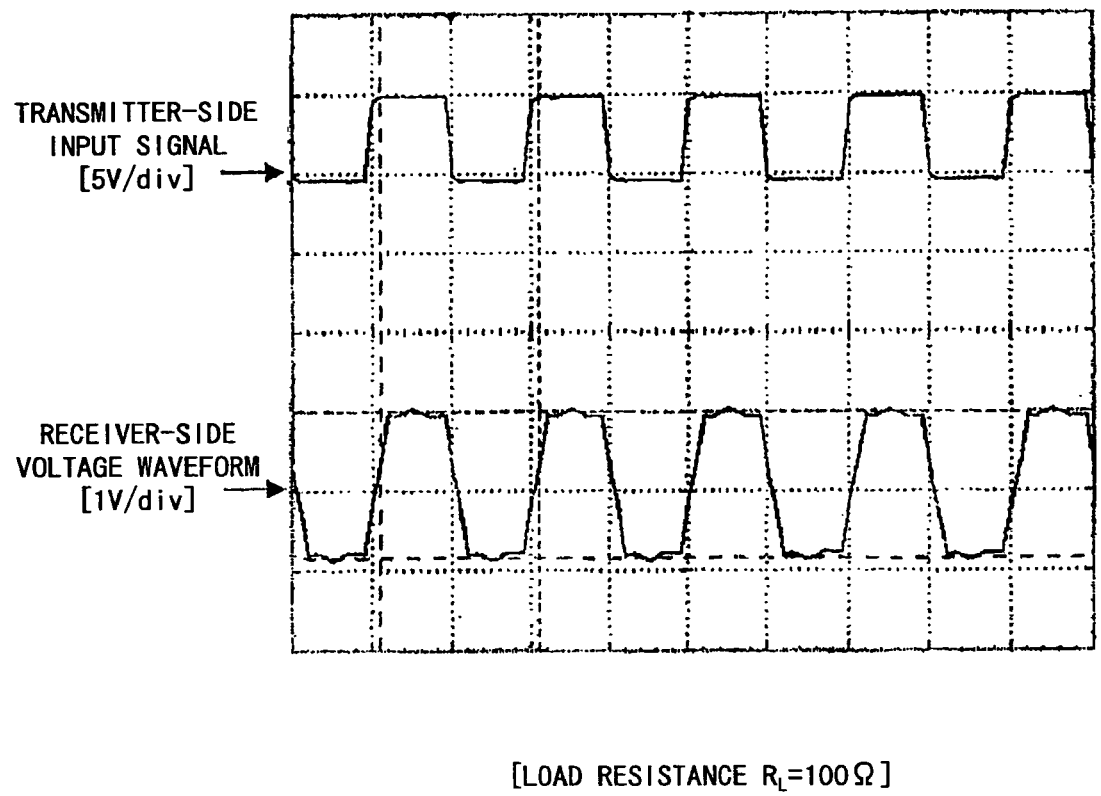
F I G. 50

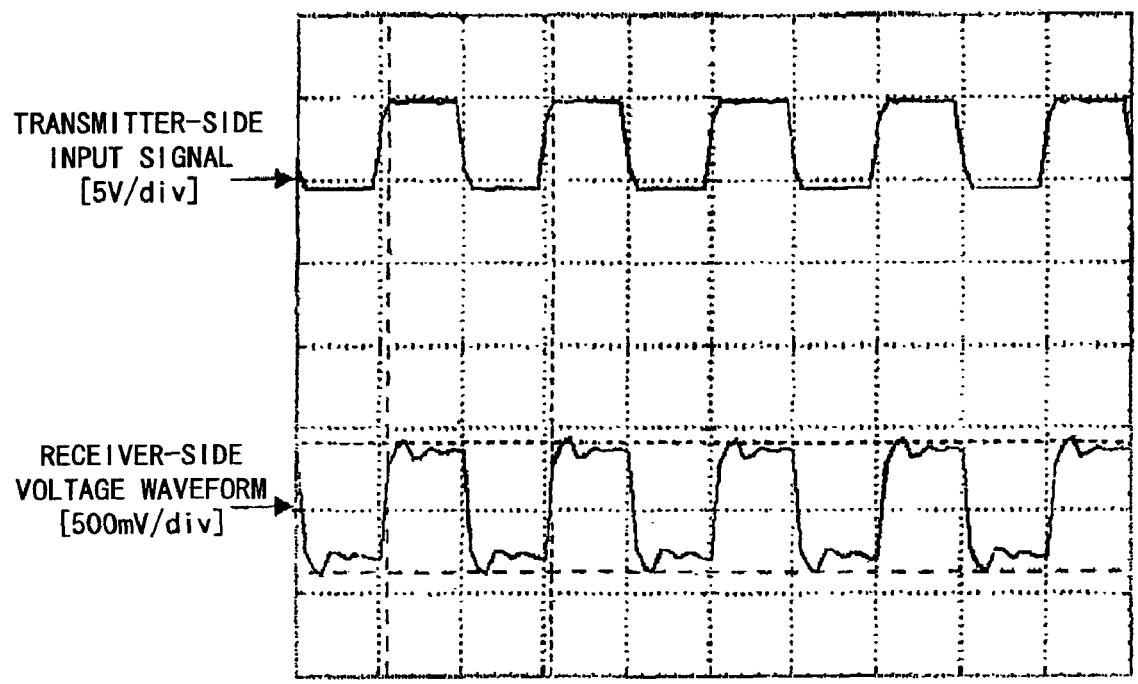
F I G. 5 2

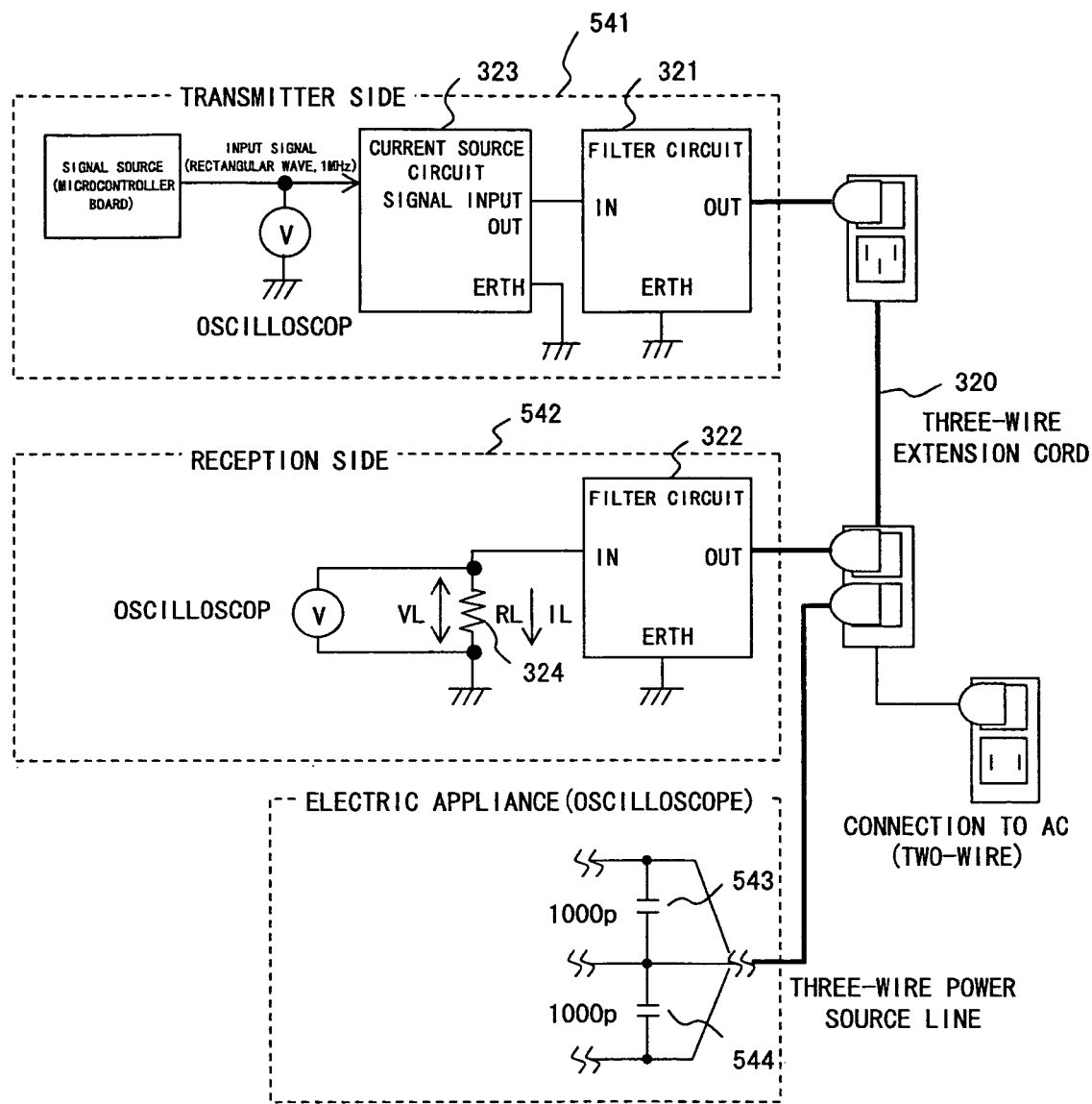
F I G. 5 4

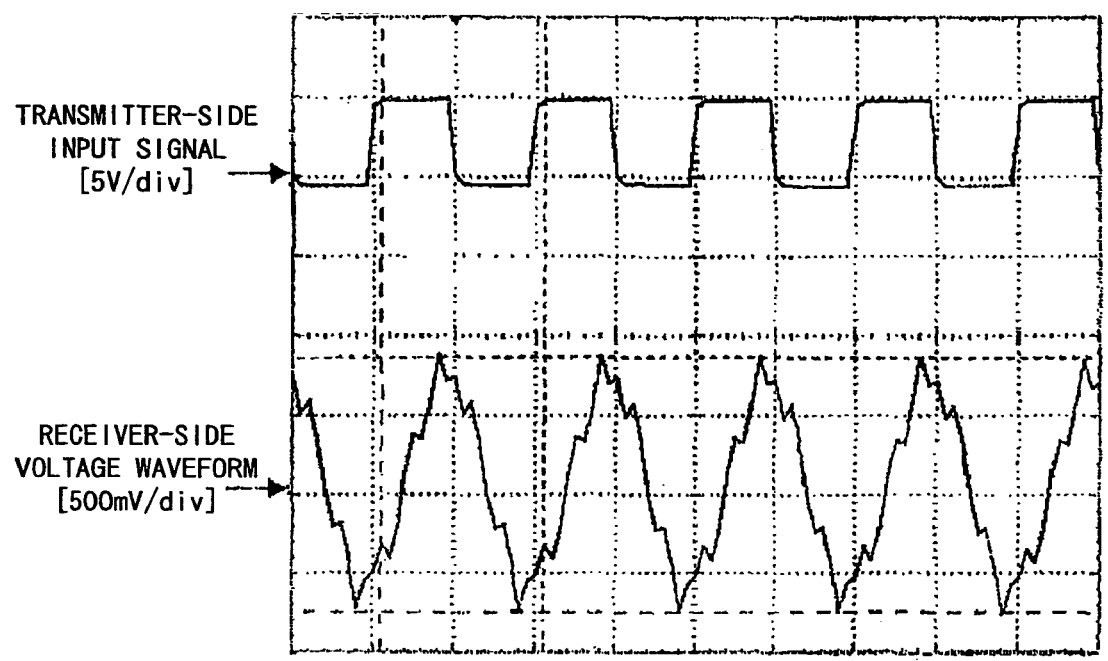
F I G. 55

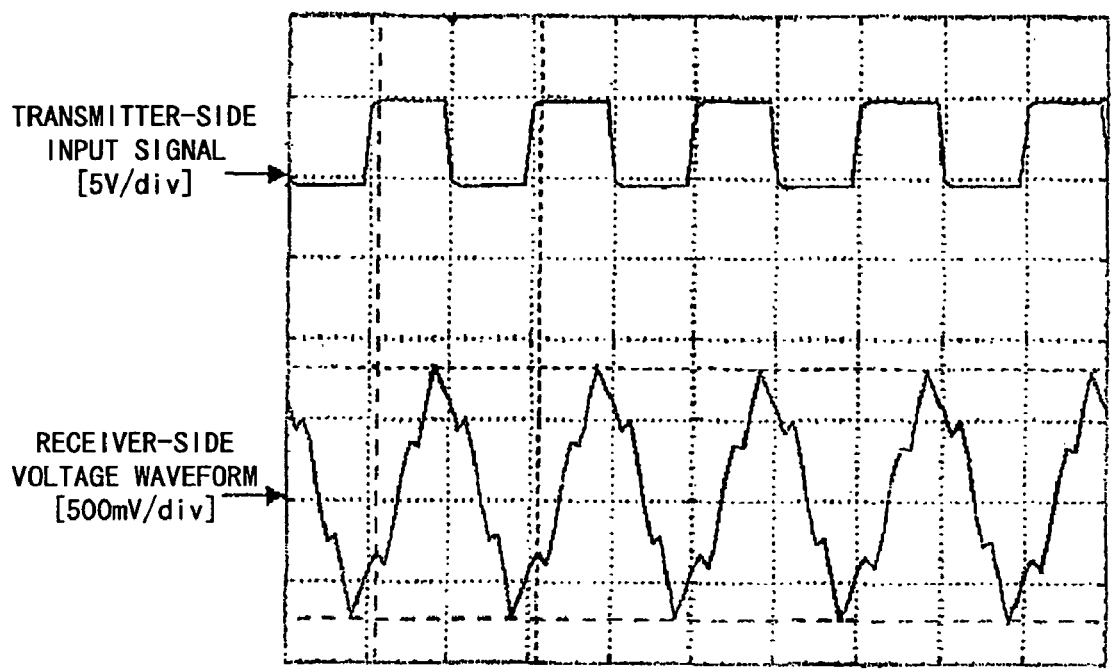
[LOAD RESISTANCE $R_L$=470Ω]
F I G. 5 6

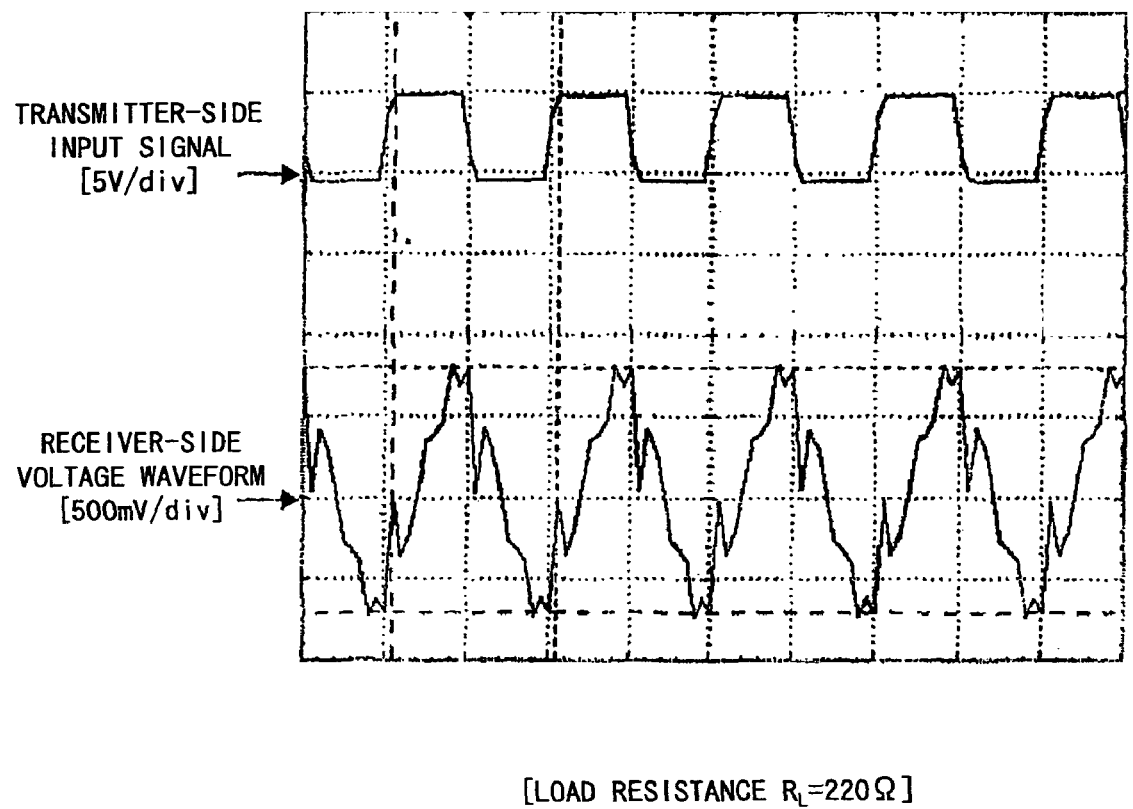
F I G. 58

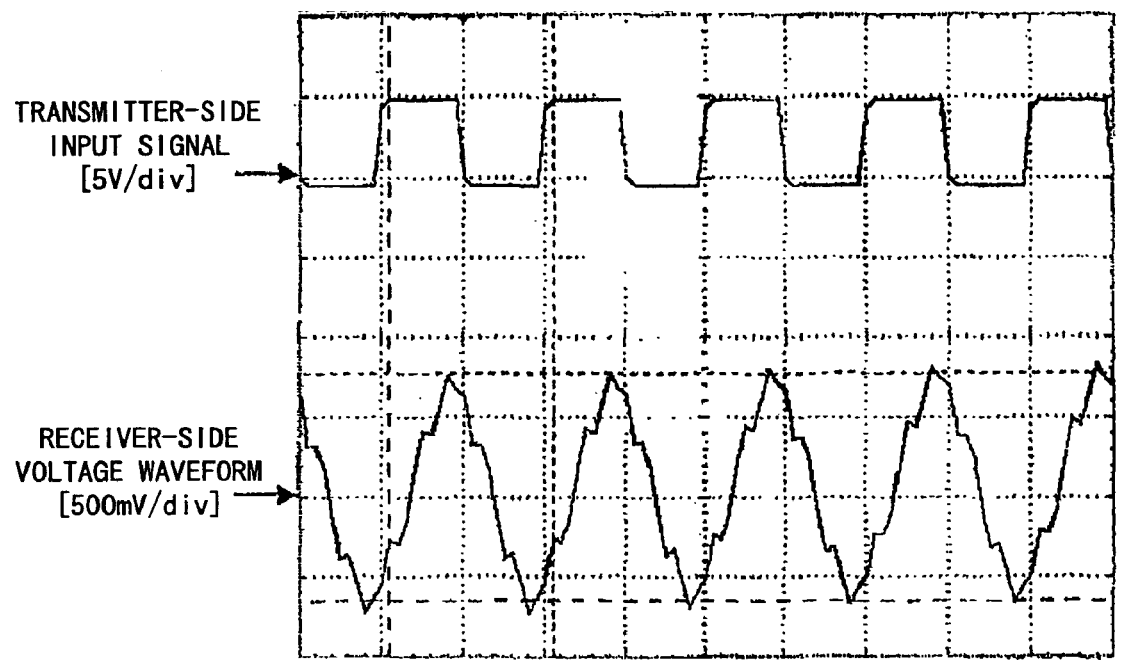
F I G. 59

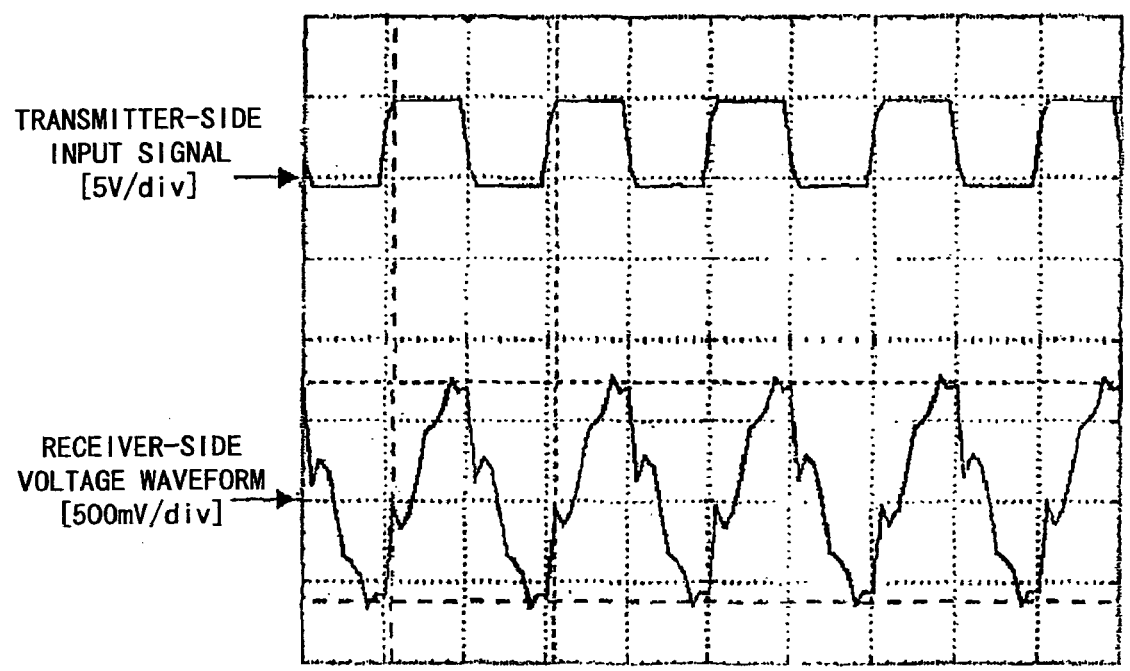
F I G. 60

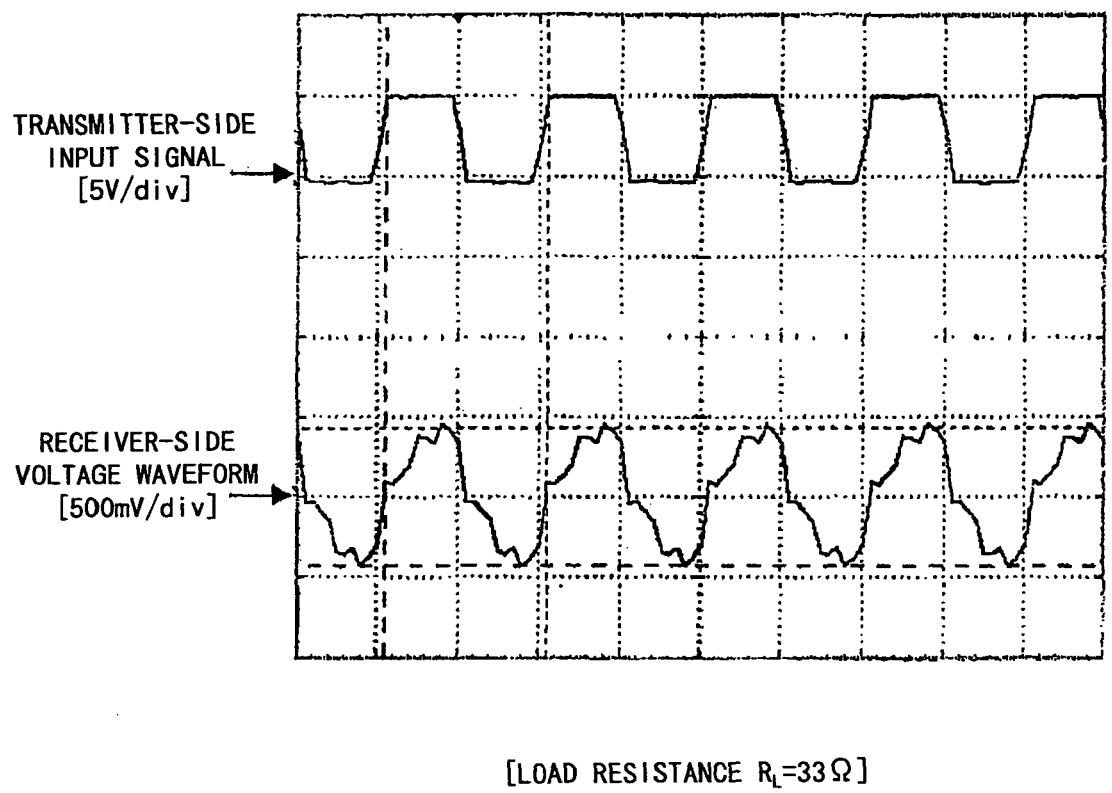
F I G. 6 2

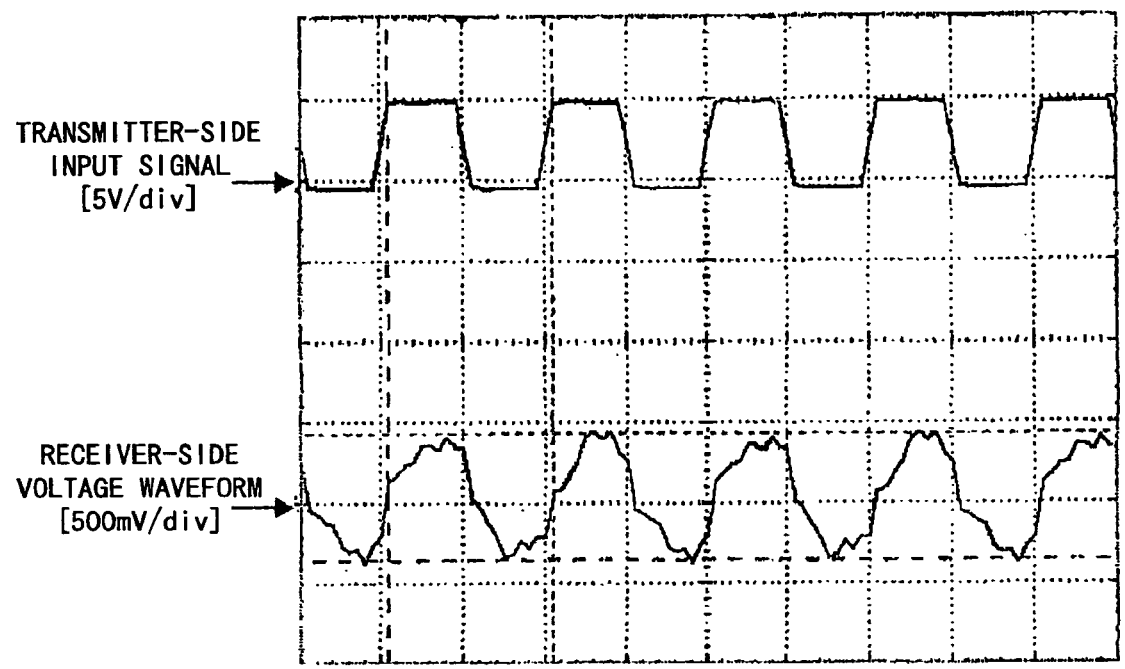
F I G. 6 3

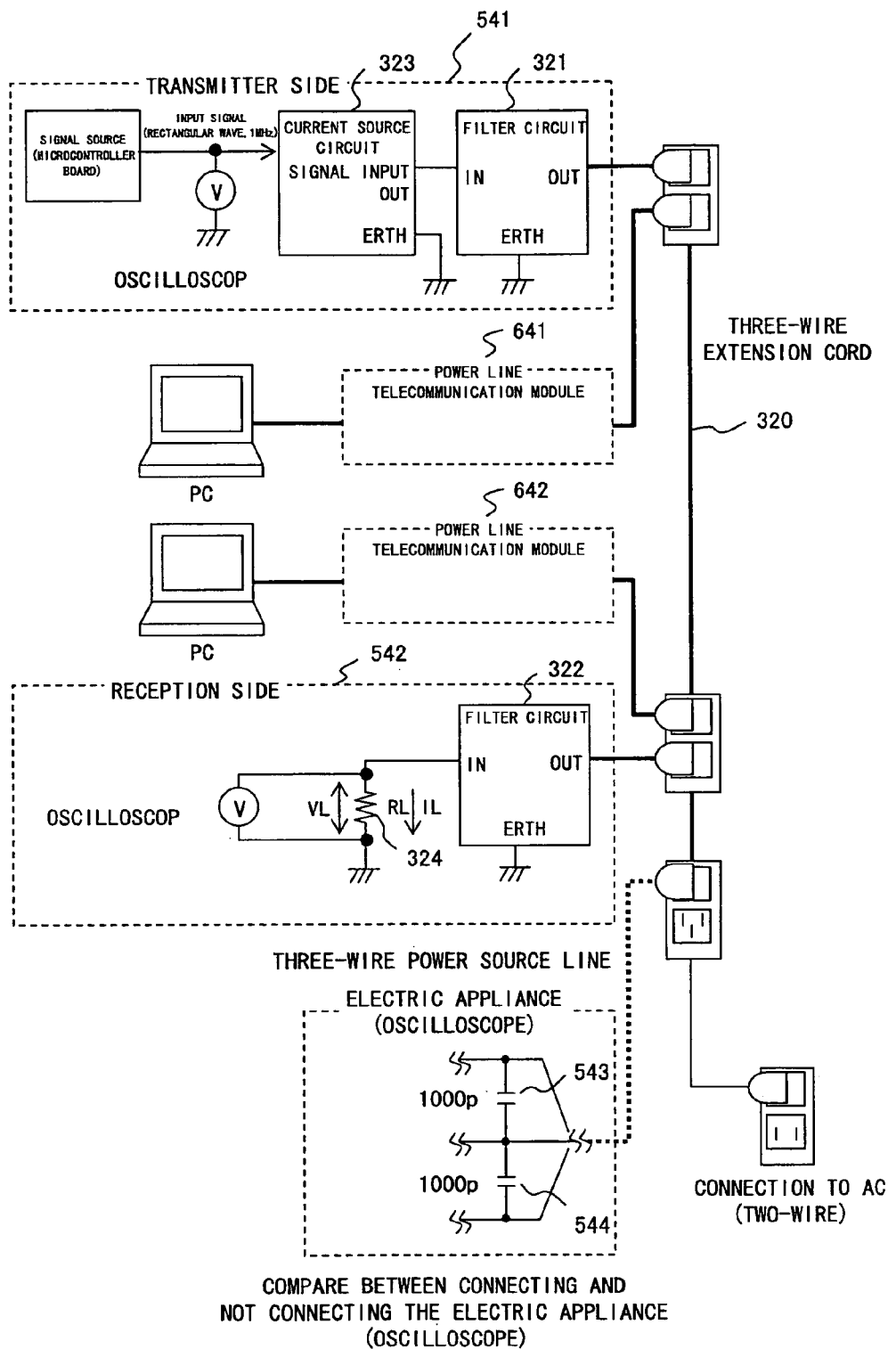
F I G. 6 4

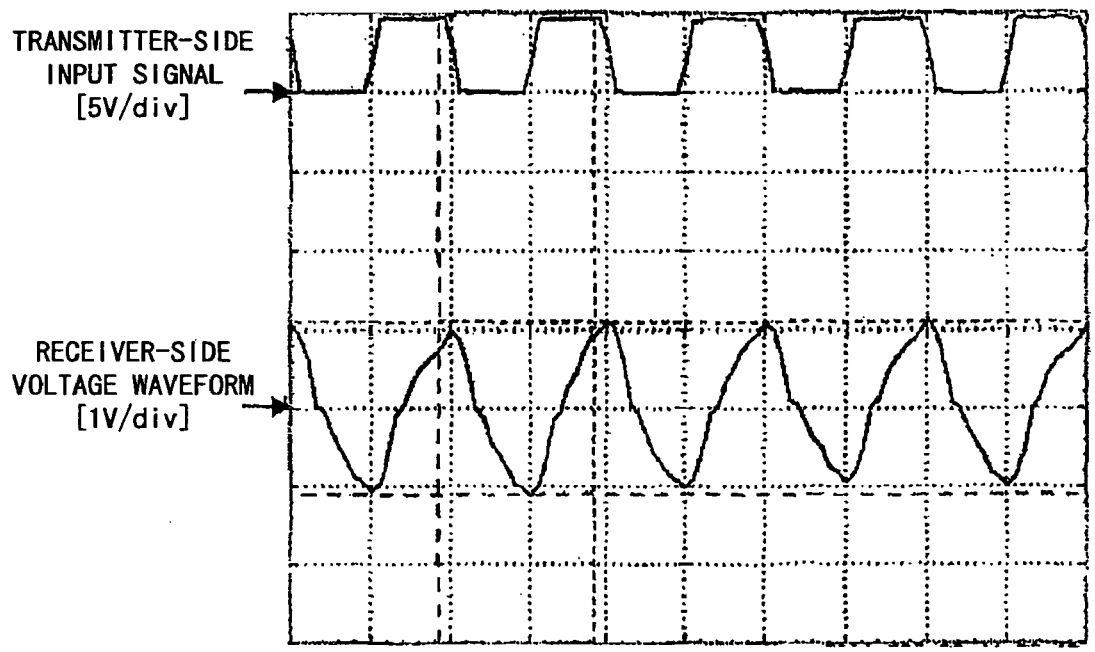
F I G. 6 5

[LOAD RESISTANCE $R_L=680\,\Omega$,
A SIGNAL OUTPUT FROM POWER LINE TELECOMMUNICATION MODULE,
NO CONNECTION OF ELECTRIC APPLIANCE]

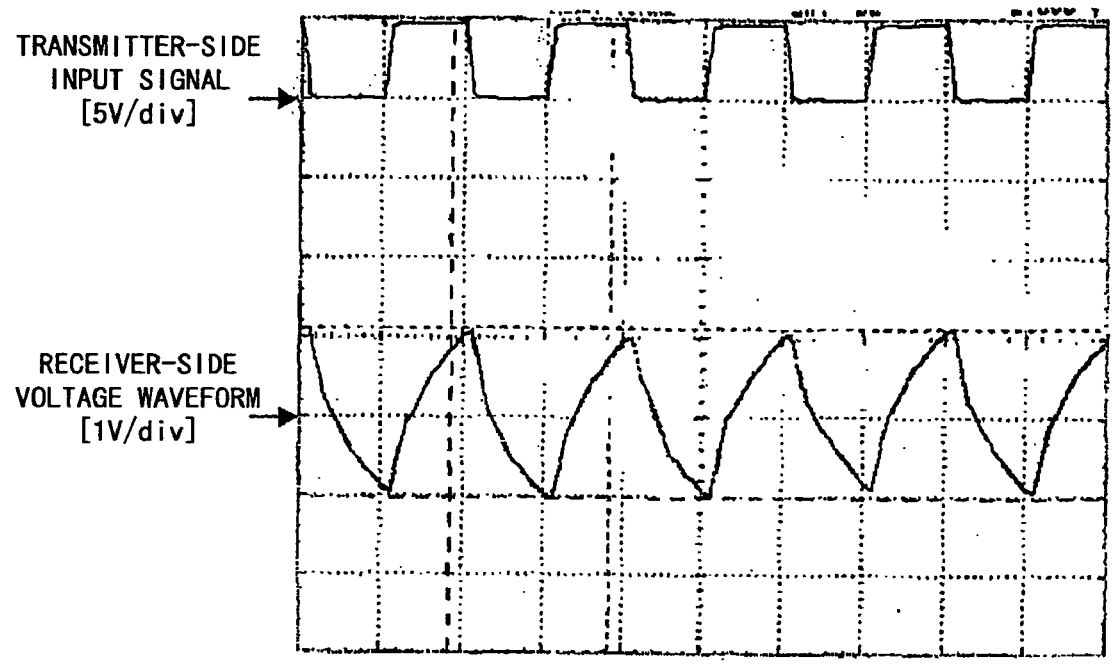
[LOAD RESISTANCE $R_L$=470Ω,
NO SIGNAL OUTPUT FROM POWER LINE TELECOMMUNICATION MODULE,
NO CONNECTION OF ELECTRIC APPLIANCE]
F I G. 6 7

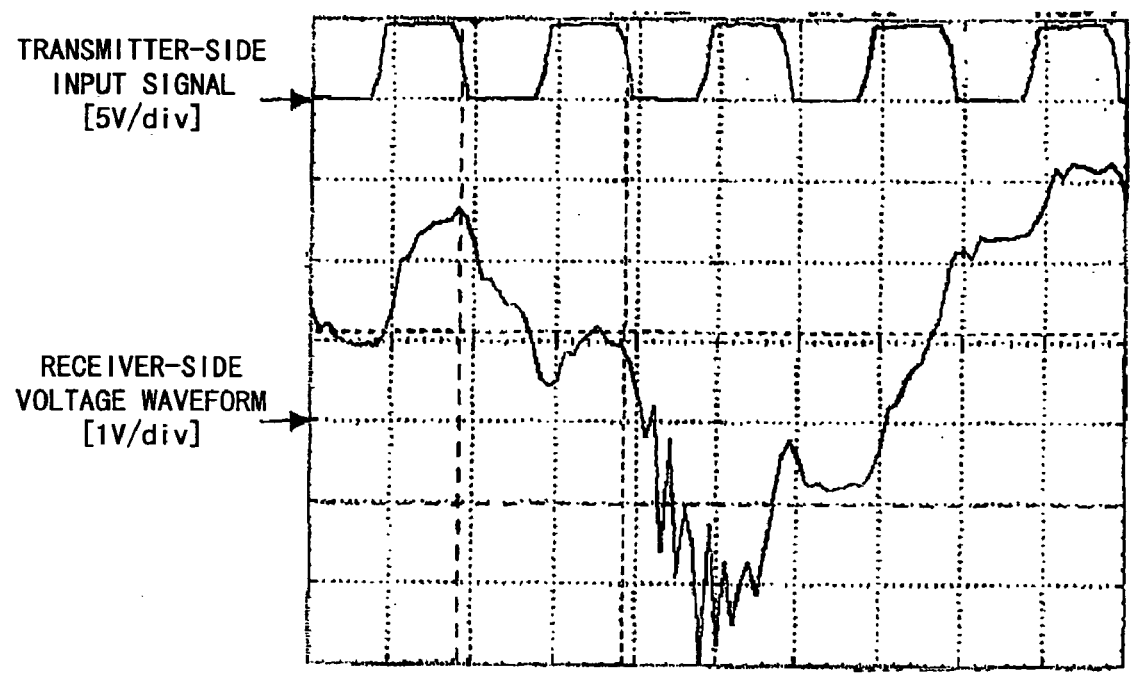
[LOAD RESISTANCE $R_L$=470Ω,
A SIGNAL OUTPUT FROM POWER LINE TELECOMMUNICATION MODULE,
NO CONNECTION OF ELECTRIC APPLIANCE]
F I G. 6 8

[LOAD RESISTANCE $R_L=330\Omega$,
NO SIGNAL OUTPUT FROM POWER LINE TELECOMMUNICATION MODULE,
NO CONNECTION OF ELECTRIC APPLIANCE]

[LOAD RESISTANCE $R_L$=330Ω,
A SIGNAL OUTPUT FROM POWER LINE TELECOMMUNICATION MODULE,
NO CONNECTION OF ELECTRIC APPLIANCE]

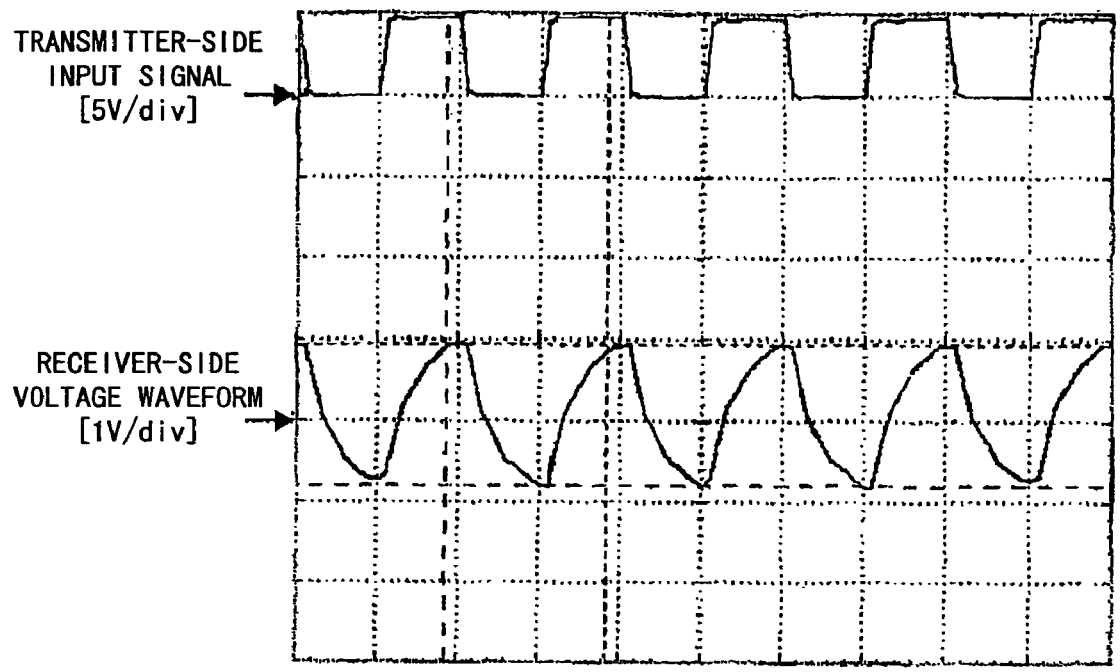
[LOAD RESISTANCE $R_L$=220Ω,
NO SIGNAL OUTPUT FROM POWER LINE TELECOMMUNICATION MODULE,
NO CONNECTION OF ELECTRIC APPLIANCE]
F I G. 7 1

[LOAD RESISTANCE $R_L=220\,\Omega$,
A SIGNAL OUTPUT FROM POWER LINE TELECOMMUNICATION MODULE,
NO CONNECTION OF ELECTRIC APPLIANCE]

[LOAD RESISTANCE $R_L=150\Omega$,
NO SIGNAL OUTPUT FROM POWER LINE TELECOMMUNICATION MODULE,
NO CONNECTION OF ELECTRIC APPLIANCE]

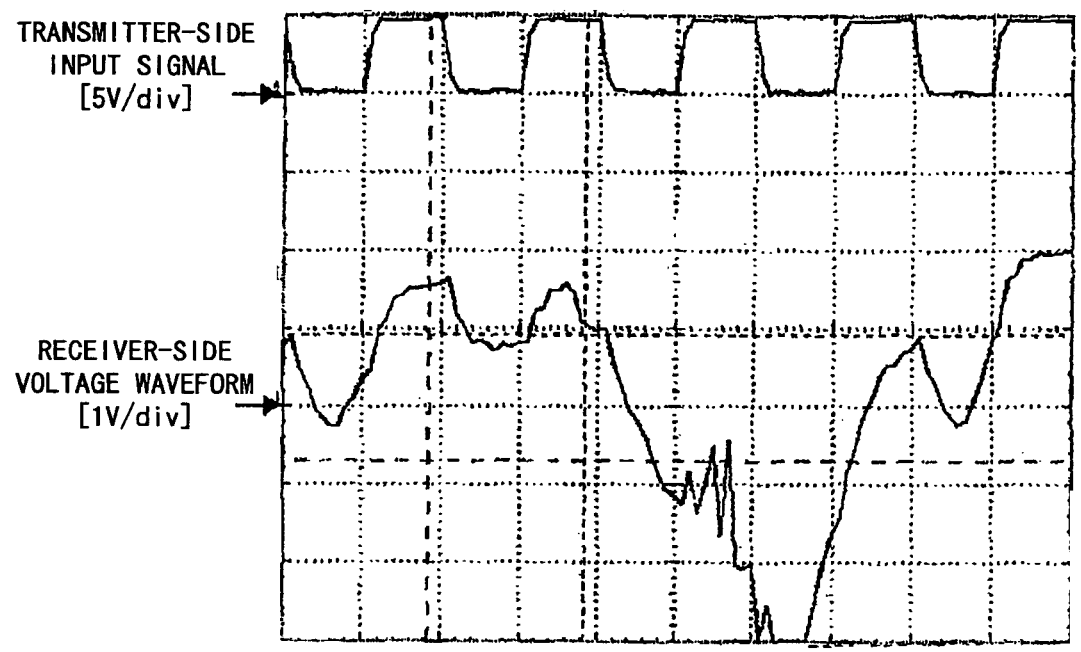
[LOAD RESISTANCE $R_L=150\Omega$,
A SIGNAL OUTPUT FROM POWER LINE TELECOMMUNICATION MODULE,
NO CONNECTION OF ELECTRIC APPLIANCE]
F I G. 74

[LOAD RESISTANCE $R_L=100\Omega$,
NO SIGNAL OUTPUT FROM POWER LINE TELECOMMUNICATION MODULE,
NO CONNECTION OF ELECTRIC APPLIANCE]

[LOAD RESISTANCE $R_L=100\Omega$,
A SIGNAL OUTPUT FROM POWER LINE TELECOMMUNICATION MODULE,
NO CONNECTION OF ELECTRIC APPLIANCE]

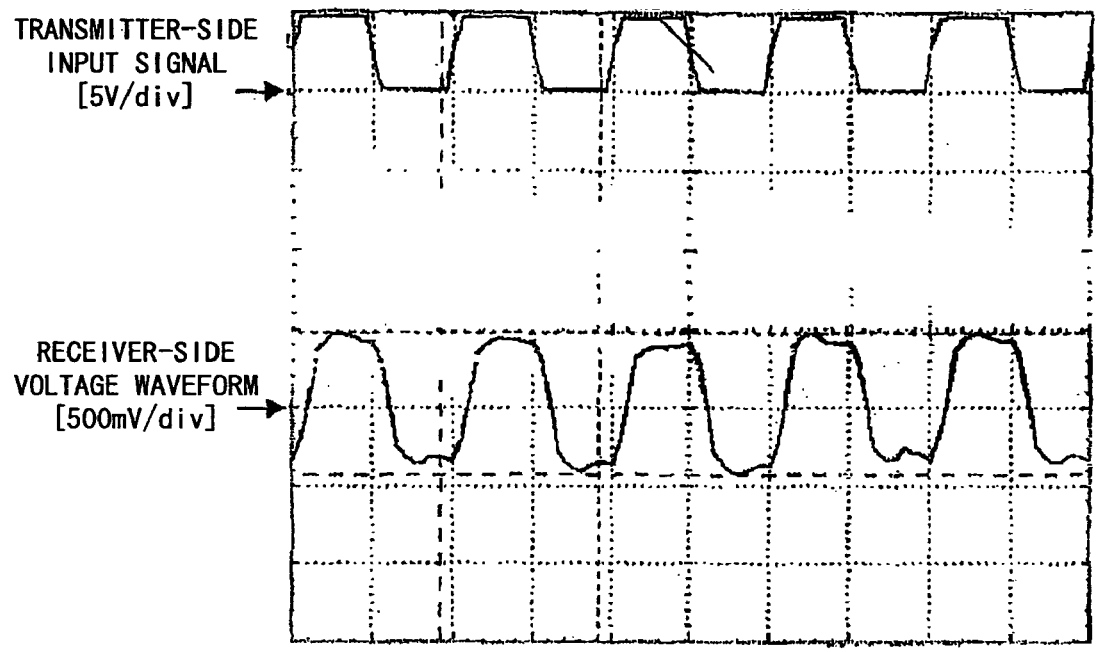
[LOAD RESISTANCE $R_L$=47Ω,
NO SIGNAL OUTPUT FROM POWER LINE TELECOMMUNICATION MODULE,
NO CONNECTION OF ELECTRIC APPLIANCE]
F I G. 77

[LOAD RESISTANCE $R_L=47\Omega$,
A SIGNAL OUTPUT FROM POWER LINE TELECOMMUNICATION MODULE,
NO CONNECTION OF ELECTRIC APPLIANCE]

[LOAD RESISTANCE $R_L$=33Ω,
NO SIGNAL OUTPUT FROM POWER LINE TELECOMMUNICATION MODULE,
NO CONNECTION OF ELECTRIC APPLIANCE]

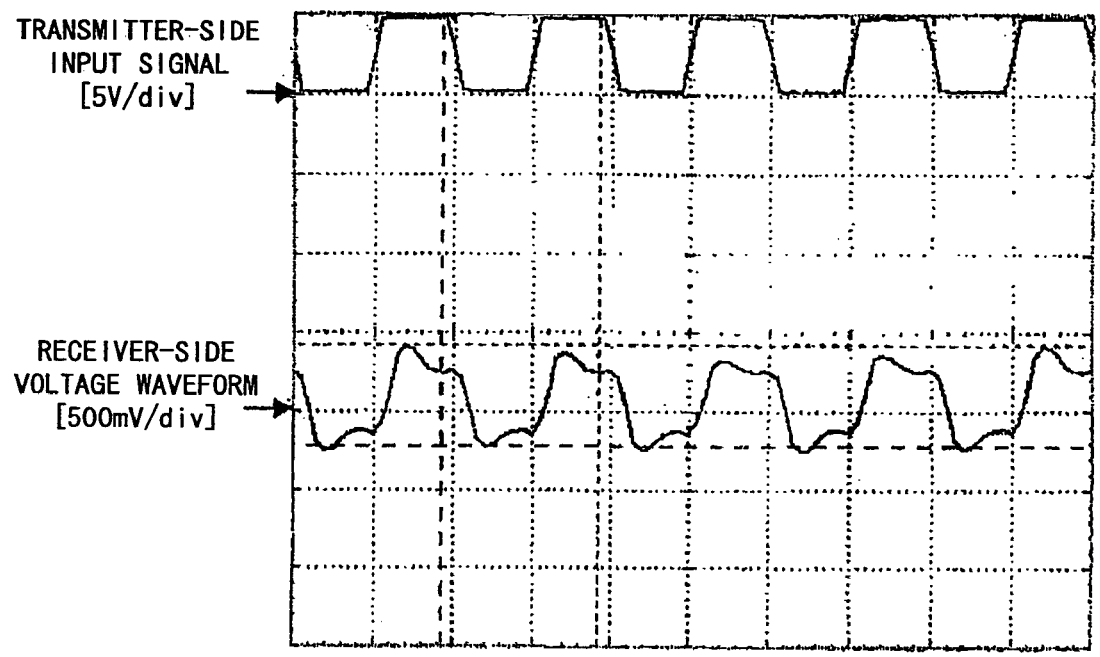
F I G. 81

[LOAD RESISTANCE $R_L=680\Omega$,
NO SIGNAL OUTPUT FROM POWER LINE TELECOMMUNICATION MODULE,
A CONNECTION OF ELECTRIC APPLIANCE]

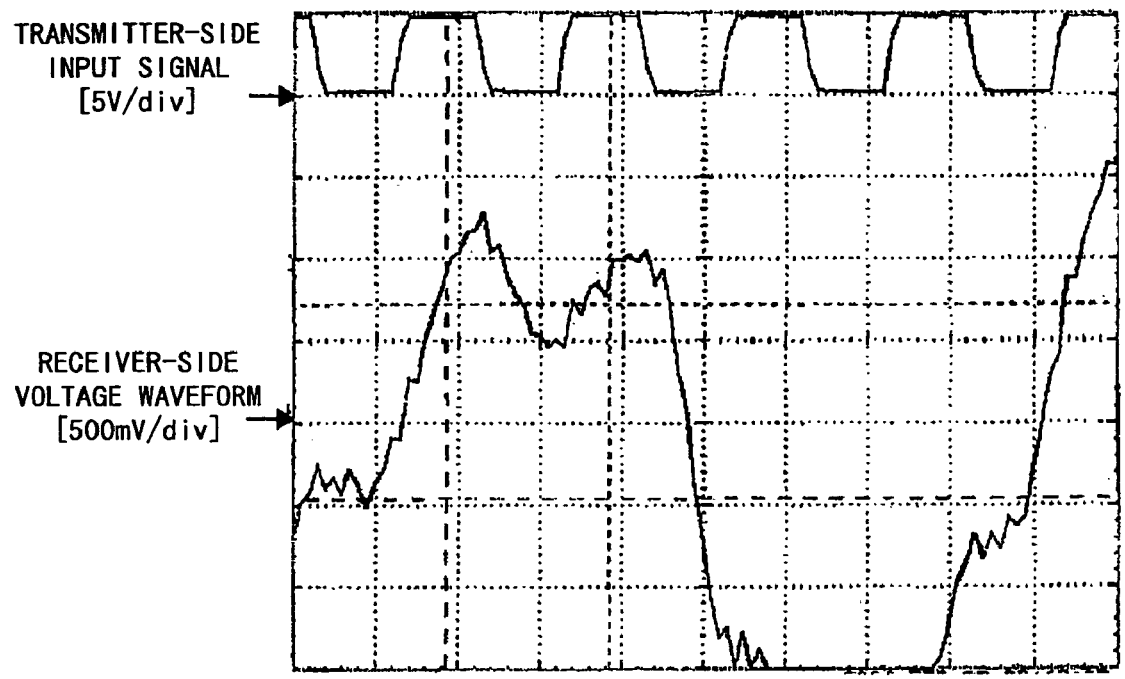
[LOAD RESISTANCE $R_L$=680Ω,
A SIGNAL OUTPUT FROM POWER LINE TELECOMMUNICATION MODULE,
A CONNECTION OF ELECTRIC APPLIANCE]
F I G. 84

[LOAD RESISTANCE $R_L$=470Ω,
NO SIGNAL OUTPUT FROM POWER LINE TELECOMMUNICATION MODULE,
A CONNECTION OF ELECTRIC APPLIANCE]

[LOAD RESISTANCE $R_L$=470 Ω,
A SIGNAL OUTPUT FROM POWER LINE TELECOMMUNICATION MODULE,
A CONNECTION OF ELECTRIC APPLIANCE]

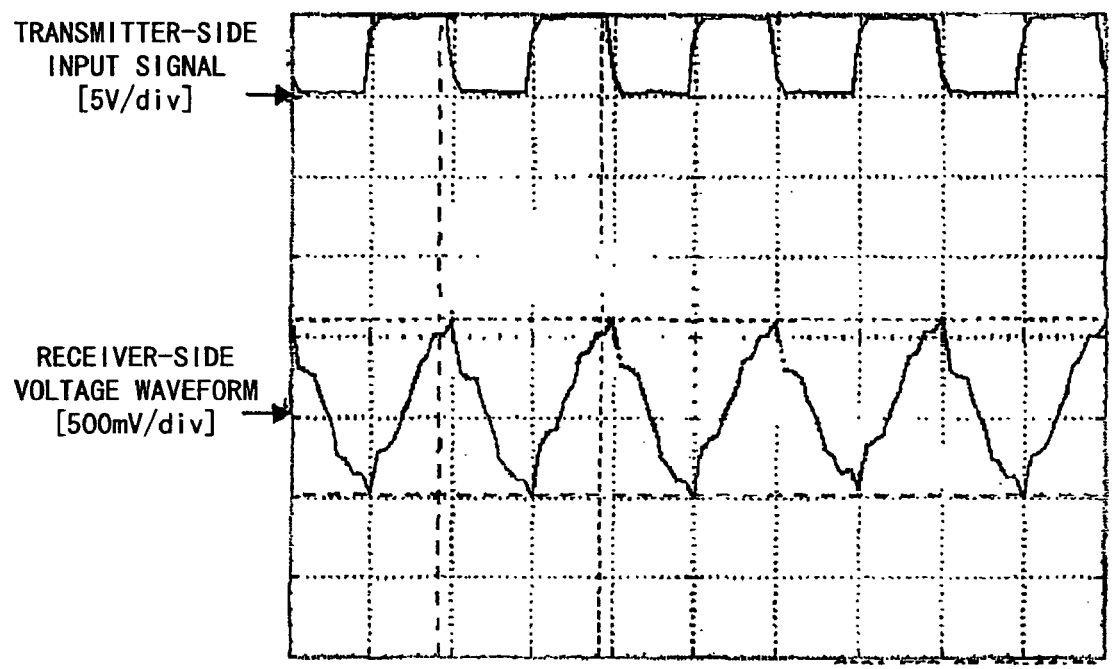
[LOAD RESISTANCE $R_L=330\,\Omega$,
A SIGNAL OUTPUT FROM POWER LINE TELECOMMUNICATION MODULE,
NO CONNECTION OF ELECTRIC APPLIANCE]
F I G. 8 7

[LOAD RESISTANCE $R_L$=330Ω,
A SIGNAL OUTPUT FROM POWER LINE TELECOMMUNICATION MODULE,
A CONNECTION OF ELECTRIC APPLIANCE]

[LOAD RESISTANCE $R_L=220\Omega$,
NO SIGNAL OUTPUT FROM POWER LINE TELECOMMUNICATION MODULE,
A CONNECTION OF ELECTRIC APPLIANCE]

[LOAD RESISTANCE $R_L=220\,\Omega$,
A SIGNAL OUTPUT FROM POWER LINE TELECOMMUNICATION MODULE,
A CONNECTION OF ELECTRIC APPLIANCE]

[LOAD RESISTANCE $R_L$=150 Ω,
NO SIGNAL OUTPUT FROM POWER LINE TELECOMMUNICATION MODULE,
A CONNECTION OF ELECTRIC APPLIANCE]

[LOAD RESISTANCE $R_L=150\Omega$,
A SIGNAL OUTPUT FROM POWER LINE TELECOMMUNICATION MODULE,
A CONNECTION OF ELECTRIC APPLIANCE]

[LOAD RESISTANCE $R_L$=100Ω,
NO SIGNAL OUTPUT FROM POWER LINE TELECOMMUNICATION MODULE,
A CONNECTION OF ELECTRIC APPLIANCE]

[LOAD RESISTANCE $R_L$=100Ω, A SIGNAL OUTPUT FROM POWER LINE TELECOMMUNICATION MODULE, A CONNECTION OF ELECTRIC APPLIANCE]

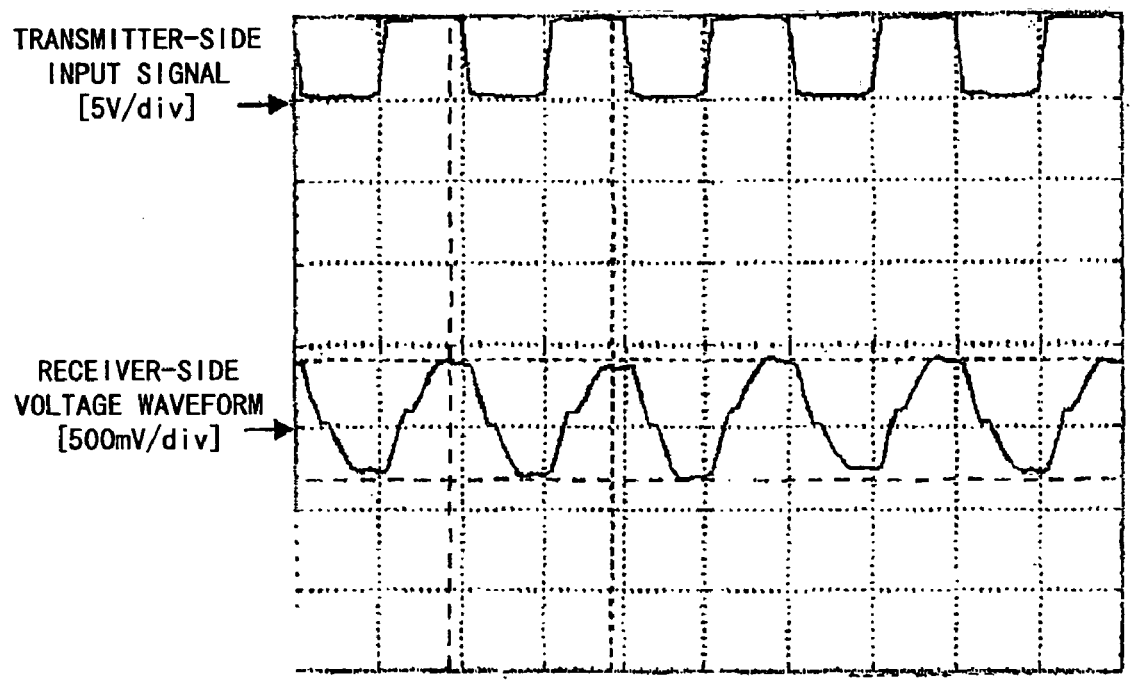
[LOAD RESISTANCE $R_L=47\Omega$,
NO SIGNAL OUTPUT FROM POWER LINE TELECOMMUNICATION MODULE,
A CONNECTION OF ELECTRIC APPLIANCE]
F I G. 95

[LOAD RESISTANCE $R_L=33\Omega$,
NO SIGNAL OUTPUT FROM POWER LINE TELECOMMUNICATION MODULE,
A CONNECTION OF ELECTRIC APPLIANCE]

[LOAD RESISTANCE $R_L = 33\Omega$,
A SIGNAL OUTPUT FROM POWER LINE TELECOMMUNICATION MODULE,
A CONNECTION OF ELECTRIC APPLIANCE]

[LOAD RESISTANCE $R_L=22\,\Omega$,
NO SIGNAL OUTPUT FROM POWER LINE TELECOMMUNICATION MODULE,
A CONNECTION OF ELECTRIC APPLIANCE]

[LOAD RESISTANCE $R_L$=22Ω, A SIGNAL OUTPUT FROM POWER LINE TELECOMMUNICATION MODULE, A CONNECTION OF ELECTRIC APPLIANCE]

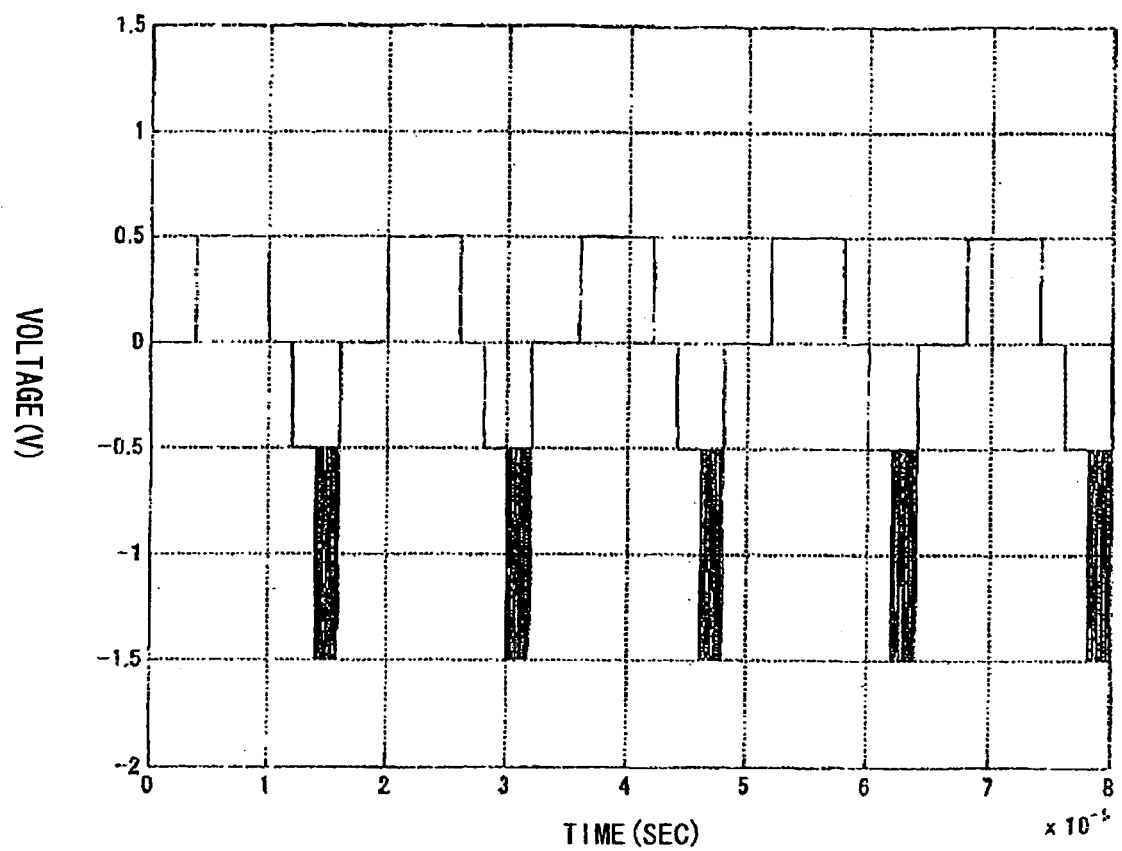
F I G. 102

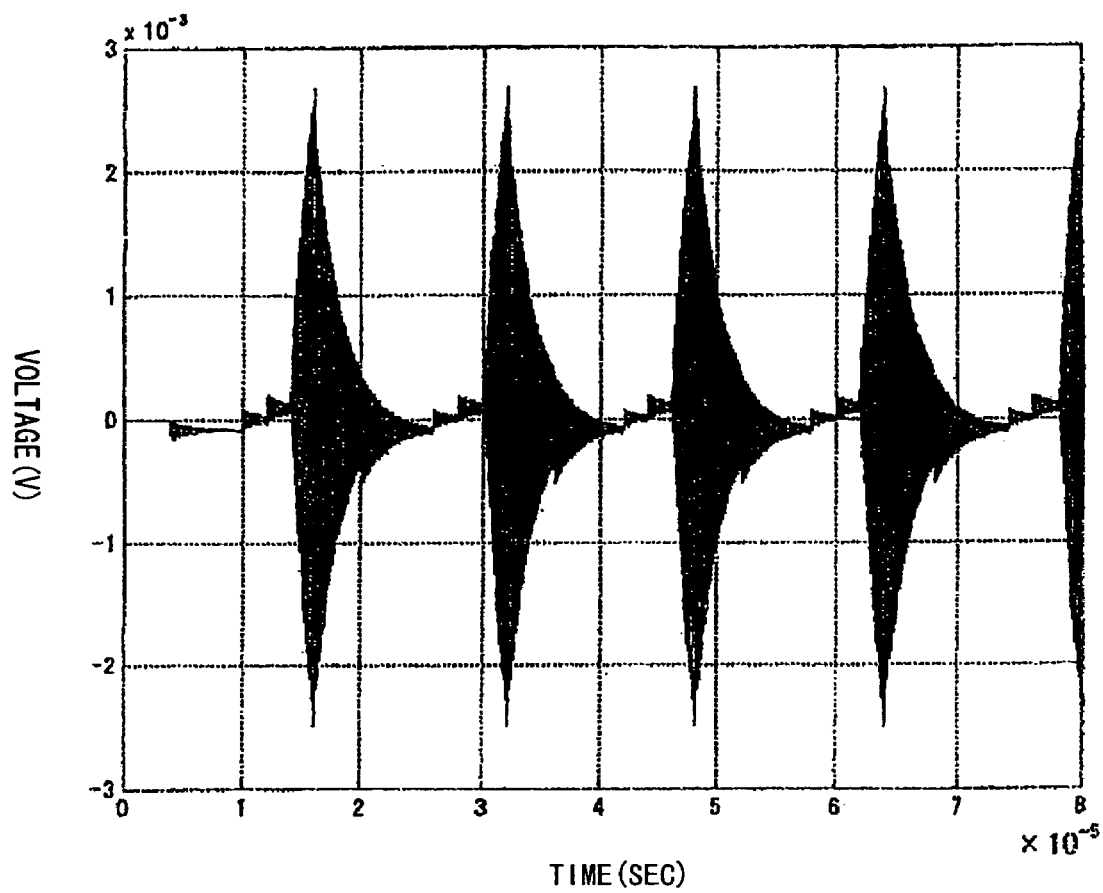
F I G. 106

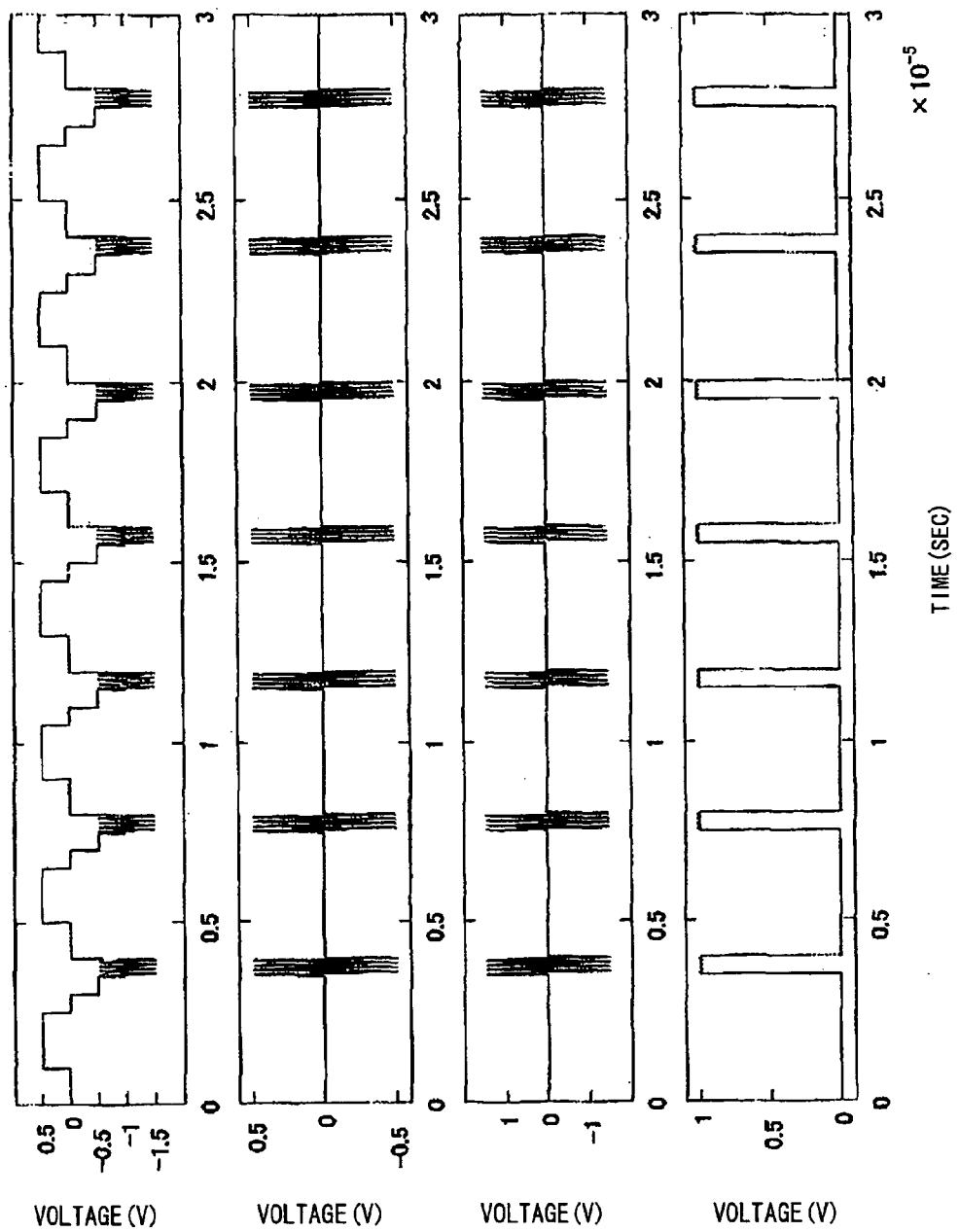
F I G. 117

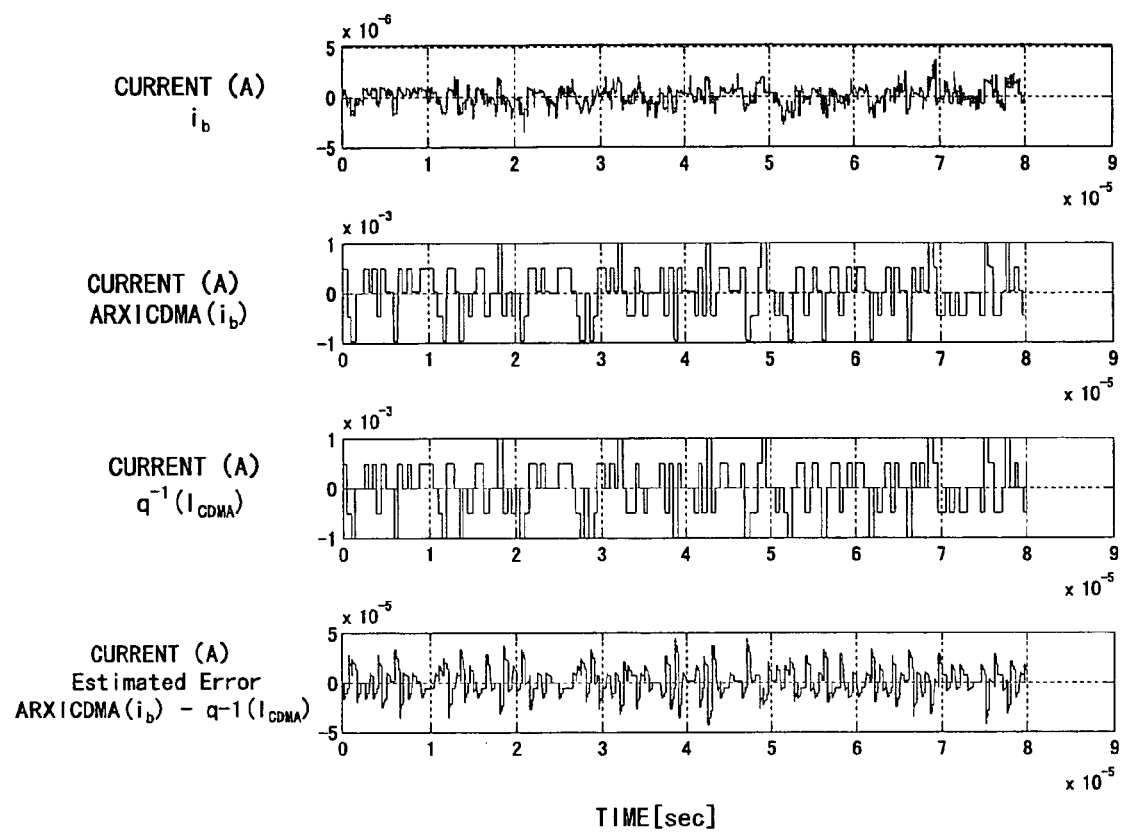
F I G. 1 2 0

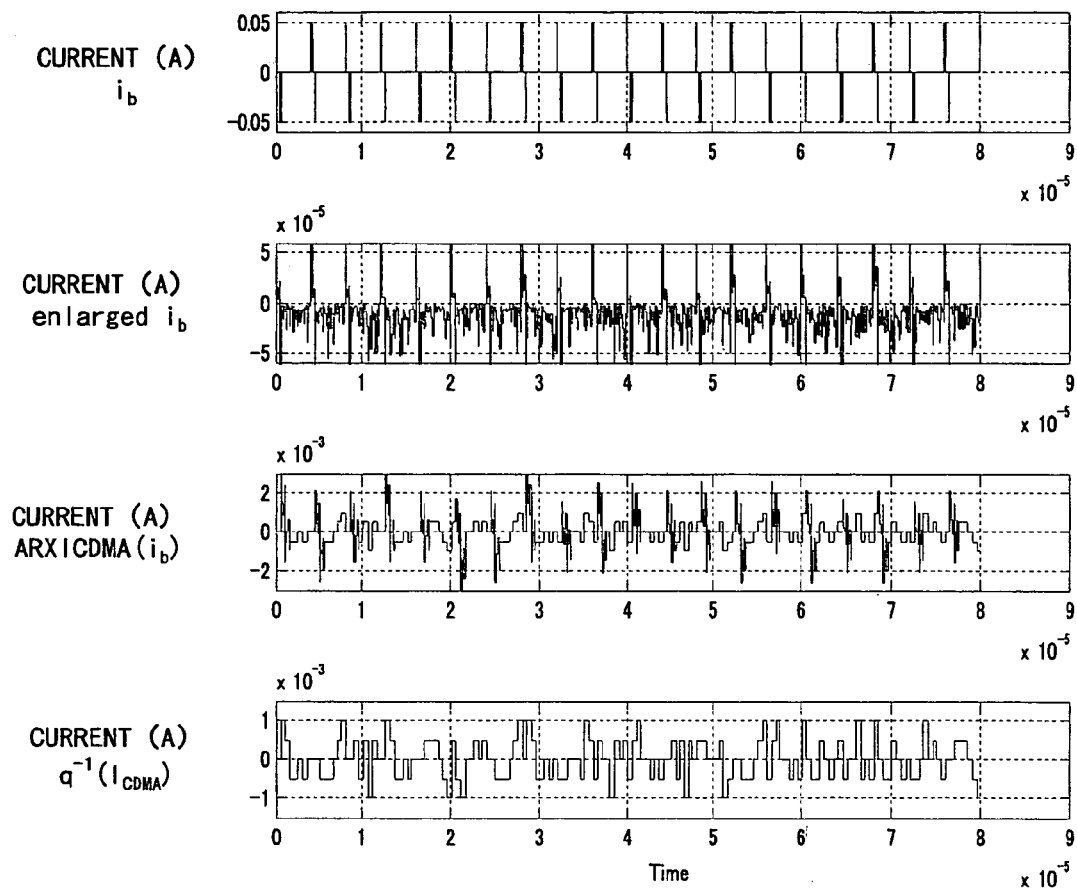
F I G. 1 2 3

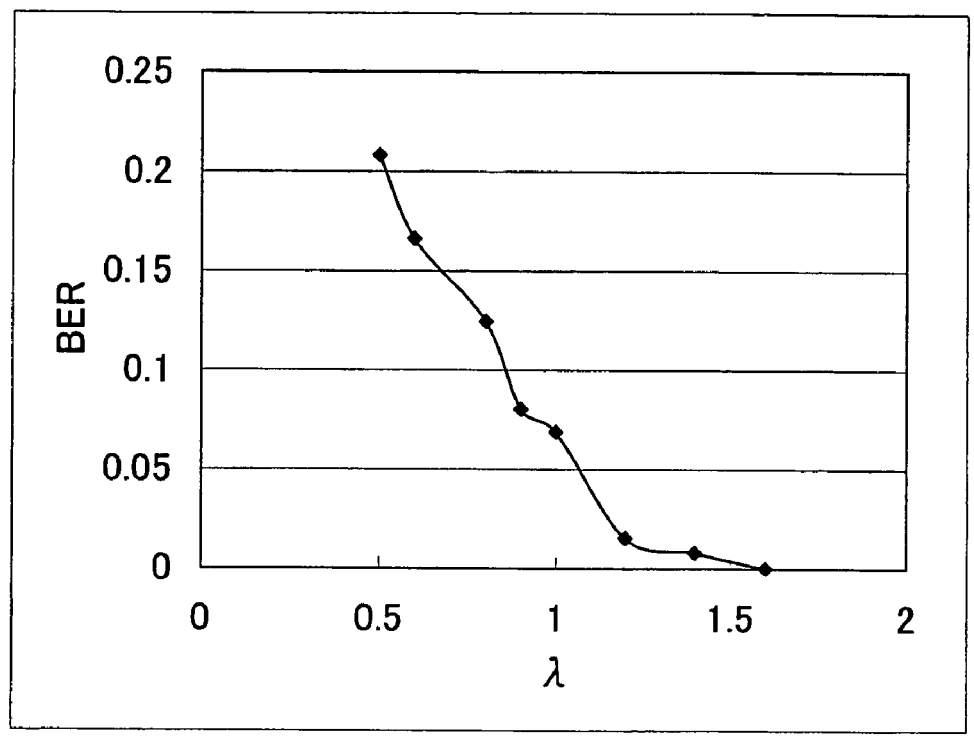
F I G. 1 2 4

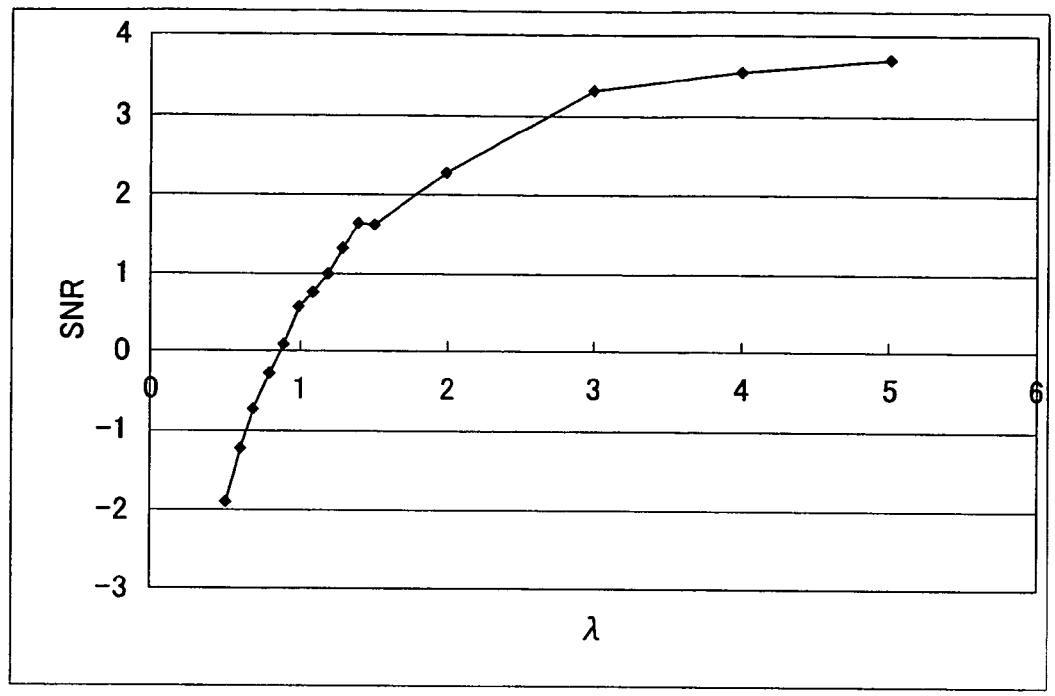
F I G. 125

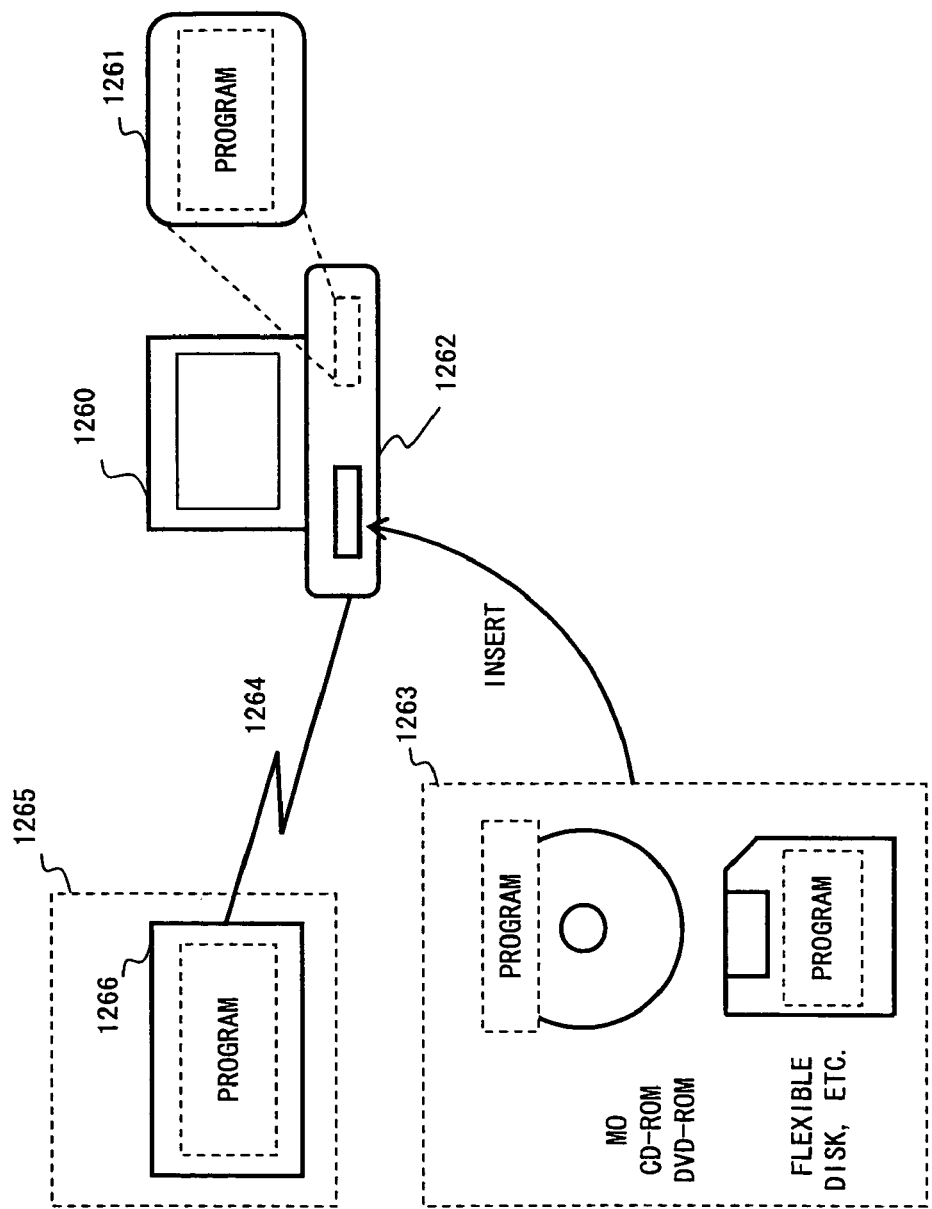

MULTIPLE ACCESS APPARATUS AND METHOD USING POWER LINE

BACKGROUND OF THE INVENTION

1. Field of the Invention

The present invention relates to a signal superimposing apparatus and a signal superimposing method which use a power signal of an alternate current (AC) power line as a carrier wave for use in a power line communication for transmitting an information signal, and in particular to a telecommunication apparatus and a telecommunication method which enable a telecommunication between a base station and a terminal station through a power line forming a many-to-many multiple access network of a code division multiple access type.

2. Description of the Related Art

Today, a power line communication (PLC) is considered to be effective as one of information transmission means for building up a ubiquitous society, which requires a very large transmission capacity and speed. In spite of the fact that networks, such as the Internet, utilizing indoor power line have actually been built up in Europe and America, little progress has been made in a development of a multiple channel code division multiple access type enabling a high speed simultaneous access of a plurality of terminals. Meanwhile, conceived as a multiple access system includes a method for dividing media into a plurality of channels and allocating them to individual stations, a method for each station measuring a usage condition of telecommunication media and performing a transmission control autonomously (i.e., a random access) and a multiple access system other than the random access; a commonly used method, however, is a random access system.

This method has only been capable of a time division telecommunication. For example, although a method of transmitting packetized data after confirming that other equipment performing an information and telecommunication on a power line, such as a Carrier Sense Multiple Access (CSMA) is adopted by many standards and products, a simultaneous access has not been enabled. As for other methods other than a random access, the considered as a multiple access system includes a frequency division multiple access (FDMA), a time division multiple access (TDMA); the frequency division multiple access (FDMA) type, however, is not suitable to a power line telecommunication in which a characteristic is widely different depending on a frequency. As for the TDMA type, it has been conventionally believed to be very difficult to accomplish it in a power line environment because the TDMA requires a common clock among each station.

And conventionally known is that a code division multiple access (CDMA) type is a method suitable to a power line telecommunication system as a method in which each station uses the same frequency by a spectrum diffusion technique and which does not require a central control. Also, the code division multiple access type, which superimposes a diffusion signal in a frequency dimension, has been believed to be desirable in terms of consistency with a modulation system, in place of a direct diffusion code division multiple access type which superimposes a diffusion signal in a time dimension. However, it has been difficult to accomplish a many-to-many simultaneous access in a power line telecommunication by the CDMA.

Meanwhile, a conventional power line communication method uses a sine wave power signal as carrier wave and sends out an information signal by superimposing with the power signal. Then, a receiving side separates the information signal superimposed with the power signal by using a filter. In this case, if an information signal is separated by a characteristic of a filter when the information signal is separated from the power signal, a phase of the information signal is shifted by the filter characteristic, which has caused no fundamental problem for the information signal being an analog signal. And if a digital signal is transmitted by the above described power line communication, a phase of the digital signal is shifted on the receiving side, resulting in deforming a waveform on the time axis.

In the case of transmitting a pulse signal by a pulse code modulation (PCM) system, however, the receiving side is capable of generating a pulse signal anew thus being enabled to respond to a distortion if the waveform is distorted on the time axis.

However, in the case of multiplexing a signal by applying a spectrum diffusion system, the receiving side is not capable of generating a pulse signal anew, as in the case of the PCM system. The distortion of the waveform on the time axis at the time of receiving a signal is actually a large issue of the spectrum diffusion system and CDMA.

In addition, another known method as one of the conventional power line communication systems is one for superimposing an information signal by making a sine wave power signal of an AC power line as a carrier wave. It is used, for example, for transmitting a relatively simple control signal such as an on/off control of a motor and an analog signal such as voice, and transmitting a digital signal by the PCM system. And most of the signal superimposing apparatuses used for the system is configured to superimpose an information signal on a power signal by making a connection transformer intervene between itself and the AC power line as a transmission path. There is accordingly a known fact that a phase, et cetera, of the information signal is changed by a certain filter which is formed by the connection transformer and AC power line, thus giving a waveform distortion to the superimposed information signal.

Even if such a waveform distortion is generated in an information signal, however, it has not caused a fundamental obstacle to the above noted control signal or analog signal because of the characteristic of a signal process, nor has it caused a difficulty to a digital signal used in the PCM system, to the extent of being incapable of repairing a code error due to a waveform distortion by means of a signal reproduction process on the reception side, and therefore a system level problem has not occurred.

Meanwhile, in the midst of various multiple access systems being considered in association with a progress of multiple access techniques in recent years, especially attracting attentions is the CDMA employing the spectrum diffusion multiplex system enabling a multiplexing by a simpler comprisal as compared to the frequency division multiple access system and time division multiple access system. However, if an information signal multiplexed according to the CDMA is attempted to transmit by the above noted power line communication system, a problem of an inability of demodulating the information signal arises because an inverse diffusion on the reception side becomes difficult due to a waveform distortion of the information signal. That is, the power line communication system using a power signal of an AC power line as carrier wave and superimposing an information signal on the power signal is incapable of superimposing the information signal of a desired waveform without a waveform distortion, and therefore a problem of being unable to transmit the information signal by the CDMA occurs.

In the meantime, patent documents 1, 2 and 3 have disclosed a telecommunication apparatus and method enabling a transmission by the CDMA by using a power line allowing a superimposition of an information signal of a desired waveform on a power signal of an AC power line. Particularly, provided are a telecommunication apparatus and method using a power line allowing superimposing an information signal of a desired waveform on a power signal of an AC power line (e.g., single phase, three-phase) having a ground or neutral point.

These telecommunication apparatus and method comprise a system (i.e., one-to-many communication) transmitting a code multiple division multiple point access-use information signal for simultaneously carrying a plurality of different pieces of information (e.g., an image, voice, facsimile, TCP/IP Protocol) from one service outlet, to many ones by transmitting a code multiple division multiple point access-use information signal by a voltage source from each service outlet and therefore other service outlets are only capable of receiving during the time when either service outlet is used for a transmission, hence precluding a use of a system (i.e., many-to-one communication) which simultaneously transmits a code division multiple point access-use information signal for simultaneously carrying a plurality of different pieces of information independently from different service outlets and receives at either one thereof, or a many-to-many simultaneous access of a code division multiple access type power line communication.

Furthermore, the above noted patent documents do not provide either (1) how to synchronize each code signal or (2) a method for forming a code multiplex signal both of which are the most important problems in accomplishing the CDMA for general uses including a portable phone in order to form a code multiplex signal from a synchronous signal on a power line and independent signals from individual service outlets and superimpose the code multiplex signal on the power line.

[Patent document 1] Registered U.S. Pat. No. 6,194,996
[Patent document 2] Laid-Open Japanese Patent Application Publication No. 11-88239
[Patent document 3] Laid-Open Japanese Patent Application Publication No. 2002-111554

SUMMARY OF THE INVENTION

The problem for the present invention is to provide a telecommunication apparatus and a telecommunication method accomplishing a one-to-many, many-to-one, and many-to-many simultaneous accesses in a power line telecommunication of a code division multiple access (CDMA) by using an AC power line (including the ground).

In order to solve the above noted problem, a power line telecommunication apparatus according to an embodiment is one carrying out a telecommunication superimposing, as an information signal, a power signal, which is externally supplied by way of a power line, on a power signal supplied to two-wire power line with neutral line (ground) on the secondary side of a transformer by way of the primary side thereof by making a voltage signal and a current signal mutually independent, wherein a base station is connected between the two-wire power line with neutral line on the secondary side of the transformer, and comprises a unit for carrying out a power line telecommunication with at least one or more terminal stations connecting between the two wire powers line with neutral line on the secondary side of the transformer and the base station comprises a unit for communicating also with an external telecommunication net; each of the terminal stations is connected between the two-wire power line with neutral line on the secondary side of the transformer, and comprises a unit for communicating with at least one or more of the base stations connected between the two-wire power line with neutral line on the secondary side of the transformer by way of the two-wire power line with neutral line, and down-linking from the base station to the terminal station, a unit for up-linking from the terminal station to base station, and a unit for controlling an apparatus capable of telecommunicating with the terminal station; and a unit by which the base station communicates with the terminal station by way of the two-wire power line with neutral line comprises a unit for estimating an impedance determined by the two-wire power line with neutral line and circuit elements of the power line telecommunication apparatus and correcting the voltage signal and current signal, and a unit for separating a synchronous signal superimposed with the information signal.

The base station according to an embodiment comprises a unit for connecting an element having an impedance serially to a power line telecommunication controller for superimposing the information signal, connecting the aforementioned two components between one of the two-wire power line with neutral line and the ground, connecting an element having an impedance between the other of the two-wire power line with neutral line and the ground, communicating with the external telecommunication net, and controlling each of the terminal apparatuses based on the obtained information.

The base station according to an embodiment comprises a dependent voltage source, a dependent current source and a unit for changing over between the aforementioned two sources, the dependent voltage source comprises a unit for communicating with the external telecommunication net and superimposing an information signal generated based on the obtained information, and the dependent current source comprises a unit for communicating with the external telecommunication net and superimposing an information signal generated based on the obtained information.

The base station according to an embodiment comprises a unit for carrying out a simultaneous connection of a code division multiple access.

The base station according to an embodiment comprises a unit for carrying out a simultaneous connection of a code division multiple access.

The terminal station according to an embodiment comprises a unit for connecting an element having an impedance serially to a power line telecommunication controller which superimposes the information signal, connecting the aforementioned two components between one of the two-wire power line with neutral line and the ground, connecting an element having an impedance between the other of the two-wire power line with neutral line and the ground, and controlling the base station based on the information obtained from an apparatus capable of communicating with the terminal station.

The terminal station according to an embodiment comprises a dependent voltage source, a dependent current source and a unit for changing over between the aforementioned two sources, the dependent voltage source comprises a unit for communicating with the external telecommunication net and superimposing an information signal generated based on the obtained information, and the dependent current source comprises a unit for communicating with the external telecommunication net and superimposing an information signal generated based on the obtained information.

The terminal station according to an embodiment comprises a dependent voltage source, a dependent current source and a unit for changing over between the aforementioned two sources, the dependent voltage source comprises a unit for communicating with said external telecommunication net and superimposing an information signal generated based on the obtained information, and the dependent current source comprises a unit for communicating with said external telecommunication net and superimposing an information signal generated based on the obtained information.

The terminal station according to an embodiment comprises a unit for carrying out a simultaneous connection of a code division multiple access.

The terminal station according to an embodiment is capable of using the base station, and becomes a base station by adding thereto a unit communicating with the external telecommunication net.

The element having an impedance according to an embodiment may be a capacitor.

The uplink according to an embodiment comprises a unit for generating a synchronous signal by the dependent voltage source of the base station and superimposing the signal on the two-wire power line with neutral line, and a unit for generating an information signal from the dependent current source of each of the terminal stations, forming a code division multiple access signal by superposing according to Kirchhoff's current law and superimposing the code division multiple access signal on the two-wire power line with neutral line based on a timing of the synchronous signal; and the base station comprises a unit for demodulating the information signal from the code division multiple access signal superimposed by each of the terminal stations.

The downlink according to an embodiment comprises a unit for generating a synchronous signal from the dependent current source of the terminal station and superimposing the synchronous signal on the two-wire power line with neutral line, and a unit for generating an information signal by the dependent voltage source of each of the base stations, forming a code division multiple access signal and superimposing it on the two-wire power line with neutral line based on a timing of the synchronous signal; and each of the terminal stations comprises a unit for demodulating the information signal from the code division multiple access signal superimposed by the base station.

The unit according to an embodiment for estimating an impedance determined by the two-wire power line with neutral line power line and circuit elements of the power line telecommunication apparatus comprises a unit being capable of estimating an impedance of a power line for superimposing and demodulating the code division multiple access signal and synchronous signal, respectively, and estimating by utilizing a parametric model.

The unit according to an embodiment for separating a synchronous signal comprises a unit being capable of extracting a voltage signal or current signal from a superimposed signal by estimating by utilizing a parametric model.

A power line telecommunication method according to an embodiment is one for carrying out a telecommunication superimposing, as an information signal, a power signal, which is externally supplied by way of a power line, on a power signal supplied to two-wire power line with neutral line on the secondary side of a transformer by way of the primary side thereof by making a voltage signal and a current signal mutually independent, wherein a base station is connected between the two-wire power line with neutral line on the secondary side of the transformer, and carries out a power line telecommunication with at least one or more terminal stations connecting between the two-wire power line with neutral line on the secondary side of the transformer and the base station communicates also with an external telecommunication net; each of the terminal stations, being connected between the two-wire power line with neutral line on the secondary side of the transformer, communicates with at least one or more of the base stations connected between the two-wire power line with neutral line on the secondary side of the transformer by way of the two-wire power line with neutral line, down-links from the base station to the terminal station, and up-links from the terminal station to the base station; the terminal station controls an apparatus capable of telecommunicating with the terminal station; and the base station and each of the terminal stations communicate with one another by way of the two-wire power line with neutral line, estimate an impedance determined by the two-wire power line with neutral line and circuit elements of the power line telecommunication apparatus and correcting the voltage signal and current signal, and separate a synchronous signal superimposed on the information signal.

The base station according to an embodiment connects an element having an impedance serially to a power line telecommunication controller for superimposing the information signal, connects them between one of the two-wire power line with neutral line and the ground, connects an element having an impedance between the other of the two-wire power line with neutral line and the ground, communicates with the external telecommunication net, and controls each of the terminal apparatuses based on the obtained information.

The base station according to claim 18 comprises a dependent voltage source and a dependent current source, and changes over between the aforementioned two sources, the dependent voltage source communicates with the external telecommunication net and superimposes an information signal generated based on the obtained information, and the dependent current source communicates with the external telecommunication net and superimposes an information signal generated based on the obtained information.

The base station according to an embodiment carries out a simultaneous connection of a code division multiple access.

The base station according to an embodiment carries out a simultaneous connection of a code division multiple access. The terminal station according to an embodiment connects an element having an impedance serially to a power line telecommunication controller for superimposing said information signal, connects them between one of said the two-wire power line with neutral line and the ground, connects an element having an impedance between the other of the two-wire power line with neutral line and the ground, and controls said base station based on information obtained from an apparatus capable of communicating with the terminal station.

The terminal station according to an embodiment comprises a dependent voltage source and a dependent current source, and changes over between the aforementioned two sources, the dependent voltage source communicates with the external telecommunication net and superimposes an information signal generated based on the obtained information, and the dependent current source communicates with the external telecommunication net and superimposes an information signal generated based on the obtained information.

The terminal station according to an embodiment comprises a dependent voltage source and a dependent current source, and changes over between the aforementioned two sources, the dependent voltage source communicates with the external telecommunication net and superimposes an information signal generated based on the obtained information, and the dependent current source communicates with the external telecommunication net and superimposes an information signal generated based on the obtained information.

The terminal station according to an embodiment carries out a simultaneous connection of a code division multiple access.

The terminal station according to an embodiment is capable of using the base station, and becomes a base station by adding thereto a unit communicating with the external telecommunication net.

The element having an impedance according to an embodiment is a capacitor.

The uplink according to an embodiment generates a synchronous signal by the dependent voltage source of the base station and superimposes the signal on the two-wire power line with neutral line, and generates an information signal from the dependent current source of each of the terminal stations, forms a code division multiple access signal by superposing according to Kirchhoff's current law and superimposes the code division multiple access signal on the two-wire power line with neutral line based on a timing of the synchronous signal; and the base station demodulates the information signal from the code division multiple access signal superimposed by each of the terminal stations.

The downlink according to an embodiment generates a synchronous signal from the dependent current source of the terminal station and superimposes the synchronous signal on the two-wire power line with neutral line, and generates an information signal by the dependent voltage source of each of the base stations, forms a code division multiple access signal and superimposes it on the two-wire power line with neutral line based on a timing of the synchronous signal; and each of the terminal stations demodulates the information signal from the code division multiple access signal superimposed by the base station.

The power line telecommunication method according to an embodiment enables an estimation of an impedance determined by the two-wire power line with neutral line and circuit elements of the power line telecommunication apparatus, estimating an impedance of a power line for superimposing and demodulating the code division multiple access signal and synchronous signal, respectively, and estimating by utilizing a parametric model.

The power line telecommunication method according to an embodiment enables an extraction of a voltage signal or current signal from a superimposed signal by estimating by utilizing a parametric model.

A computer readable recording medium according to an embodiment "A" is one recording a program for use in a computer used for a power line telecommunication system carrying out a telecommunication superimposing, as an information signal, a power signal, which is externally supplied by way of a power line, on a power signal supplied to two-wire power line with neutral line on the secondary side of a transformer by way of the primary side thereof by making a voltage signal and a current signal mutually independent, wherein the recording medium enables the aforementioned computer to read the program for carrying out the processes of: a base station, being connected between the two-wire power line with neutral line on the secondary side of the transformer, carrying out a power line telecommunication with at least one or more terminal stations connecting between the two-wire power line with neutral line on the secondary side of the transformer and the base station communicating also with an external telecommunication net; each of the terminal stations, being connected between the two-wire power line with neutral line on the secondary side of the transformer, communicating with at least one or more of the base stations connected between the two-wire power line with neutral line on the secondary side of the transformer by way of the two-wire power line with neutral line, and down-linking from the base station to terminal station; up-linking from the terminal station to the base station; the terminal station controlling an apparatus capable of telecommunicating with the terminal station; the base station communicating with each of the terminal stations by way of the two-wire power line with neutral line and estimating an impedance determined by the two-wire power line with neutral line and circuit elements of the power line telecommunication apparatus and correcting the voltage signal and current signal; and separating a synchronous signal superimposed on the information signal.

A base station according to an embodiment is that of a power line telecommunication apparatus carrying out a telecommunication superimposing, as an information signal, a power signal, which is externally supplied by way of a power line, on a power signal supplied to two-wire power line with neutral line on the secondary side of a transformer by way of the primary side thereof by making a voltage signal and a current signal mutually independent, wherein the base station is connected between the two-wire power line with neutral line on the secondary side of the transformer, and comprises a unit for carrying out a power line telecommunication with at least one or more terminal stations connecting between the two-wire power line with neutral line on the secondary side of the transformer, a unit for communicating also with an external telecommunication net, a unit, which connects a capacitor serially to a power line telecommunication controller superimposing the information signal, connects the aforementioned two components between one of the two-wire power line with neutral line and the ground, and connects a capacitor between the other of the two-wire power line with neutral line and the ground, for performing a telecommunication with the external telecommunication net and controlling each of the terminal stations based on the obtained information; and a unit by which the base station communicates with the terminal station by way of the two-wire power line with neutral line comprises a unit for estimating an impedance determined by the two-wire power line with neutral line and circuit elements of the power line telecommunication apparatus and correcting the voltage signal and current signal, and a unit for separating a synchronous signal superimposed with the information signal.

The base station according to an embodiment comprises a dependent voltage source, a dependent current source and a unit for changing over between the aforementioned two sources, the dependent voltage source comprises a unit for communicating with the external telecommunication net and superimposing an information signal generated based on the obtained information, and the dependent current source comprises a unit for communicating with the external telecommunication net and superimposing an information signal generated based on the obtained information.

The base station according to an embodiment comprises a unit for carrying out a simultaneous connection of a code division multiple access.

The unit for estimating an impedance determined by the two-wire power line with neutral line and circuit elements of the power line telecommunication apparatus according to an embodiment comprises a unit being capable of estimating an impedance of a power line for superimposing and demodulating the code division multiple access signal and synchronous signal, respectively, and estimating by utilizing a parametric model.

The unit for separating a synchronous signal according to an embodiment comprises a unit being capable of extracting a voltage signal or current signal from a superimposed signal by estimating by utilizing a parametric model.

According to an embodiment, the base station of a power line telecommunication apparatus noted in embodiment "A" mentioned above comprises a circuit for superimposing a synchronous signal generated by said dependent voltage source of the base station on the two-wire power line with neutral line, inputting an input signal to the dependent current source of each of said terminal stations by amplifying it, forming a code division multiplex access signal by superposing the inputs by the Kirchhoff's current law and superimposing on the two-wire power line with neutral line based on a timing of the synchronous signal when the terminal station performs an uplink to the base station; and a circuit for the base station demodulating the code division multiplex access signal superimposed at each of the terminal stations.

According to an embodiment, the base station of a power line telecommunication apparatus noted in embodiment "A" mentioned above comprises a circuit for superimposing a synchronous signal generated by said dependent voltage source of the terminal station on the two-wire power line with neutral line, inputting an input signal to the dependent current source of each of the base stations by amplifying it, forming a code division multiplex access signal by superposing the inputs by the Kirchhoff's current law and superimposing on the two-wire power line with neutral line based on a timing of the synchronous signal when the base station performs an downlink to the terminal station; and a circuit for each of the terminal station demodulating the code division multiplex access signal superimposed at the base stations. A terminal station according to an embodiment is that of a power line telecommunication apparatus carrying out a telecommunication superimposing, as an information signal, a power signal, which is externally supplied by way of a power line, on a power signal supplied to two-wire power line with neutral line on the secondary side of a transformer by way of the primary side thereof by making a voltage signal and a current signal mutually independent, wherein the terminal station connects a capacitor serially to a power line telecommunication controller superimposing the information signal, and connects the aforementioned two components between one of the two-wire power line with neutral line and the ground, and connects a capacitor between the other of the two-wire power line with neutral line and the ground, and comprises a unit for controlling the base station connected between the two-wire power line with neutral line on the secondary side of the transformer based on information obtained from an apparatus communicable with the terminal station; a unit by which the base station communicates with each of the terminal station by way of the two-wire power line with neutral line comprises a unit for estimating an impedance determined by the two-wire power line with neutral line and circuit elements of the power line telecommunication apparatus and correcting the voltage signal and current signal, and a unit for separating a synchronous signal superimposed with the information signal.

The terminal station according to an embodiment comprises a dependent voltage source, a dependent current source and a unit for changing over between the aforementioned two sources, the dependent voltage source comprises a unit for communicating with the external telecommunication net and superimposing an information signal generated based on the obtained information, and the dependent current source comprises a unit for communicating with the external telecommunication net and superimposing an information signal generated based on the obtained information.

The terminal station according to an embodiment comprises a unit for carrying out a simultaneous connection of a code division multiple access.

The terminal station according to an embodiment is capable of using the base station, and becomes a base station by adding thereto a unit communicating with the external telecommunication net.

The unit for estimating an impedance determined by the two-wire power line with neutral line and circuit elements of the power line telecommunication apparatus according to an embodiment comprises a unit being capable of estimating an impedance of a power line for superimposing and demodulating the code division multiple access signal and synchronous signal, respectively, and estimating by utilizing a parametric model. The unit for separating a synchronous signal according to an embodiment comprises a unit which is capable of extracting a voltage signal or current signal from a superimposed signal by estimating by utilizing a parametric model.

The base station according to an embodiment comprises a circuit for superimposing a synchronous signal generated by said dependent voltage source of the base station on said two-wire power line with neutral line, inputting an input signal to said dependent current source of each of said terminal stations by amplifying it, forming a code division multiplex access signal by superposing the inputs by the Kirchhoff's current law and superimposing on the two-wire power line with neutral line based on a timing of the synchronous signal when the terminal station performs an uplink to the base station; and a circuit for the base station demodulating the code division multiplex access signal superimposed at each of the terminal stations.

The base station according to an embodiment comprises a circuit for superimposing a synchronous signal generated by said dependent voltage source of said terminal station on said two-wire power line with neutral line, inputting an input signal to said dependent current source of each of the base stations by amplifying it, forming a code division multiplex access signal by superposing the inputs by the Kirchhoff's current law and superimposing on the two-wire power line with neutral line based on a timing of the synchronous signal when the base station performs a downlink to the terminal station; and a circuit for each of the terminal station demodulating the code division multiplex access signal superimposed at the base stations.

A power line telecommunication apparatus according to an embodiment comprises: a transformer for supplying the two-wire power line with neutral line on the secondary side of the transformer by way of the primary side thereof with a power signal supplied from the outside by way of a power line; a base station for telecommunicating with a telecommunication apparatus by a line, connecting a capacitor serially to one of the two-wire power line with neutral line, connecting a capacitor serially between the other of the two-wire power line with neutral line and the ground, comprising a dependent voltage source for superimposing a voltage signal independently on the two-wire power line with neutral line and comprising a dependent current source for superimposing a current signal independently thereon and changing over between the dependent voltage source and dependent current source; a terminal station for telecommunicating with a telecommunication apparatus, connecting a capacitor serially to one of the two-wire power line with neutral line, connecting a second element having a capacitor serially between the other of the two-wire power line with neutral line and the ground, comprising a dependent voltage source for superimposing a voltage signal independently on the two-wire power line with neutral line and comprising a dependent current source for superimposing a current signal independently thereon and changing over between the dependent voltage source and dependent current source; a circuit comprising a parametric model for estimating an impedance determined by the two-wire power line with neutral line and circuit elements of the power line telecommunication apparatus and correcting the voltage signal and current signal when the base station communicates with each of the terminal stations by way of the two-wire power line with neutral line; a circuit for superimposing a synchronous signal generated by said dependent voltage source of the base station on said two-wire power line with neutral line, inputting an input signal to said dependent current source of each of said terminal stations by amplifying it, forming a code division multiplex access signal by superposing the inputs by the Kirchhoff's current law and superimposing on the two-wire power line with neutral line based on a timing of the synchronous signal when the terminal station performs an uplink to the base station; and a circuit for the base station demodulating the code division multiplex access signal superimposed at each of the terminal stations.

A power line telecommunication apparatus according to an embodiment comprises: a transformer for supplying the two-wire power line with neutral line on the secondary side of the transformer by way of the primary side thereof with a power signal supplied from the outside by way of a power line; a base station for telecommunicating with a telecommunication apparatus by a line, connecting a capacitor serially to one of the two-wire power line with neutral line, connecting a capacitor serially between the other of the two-wire power line with neutral line and the ground, comprising a dependent voltage source for superimposing a voltage signal independently on the two-wire power line with neutral line and comprising a dependent current source for superimposing a current signal independently thereon and changing over between the dependent voltage source and dependent current source; a terminal station for telecommunicating with a telecommunication apparatus, connecting a capacitor serially to one of the two-wire power line with neutral line, connecting a second element having a capacitor serially between the other of the two-wire power line with neutral line and the ground, comprising a dependent voltage source for superimposing a voltage signal independently on the two-wire power line with neutral line and comprising a dependent current source for superimposing a current signal independently thereon and changing over between the dependent voltage source and dependent current source; a circuit comprising a parametric model for estimating an impedance determined by the two-wire power line with neutral line and circuit elements of the power line telecommunication apparatus and correcting the voltage signal and current signal when the base station communicates with each of the terminal stations by way of the two-wire power line with neutral line; a circuit for superimposing a synchronous signal generated by said dependent voltage source of said terminal station on said two-wire power line with neutral line, inputting an input signal to said dependent current source of each of the base stations by amplifying it, forming a code division multiplex access signal by superposing the inputs by the Kirchhoff's current law and superimposing on the two-wire power line with neutral line based on a timing of the synchronous signal when the base station performs a downlink to the terminal station; and a circuit for each of the terminal station demodulating the code division multiplex access signal superimposed at the base stations.

The unit for separating a synchronous signal according to an embodiment comprises a unit for performing an estimation by utilizing a parametric model, thereby extracting a synchronization-use marker signal superimposed, by a predetermined chip width, on a voltage signal or current signal that is said information signal, and making the extracted a synchronous signal.

The separation of said synchronous signal according to an embodiment performs an estimation by utilizing a parametric model, thereby extracting a synchronization-use marker signal superimposed, by a predetermined chip width, on a voltage signal or current signal that is said information signal, and making the extracted a synchronous signal.

The present invention is contrived to not only secure a large number of channels allowing a simultaneous use, but also allow a use of a time division telecommunication at the same time in a power line telecommunication network system, thereby enabling an increase in a telecommunication transmission capacity between individual service outlets as compared to the conventional method. Also enabled is a capability of securing a sufficient level of security for managing and operating a networked electrical appliances, a management system used for a coin-operated laundry, an unmanned shop, et cetera, because the code division multiple access namely uses a different code for each channel as a simple encoding key in encoding a signal of each channel and superposing on one another, followed by the receiving end demodulating a signal of a required channel by using the encoding key thereof. There is a possibility of theft of important information from a radio wave transmitted from a portable phone, radio communication equipment, et cetera, such security, however, is secured by a control and telecommunication by way of a network system provided by the present invention.

A use of the power line telecommunication makes it possible to increase a telecommunication transmission capacity between each service outlet and therefore the present invention is empowered to constitute a backbone technique for a power line telecommunication part in building up a ubiquitous society by using an optical, radio wave, power line telecommunications.

BRIEF DESCRIPTION OF THE DRAWINGS

FIG. 1 is a network connection diagram of an information terminal constituting a base station, showing a many-to-many simultaneous access network form of a code division multiple access (CDMA) on a power line;

FIG. 2 is a diagram showing a simulation model of a power line communication (PLC) controller;

FIG. 4 is a diagram showing a dependent voltage source;

FIG. 12 is an equivalent circuit of FIG. 11;

FIG. 13 exemplifies a connection between a transmission unit and a reception unit by one circuit in a model for simulating a code division multiple access (CDMA) for accomplishing a digital signal process (DSP);

FIG. 15 is an internal model of a demodulation unit of CDMA;

FIG. 16 is a diagram showing a result of simulation shown in FIG. 13 (at the time of injecting a white noise);

FIG. 17 shows an original type model of a same clock time code division multiple telecommunication enabling an uplink connection to a base station from a terminal station connecting to an individual service outlet also considering an influence of a distribution constant of a power line to a power line impedance environment and a current signal superimposing-type code division multiple telecommunication (access) simulation;

FIG. 21 shows a same clock time mixed type enabling a downlink connection from a base station to a terminal station connected to an individual service outlet and an uplink connection to a base station from a terminal station connected to an individual service outlet in a power line impedance environment and a simultaneous voltage and current signals superimposing-type code division multiple telecommunication (access) simulation (which considers a distribution constant-wise influence of a power line; while a synchronous signal uses a simplified model);

FIG. 28 shows an output voltage waveform on the primary side of a step-down transformer of a power line model;

FIG. 32 is an experimental circuit of a power line telecommunication by using a current source circuit;

FIG. 38 shows an input signal waveform of a transmission-side current source circuit and a reception-side voltage waveform in the event of $R_L$ at 220 ohms;

FIG. 39 shows an input signal waveform of a transmission-side current source circuit and a reception-side voltage waveform in the event of $R_L$ at 150 ohms;

FIG. 42 shows an input signal waveform of a transmission-side current source circuit and a reception-side voltage waveform in the event of $R_L$ at 33 ohms;

FIG. 43 shows an input signal waveform of a transmission-side current source circuit and a reception-side voltage waveform in the event of $R_L$ at 22 ohms;

FIG. 45 shows an input signal waveform of a transmission-side current source circuit and a reception-side voltage waveform in the event of $R_L$ at 680 ohms;

FIG. 47 shows an input signal waveform of a transmission-side current source circuit and a reception-side voltage waveform in the event of $R_L$ at 330 ohms;

FIG. 49 shows an input signal waveform of a transmission-side current source circuit and a reception-side voltage waveform in the event of $R_L$ at 150 ohms;

FIG. 50 shows an input signal waveform of a transmission-side current source circuit and a reception-side voltage waveform in the event of $R_L$ at 100 ohms;

FIG. 52 shows an input signal waveform of a transmission-side current source circuit and a reception-side voltage waveform in the event of $R_L$ at 33 ohms;

FIG. 54 is an experimental circuit of a power line telecommunication by using a current source circuit;

FIG. 55 shows an input signal waveform of a transmission-side current source circuit and a reception-side voltage waveform in the event of $R_L$ at 680 ohms;

FIG. 56 shows an input signal waveform of a transmission-side current source circuit and a reception-side voltage waveform in the event of $R_L$ at 470 ohms;

FIG. 58 shows an input signal waveform of a transmission-side current source circuit and a reception-side voltage waveform in the event of $R_L$ at 220 ohms;

FIG. 59 shows an input signal waveform of a transmission-side current source circuit and a reception-side voltage waveform in the event of $R_L$ at 150 ohms;

FIG. 60 shows an input signal waveform of a transmission-side current source circuit and a reception-side voltage waveform in the event of $R_L$ at 100 ohms;

FIG. 62 shows an input signal waveform of a transmission-side current source circuit and a reception-side voltage waveform in the event of $R_L$ at 33 ohms;

FIG. 63 shows an input signal waveform of a transmission-side current source circuit and a reception-side voltage waveform in the event of $R_L$ at 22 ohms;

FIG. 64 is an experimental circuit of a power line telecommunication by using a power line telecommunication module and a current source circuit;

FIG. 65 is a measured waveform in the absence of an output of a current signal from a power line telecommunication module or current source circuit in the case of no connection of an electric appliance in the event of $R_L$ at 680 ohms;

FIG. 67 is a measured waveform in the absence of an output of a current signal from a power line telecommunication module or current source circuit in the case of no connection of an electric appliance in the event of $R_L$ at 470 ohms;

FIG. 68 is a measured waveform in the presence of an output of a current signal from a power line telecommunication module or current source circuit in the case of no connection of an electric appliance in the event of $R_L$ at 470 ohms;

FIG. 71 is a measured waveform in the absence of an output of a current signal from a power line telecommunication module or current source circuit in the case of no connection of an electric appliance in the event of $R_L$ at 220 ohms;

FIG. 74 is a measured waveform in the presence of an output of a current signal from a power line telecommunication module or current source circuit in the case of no connection of an electric appliance in the event of $R_L$ at 150 ohms;

FIG. 77 is a measured waveform in the absence of an output of a current signal from a power line telecommunication module or current source circuit in the case of no connection of an electric appliance in the event of $R_L$ at 47 ohms;

FIG. 81 is a measured waveform in the absence of an output of a current signal from a power line telecommunication module or current source circuit in the case of no connection of an electric appliance in the event of $R_L$ at 22 ohms;

FIG. 84 is a measured waveform in the presence of an output of a current signal from a power line telecommunication module or current source circuit in the case of a connection of an electric appliance in the event of $R_L$ at 680 ohms;

FIG. 87 is a measured waveform in the absence of an output of a current signal from a power line telecommunication module or current source circuit in the case of a connection of an electric appliance in the event of $R_L$ at 330 ohms;

FIG. 95 is a measured waveform in the absence of an output of a current signal from a power line telecommunication module or current source circuit in the case of a connection of an electric appliance in the event of $R_L$ at 47 ohms;

FIG. 102 shows a waveform of a CDMA code, which is generated by the model shown in FIG. 101, added by a header code or signal (by using a sine wave of the frequency of 8 MHz; solid parts of FIG. 102) for synchronization;

FIG. 106 shows a header code or signal separation result by an FPGA-use embodiment circuit using the ARX model shown in FIG. 105;

FIG. 117 is a diagram of a simulation confirming an effectiveness of a synchronization method by a marker-attached code;

FIG. 118 is a diagram of a simulation confirming an effectiveness of a synchronization method by a marker-attached code;

FIG. 119 is a diagram showing an uplink connection to a base station from a terminal station;

FIG. 120 is a diagram showing a result of simulating FIG. 119;

FIG. 121 is a diagram showing an uplink connection to a base station from a terminal station;

FIG. 122 is a diagram showing a downlink connection to a base station from a terminal station;

FIG. 123 is a diagram showing a result of simulating FIG. 121;

FIG. 124 is a diagram showing a simulation result of a BER;

FIG. 125 is a diagram showing a simulation result of an SNR; and

FIG. 126 is a diagram exemplifying a configuration of a recording medium allowing a computer to read a control program.

DESCRIPTION OF THE PREFERRED EMBODIMENTS

Figure 3:
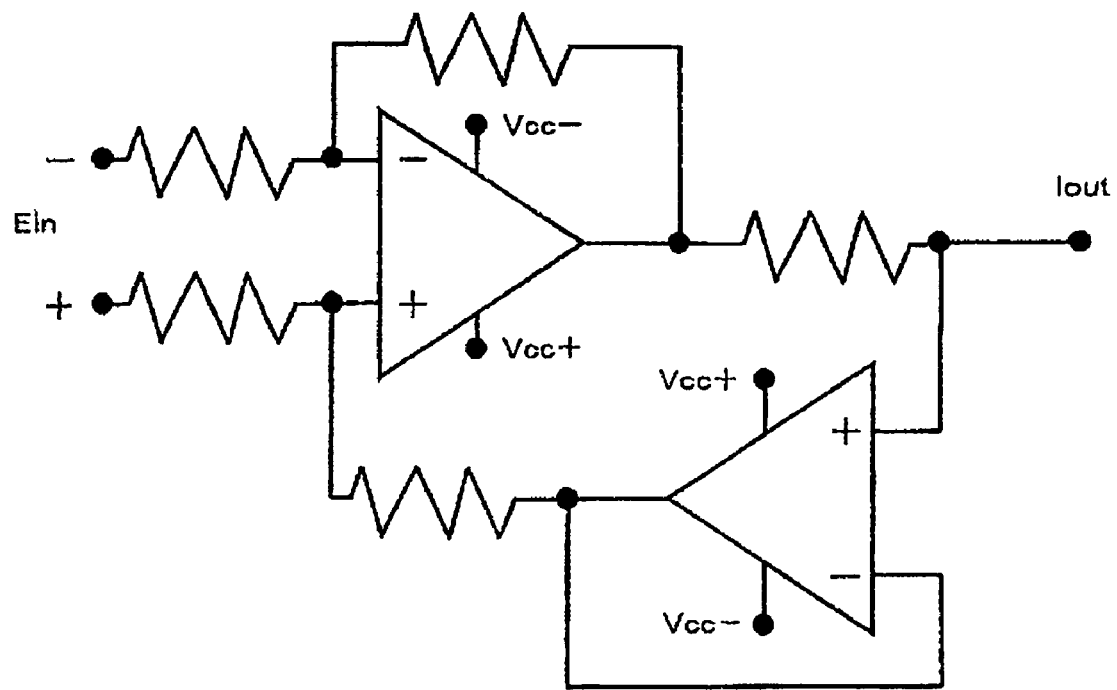
FIG. 3 is a diagram showing a dependent current source.

The following is a detailed description of the preferred embodiment of the present invention by referring to the accompanying drawings. FIG. 1 is a network connection diagram of an information terminal constituting a base station, showing a many-to-many simultaneous access network form of a code division multiple access (CDMA) on a power line.

The configuration shown in FIG. 1 is constituted by an external power line model 1, a power distribution board 2 and an indoor power line model 3. The external power line model 1 indicates an AC power signal (e.g., an AC power signal of 100 volts, 50 Hz in the Kanto area of Japan for example) from a power company.

Then, the power is supplied to the indoor power line model 3 by way of a distribution transformer (step-down transformer) of the power distribution board 2.

An electrical characteristic of the step-down transformer can be generally expressed by the following expression 1, where L1 is the primary self inductance of the step-down transformer, L2 is the secondary self inductance, M is a mutual inductance, e0 is the primary voltage of the step-down transformer, e1 is the secondary voltage, i0 is the primary current of the step-down transformer and i1 is the secondary current.

From the expression 1, it is understood that the secondary voltage e1 is given by an superpose of the M (i.e., di0/dt) on L2 (i.e., di1/dt). That is, the term of mutual inductance M and that of self inductance L2 determine the secondary voltage e1, that is, an indoor voltage. Therefore, giving secondary current i1 an information signal makes it possible to superimpose the information signal on the secondary voltage e1 according to e1=[sine wave power signal]+[information signal]. And, a terminal voltage ek across terminals of each terminal station of the indoor wiring circuit is given by e1=e2=e3 through =ek, since the indoor wiring is a parallel connection, thereby constituting a telecommunication by means of a power line communication system employing a power signal of an AC power line as a carrier wave for superimposing an information signal thereon.

$$\begin{pmatrix} e0 \\ e1 \end{pmatrix} = \begin{pmatrix} L1 & M \\ M & L2 \end{pmatrix} \begin{pmatrix} \frac{di0}{dt} \\ \frac{di1}{dt} \end{pmatrix} \quad (1)$$

The indoor power line model 3 is configured in a manner that a base station 4 performs a power line telecommunication with each terminal station 5 by way of service outlets "service outlet" used herein denotes any form of connections using a 2-wire power line with a neutral wire (2WN) by utilizing a characteristic of the expression 1, with the terminal station 5 controlling and managing a numerical 6 (e.g., a personal computer (PC), electric appliances, et cetera) which are installed in the indoor power line model 3.

The indoor power line model 3 shown in FIG. 1 is connected to the terminal stations 5 (i.e., ch1 through chn), which are connected to the power line by way of capacitors C1 and C2 that shut off a sine wave of a low frequency power signal such as 50 Hz and 60 Hz, and to the power line by way of the capacitors C1 and C2 that shut off a sine wave of a low frequency power signal such as 50 Hz and 60 Hz.

The base station 4 is always connected to the Internet by way of a line (i.e., a line such as a cable television (CATV) cable, optical cable, asymmetric digital subscriber line (ADSL) modem, wireless local area network (LAN), et cetera, and comprises a media converter 7 and a data link controller 8 which are always connected to an external data bus, and a PLC controller 9 for controlling transmission and reception of an information signal and of a synchronous signal.

Each of the terminal stations 5 (i.e., ch1 through chn) comprises a data link controller 8 and a PLC controller 9 for controlling transmission and reception of an information signal and of a synchronous signal.

The media converter 7 comprises the function of always connecting the data link controller 8 to the Internet by way of the CATV cable, optical cable, ADSL modem, wireless LAN, et cetera, or to an external LAN, et cetera, or the function of connecting to an external data bus. For example, it comprises a data link layer (for transferring one bit to an adjacent external LAN or a node of an external data bus and the base station 4) of the layer 2 of the OS 17 layer structure model, or the Ethernet II (which is a registered trademark; the same hereinafter) per IEEE802.3 standard (IEEE: Institute of Electrical and Electronic Engineers). Note that the functions of the aforementioned connections are not limited as such.

The data link controller 8 comprises, for example, either the data link layer of the layer 2 of the OS 17 layer structure model (for transferring one bit to an adjacent terminal station 5 (of the ch1 through chn) and the base station 4), or the Ethernet II per IEEE802.3 standard. Note that the functions of the aforementioned connections are not limited as such.

The present embodiment is configured in such a manner that the data link layer transfers one electronic sentence (i.e., a bit string) to the terminal station 5 (of the ch1 through chn) and base station 4. Here, if a different physical medium (e.g., a cable, et cetera) is connected to the terminal station 5 and/or base station 4, the data link controller 8 converts a format of data, et cetera, for each of the connected media and hands the data to a corresponding physical layer. Meanwhile, the Ethernet II per the IEEE802.3, the TCP/IP data link layer has the function of various device drivers of a point-to-point protocol (PPP) and of a LAN board, thus functioning as interface to a physical media and/or apparatus. Also shown in FIG. 1 is the numerical 10 indicating an equivalent model of a power line impedance.

The PLC controller 9 is configured as shown in FIG. 2, comprising a dependent voltage source 21, a dependent current source 22, a voltage monitor 24, a current monitor 25, and a transceiver-receiver controller (not shown in a drawing herein) included in a signal changeover switch (i.e., a multiplexer) 23, transmits an information signal and a synchronous signal.

An information signal or a synchronous signal is changed over by the multiplexer 23, and is transmitted by either the dependent voltage source 21 or dependent current source 22. A voltage signal and a current signal are always monitored by the voltage monitor 24 and current monitor 25, respectively. And the transceiver-receiver controller controls a one-bit transmission and reception to and from external ports, and has the function of transmitting and receiving as per CDMA.

Internal circuits of the dependent voltage source 21 or dependent current source 22 are conceivable as simulation models configured as shown in FIGS. 3 and 4, respectively. Note that the configurations are not limited as such.

Figure 5:
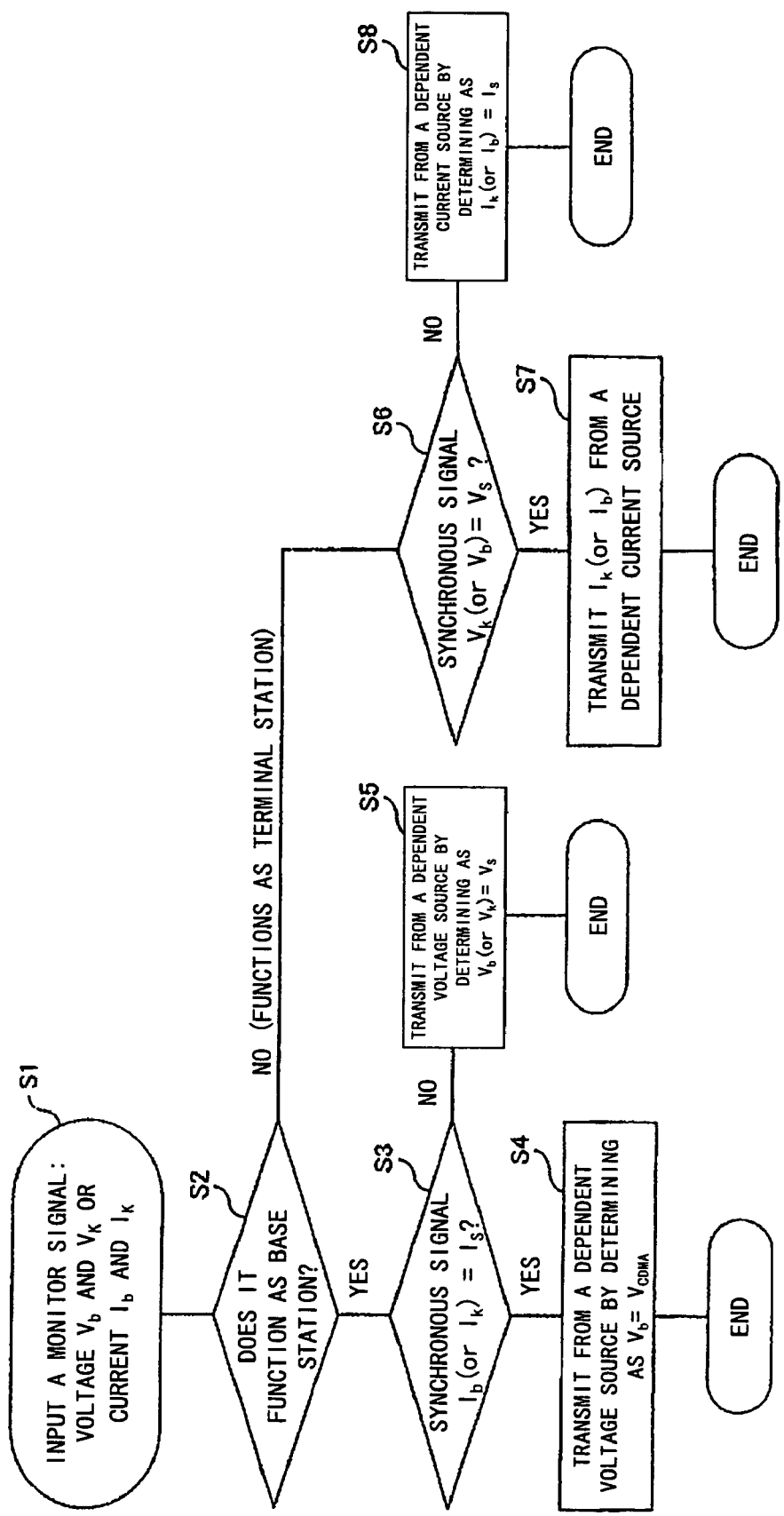
FIG. 5 is a diagram showing a flow chart of changing over between a dependent current source and a dependent voltage source.
Figure 6:
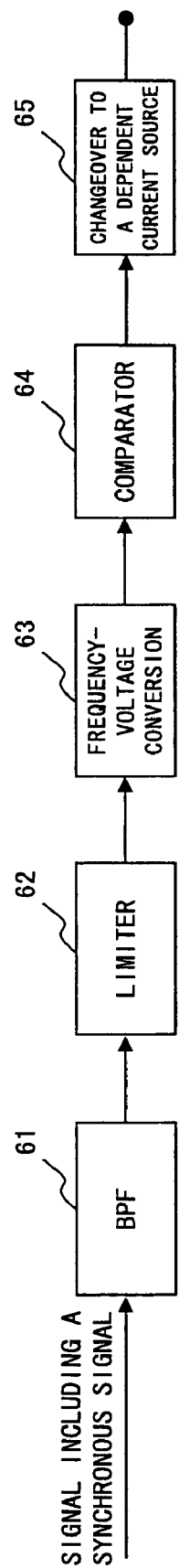
FIG. 6 is a block diagram showing a method for detecting a synchronous signal.

FIG. 5 shows a flow chart of the multiplexer 23 changing over between a dependent current source and a dependent voltage source; and FIG. 6 is a block diagram showing a method for detecting a synchronous signal.

Referring to FIG. 6, the first step extracts a synchronous signal by letting a signal measured at the voltage monitor 24 pass through a band pass filter (BPF) 61 for extracting a synchronous signal. The next judges whether or not the synchronous signal extracted at the next limiter block 62 is a synchronous signal based on a preset threshold value. The next converts a frequency of the synchronous signal into a voltage (63), e.g., 8 MHz into 3.3 volts. Then a comparator 64 compares a frequency converted into the voltage with a reference value, followed by the multiplexer 23 changing over (a device allowing a switch changeover according to a telecommunication speed) (65). Note that a synchronous signal can be extracted by utilizing an auto-regressive model with exogenous input (ARX model), et cetera, or it can be reproduced by a clock reproduction circuit using a preamble signal commonly used for a radio communication, or et cetera.

While it will be described later based on FIG. 12, a changeover condition uses a signal monitored by the voltage monitor 24 and current monitor 25 in S1 shown in FIG. 5 as an input signal, and inputs a $v_b$ and $v_k$ if the monitored is a voltage, while inputs an $i_b$ and $i_k$ if it is a current. The S2 judges whether a station functions as base station or terminal station. If it functions as base station, the S3 judges whether or not the $i_b$ or $i_k$ is a synchronous signal $I_S$ and, if it is a synchronous signal, the S4 determines as $v_b$ (or $v_k$)=$V_{CDMA}$, and transmit it from the dependent voltage source. If the judgment is "no", then the S5 determines as $v_b$ (or $v_k$)=$V_s$ and transmit it from the dependent voltage source.

Contrarily, if it is a terminal station, the S6 judges whether or not the $v_b$ or $v_k$ is a synchronous signal $V_s$ and, if it is a synchronous signal, the S7 transmits the $i_b$ or $i_k$ from the dependent current source, while if it is "no", the S8 determines as $i_b$ (or $i_k$)=$I_S$, and transmits it from the dependent current source.

Figure 7A:
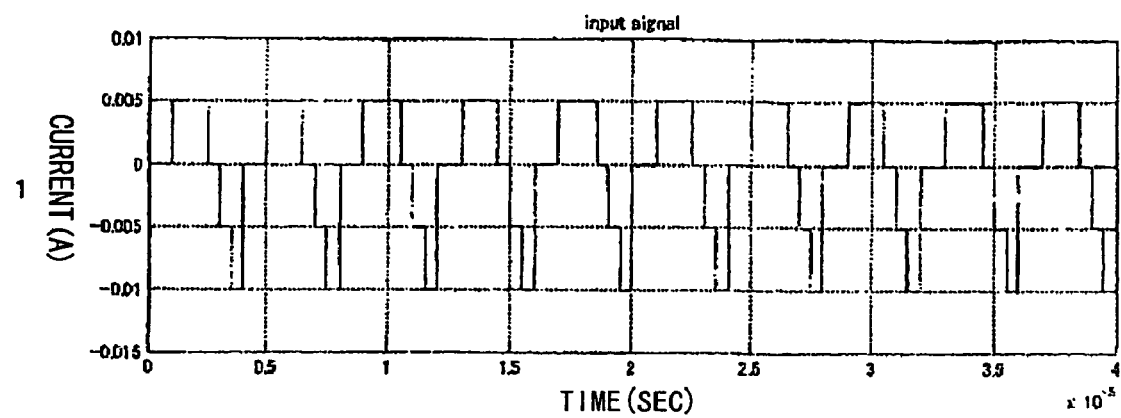
FIG. 7A is a diagram showing a relationship between a superimposition signal and a synchronous signal.
Figure 7B:
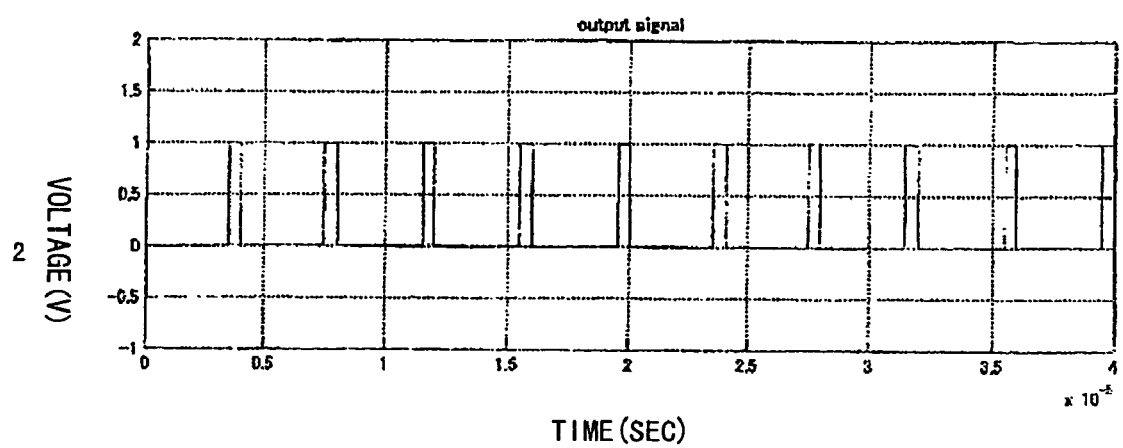
FIG. 7B is a diagram showing a relationship between a superimposition signal and a synchronous signal.

FIG. 7A,7B is a diagram showing a relationship between a superimposition signal and a synchronous signal, with the FIG. 7A showing a current waveform of a superimposed signal transmitted from a base station and the FIG. 7B showing a waveform of a synchronous signal.

Figure 8:
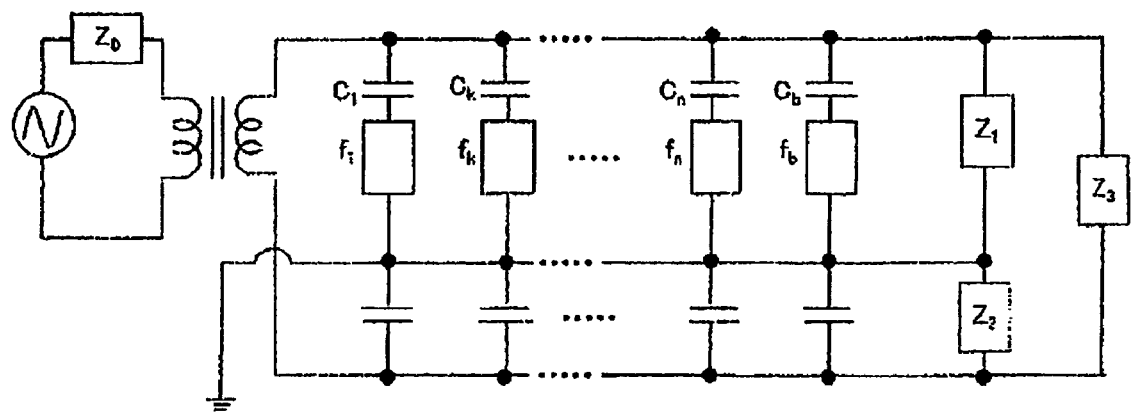
FIG. 8 is an equivalent circuit, related to two-wire power line with neutral line telecommunication, of a one-to-many, many-to-one, and many-to-many simultaneous access telecommunication system (i.e., a current source circuit diagram expressing an input to each channel, and a network connection diagram of information terminals constituting base station(s)) of CDMA in a power line telecommunication.
Figure 9:
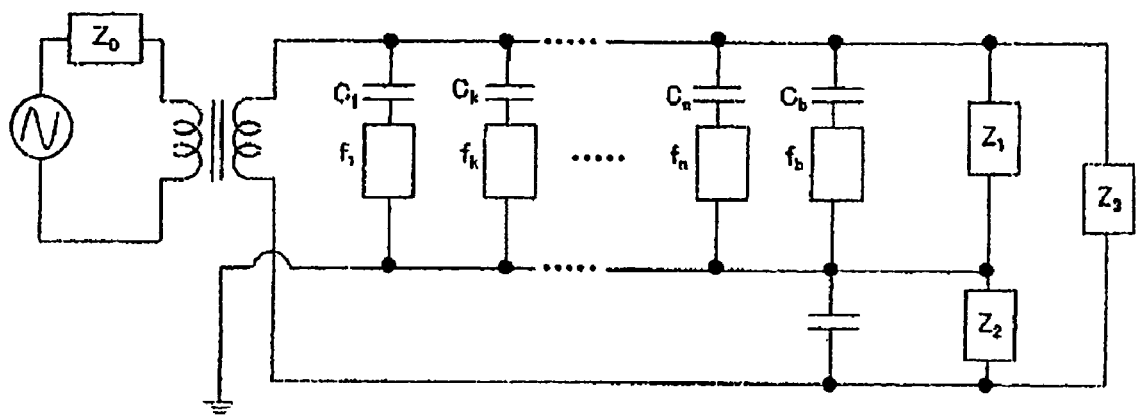
FIG. 9 is an equivalent circuit of FIG. 8.
Figure 10:
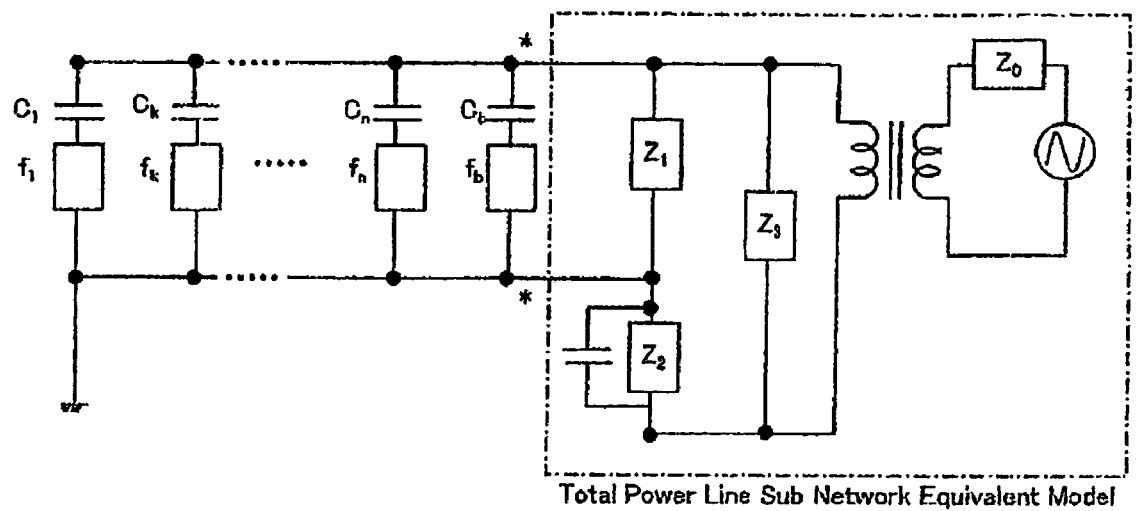
FIG. 10 is an equivalent circuit of FIG. 9.
Figure 11:
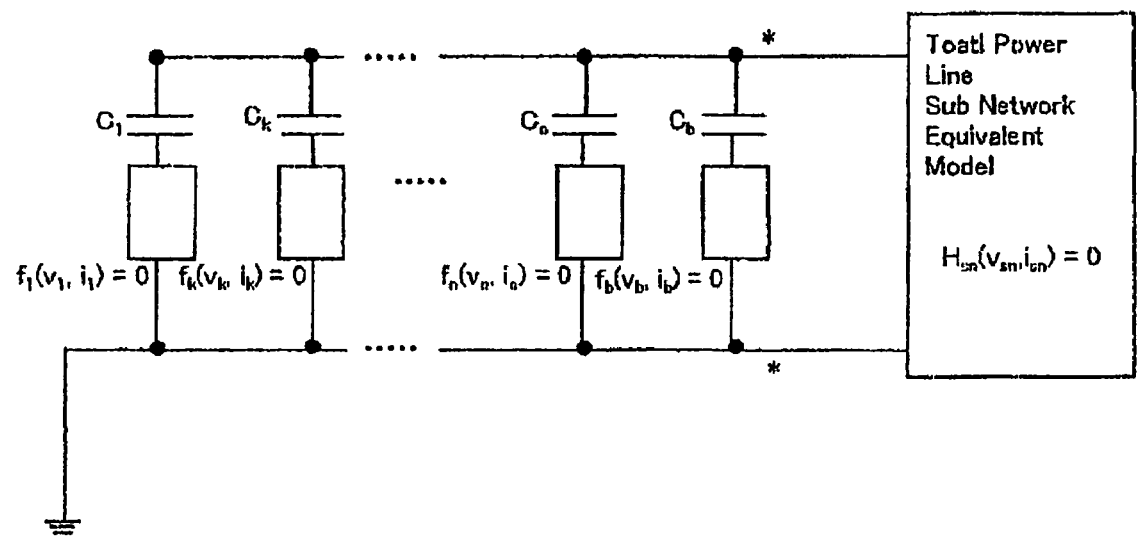
FIG. 11 is an equivalent circuit of FIG. 10.

FIGS. 8 through 12 each shows an equivalent circuit of FIG. 1, related to two-wire power line with neutral line telecommunication, of a one-to-many, many-to-one, and many-to-many simultaneous access telecommunication system (i.e., a current source circuit diagram expressing an input to each channel, and a network connection diagram of information terminals constituting base station(s)) of CDMA in a power line telecommunication. FIG. 8 is an equivalent circuit focusing on two-wire power line with neutral line telecommunication path, with FIGS. 9, 10, 11 and 12 showing a sequential modification in the aforementioned order.

Now a description is provided based on FIG. 12.

$$H_{SN}=H(v_{SN},i_{SN}(v_{SN}))=0 \qquad (2)$$

The expression 2 expresses an equivalent model of a partial-circuit net of a power line environment other than a telecommunication path by an implicit function, and an equivalent model $H_{SN}$ of the partial-circuit net of the power line environment other than a telecommunication path automatically specifies an explicit function of which the domain is a voltage $v_{SN}$ across both terminals of the $H_{SN}$ whose range is a current $i_{SN}$ flowing in the $H_{SN}$, since the partial-circuit net is parallelly connected to the telecommunication path, with an $i_{SN}(v_{SN})$ specifically being estimated by using an ARX model which is accomplished by using a device enabling an arithmetic operation process such as a field programmable gate array (FPGA).

$$I_{CDMA} = \sum_{k=1}^{n} i_k \qquad (3)$$

The expression 3 indicates a code division multiple type current signal transmitted from each terminal station to a base station or absence of signal, and current signals from individual terminal stations can be expressed as a grand total as such.

In the case of performing an uplink from a terminal station connected to an individual service outlet to a base station, such an uplink is performed by using a current signal, signals of individual terminal stations are superimposed according to the Kirchhoff's current law, a code multiplex signal is formed and information of each terminal station is demodulated at the base station, by using a characteristic of two-wire power line with neutral line which allows a superimposition of a voltage signal independently of a current signal. In this event, a synchronous signal is superimposed by a voltage signal and each terminal station is controlled so as to well generate the code multiplex signal based on the synchronous signal.

Describing a circuit operation of an uplink, the base station becomes a dependent voltage source capable of expressing a dependent source of the implicit function form shown by the following expression 4 by using a dependent voltage source voltage $v_b$. A state of $i_b$ of the expression 4 cannot be determined autonomously and instead determined based on a circuit state of the equivalent model shown in FIG. 12, and therefore the $i_b$ can conceivably in a discretionary state.

$$f_b(v_b,i_b)=0 \qquad (4)$$

Then, each terminal station transmits a voltage synchronous signal $v_s$ by using a dependent voltage source so as to form a current signal for CDMA.

$$v_b=V_s \qquad (5)$$

In this event, a dependent voltage source voltage $v_b$ cannot be transmitted directly to two-wire power line with neutral line telecommunication path as shown by the expression 5, the voltage synchronous signal $v_S$ is expressed by an expression 6 according to the Kirchhoff's voltage law.

$$V_s'=v_b+v_{cb} \qquad (6)$$

And an explicit function, of which the domain is a $v_{SN}$ with an $i_{SN}$ being a range, is automatically specified from the expression 2 because an equivalent model of the partial circuit net of the power line environment other than the telecommunication path as described above by a voltage synchronous signal of the expression 6 being sent. Then the relationship of the following expression 7 is obtained from the Kirchhoff's voltage law and current law.

$$v_{SN} = V_S'$$

$$i_b = -i_{SN}(V_S') - \sum_{k=1}^{n} i_k \qquad (7)$$

$$i_b = -i_{SN}(v_b + v_{cb}) - \sum_{k=1}^{n} i_k$$

$$i_b = i_{cb}$$

When a fundamental frequency of $i_b$ is high, a voltage value of a capacitor $C_b$ technically constitutes the condition of the following expression 8 by an integration effect.

$$v_{cb} = \frac{1}{C_b} \int i_b dt \quad (8)$$

$$|v_{cb}| \ll |v_b| \Rightarrow |v_{cb}| \approx 0$$

Therefore the following expression 9 is derived from the expression 8.

$$V'_s \approx v_b = V_s \quad (9)$$

$$i_b \approx -i_{SN}(v_b) - \sum_{k=1}^{n} i_k$$

$$i_b \approx -I_{CDMA} - i_{SN}(V_s)$$

$$I_{CDMA} = \sum_{k=1}^{n} i_k$$

Then, a code multiplex signal is formed by each terminal station transmitting a code by a current with the head of the code having orthogonal nature being lined up by using a synchronous signal received at each terminal station.

Therefore, it is possible to receive, and demodulate, the code multiplex signal transmitted from each terminal and formed at the base station by monitoring the $i_b$. However, monitoring $i_b$ includes not only $I_{CDMA}$ but also a value in the amount of $I_{SN}(v_S)$, it is corrected by using an estimation model of $I_{SN}(v_S)$ using an ARX model.

Then, each of the terminal stations k (where k=1 through n) connected to individual service outlets receives a voltage synchronous signal from the base station, and each of them transmits the code by using a current with the head of a code having an orthogonal nature being lined up. The following expression 10 is a dependent source of an implicit function form, handling a terminal as a dependent current source, with $i_k$ being a dependent current source current.

$$f_k(v_k, i_k) = 0 \quad (10)$$

The following is a description on receiving a voltage synchronous signal $v_S$ from a base station.

$$V'_s \approx v_b = V_s$$

$$V'_s = v_k + v_{ck}$$

$$i_k = i_{ck} \quad (11)$$

The expression 11 indicates a relationship among individual terminal stations, especially related to the k-th terminal station. When a fundamental frequency of an $i_k$ is high under the condition of the expression 11, the condition shown by the following expression 12 is constituted by an integration effect of a capacitor $C_k$.

$$v_{ck} = \frac{1}{C_k} \int i_{ck} dt \quad (12)$$

$$|v_{ck}| \ll |V'_s| \Rightarrow |v_{ck}| \approx 0$$

Therefore, the following expression 13 is derived under the condition.

$$v_k \approx V'_s \approx V_s \quad (13)$$

The individual terminal stations are accordingly enabled to transmit their respective codes by the dependent current source currents $i_k$ with the heads of the codes having an orthogonal nature being lined up by receiving the voltage synchronous signal $v_S$ by monitoring the $v_k$.

Then, a downlink from the base station to the individual terminal stations connected to the respective service outlets is carried out by using a characteristic allowing a superimposition of a voltage signal and a current signal mutually independently in two-wire power line with neutral line. A downlink from the base station to the individual terminal stations connected to the respective service outlets are performed by a voltage signal, and a code multiplex signal formed at the base station is respectively modulated at the individual terminal stations. In this event, each terminal station, superimposing a synchronous signal by a current signal, well demodulates a code multiplex signal by the synchronous signal.

$$I_s = \sum_{k=1}^{n} i_k \quad (14)$$

The expression 14 indicates the current synchronous signal shown in FIG. 12 or an absence of signal, with $i_1$ through $i_n$ being set so as to allow synchronization. Then, a terminal needing to receive an information signal from the base station transmits a synchronous signal by the current, and, if another terminal station needs to receive an information signal from the base station while either of the terminal stations is already transmitting a synchronous signal, the other terminal station transmits a synchronous signal by synchronizing with the already existing one.

A $V_{CDMA}$ is defined as a code division multiplex type voltage signal on an absence of signal, the base station is expressed by a dependent source of an implicit function form as shown in the expression 4 and constitutes a dependent voltage source, and therefore a state of an $i_b$ cannot be determined autonomously and instead is determined by a state of the circuit, thus the $i_b$ resulting in being in a discretionary state.

If an individual terminal station needs to receive a CDMA type signal from the base station by a voltage, it transmits the above described current synchronous signal. In this event, the base station obtains the relationship of the following expression 15 from the Kirchhoff's voltage law and current law.

$$v_b = V_{CDMA} \quad (15)$$

$$V'_{CDMA} = v_b + v_{cb}$$

$$i_b = -i_{SN}(V'_{CDMA}) - \sum_{k=1}^{n} i_k$$

$$i_b = -I_s - i_{SN}(V'_{CDMA})$$

Furthermore, the condition represented by the following expression 16 is constituted by an integration effect of the capacitor $C_b$ as shown below if the fundamental frequency of $i_b$ is high.

$$v_{cb} = \frac{1}{C_b} \int i_b dt \quad (16)$$

$$|v_{cb}| \ll |v_b| \Rightarrow |v_{cb}| \approx 0$$

Therefore, the following expression 17 is derived under the condition.

$$V_{CDMA}' \approx v_b = V_{CDMA}$$

$$i_b \approx -I_S - i_{SN}(V_{CDMA}) \quad (17)$$

Therefore, a monitoring of the $i_b$ enables the base station to receive a current synchronous signal formed by being transmitted from the individual terminal stations and transmit a code division multiple type voltage signal $V_{CDMA}$ synchronized with the synchronous signal. However, not only an $I_S$, but also an amount of $I_{SN}(v_{CDMA})$ is included in the monitoring of the $i_b$, and therefore a correction is performed by using an estimation model of the $I_{SN}(v_{CDMA})$ utilizing an ARX model, et cetera.

A terminal station is capable of handling a dependent source of the implicit function form indicated by the following expression 18 as a dependent current source.

$$f_k(v_k, i_k) = 0 \quad (18)$$

A state of a $v_k$ cannot be determined autonomously and instead is determined by a state equation of the circuit and therefore the $v_k$ is in a discretionary state. If there is a need to receive a CDMA type signal from the base station by a voltage, the individual terminal station transmits a current synchronous signal. In the case of transmitting a code division multiple type voltage signal under the condition of the following expression 19, that is, $$V_{CDMA}' \approx v_b = V_{CDMA} \quad (19),$$

a relationship represented by the following expression 20 is obtained from the Kirchhoff's voltage law and current law.

$$V_{CDMA}' = v_k + v_{ck}$$

$$i_k = i_{ck} \quad (20)$$

In this event, the following expression 21 is constituted by an integration effect of the capacitor $C_k$ when the fundamental frequency of the $i_k$ is high:

$$v_{ck} = \frac{1}{C_k} \int i_{ck} dt \quad (21)$$

$$|v_{ck}| \ll |V_{CDMA}| \Rightarrow |v_{ck}| \approx 0,$$

and the following expression 22 is constituted under the condition.

$$v_k \approx V_{CDMA}' = V_{CDMA} \quad (22)$$

Therefore, a monitoring of $v_k$ enables an individual terminal station to receive, and demodulate, the code division multiple type voltage signal $V_{CDMA}$, which is transmitted from the base station, by synchronizing with the synchronous signal.

Embodiment 1

FIG. 13 exemplifies a connection between a transmission unit and a reception unit by one circuit in a model for simulating a code division multiple access (CDMA) for accomplishing a digital signal process (DSP). In an actual line, not only a power line but also any line has a resident noise component, influencing a telecommunication.

However, it is a model validating by a simulation that a use of the CDMA system becomes hardly influenced by a noise component.

Figure 14:
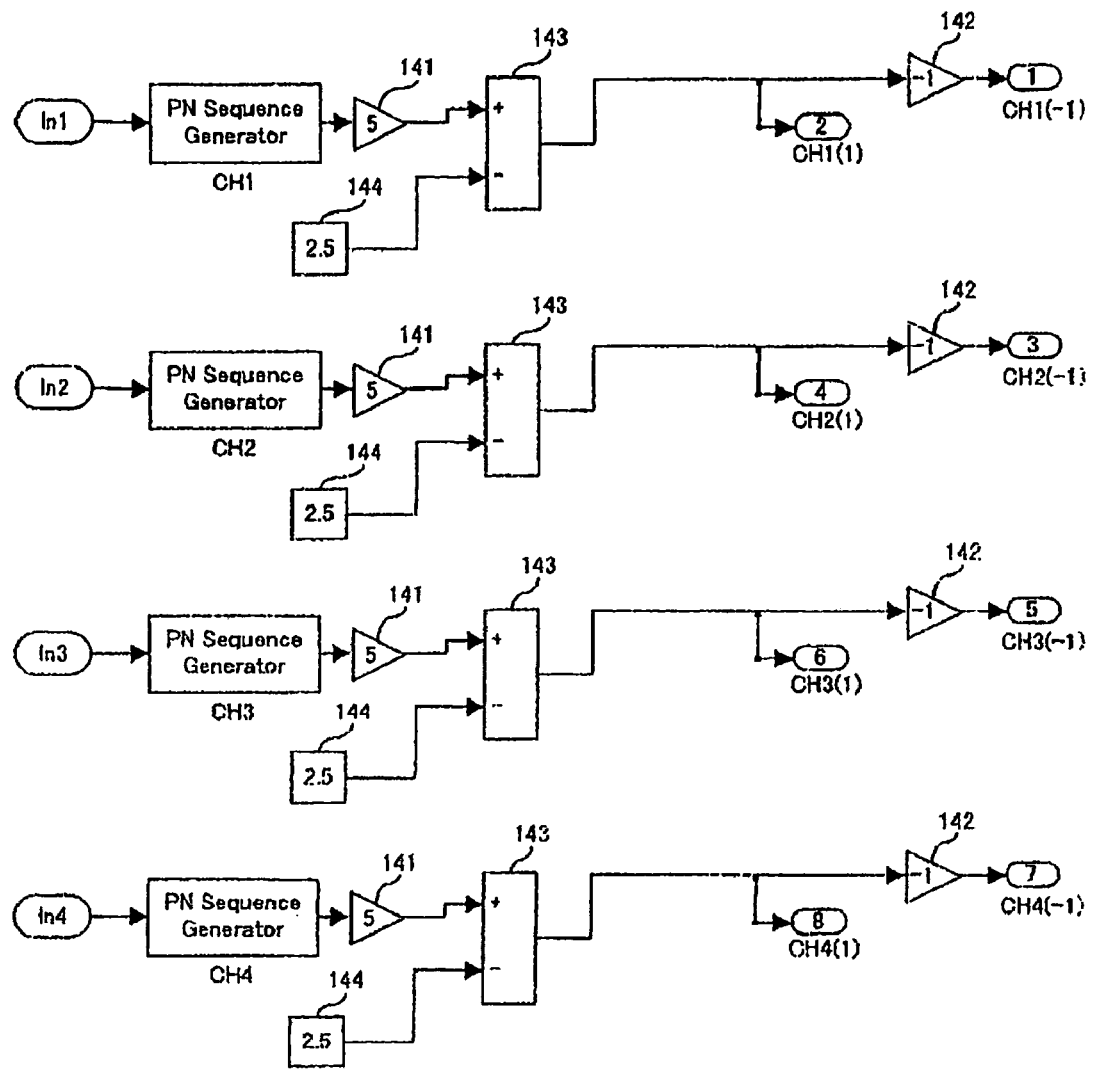
FIG. 14 is an internal model for generating and transmitting a CDMA code.

FIG. 14 is a diagram showing an internal model of a code division multiplex (CDMA) transmission unit, indicating an internal configuration of a TXCODE 131 shown in FIG. 13. The CH1 through CH4 shown in FIG. 14 respectively generate CDMA signals, receive synchronous signals input from in1 through in4, adjust gains, et cetera, of the generated signal and transmit from individual outputs CH1 (−1), CH1 (1), CH2 (−1), CH2 (1), CH3 (−1), CH3 (1), CH4 (−1) and CH4 (1), respectively. Triangles shown by the numerical 141 and 142 indicate blocks adjusting the above described gain, the squares 144 indicate constant, and the rectangles 143 indicate adders.

Referring to FIG. 13, transmission signals of the CH1 (−1), CH2 (1), CH3 (1) and CH4 (1) are compounded and demodulated following a noise generator adding a noise component on the line as described above. In this event, an adder 135 adds a white noise (having a band limit on the model) as the noise component.

The 132 indicate adders having a signal change switch.

A pulse signal generated by a pulse generator 138 is supplied to the TXCODE 131 or RXCODE 136 by way of blocks of numerical 134 and 137 for discretization.

FIG. 15 is a diagram showing an internal model of a code division multiplex (CDMA) transmission unit. The present model does not reproduce a clock, and instead has a pulse generator generate a synchronous signal. A code is generated by the RXCODE 136 and demodulated by obtaining a correlation of the signal of the RXCODE 136 with a compounded transmission signal including the above noted noise component. The signal of the RXCODE 136 and compounded transmission signal including the above noted noise component are multiplied by a product device 151, followed by a block 152 applying an interval arithmetic, followed by a sample and hold (S/H) block 153 having a multiplier 155 overclocks (which is optional) a synchronous signal from a CLK, followed by sample-holding based on the signal and followed by having a positive/negative judgment block 154 judge a positive or negative before outputting it.

FIG. 16 is a diagram showing a result of simulation shown at a code division multiplex transmission unit and reception unit. Waveforms shown in FIG. 16 are ones measured at observation points shown by the scope 1310 shown in FIG. 13, with the one on the top showing a transmission signal when the noise of FIG. 13 is added, the second from the top showing a synchronous signal, and the third, fourth, fifth and sixth showing the respective result of demodulations in the case of substituting signals −1, 1, 1 and 1 for the CH1, CH2, CH3 and CH4, respectively. Demodulation is achieved even though waveforms are not clear when a noise is added. Other patterns can also be demodulated. Incidentally, −1 as low level and 1 as high level are shown for each channel as a digital signal input. Here, the reason for substituting by −1 and 1 is that the present simulation calculates by expressing a pattern by a polynomial expression.

Embodiment 2

FIG. 17 is a model equipping a power line model in a CDMA model line shown in FIG. 12. And the present model is an original type model of a same clock time code division multiple telecommunication enabling an uplink connection to a base station from a terminal station connecting to an individual service outlet also considering an influence of a distribution constant of a power line to a power line impedance environment and a current signal superimposing-type code division multiple telecommunication (access) simulation.

An AC power supply 1 is connected to the primary side of a step-down transformer 170 of the present model for supplying a power signal (e.g., 100 volts, 50 Hz or 60 Hz, et cetera).

A terminal station in the present model is constituted by model DIPs 176a through 176d (i.e., a dependent current source) for superimposing a signal transmitted from each channel of a TXCODE 175 on a current signal of the power line, a monitor signal conversion block 177a through 177d and capacitors C176a through 176d and 176e, thereby transmitting a transmission signal from the TXCODE 175 to a base station by way of each of the DIPs 176a through 176d according to the configuration of the present embodiment.

The base station in the present model is constituted by a current monitor signal conversion block 171, a capacitor 172, a demodulation unit 173 and an RXCODE 174, in which a current signal superimposed on a power line is measured by the current monitor signal conversion block 171, the measured signal is handed to the RXCODE 174 and demodulated. In this event, a transmission timing of each of the DIPs 176a through 176d is determined by superimposing a synchronous signal from the base station to make it a voltage signal followed by reproducing it by a synchronous signal reproduction block 178.

Figure 18A:
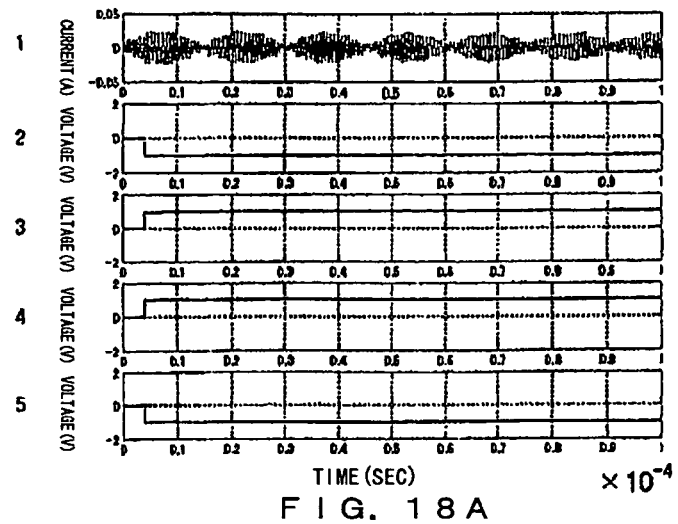
FIG. 18A shows a power line impedance environment and a current signal superimposing-type code division multiple telecommunication (access) simulation result.
Figure 18B:
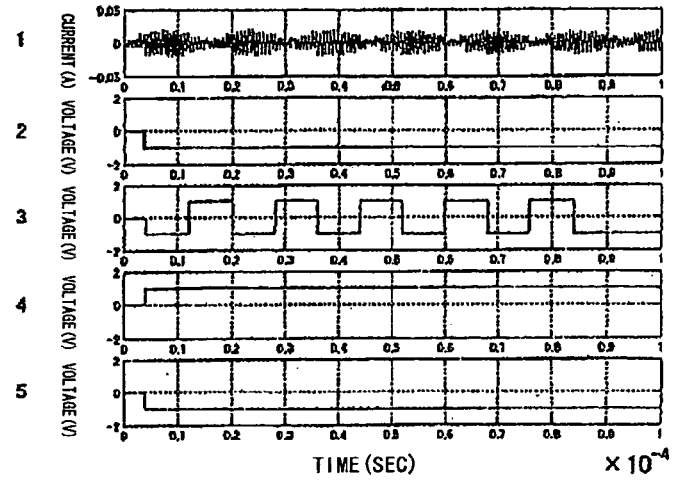
FIG. 18B shows a power line impedance environment and a current signal superimposing-type code division multiple telecommunication (access) simulation result.
Figure 18C:
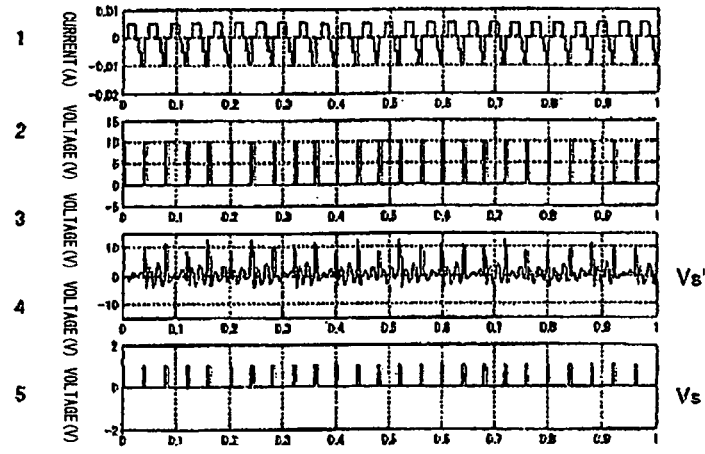
FIG. 18C shows a power line impedance environment and a current signal superimposing-type code division multiple telecommunication (access) simulation result.

FIG. 18A, FIG. 18B and FIG. 18C shows a power line impedance environment and a current signal superimposing-type code division multiple telecommunication (access) simulation result. The top one of a good embodiment of FIG. 18A considering also an influence of a distribution constant of a power line indicates a code division multiplex signal waveform distorted by a power line impedance environment, and the second, third, fourth and fifth indicate a result of decoding in the case of inputting signals −1, 1, 1, and −1 to the CH1, CH2, CH3 and CH4, respectively. This indicates that the decoding is achieved despite they are considerably distorted by the power line impedance environment.

Being the same with most of other patterns, the bad example shown in FIG. 18B includes some patterns which are not decoded. This is because a shunt current of a current signal to the power line impedance environment influences. In order to minimize the influence of the shunt current, it is necessary to make a correction algorithm by making an approximation model of the power line impedance environment.

The correction algorithm is an estimation of a transfer function, of which the methodology is already established, and therefore a modification for a specific use for the present communication is considered to be adequate (that is, to employ a parametric estimation method).

Meanwhile, as for the waveforms shown in FIG. 18C, the first one is a code division multiplex signal waveform distorted by a power line impedance environment, it is reproduced by the synchronous signal reproduction block 178 shown in FIG. 17, and the second, third and fourth waveforms respectively show a synchronous signal transmitted from the base station, a synchronous signal superimposed on the power line impedance environment and a separated/demodulated synchronous signal. This indicates that the superimposition and demodulation of the synchronous signal are well carried out (as noted in the expressions 11 through 13).

Embodiment 3

Figure 19:
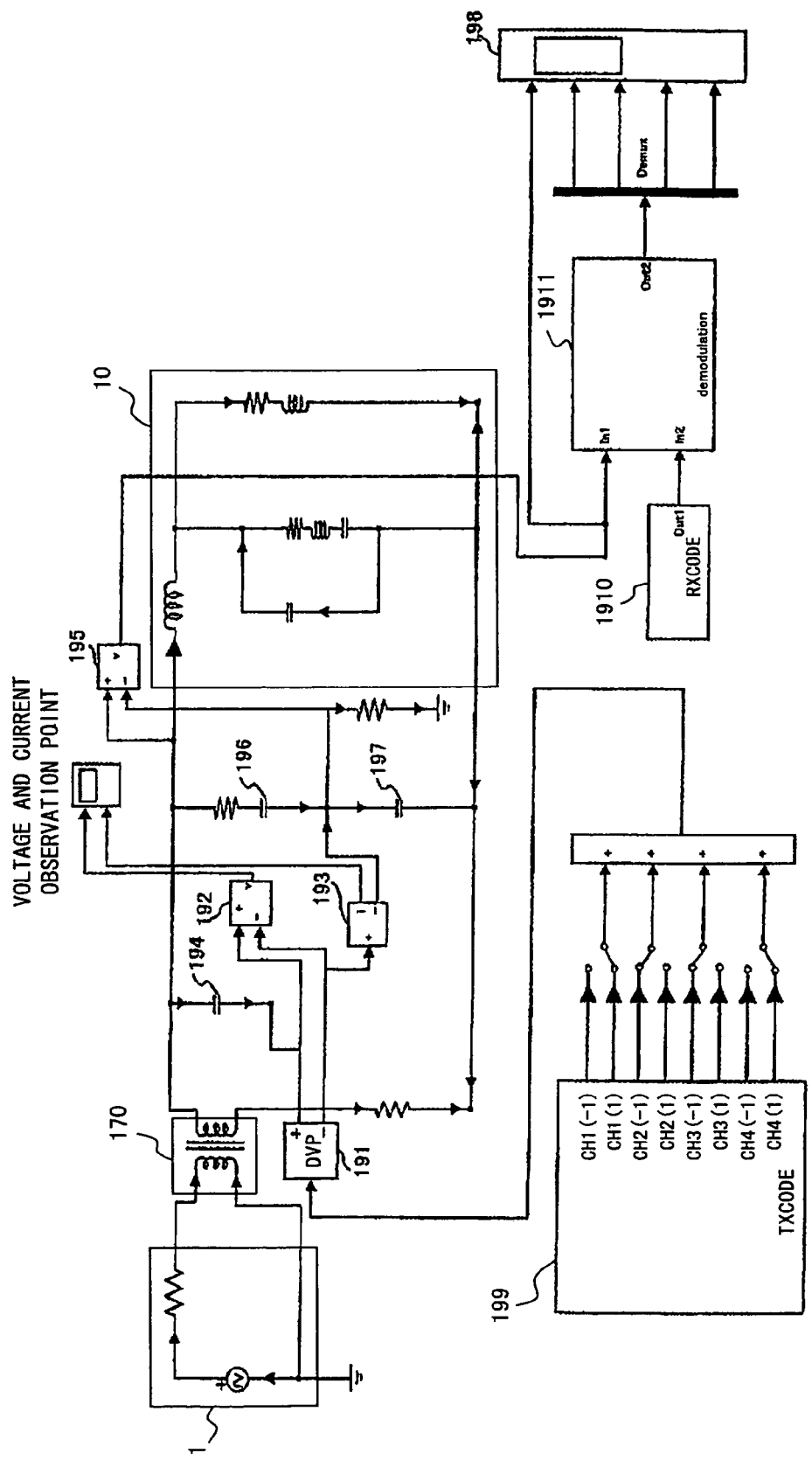
FIG. 19 shows a downlink connection from a base station to a terminal station connected to an individual service outlet in a power line impedance environment and a current signal superimposing-type code division multiple telecommunication (access) simulation (which does not consider a distribution constant-wise influence of a power line; while a synchronous signal uses a simplified model)

FIG. 19 is a power line impedance environment and a current signal superimposing-type code division multiple telecommunication (access) simulation, which is a downlink connection from a base station to an individual terminal station (the present embodiment does not consider a distribution constant-wise influence of a power line; while a synchronous signal uses a simplified model).

Likewise at the time of an uplink, a connection of an AC power source on the primary side of a step-down transformer 170 of the present model supplies a power signal (e.g., 100 volts, 50 Hz or 60 Hz, et cetera). A terminal station in the present model is constituted by a model DVP 191 (i.e., a dependent voltage source) for superimposing a signal transmitted from each channel from a TXCODE 199 on a voltage signal of the power line, by a voltage monitor signal conversion block 192, by a current monitor signal conversion block 193 and by a capacitor 194; and a transmission signal is transmitted from the TXCODE 199 to a terminal station by way of the DVP 191 according to the present embodiment.

And a terminal station in the present model, being constituted by a voltage monitor signal conversion block 195, an RXCODE 1910, capacitors 196 and 197 and a demodulation unit 1911, hands over a signal of the RXCODE 1910 and a signal which is a voltage signal superimposed on a power line measured by the voltage monitor signal conversion block 195 to a demodulation unit 1911 and demodulates the signals.

Figure 20:
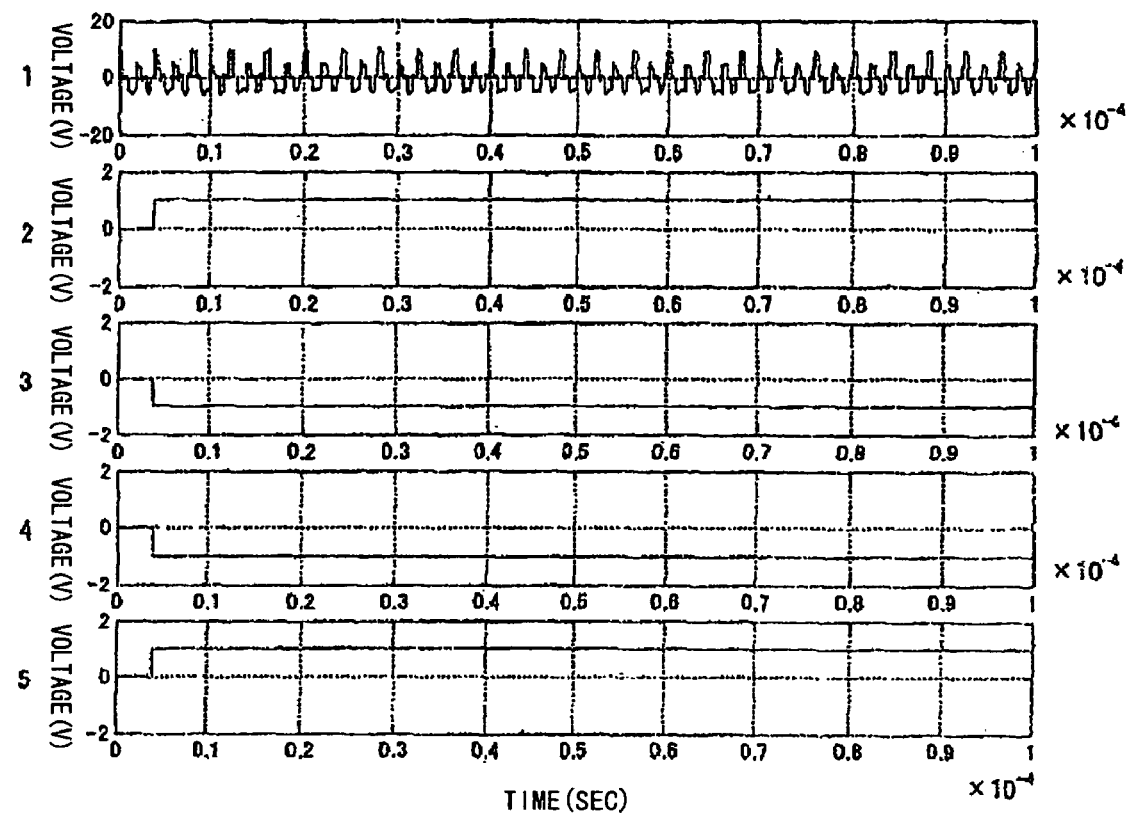
FIG. 20 shows a power line impedance environment and a voltage signal imposing-type code division multiple telecommunication simulation result.

FIG. 20 shows a power line impedance environment and a voltage signal imposing-type code division multiple telecommunication simulation result, in observation of waveforms at the numerical 198 (refer to FIG. 19). The top of the diagram is a code division multiplex signal waveform distorted by a power line impedance environment, while the second, third, fourth and fifth are results of decoding in the case of inputting signals 1, −1, −1 and 1 to the CH1, CH2, CH3 and CH4, respectively.

This indicates that the decoding is achieved despite they are considerably distorted by the power line impedance environment. Other patterns are likewise well achieved.

Embodiment 4

FIG. 21 shows a voltage and a current signal simultaneous superimposition type code division multiple telecommunication (access) simulation in a power line impedance environment, which a same clock time mixed type for a base station performing a downlink connection to a terminal station connected to an individual service outlet and a terminal station connected thereto performing an uplink connection to the base station (the present embodiment does not consider a distribution constant-wise influence of a power line; while a synchronous signal uses a simplified model).

Figure 22A:
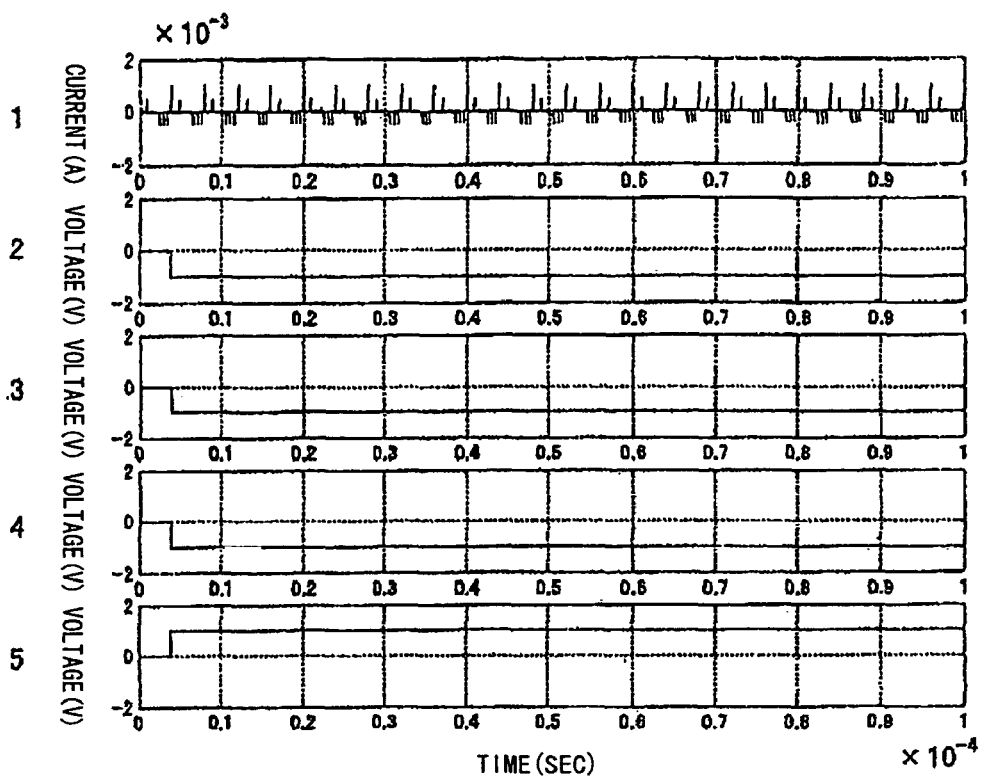
FIG. 22A shows a simultaneous voltage and current signals superimposing-type code division multiple telecommunication simulation result in a power line impedance environment.
Figure 22B:
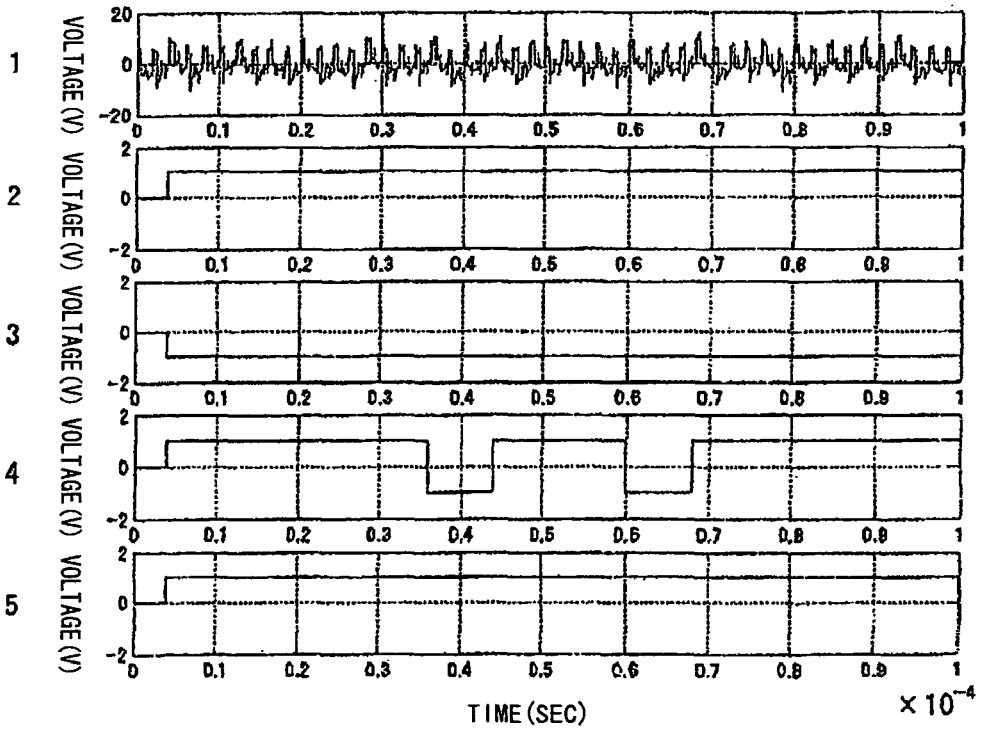
FIG. 22B shows a simultaneous voltage and current signals superimposing-type code division multiple telecommunication simulation result in a power line impedance environment.

The present embodiment is constituted by the models described associated with FIGS. 17 and 19. FIGS. 22A and 22B shows a simultaneous voltage and current signals superimposing-type code division multiple telecommunication simulation result in a power line impedance environment, and the top of FIG. 22A shows a code division multiplex signal waveform distorted by a power line impedance environment, while the second, third, fourth and fifth respectively show results of decoding in the case of inputting signals −1, −1, −1 and 1, as current signals, to the CH1, CH2, CH3 and CH4, respectively. In the next FIG. 22B, the top of the diagram is a code division multiplex signal waveform distorted by a power line impedance environment, while the second, third, fourth and fifth respectively show results of decoding in the case of inputting signals 1, −1, 1 and 1, as current signals, to the CH1, CH2, CH3 and CH4, respectively. This result includes error.

As shown in FIG. 21, the error rate is high because an important circuit constant is not optimized by examining a most optimal circuit constant for the mixed type, nonetheless the result indicates the simultaneous voltage and current signals superimposing-type code division multiple telecommunication per se is enabled. The most important point is the fact that a voltage signal and a current signal can be simultaneously superimposed, which is a system for superimposing a synchronous signal by a current signal in the case of carrying out a downlink code division multiple telecommunication by a voltage signal, and superimposing a synchronous signal by a voltage signal in the case of carrying out an uplink code division multiple telecommunication by a current signal. Note that a simultaneous voltage and current signals superimposing-type code division multiple telecommunication may not always be performed.

Figure 23:
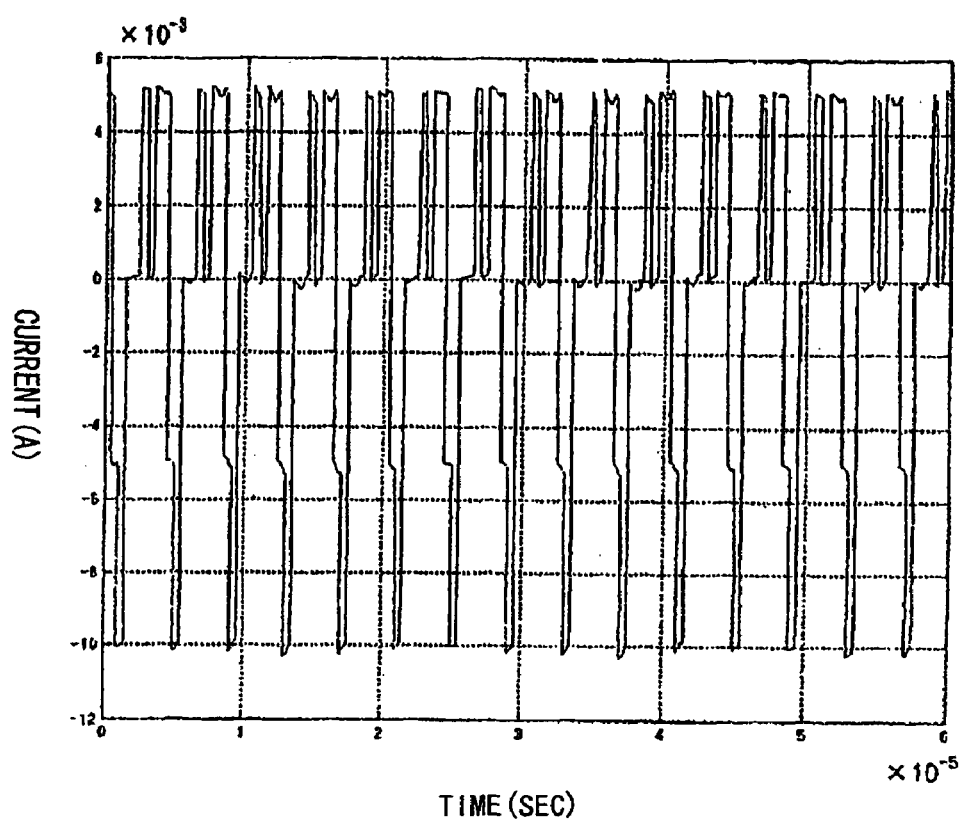
FIG. 23 shows a compound waveform of codes of individual channels of a simultaneous voltage and current signals superimposing-type code division multiple telecommunication (access) in a power line impedance environment.

Meanwhile, FIG. 23 is a simultaneous voltage and current signals superimposing-type code division multiple telecommunication (access) simulation result in a power line impedance environment, showing a waveform at a CDMA part, that is, a superimposed waveform observed in the scope 211 shown in FIG. 21.

Embodiment 5

Figure 24:
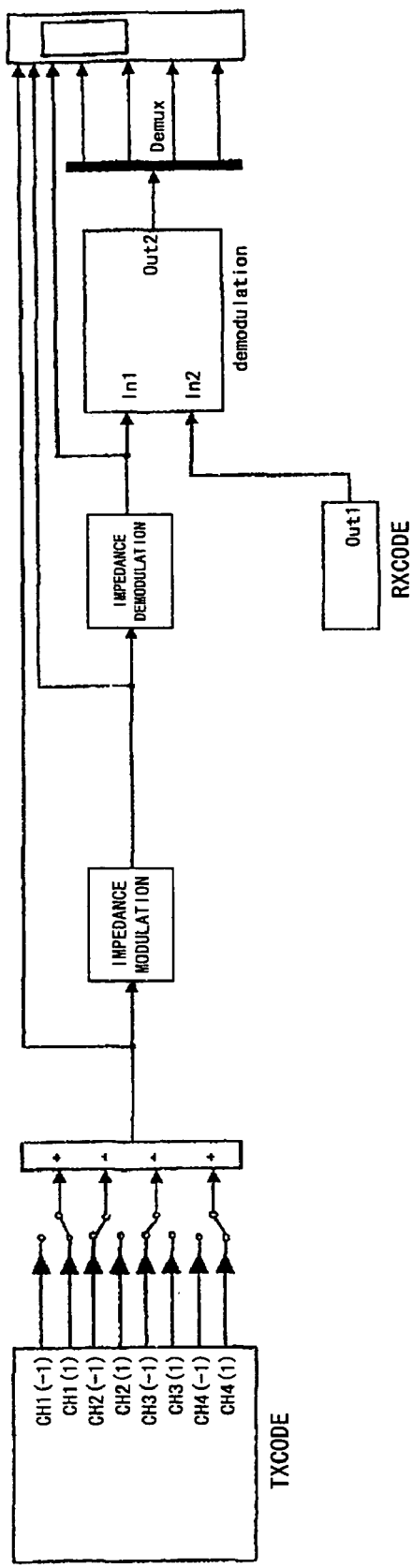
FIG. 24 is a model considering an environmental impedance element of a power line telecommunication model.

A method of superimposing and decoding by estimating an environmental impedance of a power line for superimposing and demodulating a code division multiplex signal and a synchronous signal must consider an influence of an environmental impedance of a power line other than of a base station in order to form a code multiplex signal independently transmitted from an individual channel by using a current signal from an individual service outlet and the Kirchhoff's current law. A model system shown by FIG. 24 has been accordingly conceived.

Figure 25:
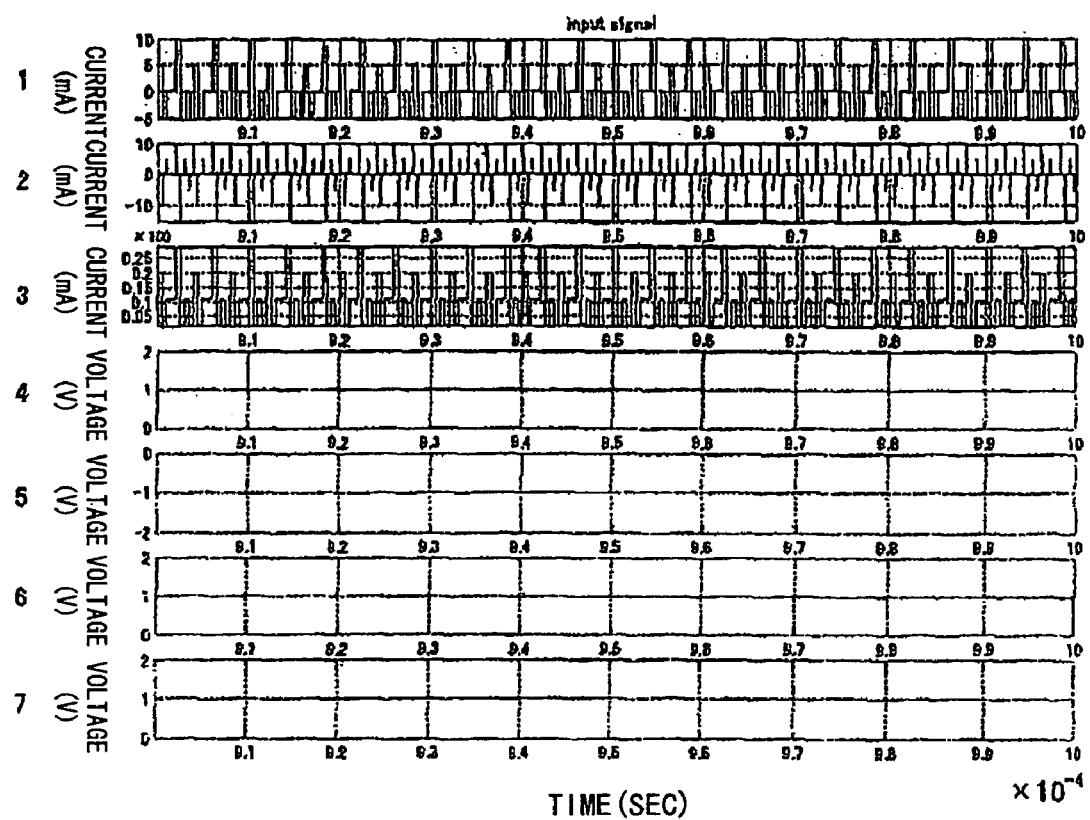
FIG. 25 shows a result of the simulation shown in FIG. 24.

That is, the concept interprets, as a modulation, a phenomenon of a waveform being distorted by an influence of an environmental impedance of a power line other than that of a base station after forming a code multiplex signal by individual channels independently transmitting by a current signal by utilizing the Kirchhoff's current law, and interprets a modulation of the modulation as an estimation of the influence of an environmental impedance element of a power line other than the base station. Signal waveforms shown in FIG. 25 indicate, from the top of the diagram, the first is a waveform forming a code multiplex signal by individual channels transmitting independently, the second is a waveform distorted by an influence of an environmental impedance element of a power line other than of the base station, the third is an estimated code multiplex signal and the fourth, and thereafter, are demodulated waveforms at individual channels, with the present example indicating a demodulation result in the case of inputting signals 1, −1, 1 and 1 to the respective channels. In this event, the environmental impedance has been estimated by using an ARX model (which is carried out by using a device, including FPGA, et cetera, which is capable of an arithmetic operation process).

Figure 26:
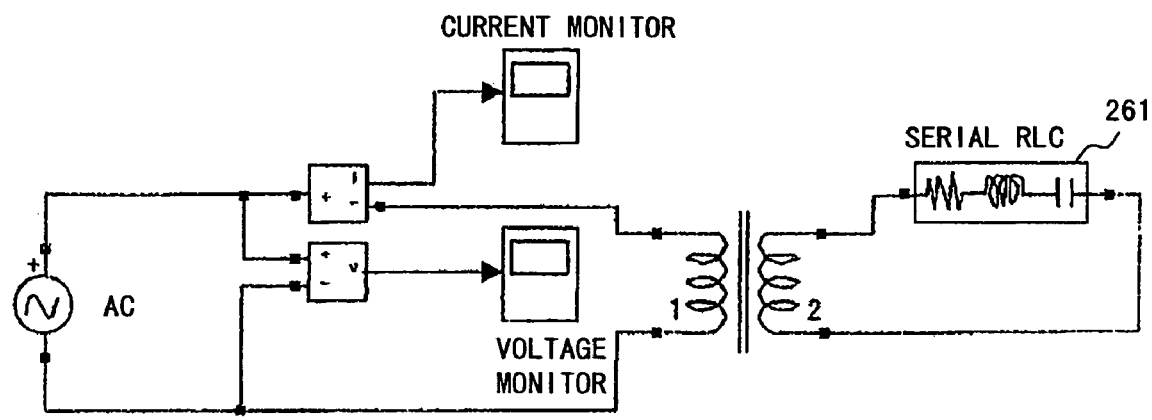
FIG. 26 exemplifies a power line model in the case of estimating an environmental impedance by using an ARX model.

FIG. 26 exemplifies a power line model in the case of estimating an environmental impedance by using an ARX model, exemplifying where a serial RLC 261 is 1 ohm, 1 mH and 1 micro Farad, respectively, and the AC voltage is 100 volts, 60 Hz.

Figure 27:
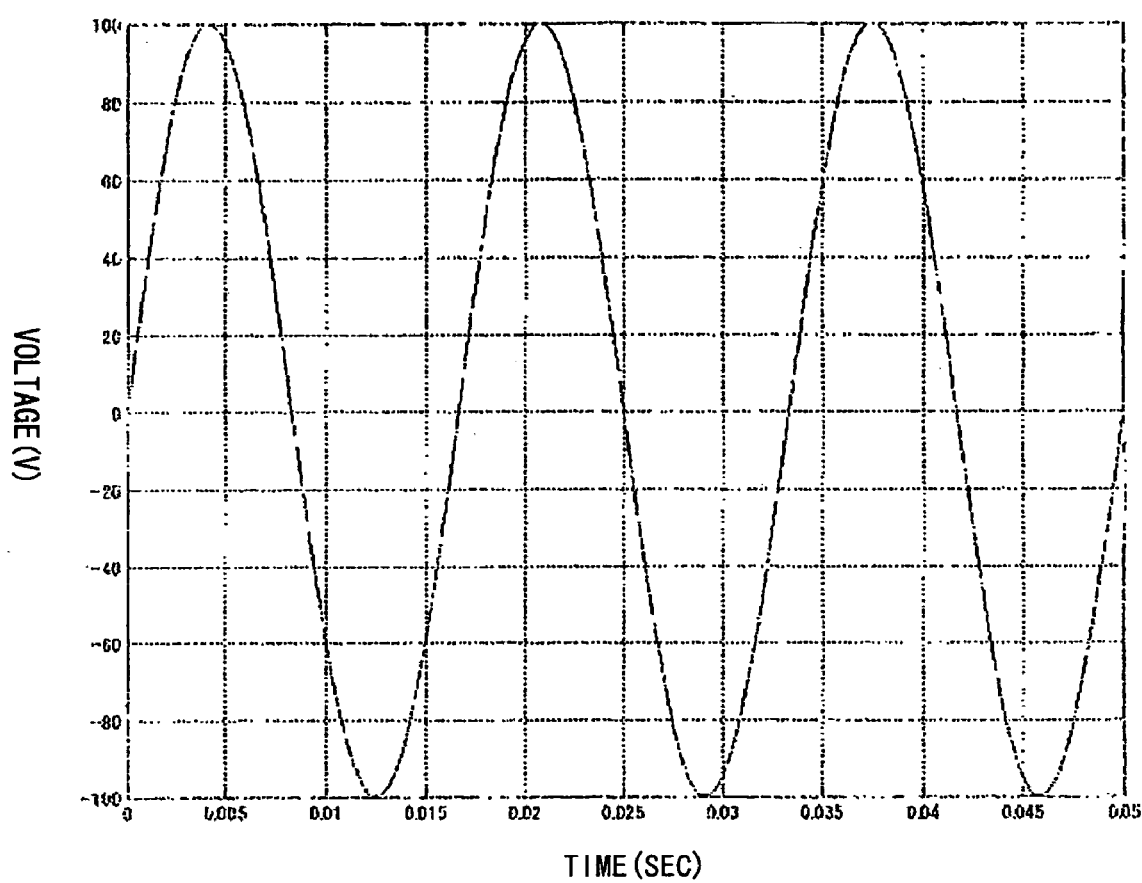
FIG. 27 shows an input voltage waveform on the primary side of a step-down transformer of a power line model.
Figure 29:
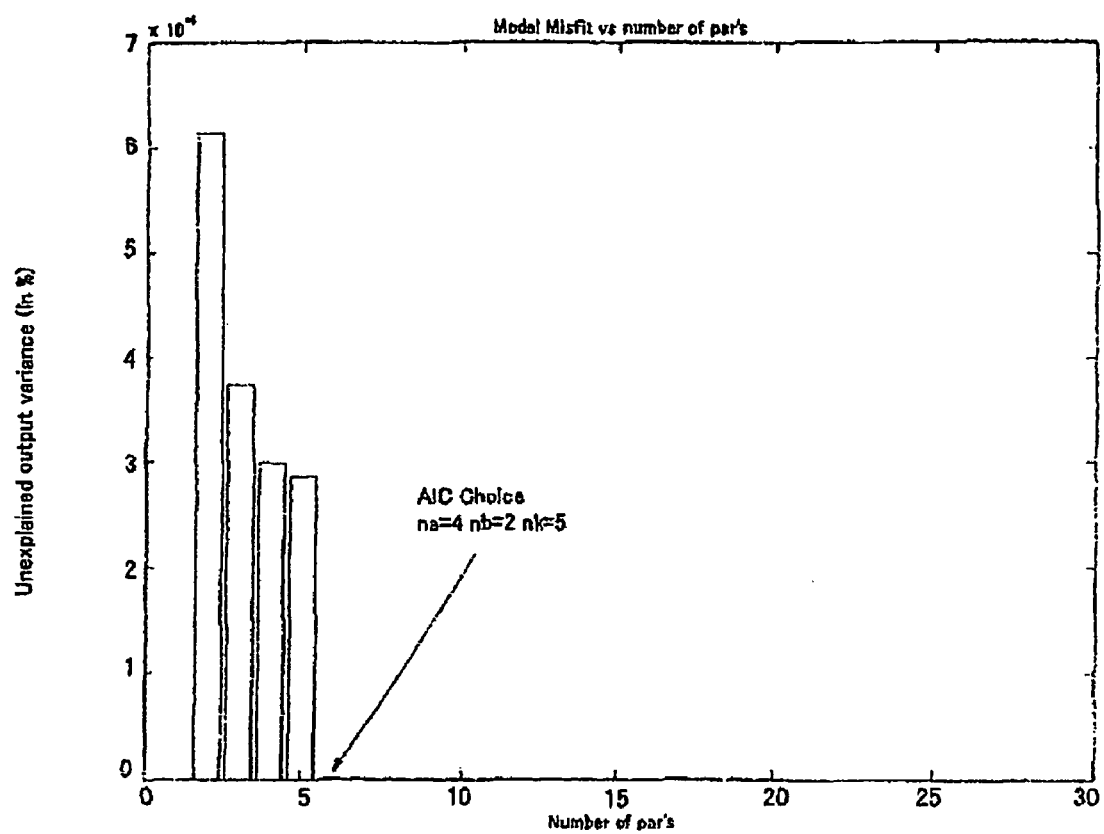
FIG. 29 is a diagram showing a scale, according to AIC (i.e., Akaike's Information Criterion), for measuring a degree of misfit of a model at the time of estimating an ARX model.

FIG. 27 shows an input voltage waveform on the primary side of the step-down transformer shown in FIG. 26; FIG. 28 shows an output voltage waveform on the primary side of the step-down transformer shown in FIG. 26; and FIG. 29 is a diagram showing a scale, according to AIC (i.e., Akaike's Information Criterion; smaller the scale the better a model), for measuring a degree of misfit of a model at the time of estimating an ARX model.

An ARX model in a multiple variables system is represented by a discrete polynomial equation as the following expression 23.

$$A(q)y(t)=B(q)u(t-nk)+e(t)$$

$$A(q)=1+a_1q^{-1}+\ldots+a_{na}q^{-na}$$

$$B(q)=b_1+b_2q^{-1}+\ldots+b_{nb}q^{-nb+1} \quad (23)$$

Figure 30:
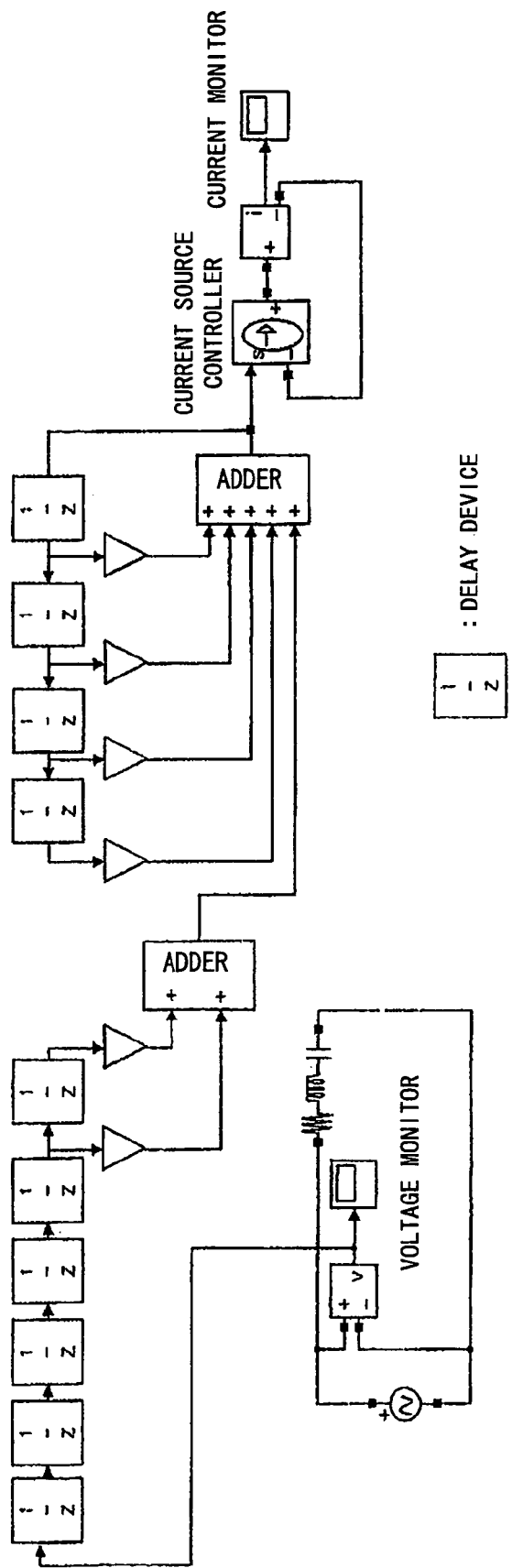
FIG. 30 is a circuit diagram of a current estimation ARX model of the primary side of a step-down transformer

A determination of orders and of each coefficient of the ARX model of the following expression 24 so as to minimize the AIC standard has built up a current estimation ARX model on the primary side of the step-down transformer shown in FIG. 30 by means of an FPGA-use embodiment circuit.

Figure 31:
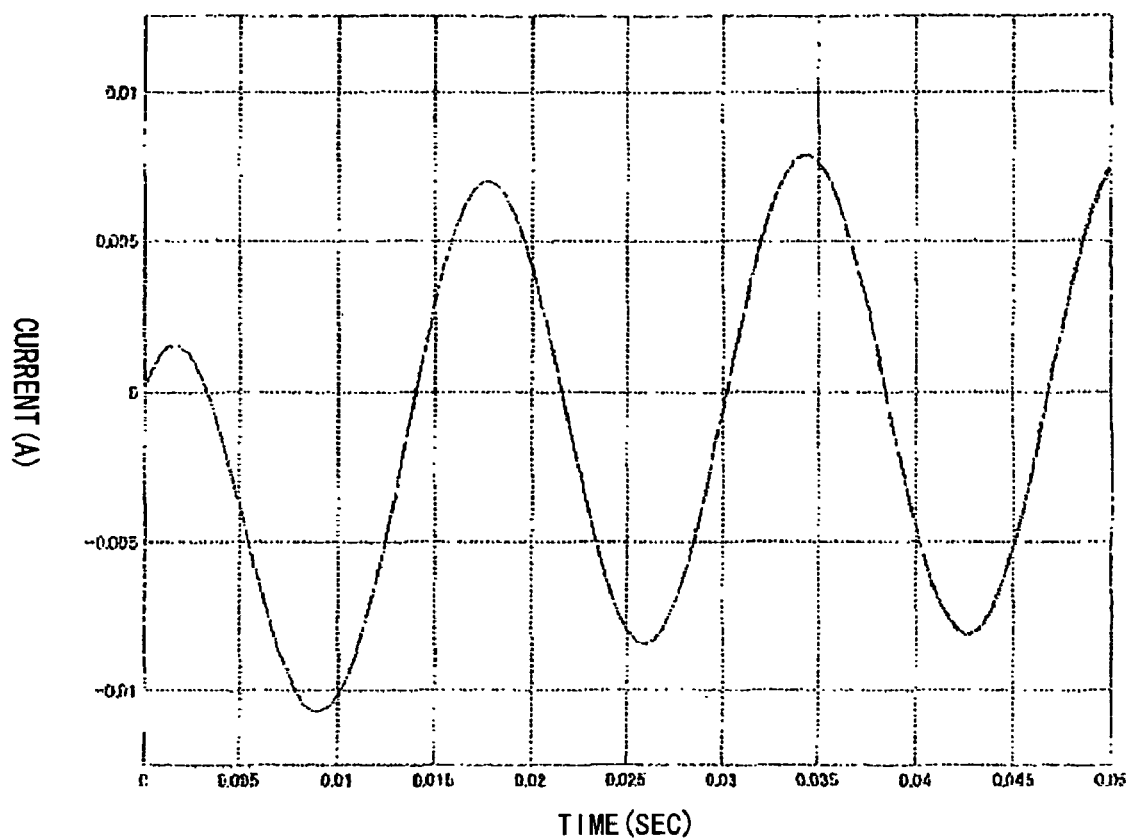
FIG. 31 shows a result of the simulation shown in FIG. 30.

FIG. 31 shows an estimated output current waveform on the primary side of the step-down transformer by the estimation ARX model by means of the FPGA-use embodiment circuit of the current estimation ARX model. What is understood from the result is, the FPGA-use embodiment circuit of the estimation ARX model estimates an environmental impedance in the case of regarding both a current and a voltage on the primary side of the step-down transformer of a power line including the step-down transformer shown in FIG. 26 as one port. Note that an estimation model for such estimation may use other parametric models, in lieu of being limited to the ARX model.

$$A(q) = 1 + 3.562e^{-5}(\pm 0.0001815)q^{-1} - 2.784e^{-5}(\pm 0.0001815)q^{-2} + \quad (24)$$
$$0.0003707(\pm 0.0001815)q^{-3} - 0.9993(\pm 0.0001815)q^{-4}$$
$$B(q) = 0.0002059(\pm 5.28e^{-8})q^{-5} - 0.000206(\pm 5.281e^{-8})q^{-6}$$

Embodiment 6

Figure 33:
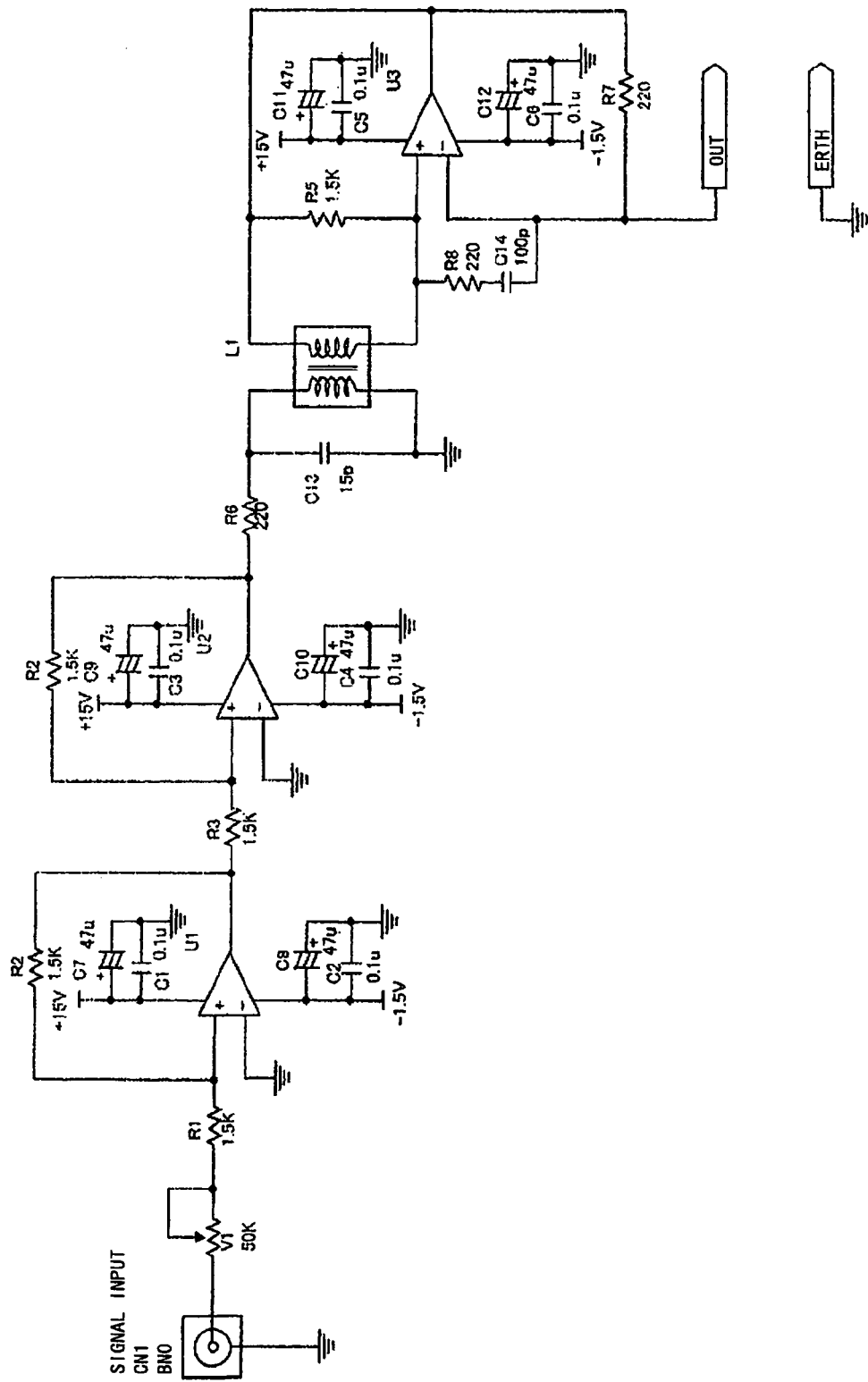
FIG. 33 shows a current source circuit.
Figure 34:
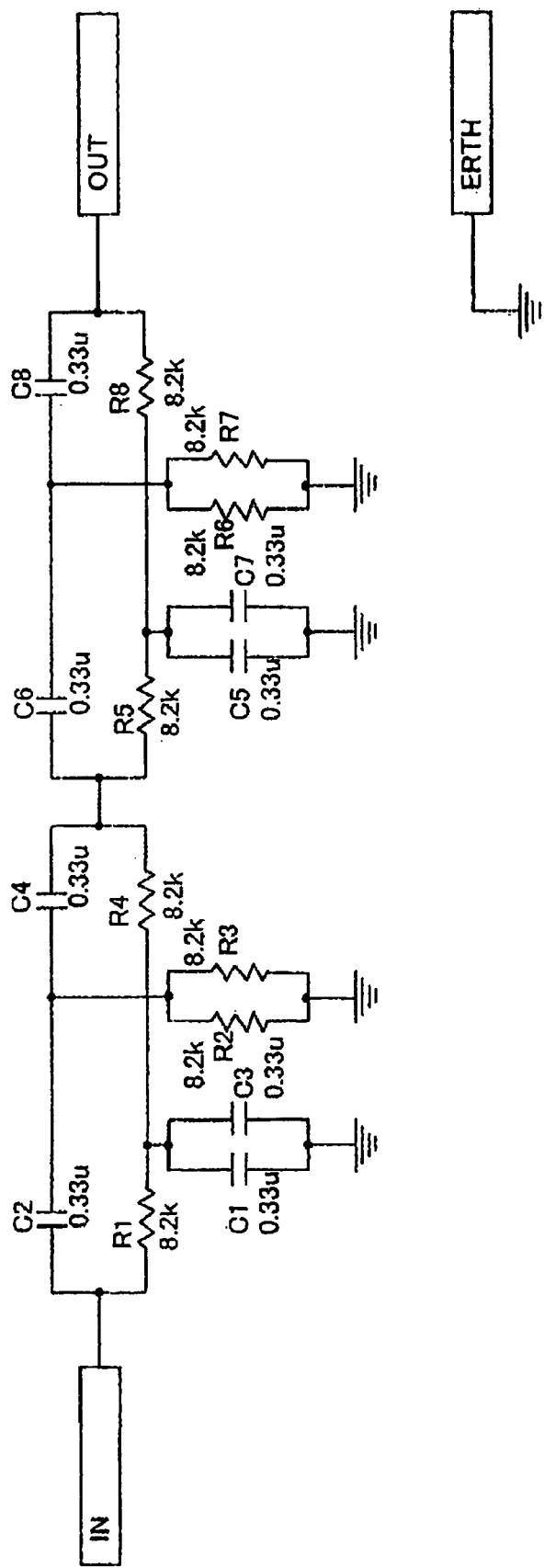
FIG. 34 shows a filter circuit diagram.
Figure 35:
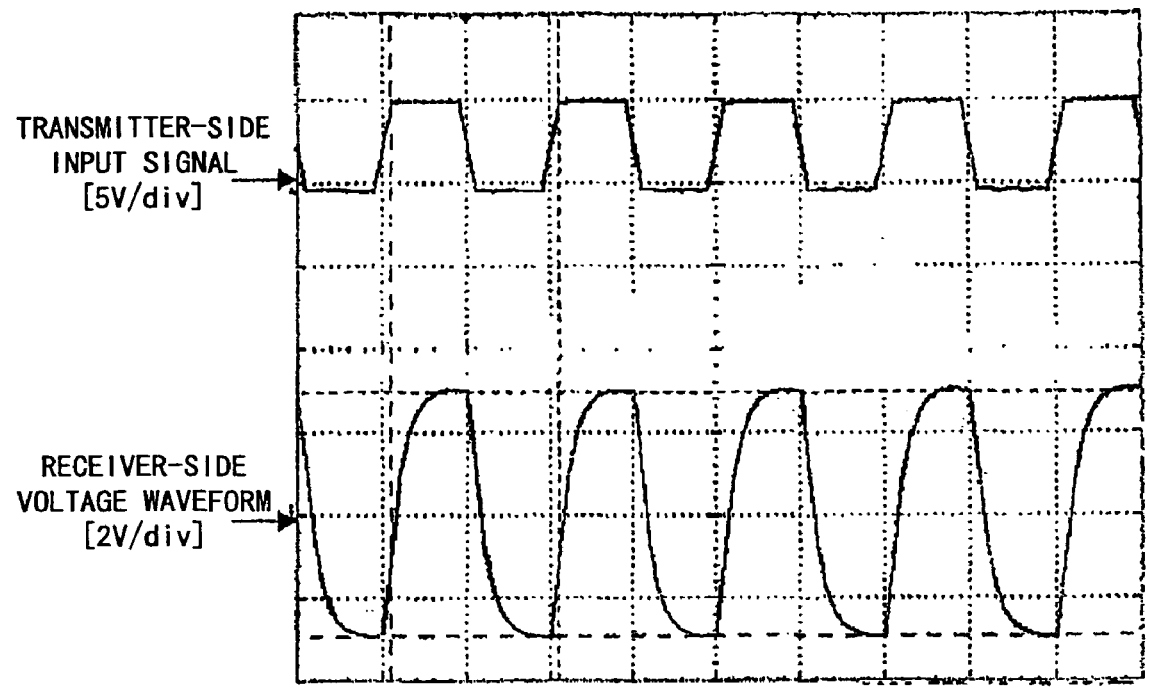
FIG. 35 shows an input signal waveform of a transmission-side current source circuit and a reception-side voltage waveform in the event of $R_L$ at 680 ohms.
Figure 36:
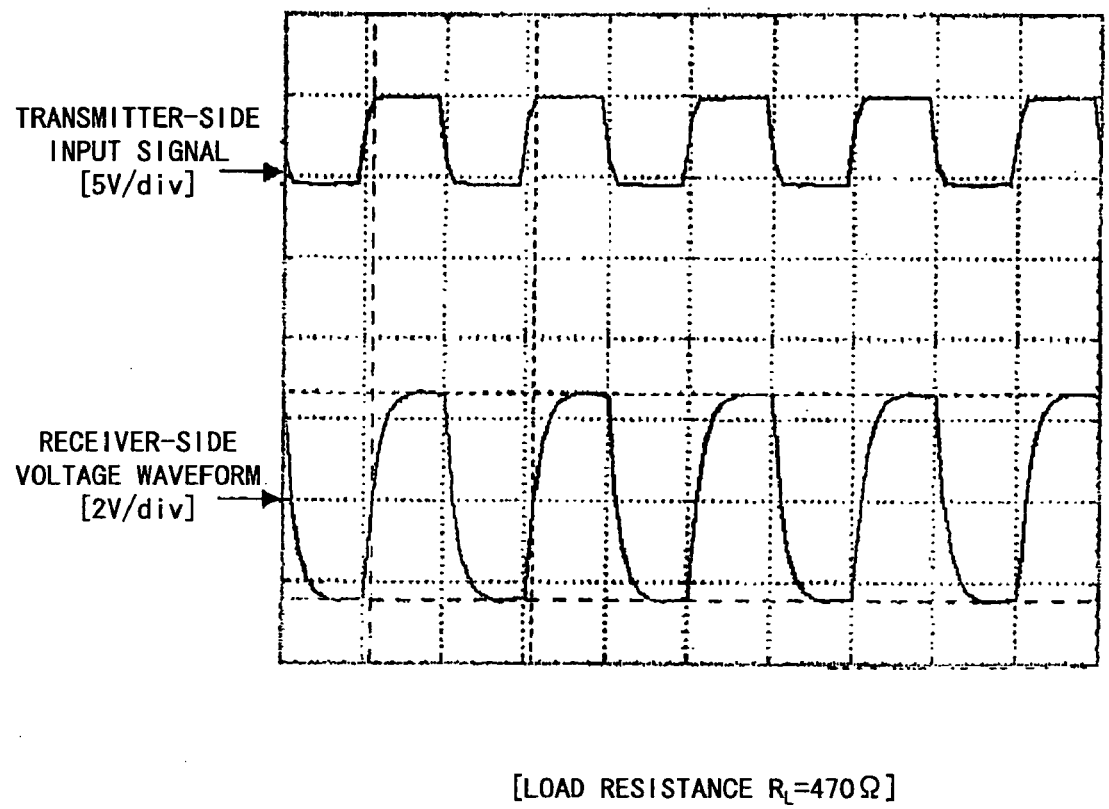
FIG. 36 shows an input signal waveform of a transmission-side current source circuit and a reception-side voltage waveform in the event of $R_L$ at 470 ohms.
Figure 37:
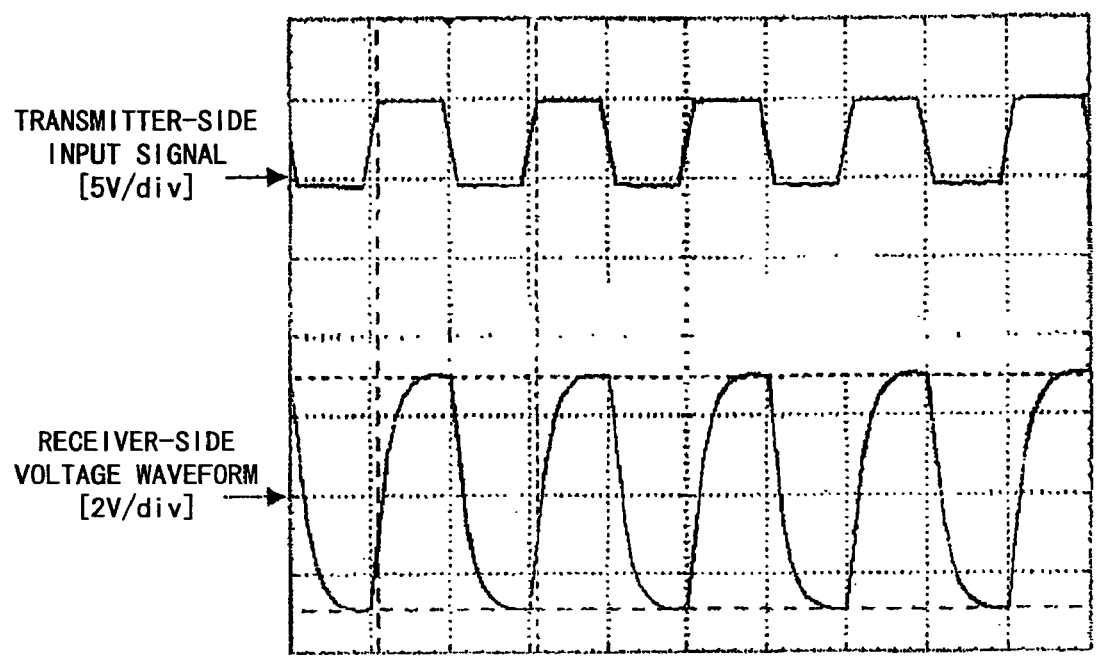
FIG. 37 shows an input signal waveform of a transmission-side current source circuit and a reception-side voltage waveform in the event of $R_L$ at 330 ohms.
Figure 40:
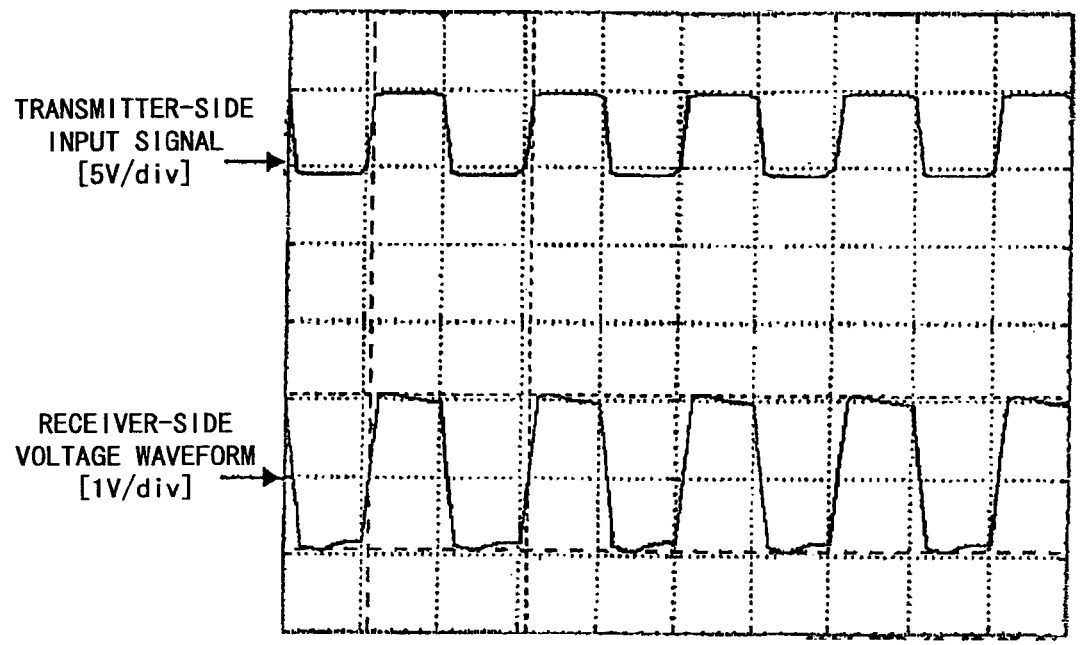
FIG. 40 shows an input signal waveform of a transmission-side current source circuit and a reception-side voltage waveform in the event of $R_L$ at 100 ohms.
Figure 41:
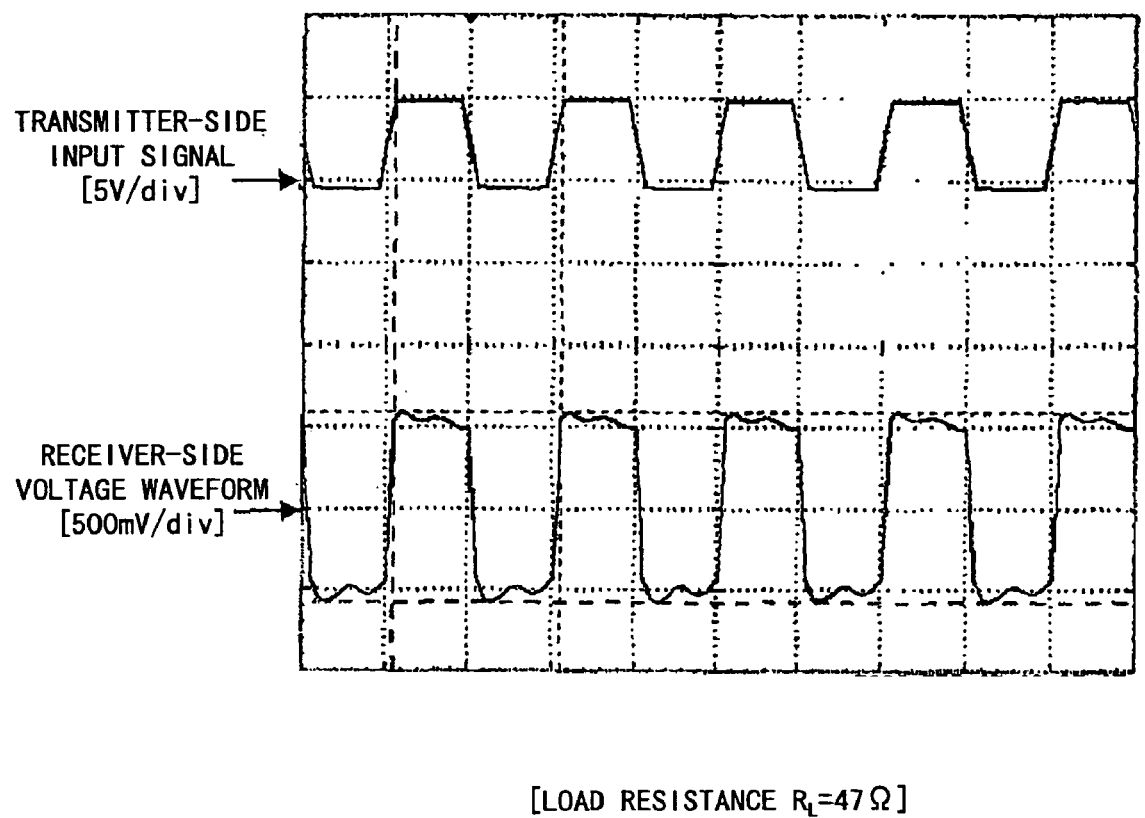
FIG. 41 shows an input signal waveform of a transmission-side current source circuit and a reception-side voltage waveform in the event of $R_L$ at 47 ohms.

Premising an actual telecommunication by way of a power line, the present embodiment comprises filters 321 and 322 on each of a transmitter side and a receiver side for removing a 60-(Hz) component. Also in this case, a current source circuit 323 is put in a state of an adjustment for gaining a maximum output. In this state, a load resistance 324 ($R_L$) is changed and a voltage appearing across the ends of the $R_L$ is observed. FIG. 32 shows a measurement system in this event, while FIG. 33 shows a circuit diagram of the current source circuit. Likewise, FIG. 34 shows a circuit diagram of filters 321 and 322. Note that the constants noted in the circuit diagram and the circuit configuration are not limited as such.

FIGS. 35 through 43 show input signal waveforms of a current source circuit 323 on the observed transmitter side and voltage waveforms on the receiver side as a result of the experiments.

And, Table 1 summarizes resistance values of resistor $R_L$ of the receiver side, amplitudes of voltage waveforms appearing across both terminals of the resistor $R_L$ (defined as "receiver-side voltage waveform amplitude" herein) and current amplitudes (defined as "receiver-side current amplitude" herein).

TABLE 1

| $R_L$[Ohm] | Receiver-side voltage waveform amplitude [V] | Receiver-side current amplitude [mA] | FIG. No. |
|---|---|---|---|
| 680 | 5.88 | 8.65 | 35 |
| 470 | 5.08 | 10.81 | 36 |

TABLE 1-continued

| $R_L$[Ohm] | Receiver-side voltage waveform amplitude [V] | Receiver-side current amplitude [mA] | FIG. No. |
|---|---|---|---|
| 330 | 4.20 | 12.73 | 37 |
| 220 | 3.32 | 15.09 | 38 |
| 150 | 2.64 | 17.60 | 39 |
| 100 | 2.00 | 20.00 | 40 |
| 47 | 1.17 | 24.89 | 41 |
| 33 | 0.98 | 29.70 | 42 |
| 22 | 0.70 | 31.82 | 43 |

Embodiment 7

Using a manufactured current source circuit 323 and comprising filters 321 and 322 for removing a 60-(Hz) component of a power line on both the transmitter and receiver sides, followed by connecting them to a power line, then an experiment of a one-to-one telecommunication has been performed.

Figure 44:
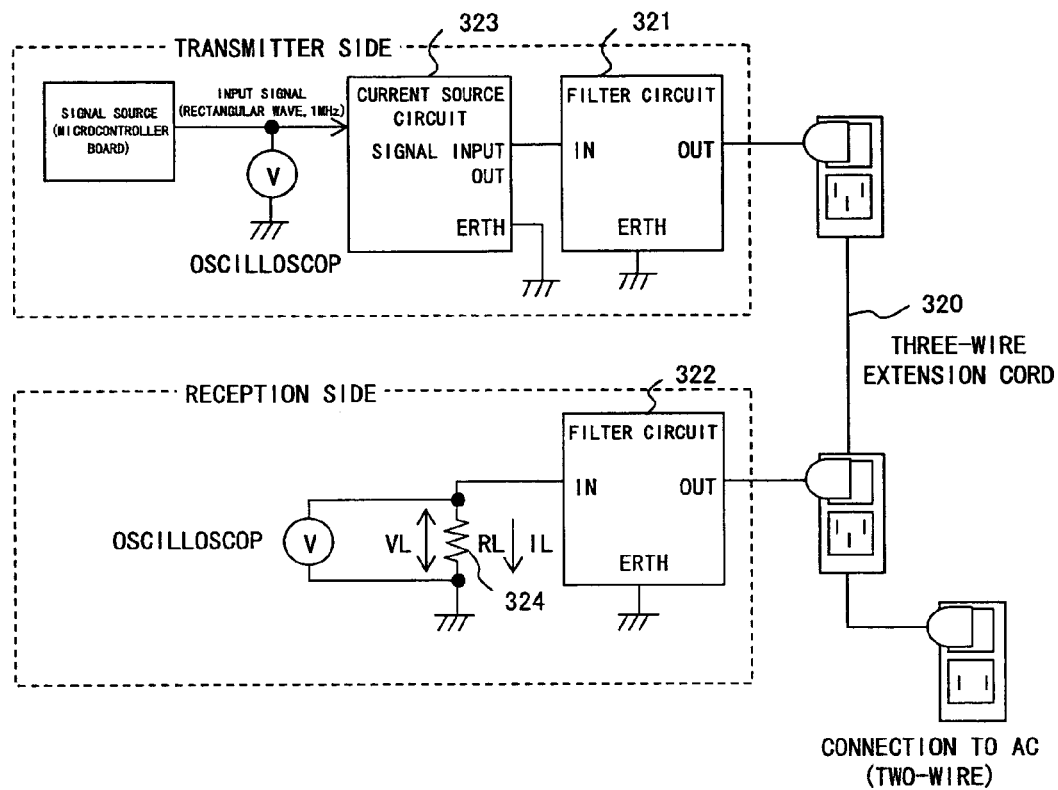
FIG. 44 is an experimental circuit of a power line telecommunication by using a current source circuit.
Figure 46:
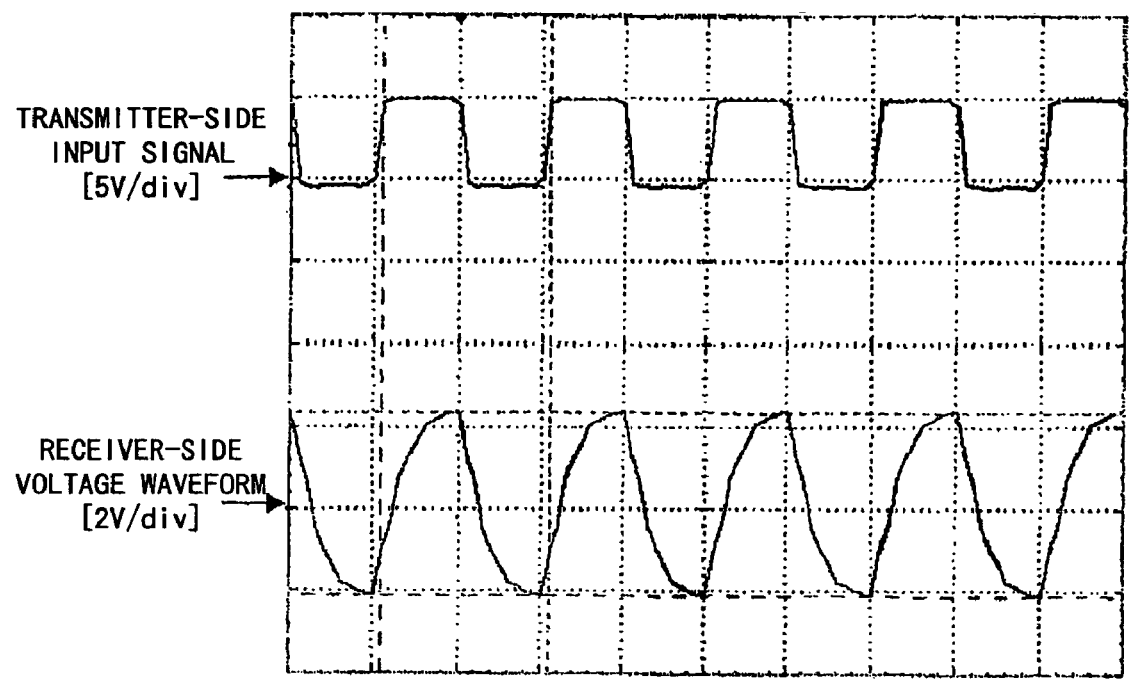
FIG. 46 shows an input signal waveform of a transmission-side current source circuit and a reception-side voltage waveform in the event of $R_L$ at 470 ohms.
Figure 48:
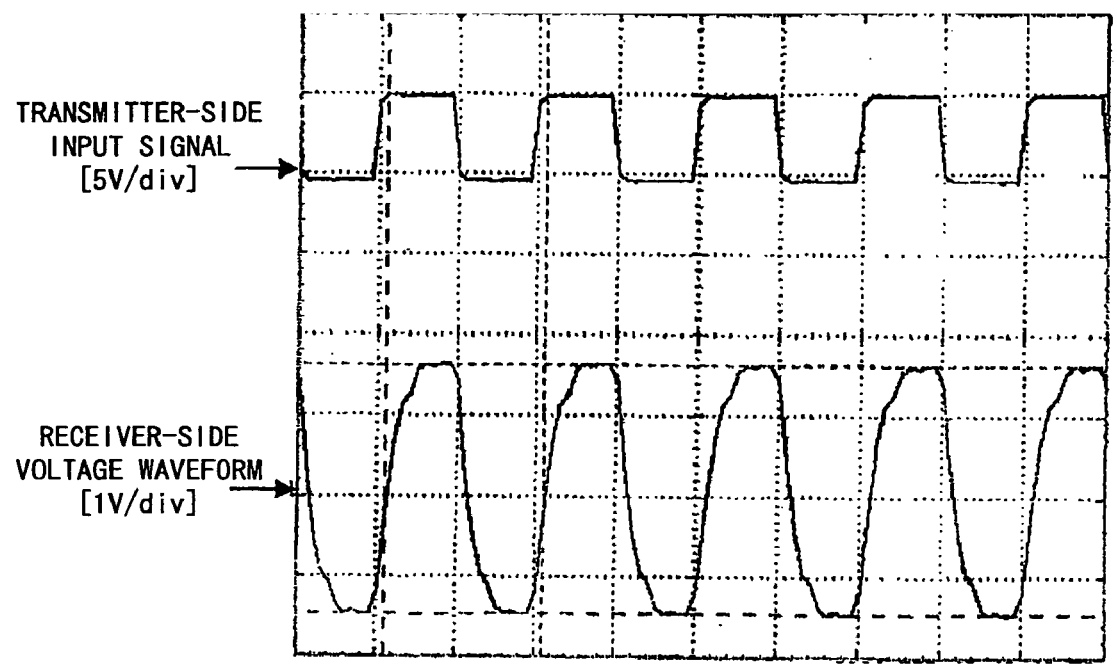
FIG. 48 shows an input signal waveform of a transmission-side current source circuit and a reception-side voltage waveform in the event of $R_L$ at 220 ohms.
Figure 51:
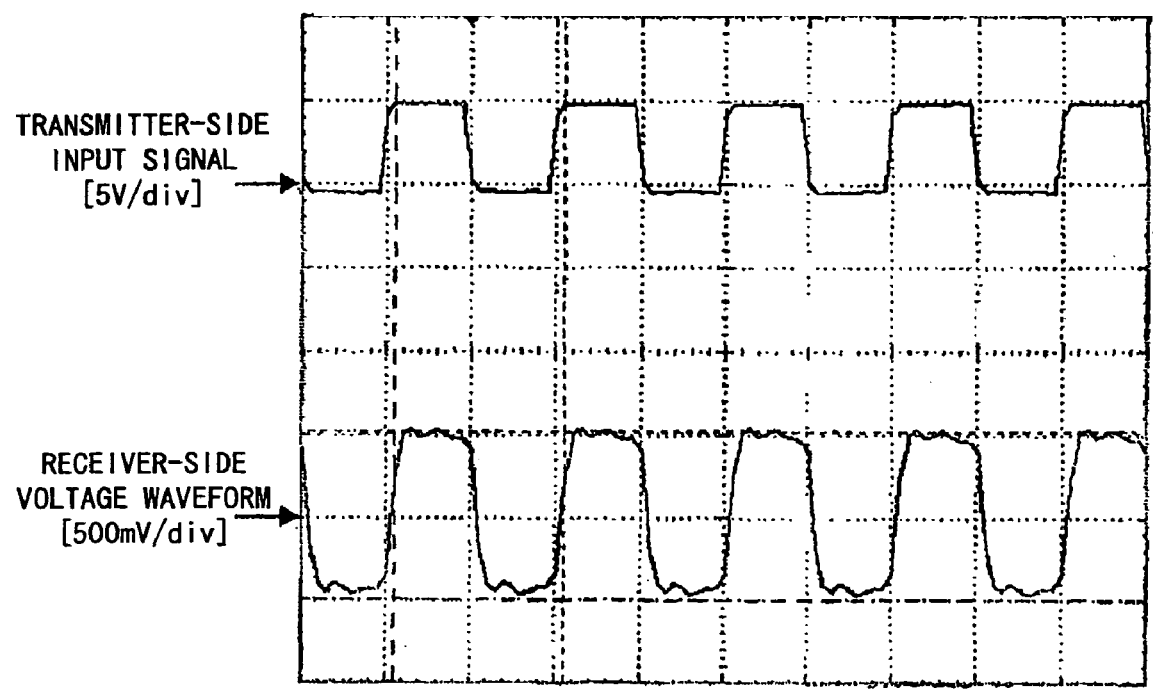
FIG. 51 shows an input signal waveform of a transmission-side current source circuit and a reception-side voltage waveform in the event of $R_L$ at 47 ohms.
Figure 53:
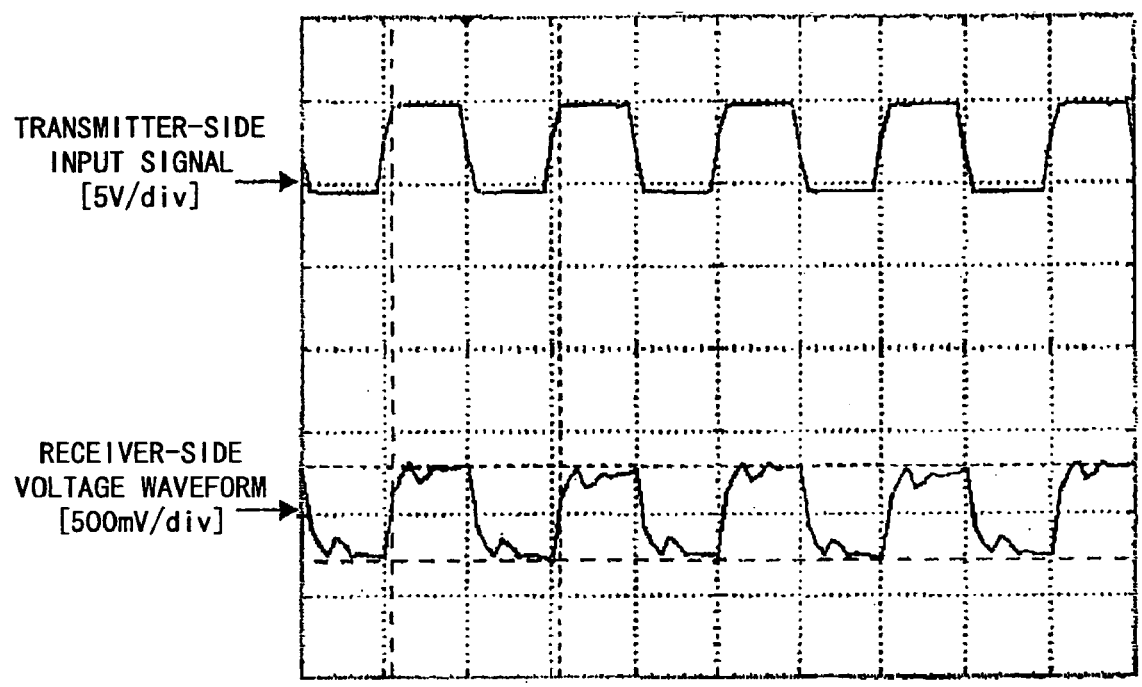
FIG. 53 shows an input signal waveform of a transmission-side current source circuit and a reception-side voltage waveform in the event of $R_L$ at 22 ohms.
Figure 57:
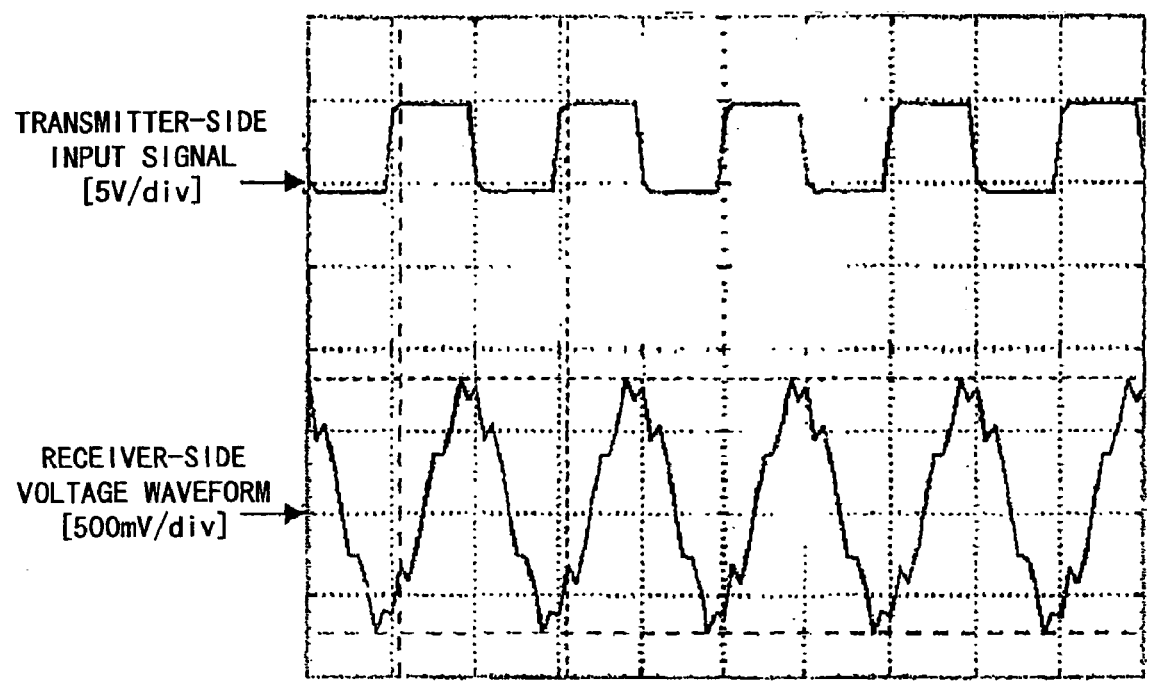
FIG. 57 shows an input signal waveform of a transmission-side current source circuit and a reception-side voltage waveform in the event of $R_L$ at 330 ohms.
Figure 61:
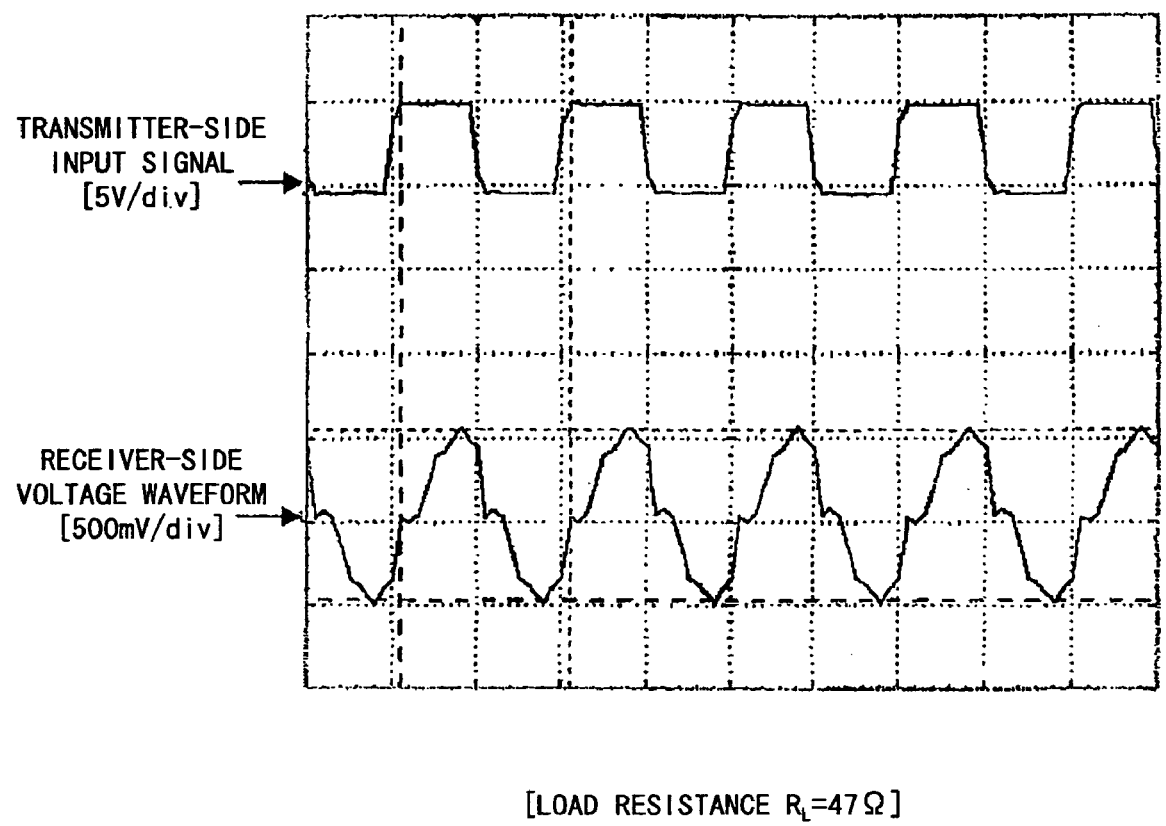
FIG. 61 shows an input signal waveform of a transmission-side current source circuit and a reception-side voltage waveform in the event of $R_L$ at 47 ohms.
Figure 66:
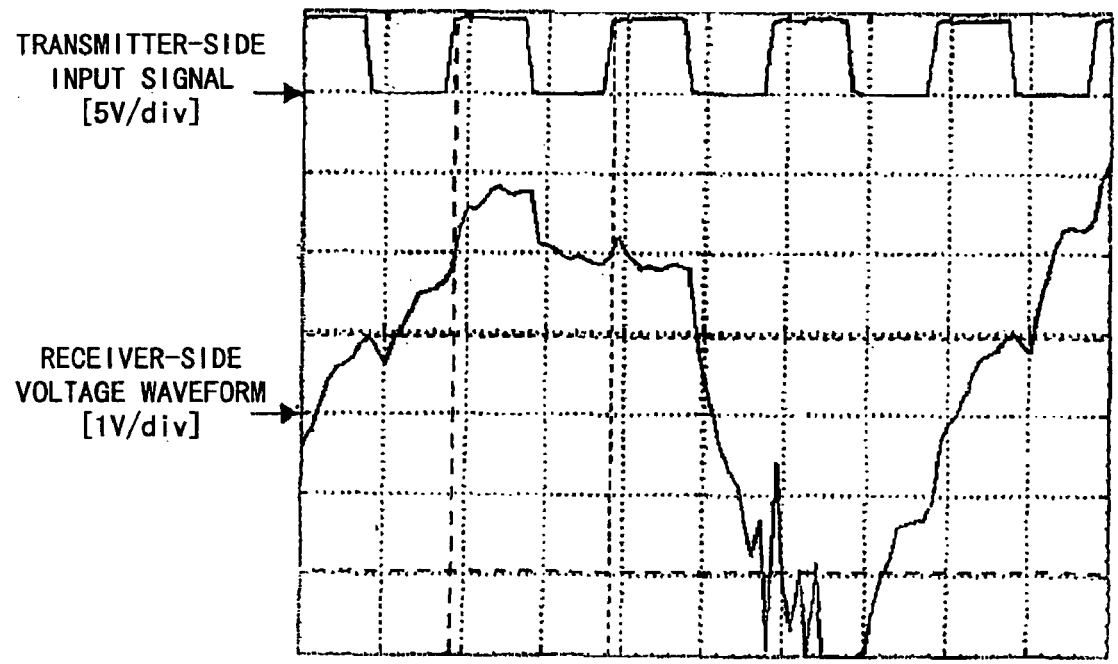
FIG. 66 is a measured waveform in the presence of an output of a current signal from a power line telecommunication module or current source circuit in the case of no connection of an electric appliance in the event of $R_L$ at 680 ohms.
Figure 69:
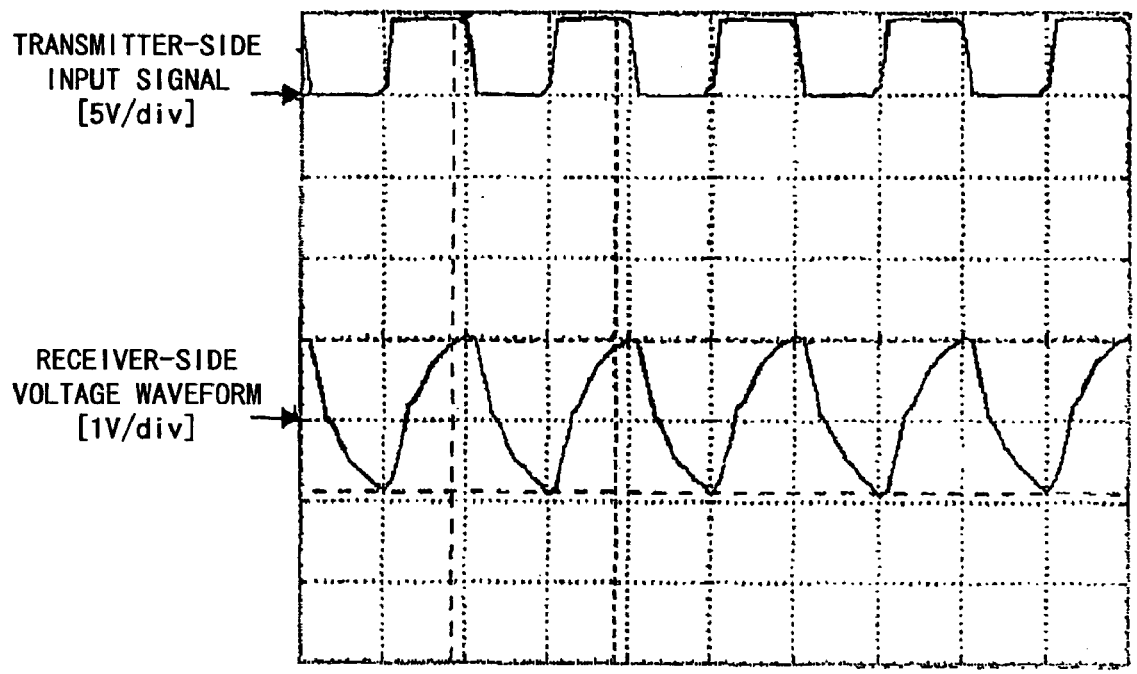
FIG. 69 is a measured waveform in the absence of an output of a current signal from a power line telecommunication module or current source circuit in the case of no connection of an electric appliance in the event of $R_L$ at 330 ohms.
Figure 70:
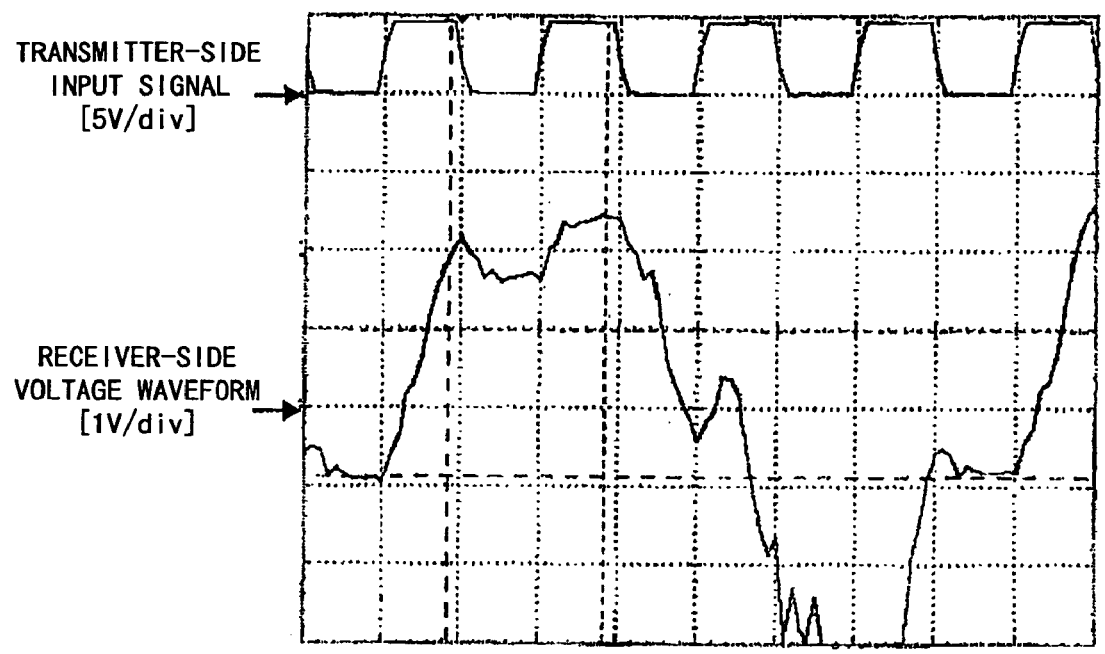
FIG. 70 is a measured waveform in the presence of an output of a current signal from a power line telecommunication module or current source circuit in the case of no connection of an electric appliance in the event of $R_L$ at 330 ohms.
Figure 72:
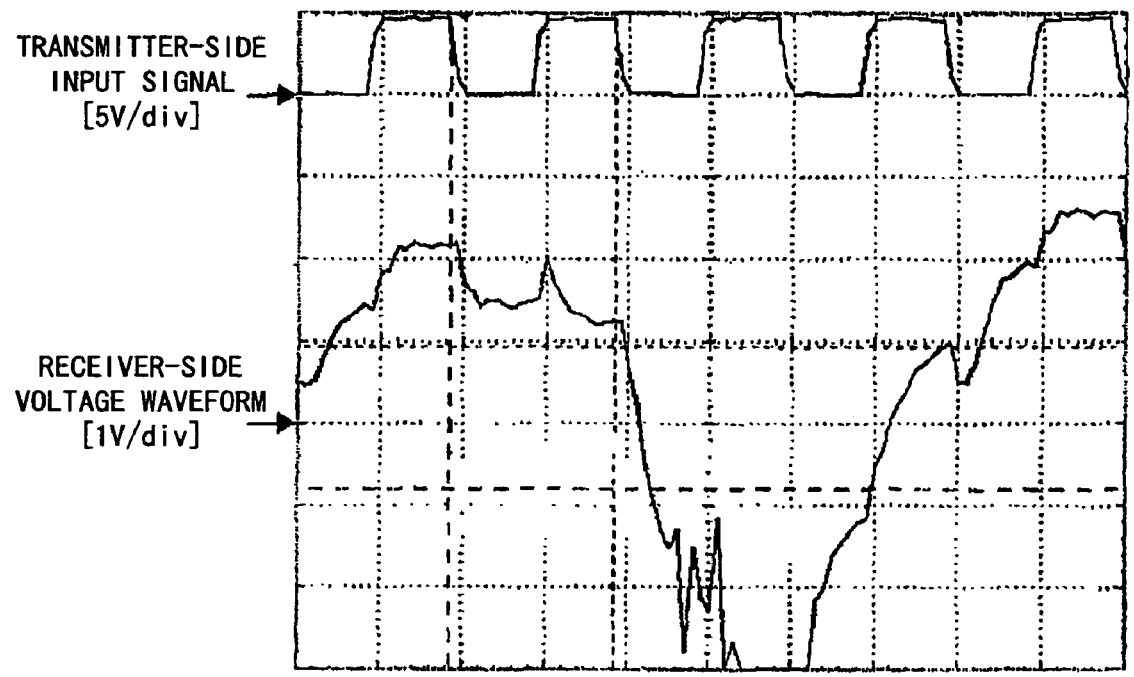
FIG. 72 is a measured waveform in the presence of an output of a current signal from a power line telecommunication module or current source circuit in the case of no connection of an electric appliance in the event of $R_L$ at 220 ohms.
Figure 73:
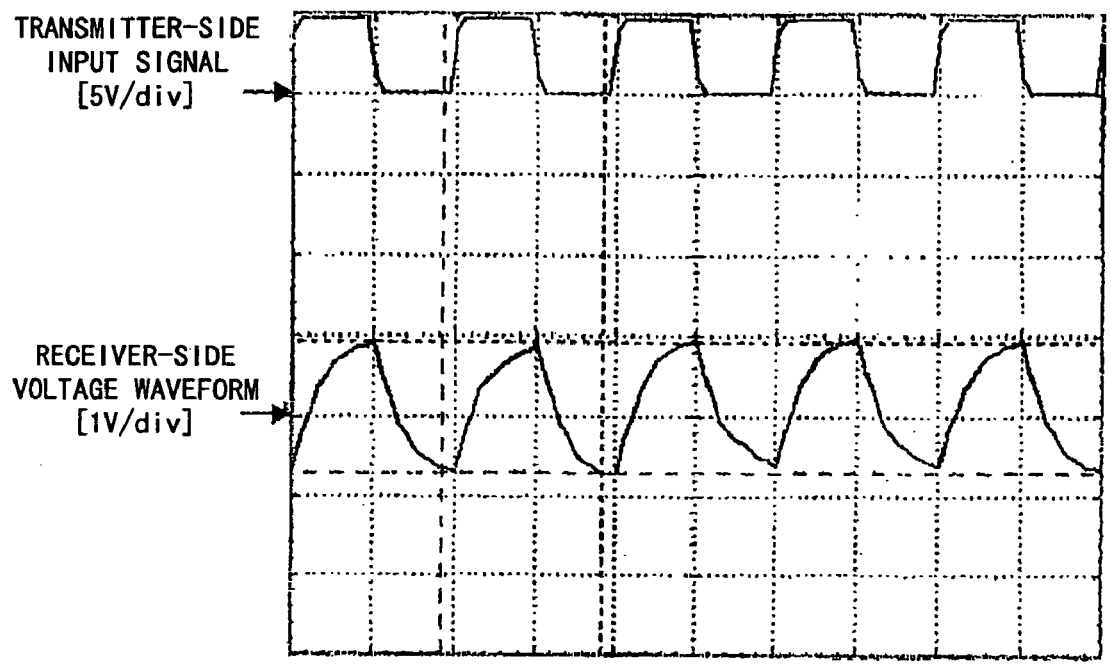
FIG. 73 is a measured waveform in the absence of an output of a current signal from a power line telecommunication module or current source circuit in the case of no connection of an electric appliance in the event of $R_L$ at 150 ohms.
Figure 75:
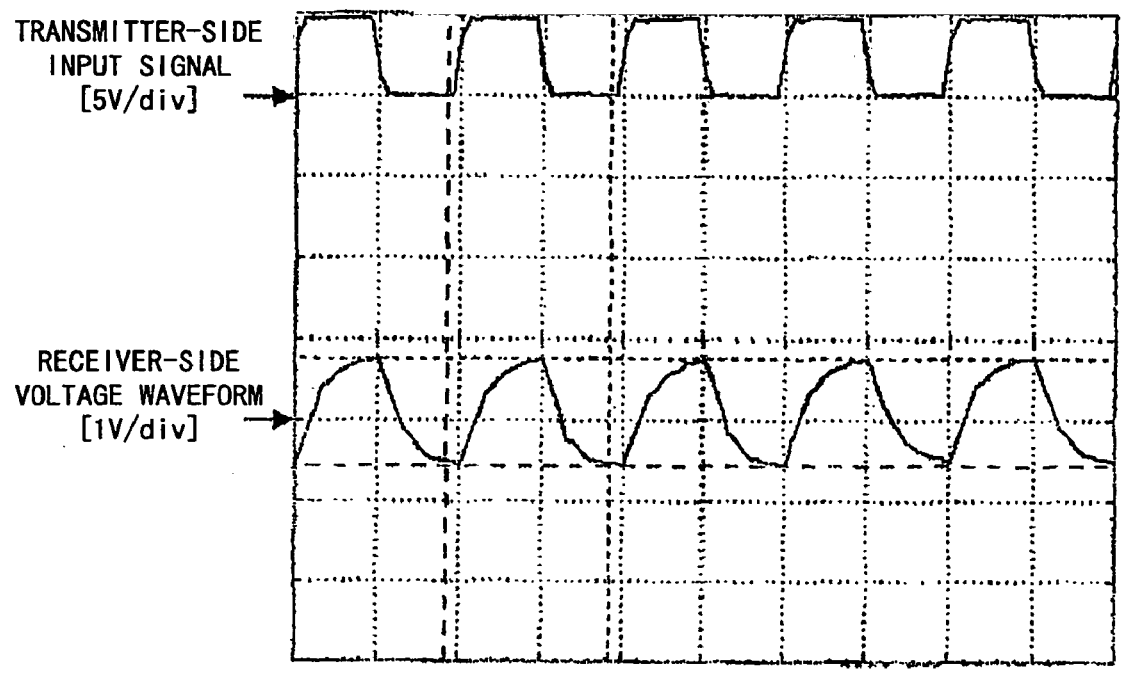
FIG. 75 is a measured waveform in the absence of an output of a current signal from a power line telecommunication module or current source circuit in the case of no connection of an electric appliance in the event of $R_L$ at 100 ohms.
Figure 76:
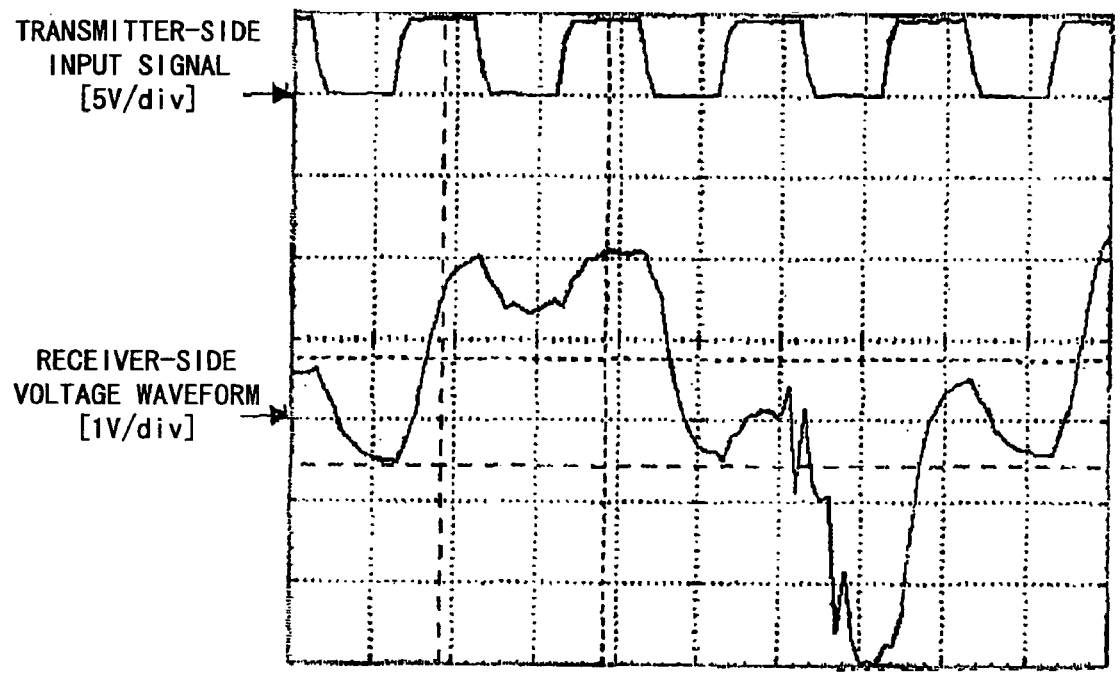
FIG. 76 is a measured waveform in the presence of an output of a current signal from a power line telecommunication module or current source circuit in the case of no connection of an electric appliance in the event of $R_L$ at 100 ohms.
Figure 78:
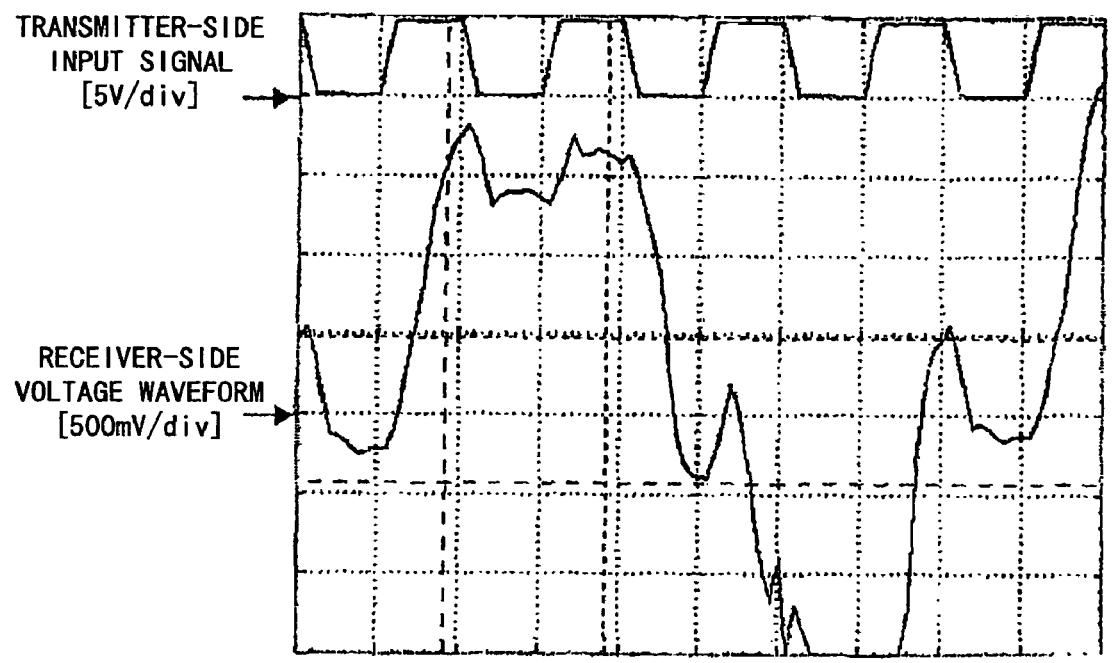
FIG. 78 is a measured waveform in the presence of an output of a current signal from a power line telecommunication module or current source circuit in the case of no connection of an electric appliance in the event of $R_L$ at 47 ohms.
Figure 79:
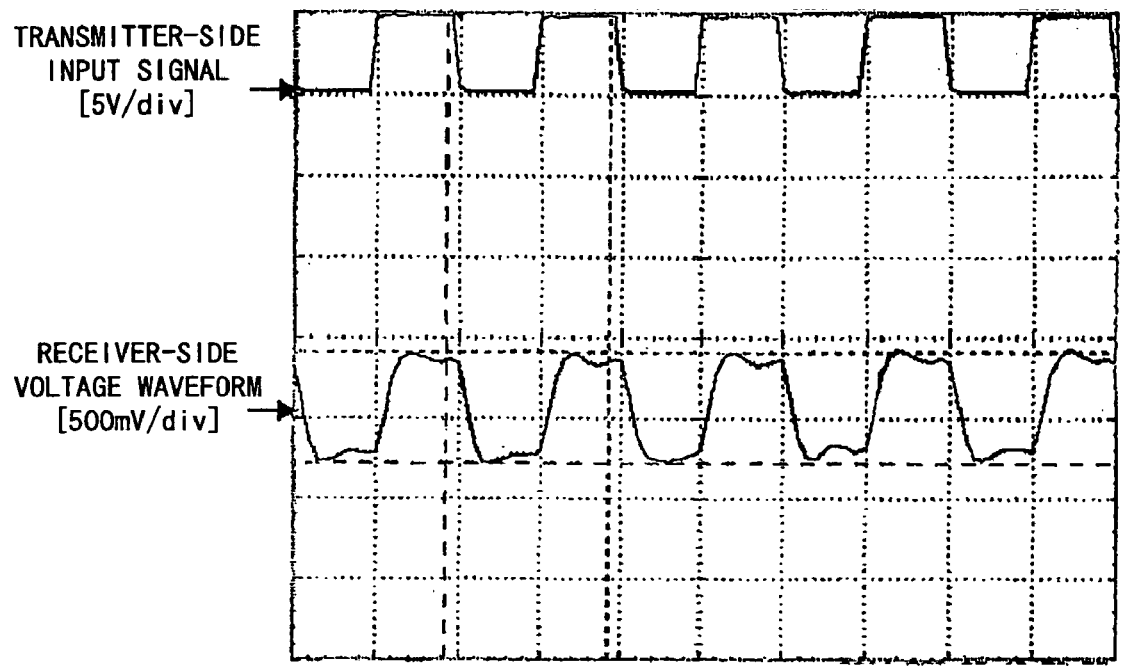
FIG. 79 is a measured waveform in the absence of an output of a current signal from a power line telecommunication module or current source circuit in the case of no connection of an electric appliance in the event of $R_L$ at 33 ohms.
Figure 80:
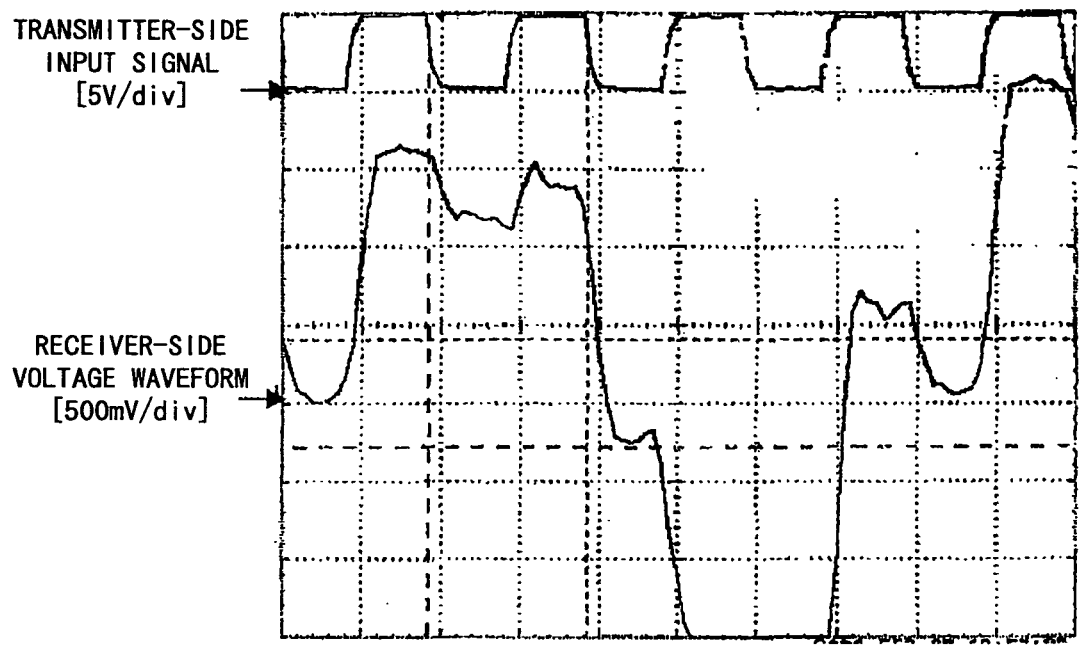
FIG. 80 is a measured waveform in the presence of an output of a current signal from a power line telecommunication module or current source circuit in the case of no connection of an electric appliance in the event of $R_L$ at 33 ohms.
Figure 82:
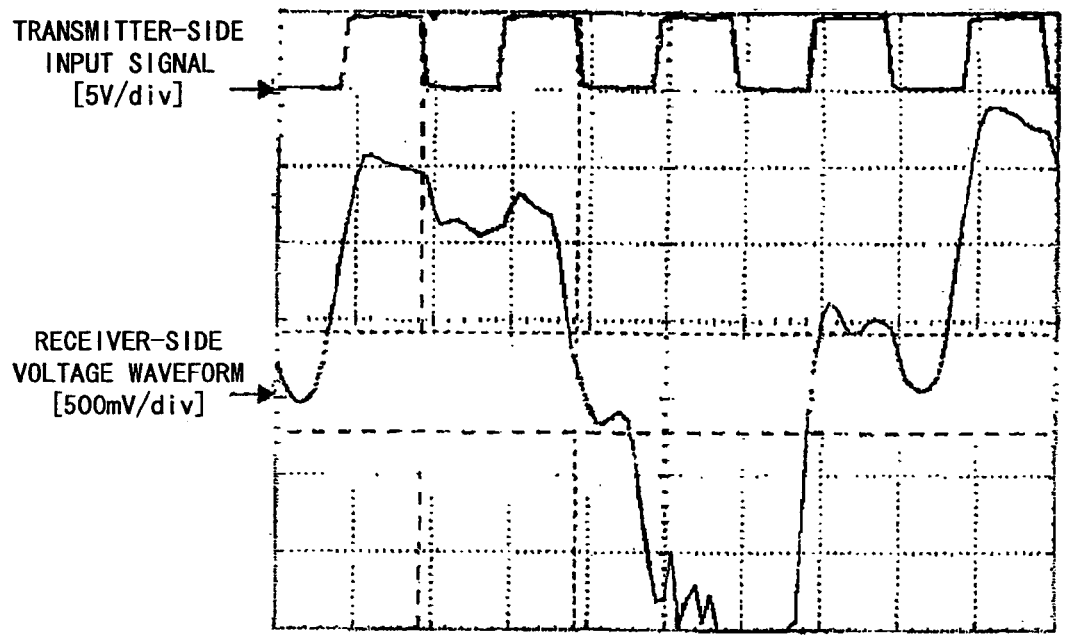
FIG. 82 is a measured waveform in the presence of an output of a current signal from a power line telecommunication module or current source circuit in the case of no connection of an electric appliance in the event of $R_L$ at 22 ohms.
Figure 83:
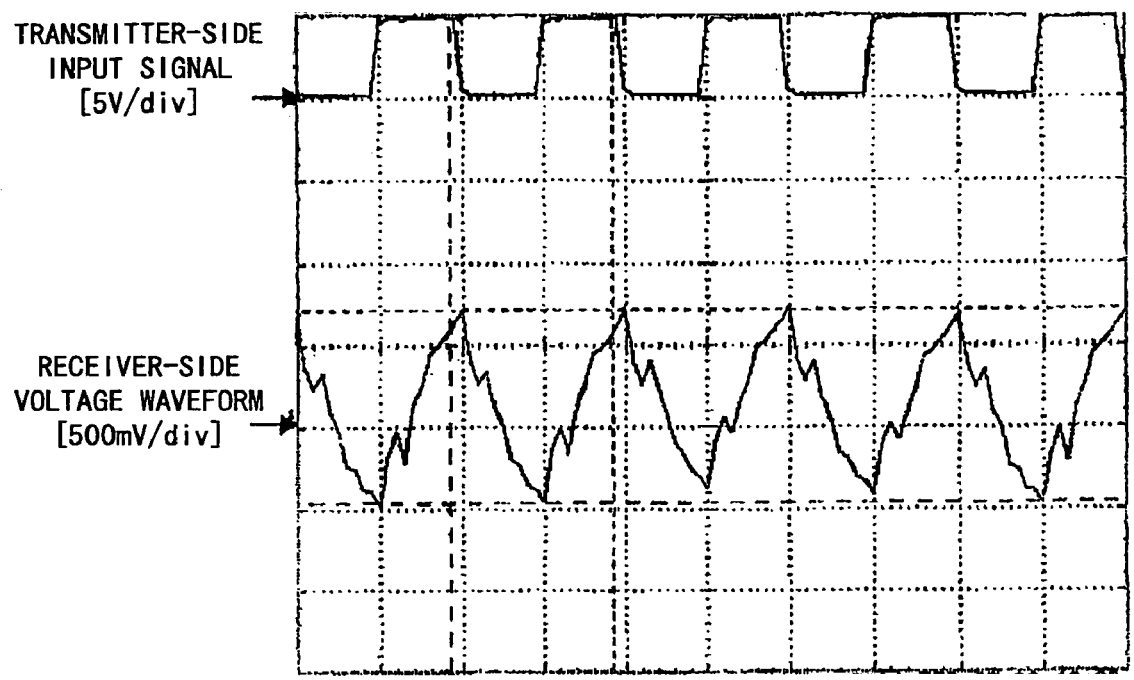
FIG. 83 is a measured waveform in the absence of an output of a current signal from a power line telecommunication module or current source circuit in the case of a connection of an electric appliance in the event of $R_L$ at 680 ohms.
Figure 85:
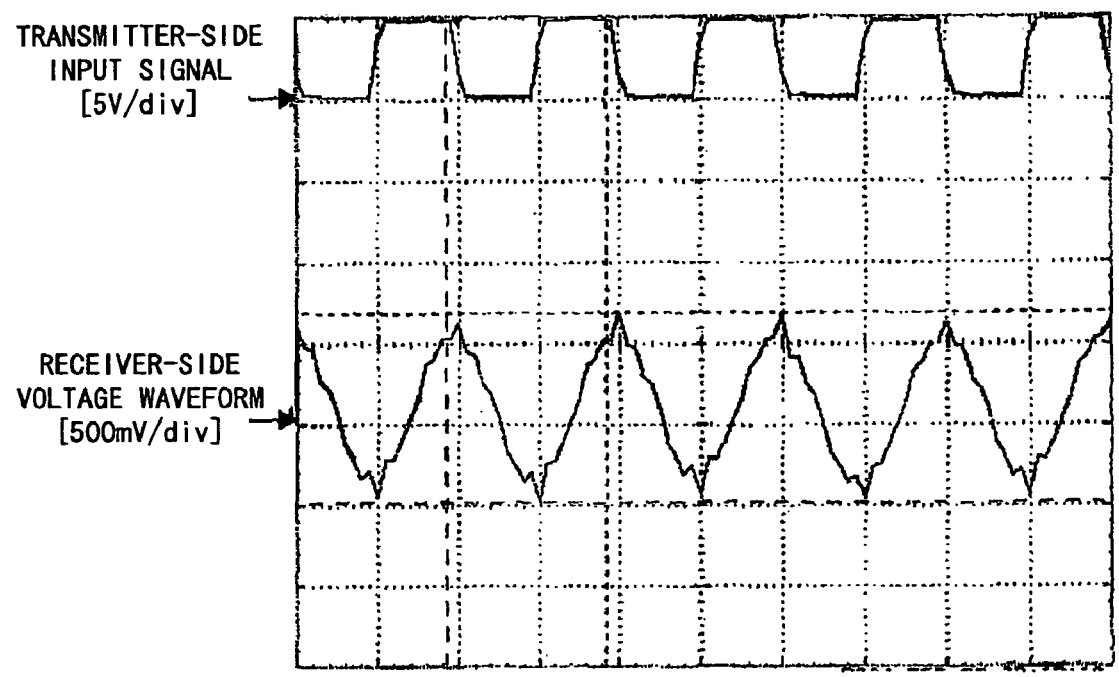
FIG. 85 is a measured waveform in the absence of an output of a current signal from a power line telecommunication module or current source circuit in the case of a connection of an electric appliance in the event of $R_L$ at 470 ohms.
Figure 86:
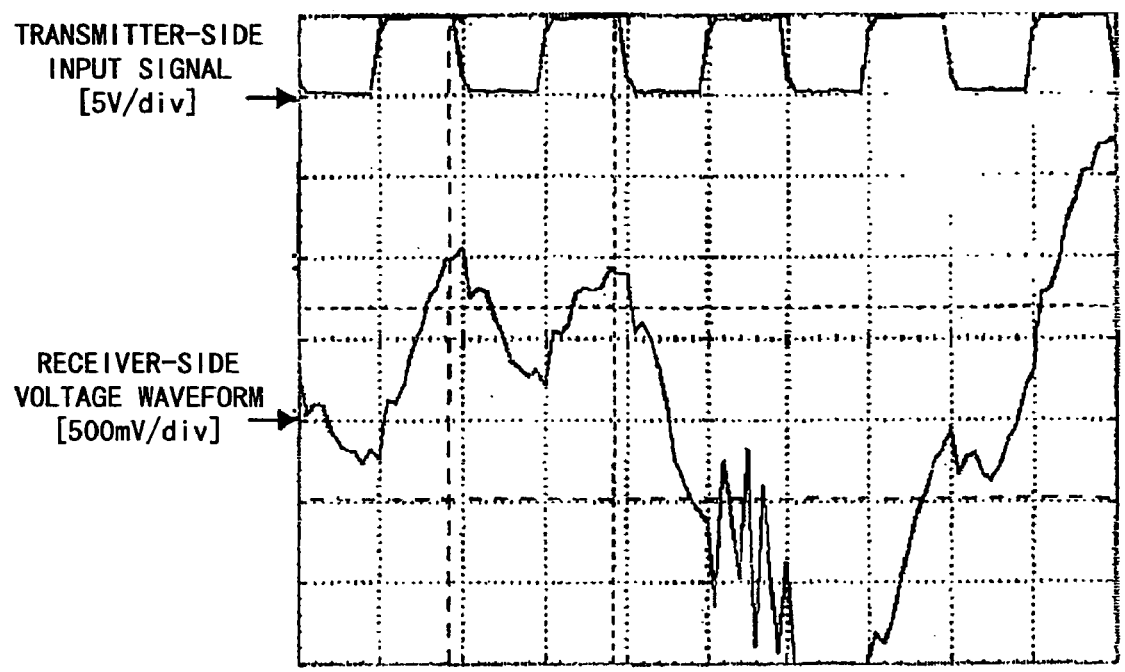
FIG. 86 is a measured waveform in the presence of an output of a current signal from a power line telecommunication module or current source circuit in the case of a connection of an electric appliance in the event of $R_L$ at 470 ohms.
Figure 88:
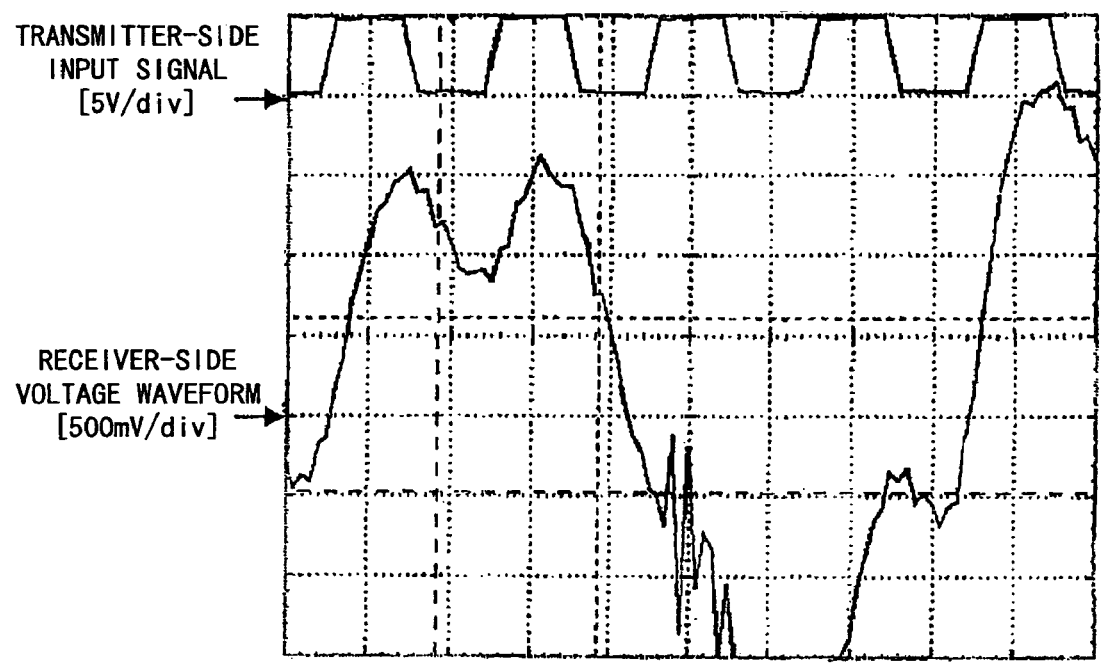
FIG. 88 is a measured waveform in the presence of an output of a current signal from a power line telecommunication module or current source circuit in the case of a connection of an electric appliance in the event of $R_L$ at 330 ohms.
Figure 89:
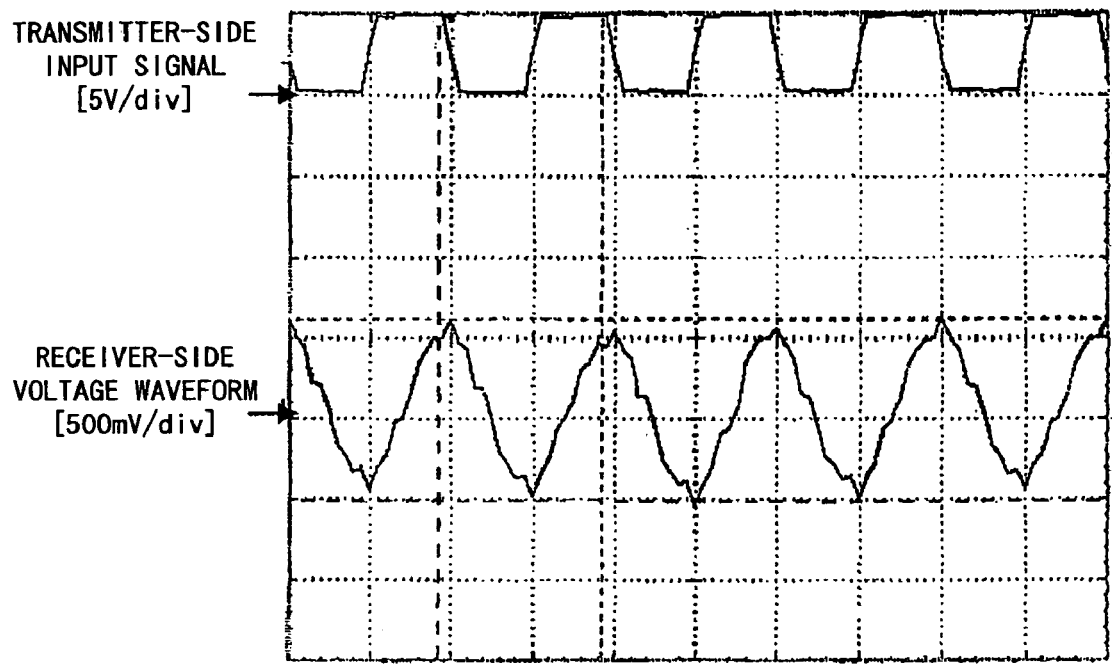
FIG. 89 is a measured waveform in the absence of an output of a current signal from a power line telecommunication module or current source circuit in the case of a connection of an electric appliance in the event of $R_L$ at 220 ohms.
Figure 90:
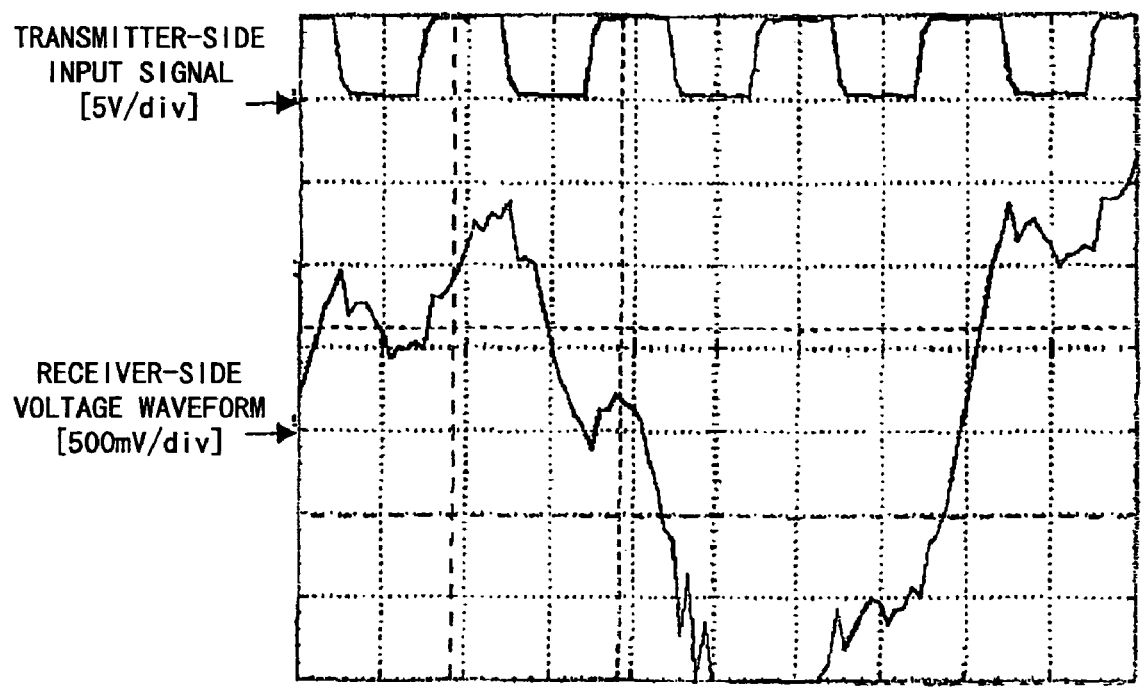
FIG. 90 is a measured waveform in the presence of an output of a current signal from a power line telecommunication module or current source circuit in the case of a connection of an electric appliance in the event of $R_L$ at 220 ohms.
Figure 91:
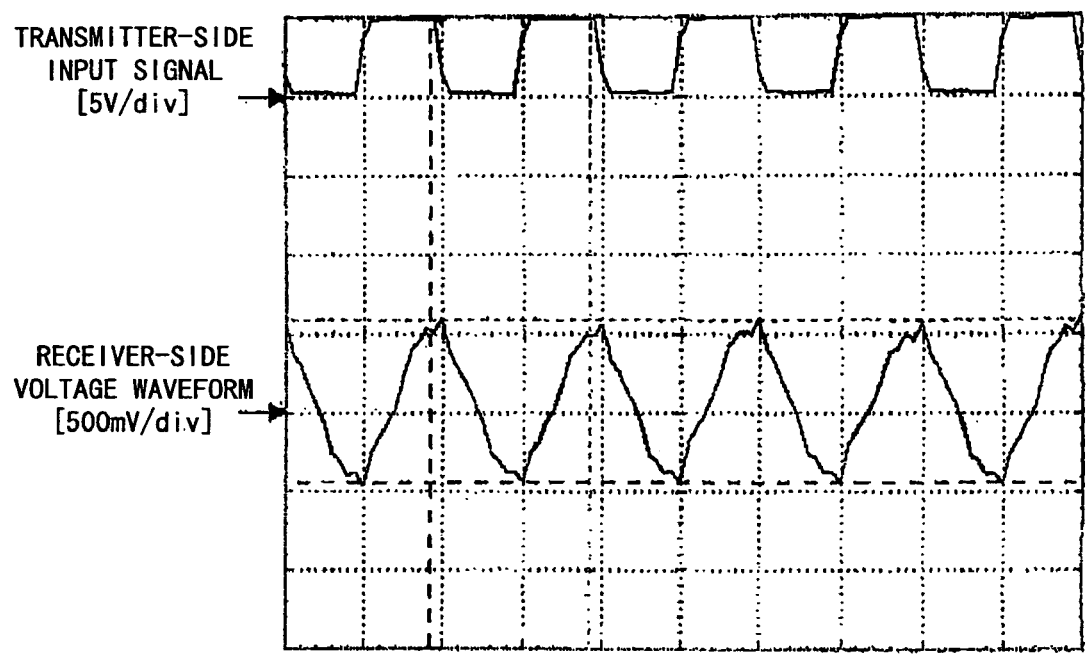
FIG. 91 is a measured waveform in the absence of an output of a current signal from a power line telecommunication module or current source circuit in the case of a connection of an electric appliance in the event of $R_L$ at 150 ohms.
Figure 92:
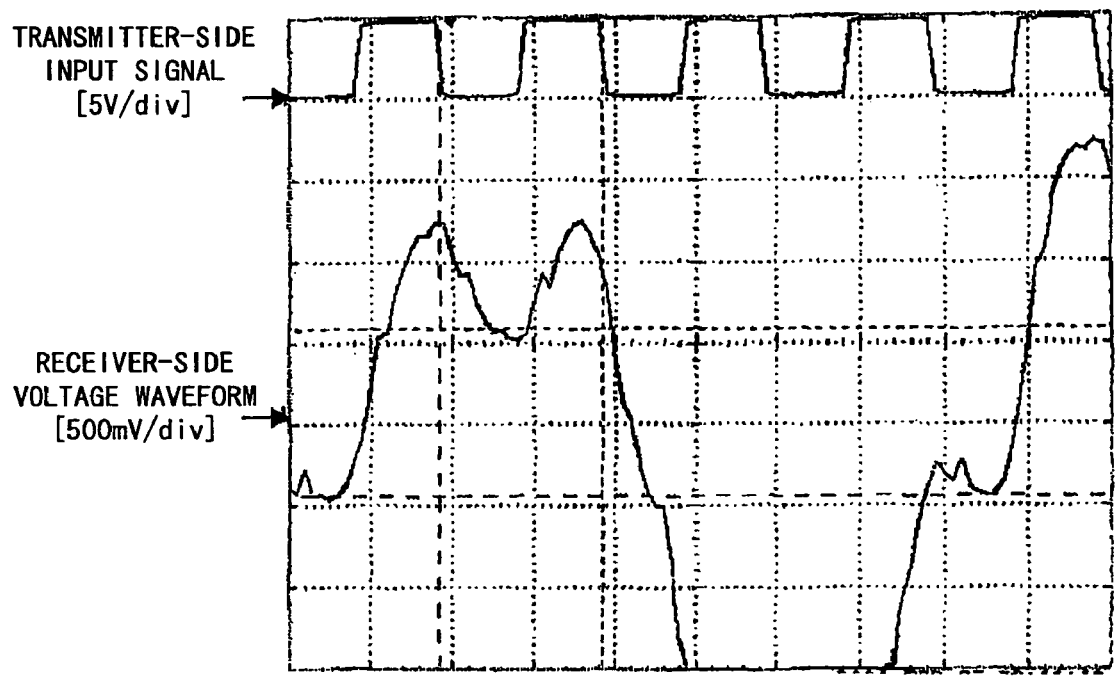
FIG. 92 is a measured waveform in the presence of an output of a current signal from a power line telecommunication module or current source circuit in the case of a connection of an electric appliance in the event of $R_L$ at 150 ohms.
Figure 93:
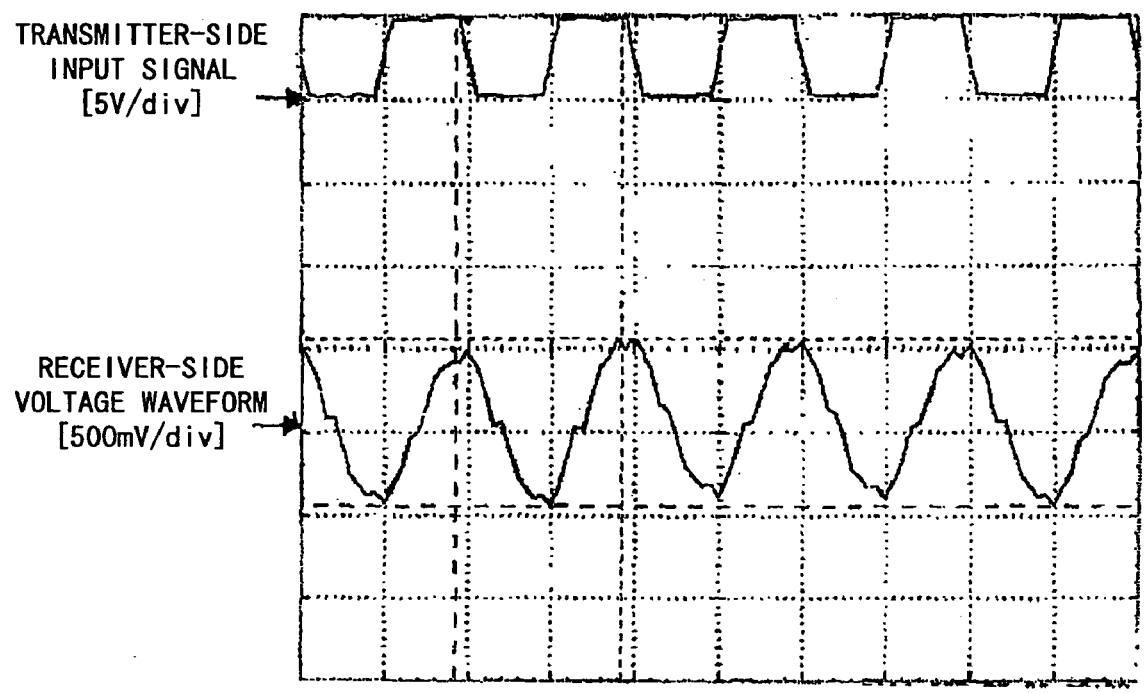
FIG. 93 is a measured waveform in the absence of an output of a current signal from a power line telecommunication module or current source circuit in the case of a connection of an electric appliance in the event of $R_L$ at 100 ohms.
Figure 94:
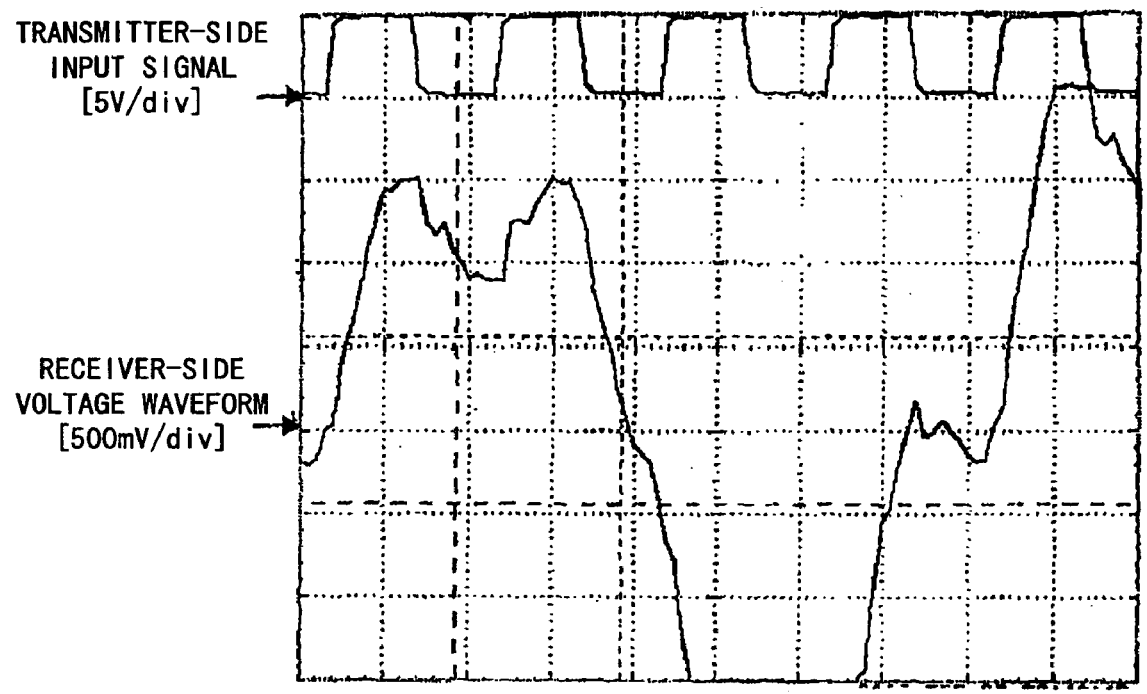
FIG. 94 is a measured waveform in the presence of an output of a current signal from a power line telecommunication module or current source circuit in the case of a connection of an electric appliance in the event of $R_L$ at 100 ohms.
Figure 96:
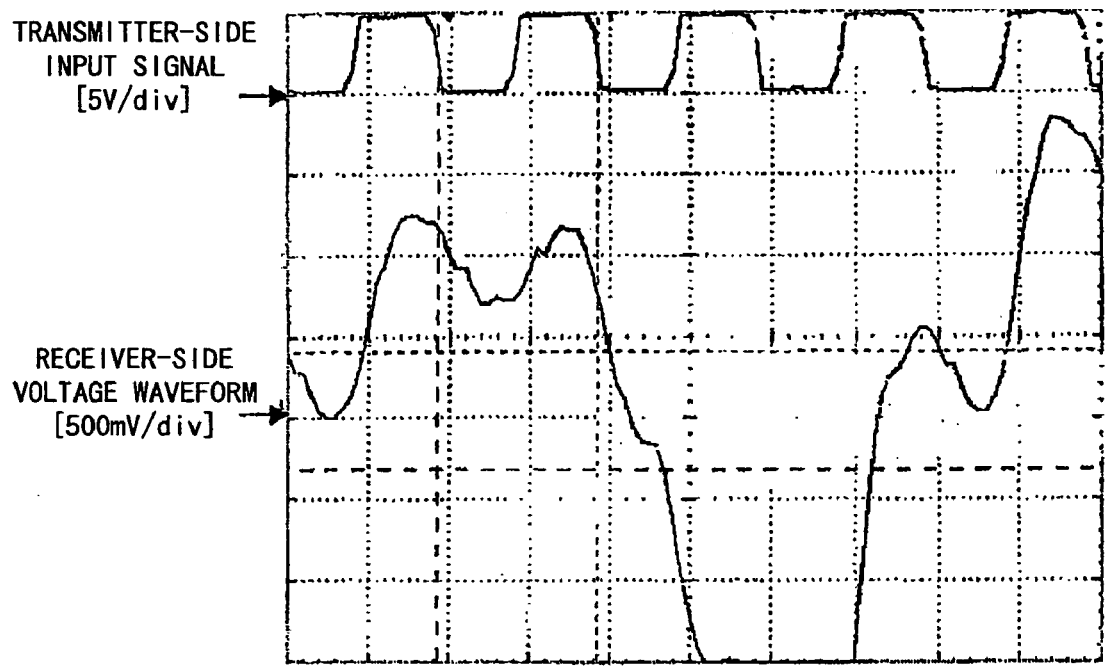
FIG. 96 is a measured waveform in the presence of an output of a current signal from a power line telecommunication module or current source circuit in the case of a connection of an electric appliance in the event of $R_L$ at 4.7 ohms.
Figure 97:
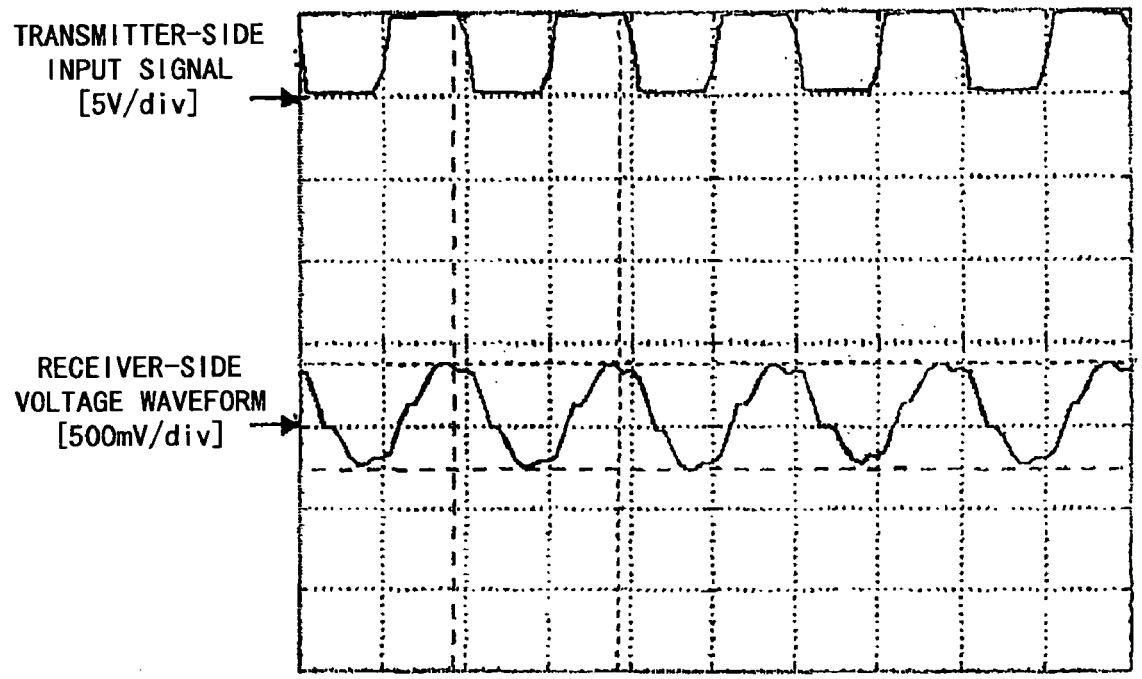
FIG. 97 is a measured waveform in the absence of an output of a current signal from a power line telecommunication module or current source circuit in the case of a connection of an electric appliance in the event of $R_L$ at 33 ohms.
Figure 98:
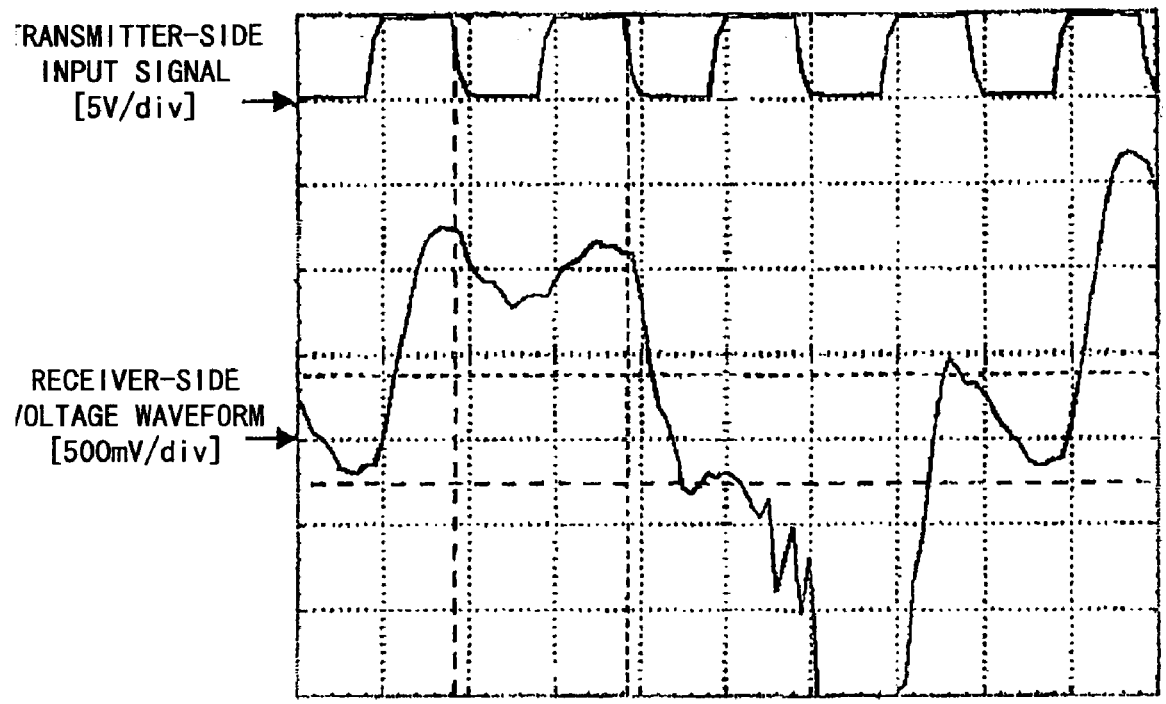
FIG. 98 is a measured waveform in the presence of an output of a current signal from a power line telecommunication module or current source circuit in the case of a connection of an electric appliance in the event of $R_L$ at 33 ohms.
Figure 99:
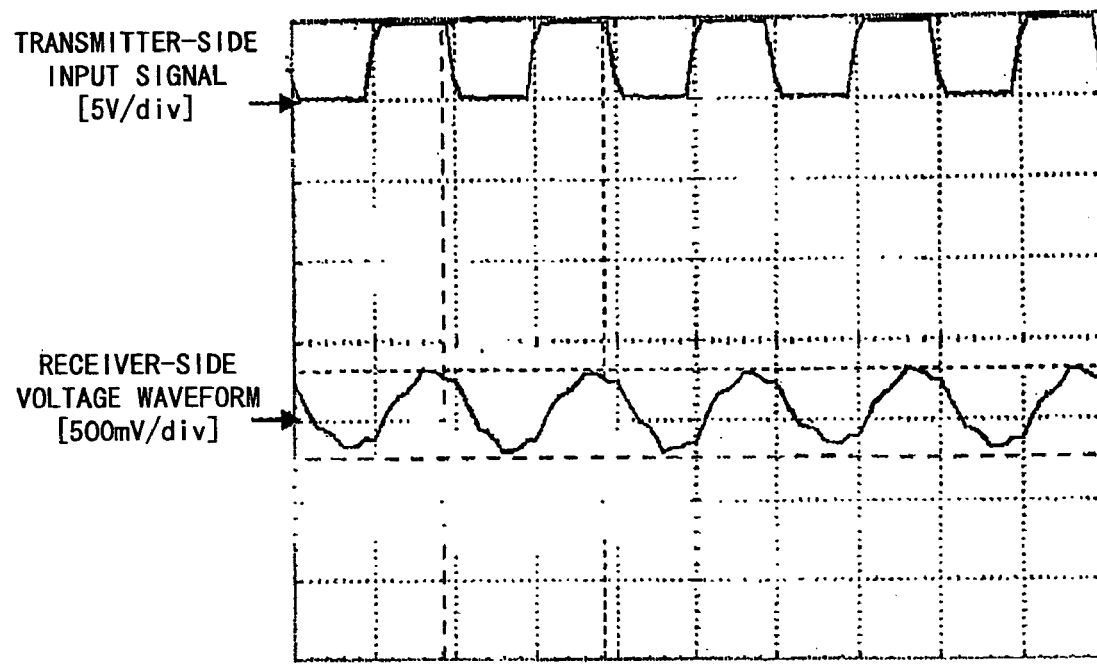
FIG. 99 is a measured waveform in the absence of an output of a current signal from a power line telecommunication module or current source circuit in the case of a connection of an electric appliance in the event of $R_L$ at 22 ohms.
Figure 100:
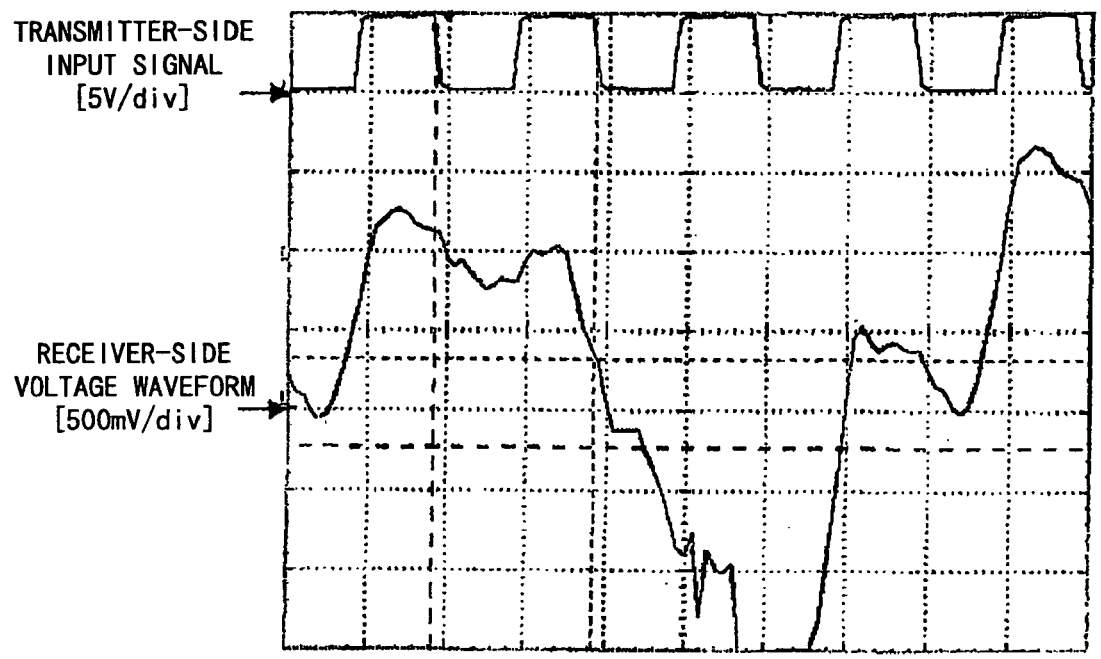
FIG. 100 is a measured waveform in the presence of an output of a current signal from a power line telecommunication module or current source circuit in the case of a connection of an electric appliance in the event of $R_L$ at 22 ohms.

In this event, the current source circuit 323 has been put in a state of being adjusted so as to gain a maximum output. With a load resistor 324 ($R_L$) being changed in this state, a voltage appearing across both terminals of the $R_L$ has been observed. FIG. 44 shows the measurement system in the event. FIG. 33 shows the circuit diagram of the current source circuit 323, and FIG. 34 shows the circuit diagram of the filters. However, the constants noted in the circuit or the circuit configuration is not limited as such.

FIGS. 45 through 53 show input signal waveforms of a current source circuit on the observed transmitter side and voltage waveforms on the receiver side as a result of the experiments.

And, Table 2 summarizes resistance values of resistor $R_L$ of the receiver side, amplitudes of voltage waveforms appearing across both terminals of the resistor $R_L$ (defined as "receiver-side voltage waveform amplitude" herein) and current amplitudes (defined as "receiver-side current amplitude" herein).

TABLE 2

| $R_L$[Ohm] | Receiver-side voltage waveform amplitude [V] | Receiver-side current amplitude [mA] | FIG. No. |
|---|---|---|---|
| 680 | 5.00 | 7.35 | 45 |
| 470 | 4.48 | 9.53 | 46 |
| 330 | 3.80 | 10.00 | 47 |
| 220 | 3.08 | 14.00 | 48 |
| 150 | 2.50 | 16.67 | 49 |
| 100 | 1.84 | 18.40 | 50 |
| 47 | 1.02 | 21.70 | 51 |
| 33 | 0.78 | 23.64 | 52 |
| 22 | 0.57 | 25.91 | 53 |

Embodiment 8

Using a manufactured current source circuit 323 and comprising filters 321 and 322 for removing a 60-(Hz) component of a power line on both the transmitter and receiver sides, followed by connecting them to a power line and further connecting electric appliances (i.e., oscilloscopes 541 and 542), then an experiment of a one-to-one telecommunication has been performed by a measurement system shown in FIG. 54.

In this event, electric appliances (i.e., oscilloscopes which is different from one for observing a signal) is connected to a three-line extension cord 320. An investigation of the power supply part of the electrical appliances connected to the three-line extension cord 320 has found 1000 pF capacitors 543 and 544 being comprised as shown in FIG. 54.

The current source circuit has been put in a state of being adjusted so as to gain a maximum output. With a load resistor 324 ($R_L$) being changed in this state, a voltage appearing across both terminals of the $R_L$ has been observed.

FIG. 33 shows the circuit diagram of the current source circuit 323, and FIG. 34 shows the circuit diagram of the filters 321 and 322.

However, the constants noted in the circuit or the circuit configuration is not limited as such.

FIGS. 55 through 63 show input signal waveforms of a current source circuit on the observed transmitter side and voltage waveforms on the receiver side as a result of the experiments.

And, Table 3 summarizes resistance values of resistor $R_L$ of the receiver side, amplitudes of voltage waveforms appearing across both terminals of the resistor $R_L$ (defined as "receiver-side voltage waveform amplitude" herein) and current amplitudes (defined as "receiver-side current amplitude" herein).

TABLE 3

| $R_L$[Ohm] | Receiver-side voltage waveform amplitude [V] | Receiver-side current amplitude [mA] | FIG. No. |
|---|---|---|---|
| 680 | 1.62 | 2.38 | 55 |
| 470 | 1.55 | 3.06 | 56 |
| 330 | 1.55 | 3.30 | 57 |
| 220 | 1.51 | 7.05 | 58 |
| 150 | 1.42 | 9.47 | 59 |
| 100 | 1.36 | 13.6 | 60 |
| 47 | 1.02 | 21.70 | 61 |
| 33 | 0.86 | 26.06 | 62 |
| 22 | 0.78 | 35.45 | 63 |

Embodiment 9

Using a manufactured current source circuit and outputting a rectangular wave (i.e., a clock pulse) from one signal generation source (i.e., a transmitter side), a signal waveform has been observed on the receiver side. Also, a telecommunication has been performed simultaneously by power line telecommunication modules for validating an independent telecommunications. FIG. 64 shows the measurement system used for the experiment.

Comprising a filter for removing a 60-(Hz) component of the power line for each of the transmitter and receiver, an evaluation related to the telecommunication at the current source circuit 323 has been carried out by observing a signal appearing on both terminals of a current detection-use resistor 324 ($R_L$) (by changing the $R_L$).

As for a telecommunication by the power line telecommunication module, an evaluation has been performed by executing "ping" test (for 1000 times) from a PC (on the command prompt) and measuring a success ratio of the ping test.

An influence of a current signal to a telecommunication of the power line telecommunication modules 641 and 642 has been examined by comparing two conditions, that is, between 1) the case of not outputting a current signal from the current source circuit 323, and 2) the case of carrying out a telecommunication by the power line telecommunication modules 641 and 642, which had been previously manufactured, simultaneously in the state of outputting a rectangular wave current signal of a frequency 1 (MHz) (with the current source circuit being in a state of being adjusted for a maximum output).

And, an electric appliance (i.e., an oscilloscope which is different from one for observing a signal) is connected to a three-line extension cord 320 for a likewise evaluation.

FIG. 33 shows the circuit diagram of the current source circuit, and FIG. 34 shows the circuit diagram of the filters 321 and 322.

An investigation of the power supply part of the electrical appliance connected to the three-line extension cord 320 has found 1000 pF capacitors 543 and 544 being comprised as shown in FIG. 64.

FIGS. 65 through 82 show the observed input signal waveforms of the transmitter-side current source circuit and the signal waveforms appearing on both terminals of the receiver-side current detection-use resistor $R_L$ as a result of experimenting by changing a current detection-use resistor $R_L$, both of which are related to the telecommunication at the current source circuit as a result of the experiments, particularly in the case of not connecting an electric appliance to the power line. FIGS. 83 through 100 show the similar test result, particularly in the case of connecting the above described electric appliance.

Also related to the telecommunication state of the power line telecommunication modules 641 and 642, Table 4 summarizes the test success ratio of 1000 times of ping command executions between the case of a presence of a current signal output from the current source circuit 323 and that of an absence thereof therefrom in the respective cases of connecting, and not connecting, the electric appliance. Referring to Table 4, the ping test success ratio in the case of connecting the electric appliance (i.e., a current signal exists) appears to be low, this case, however, corresponds to the experiment of the embodiment 4, and the present embodiment is apparently effective, considering the condition of outputting a voltage signal and a current signal absolutely independently.

TABLE 4

| $R_L$[Ohm] | Ping test success ratio in the case of not connecting an electric appliance | | FIG. No. | |
|---|---|---|---|---|
| | Absence of a current signal [%] | Presence of a current signal [%] | | |
| 680 | 95.4 | 83.3 | 65 | 66 |
| 470 | 90.8 | 81.6 | 67 | 68 |
| 330 | 94.3 | 89.4 | 69 | 70 |
| 220 | 96.5 | 87.2 | 71 | 72 |
| 150 | 94.3 | 79.9 | 73 | 74 |
| 100 | 99.6 | 77.2 | 75 | 76 |
| 47 | 96.6 | 68.0 | 77 | 78 |
| 33 | 93.7 | 48.6 | 79 | 80 |
| 22 | 0 | 3.1 | 81 | 82 |
| 680 | 98.2 | 39.9 | 83 | 84 |
| 470 | 98.6 | 48.4 | 85 | 86 |
| 330 | 97.4 | 56.9 | 87 | 88 |
| 220 | 89.0 | 52.2 | 89 | 90 |
| 150 | 78.9 | 49.2 | 91 | 92 |
| 100 | 66.8 | 46.7 | 93 | 94 |
| 47 | 79.2 | 41.8 | 95 | 96 |
| 33 | 41.2 | 17.4 | 97 | 98 |
| 22 | 0 | 0.1 | 99 | 100 |

Embodiment 10

The present embodiment shows the case of separating a synchronization-use header code from a signal, which is a CDMA code with a synchronization-use code or signal (by using a sine wave of the frequency of 8 MHz) being added, by using an ARX model.

Shown here is a method for a receiver side separating a synchronization-use header code or signal by using an ARX model in the case of transmitting by adding the synchronization-use header code or signal to a CDMA code (by using a sine wave of the frequency of 8 MHz for example), and of the receiving side separating the synchronization-use header code or signal and finding a cue of the CDMA code.

Figure 101:
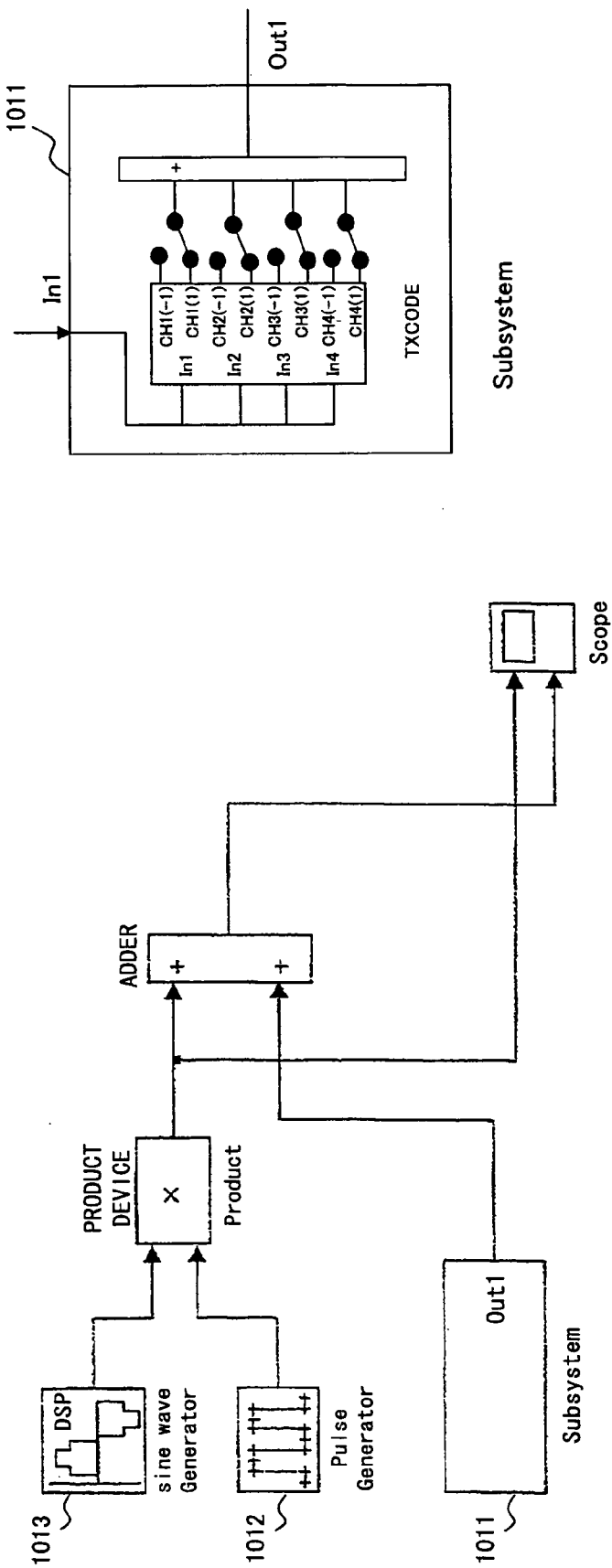
FIG. 101 shows a simulation model adding a header code or signal (by using a sine wave of the frequency of 8 MHz) to a CDMA code for synchronization.

FIG. 101 shows a simulation model adding a synchronization-use header code or signal (by using a sine wave of the frequency of 8 MHz) to a CDMA code. Subsystem 1011 of FIG. 101, comprising a code division multiple access (CDMA) transmission unit of FIG. 14, has the function of changing over between a signal waveform as result of multiplying a TXCODE 175 which is a tracking function-attached diffusion code generator of a synchronous signal and "−1" of a positive/negative binary value-bipolar information signal and another signal waveform as a result of multiplying the TXCODE 175 and "1" of the positive/negative binary value-bipolar information signal, and of adding.

Figure 103:
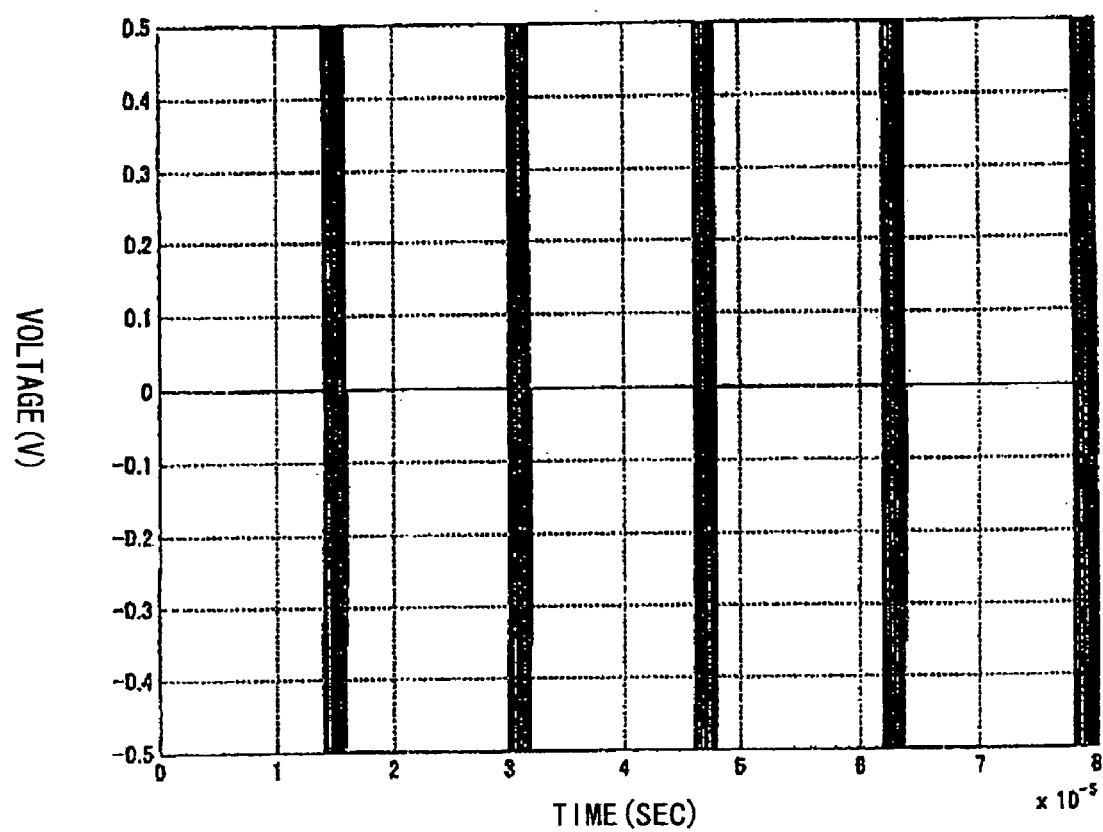
FIG. 103 shows a timing waveform of a header code or signal (i.e., a sine wave of the frequency of 8 MHz) for synchronization.
Figure 104:
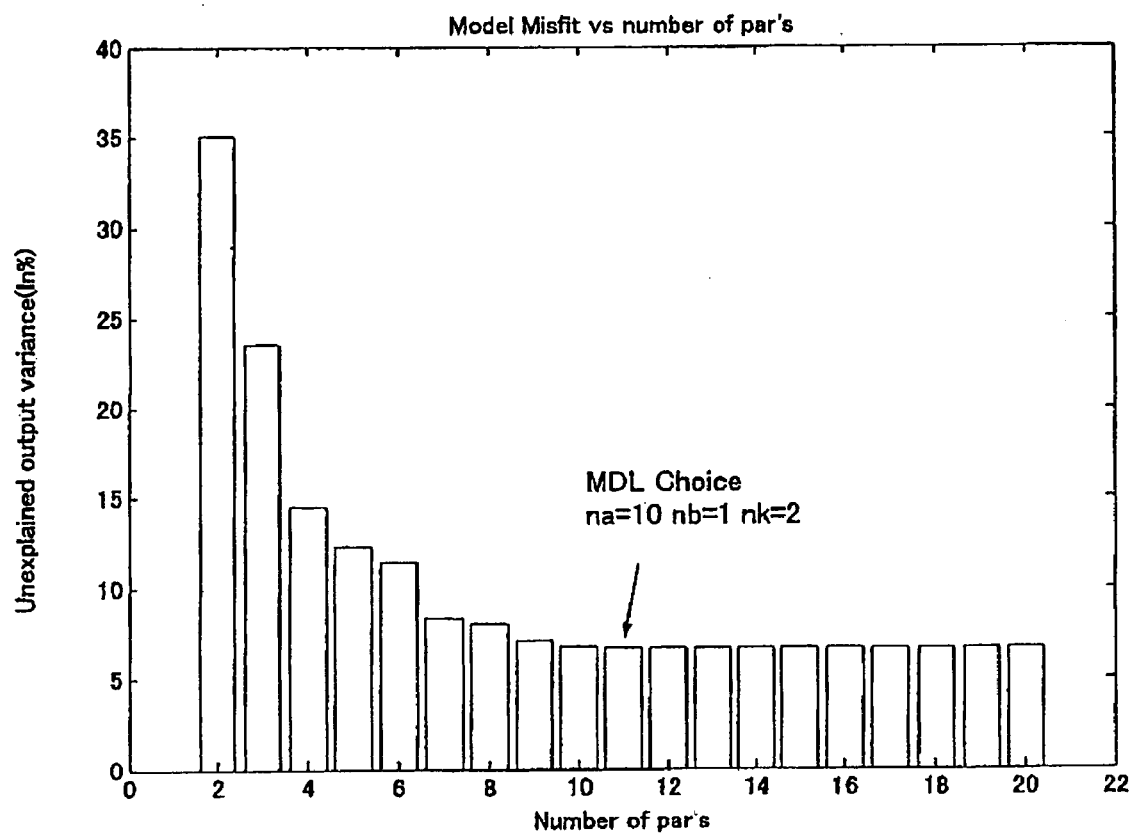
FIG. 104 is a diagram showing a scale, by AIC, for measuring a degree of misfit of a model at the time of estimating an ARX model.

And a synchronization-use header code or signal is added to a CDMA signal by adding a pulse from a pulse generator 1012, a signal waveform as a result of multiplying a pulse from the pulse generator 1012 by a sine wave from a sine wave generator 1013, and a CDMA code signal from a subsystem 1011. In this event, the cycle of a pulse width of the pulse generator 1012 and the cycle of a chip width of the CDMA code (i.e., an information signal) are identical. FIG. 102 shows a waveform as a result of adding a synchronization-use header code or signal (i.e., a sine wave of the frequency of 8 MHz; the solid parts of FIG. 102) to a CDMA code which is generated by the model shown in FIG. 101. In this event, bipolar information signals of a changeover switch within the Subsystem 1011 are entirely set at "1". FIG. 103 shows a timing waveform of a synchronization-use header code or signal (i.e., a sine wave of the frequency of 8 MHz). FIG. 104 is a diagram showing a scale, according to the AIC, for measuring a degree of misfit of a model at the time of estimating an ARX model.

$$A(q) = 1 - 0.5358(+-0.005728)q^{-1} - 0.1449(+-0.006477)q^{-2} + \quad (25)$$
$$0.3397(+-0.005957)q^{-3} - 0.1856(+-0.005919)q^{-4} +$$
$$0.216(+-0.005578\ q^{-5}0.3899(+-0.005578\ q^{-6} -$$
$$0.3588(+-0.005919)q^{-7} + 0.4595(+-0.005957)q^{-8} -$$
$$0.1294(+-0.006468)q^{-9} - 0.1278(+-0.005728)q^{-10}$$
$$B(q) = -0.0001604(+-0.0003572)q^{-2}$$

Figure 105:
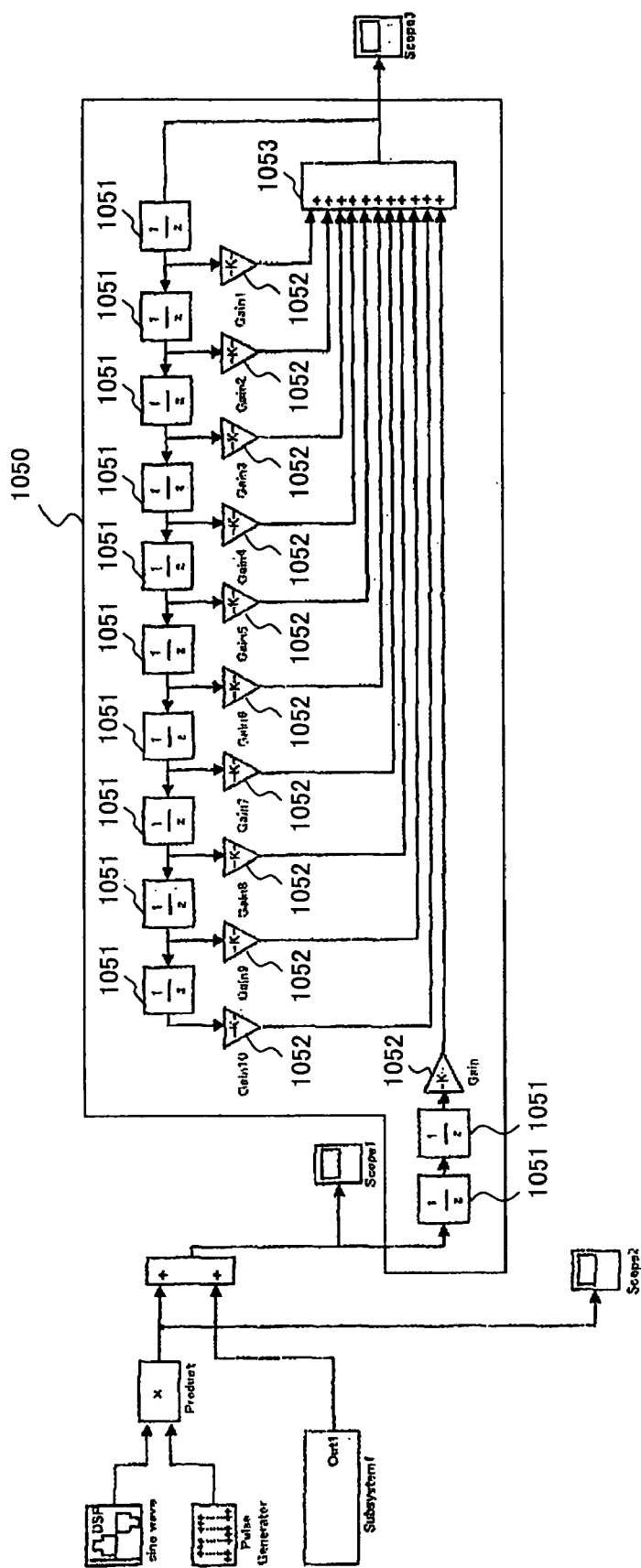
FIG. 105 shows an FPGA-use embodiment circuit using an ARX model for a header code or signal separation.

The expression is an ARX model expression used for separating a header code or signal, while FIG. 105 is an FPGA-use embodiment circuit using an ARX model 1050 for a header code or signal separation. The ARX model 1050 comprises an amplifier 1052 and an adder 1053.

FIG. 106 shows a header code or signal separation result by an FPGA-use embodiment circuit using the ARX model 1050 shown in FIG. 105. Note that an estimation model may use other parametric models in lieu of being limited to an ARX model 1050.

The above described configuration, applying a characteristic of being capable of superimposing a voltage signal and a current signal mutually independently in two-wire power line with neutral line, makes it possible to provide a system in which a current signal shoulders a synchronous signal for lining up heads of individual code signals in the case of a current signal shouldering a code-multiplexed stepwise waveform, in the case of a voltage signal shouldering a synchronous signal for lining up the heads of individual code signals and the voltage signal shouldering a code-multiplexed stepwise waveform, in order to form a stepwise waveform by exactly lining up the heads of codes having orthogonal nature independently and code-multiplexing them, and exactly line up the head of the code-multiplexed stepwise waveform with that of a code for extracting a necessary channel.

Conventionally established method was one for forming a code multiplex signal by a zero voltage signal as a method of how to form a code multiplex signal and that of superimposing, and decoding, by estimating an impedance of a power line in order to superimposing, and demodulating, a code multiplex signal and a synchronous signal; individual service outlets however, are parallelly connected, and therefore a transmission from another service outlet was impossible during the time in which a signal is transmitted from one service outlet. However, provided here is a utilization of the Kirchhoff's current law for individual channels independently transmitting current signals from individual service outlets and for a base station forming a code multiplex signal.

Described here is on a method of superimposing, and decoding, an environmental impedance of a power line in order to superimposing and demodulating a code multiplex signal and a synchronous signal as a method for superimposing and decoding by estimating the environmental impedance of the power line for superimposing and demodulating the code multiplex signal and synchronous signal. It is possible to provide a system considering an influence of an environmental impedance element of a power line other than of a base station in order to form a code multiplex signal at the base station by individual channels transmitting signals independently by current signals from the respective service outlets by utilizing the Kirchhoff's current law.

Embodiment 11

Information contents going through a power line include voice information, image information, control information, equipment management information, et cetera, enabling monitoring and managing a working condition, and a failure condition, of equipment used in a shop, and restoring by a remote operation.

Embodiment 12

And shop management information, such as a shop lighting, external advertisement lighting, entrance door locking, air conditioning, fire, theft, pranks, water pump, gas meter, the number of people in a room, is capable of grasping a condition and managing it.

Embodiment 13

User management information identifies a user of a washer or dryer by image processing, finger print collation, prepaid card identification, et cetera, and obtains a usage condition. Also an analysis of a relationship of a usage condition with a day of week, time range, temperature, weather, et cetera, is used for a sales promotion.

Embodiment 14

Maintenance personnel management information manages an activity situation, collected amount of money, repair history, et cetera, of maintenance personnel carrying out shop cleaning, equipment cleaning, collection of money, replenishment, repair, et cetera.

Embodiment 15

Information for communicating with a user collects usage methods of equipment, complaints, requirements, et cetera, through a communication with a remotely located operator by using equipment such as video phone to improve a degree of satisfaction of a user. In addition to an operator, answering apparatus responds to a user question.

Embodiment 16

The next description is on an embodiment of an ARX model modifying the above described expressions 9 and 17 (i.e., a description of an embodiment of a parametric model).

In the western part of Japan for example, the power is supplied by an outdoor power line of 200 volts, 60 Hz from the power company and drawn to a general household after a conversion into 100 volts, 60 Hz by a power distribution transformer.

And so a waveform and a synchronous signal practical for implementing a telecommunication on the power line by using CDMA are severely distorted by an environmental power line impedance such as a line filter of electric appliances represented by a TV set, indoor wiring or power distribution board.

Figure 107:
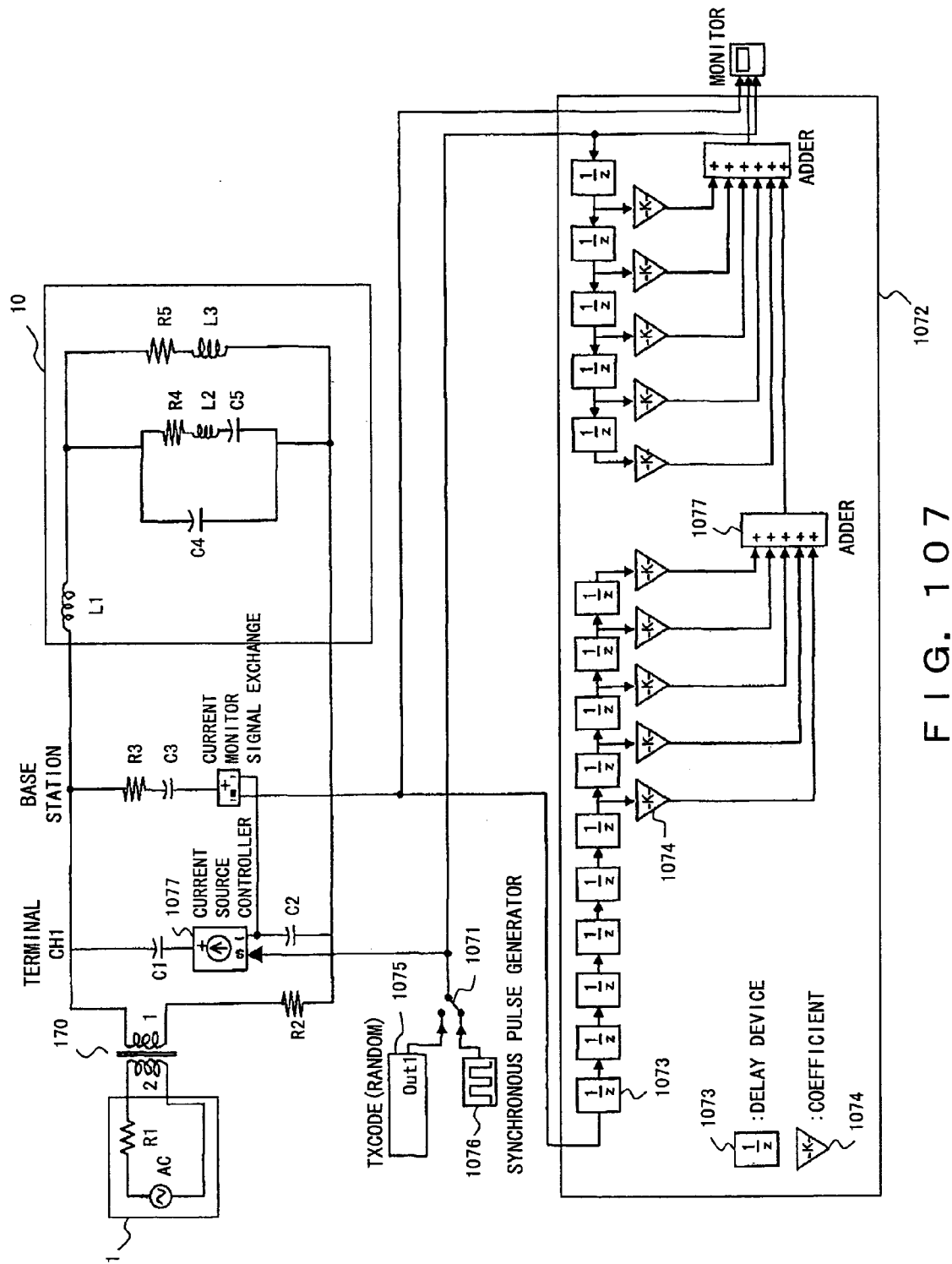
FIG. 107 is a diagram showing a simple power line model comprising a line filter which models a television set so as to make an indoor voltage as 100 volts.

Accordingly conceived is a simple power line mode made up of a line filter by modeling a TV set so as to make an indoor voltage 100 volts as shown in FIG. 107.

The distribution transformer 170 uses a 2-wire power line having a neutral wire (i.e., a ground-connected wire, etcetera). Also, the distribution transformer 170 uses one having a characteristic of 1.5 KVA, 100 to 200 volts, L1=143.5 mH, L2=38.7 mH and M=74.5 mH. Note that the present embodiment assumes AC 200 volts, 60 Hz for an AC power source on the primary side of the distribution transformer 170.

Note that the internal parameters of the model are set at: R1=0.35 ohms, R2=0.15 ohms, R3=1 ohm, R4=4 ohms, R5=100 ohms, C1=C2=C3=1000 pF, C4=24800 pF, C5=62200 pF, L1=25 µH, L2=29.8 µH and L3=0.6 µH.

Then, an $ARX_{CDMA}$ model and an $ARX_S$ model 1072 are used for estimating a current flowing in power line model shown in FIG. 107, and a code multiplex type current signal $I_{CDMA}$ and a synchronous signal current $I_S$, $I_{CDMA}$ or $I_S$ is transmitted from a terminal station to a base station.

A current signal of a current source controller 1077 of the terminal station Ch1 is controlled by a synchronous pulse generator 1076 and a random-M series signal generator 1075 (i.e., TXCODE). The current signal assumes outputs y(t) of the $ARX_{CDMA}$ and $ARX_S$ models 1072, and a signal measured by the current monitor at the base station determines an input u(t) to the $ARX_{CDMA}$ and $ARX_S$ model 1072.

Generating by using the AIC (Akaike's Information Criterion) and considering a stability of identified models A (q) and B (q), the $ARX_{CDMA}$ and $ARX_S$ 1072 can be represented by the following expression 26:

$$A(q)y(t) = B(q)u(t) + e(t) \quad (26)$$

$$A(q) = 1 - 0.9665q^{-1} - 0.004677q^{-2} -$$
$$0.00414q^{-3} - 0.0004803q^{-4} - 0.01079q^{-5}$$
$$B(q) = 0.04216q^{-6} + 0.01308q^{-7} + 0.0009162q^{-8} -$$
$$0.002954q^{-9} + 0.002968q^{-10};$$

where u(t) is an input signal measured in a discrete time, y(t) is an output signal measured in a discrete time, e(t) is an unknown input signal such as a white noise measured in a discrete time. The $q^{-1}$ shows a sampling time interval which is a backward shift operator in the interval of $10^{-7}$ sec.

A changeover between the random-M series signal generator 1075 and synchronous pulse generator 1076 can be carried out simply by the switch shown in FIG. 107. Simulation results of the $ARX_{CDMA}$ and $ARX_S$ 1072 are shown in FIGS. 108 and 109, respectively.

Figure 108:
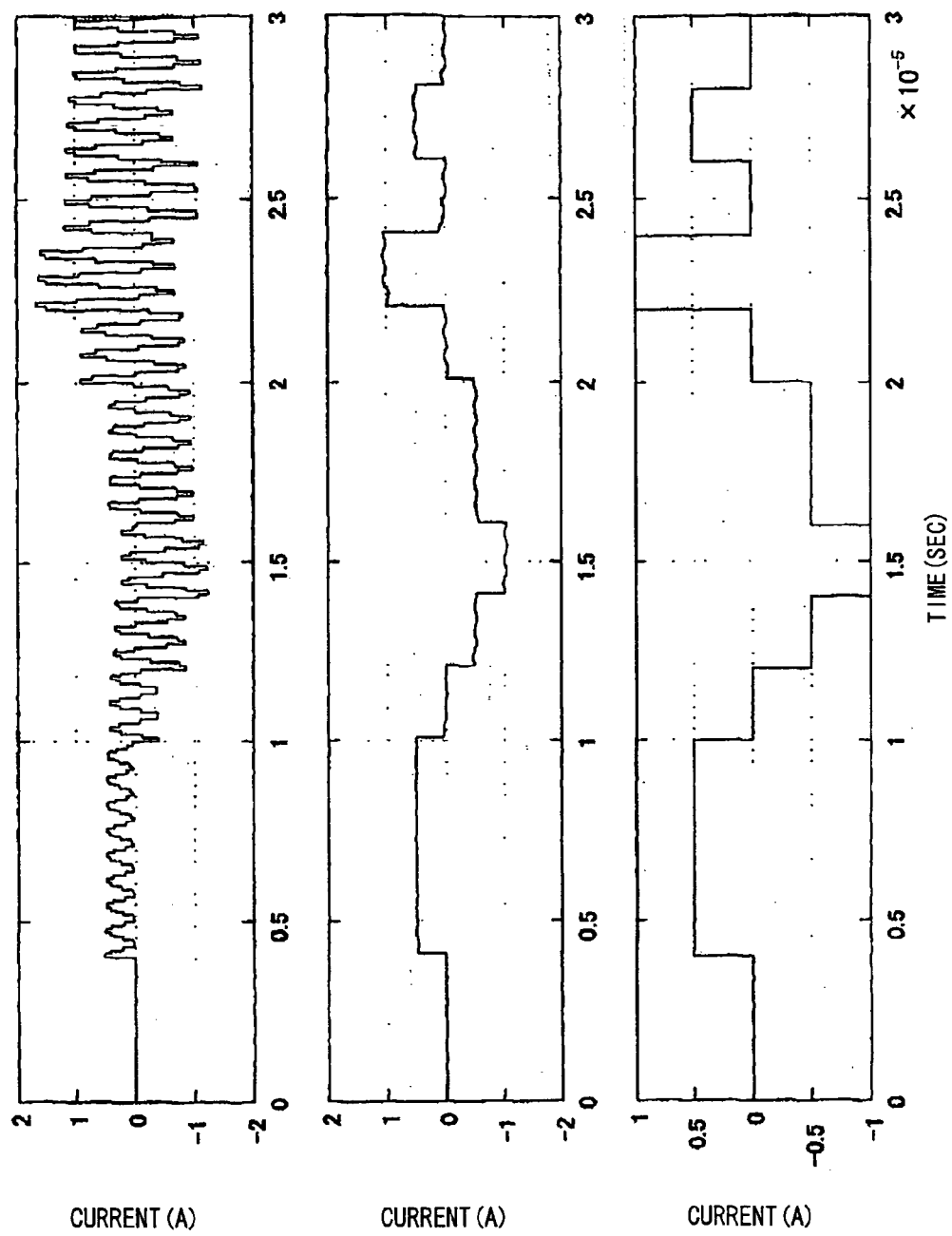
FIG. 108 is a diagram showing an $I_{CDMA}$ (A), which is estimated by a current signal (A) and $ARX_{CDMA}$ at a base station (where the current is measured), and an $I_{CDMA}$ (A), which is transmitted from, and constituted by, each terminal channel.
Figure 109:
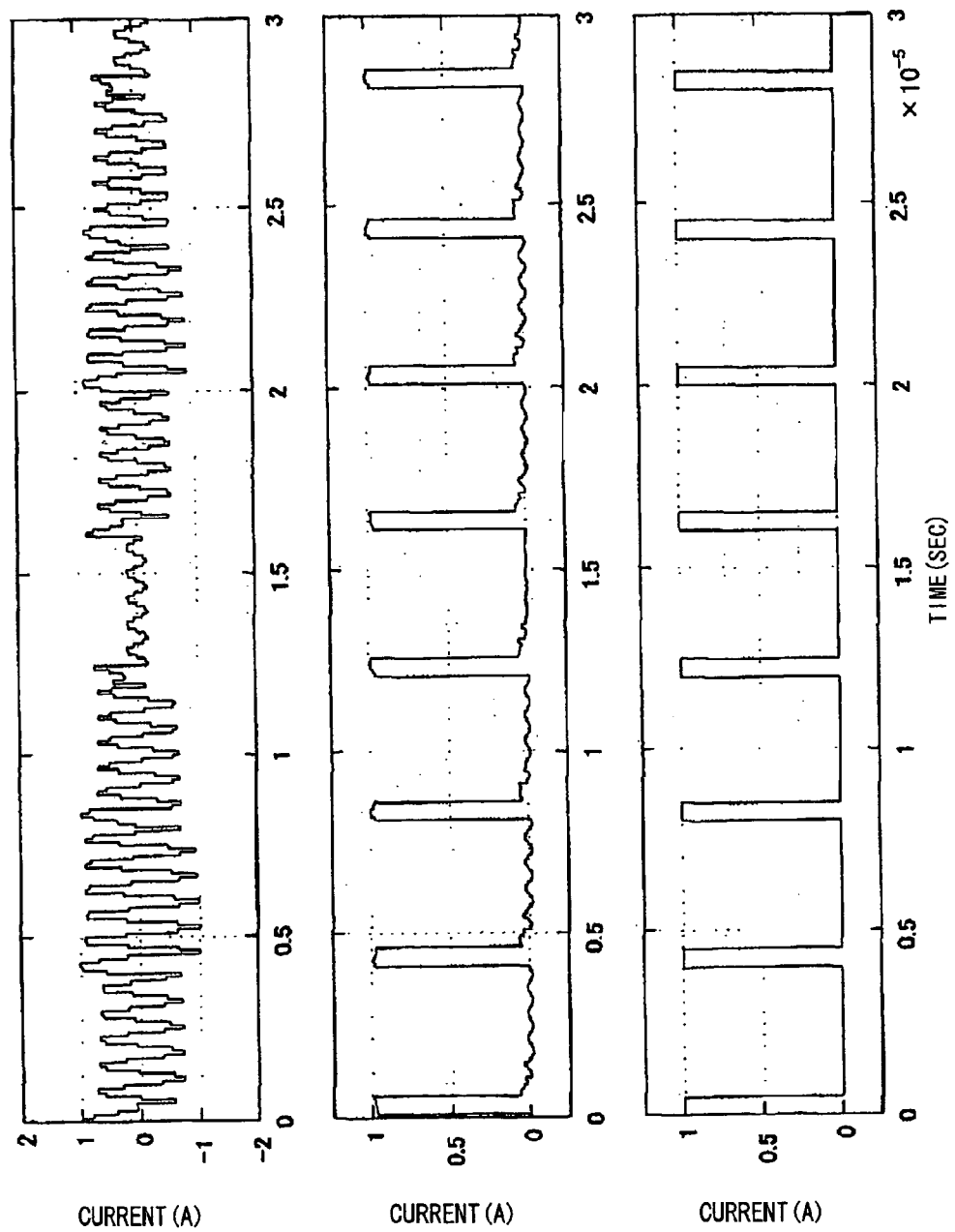
FIG. 109 is a diagram showing an $I_{CDMA}$ (A), which is estimated by a current signal (A) and $ARX_{CDMA}$ at a base station (where the current is measured), and an $I_{CDMA}$ (A), which is transmitted from, and constituted by, each terminal channel.

In order of the top toward the bottom of FIGS. 108 and 109, respectively, shown are: a current signal (A) at the base station (where the current is measured), an $I_{CDMA}$ (A) estimated by the $ARX_{CDMA}$ (or the $I_S$ (A) estimated by the $ARX_S$) and an $I_{CDMA}$ (A) constituted by compounding current signals transmitted from individual terminals ch (or the $I_S$ (A) transmitted from the individual terminals ch), respectively. The expression 26 represents the $ARX_{CDMA}$ and $ARX_S$ model 1072 highly accurately.

Figure 110:
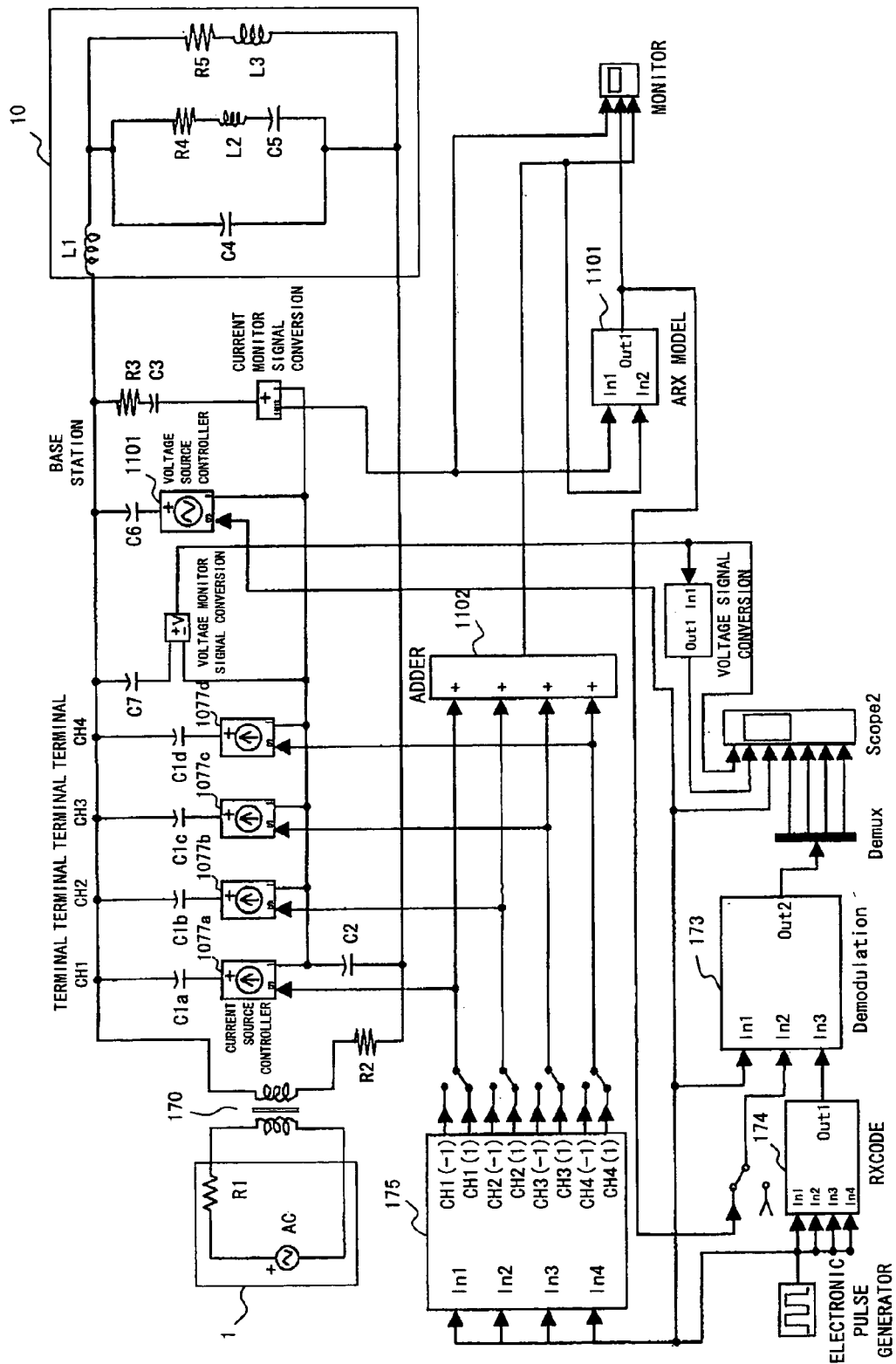
FIG. 110 is a simulation model of a multiple telecommunication transmitted from a terminal to a base station.

Next, FIG. 110 is a simulation model of a multiple telecommunication transmitted from a terminal to a base station.

An AC voltage source 1 is connected to the primary side of the step-down transformer 170 of the present model, and an electric signal (e.g., 100 volts, 50 or 60 Hz). The power line impedance model is constituted by the L1, L2, L3, R4, R5, C4, C5 and such.

The TXCODE 175 is a tracking function-attached diffusion code generator of a synchronous signal as in the case of the above described each embodiment. CH 1 (−1), CH 1 (1) through CH 4 (−1) and CH 4 (1) of the TXCODE 175 output.

Likewise the above described each embodiment, the RXCODE 174 is a tracking function-attached diffusion code generator of a synchronous signal, and inputs to the demodulation 173 at the time of receiving. The present embodiment is configured to output from an Out 1 of the RXCODE 174.

A demodulation 1173, comprising a tracking function of a synchronous signal, internally performs a scalar product arithmetic operation at intervals and carries out a decryption.

Current source controller 1077a through 1077d of each terminal station, and a voltage controller 1101 of a base station comprise dependent current sources and dependent voltage source.

Figure 111:
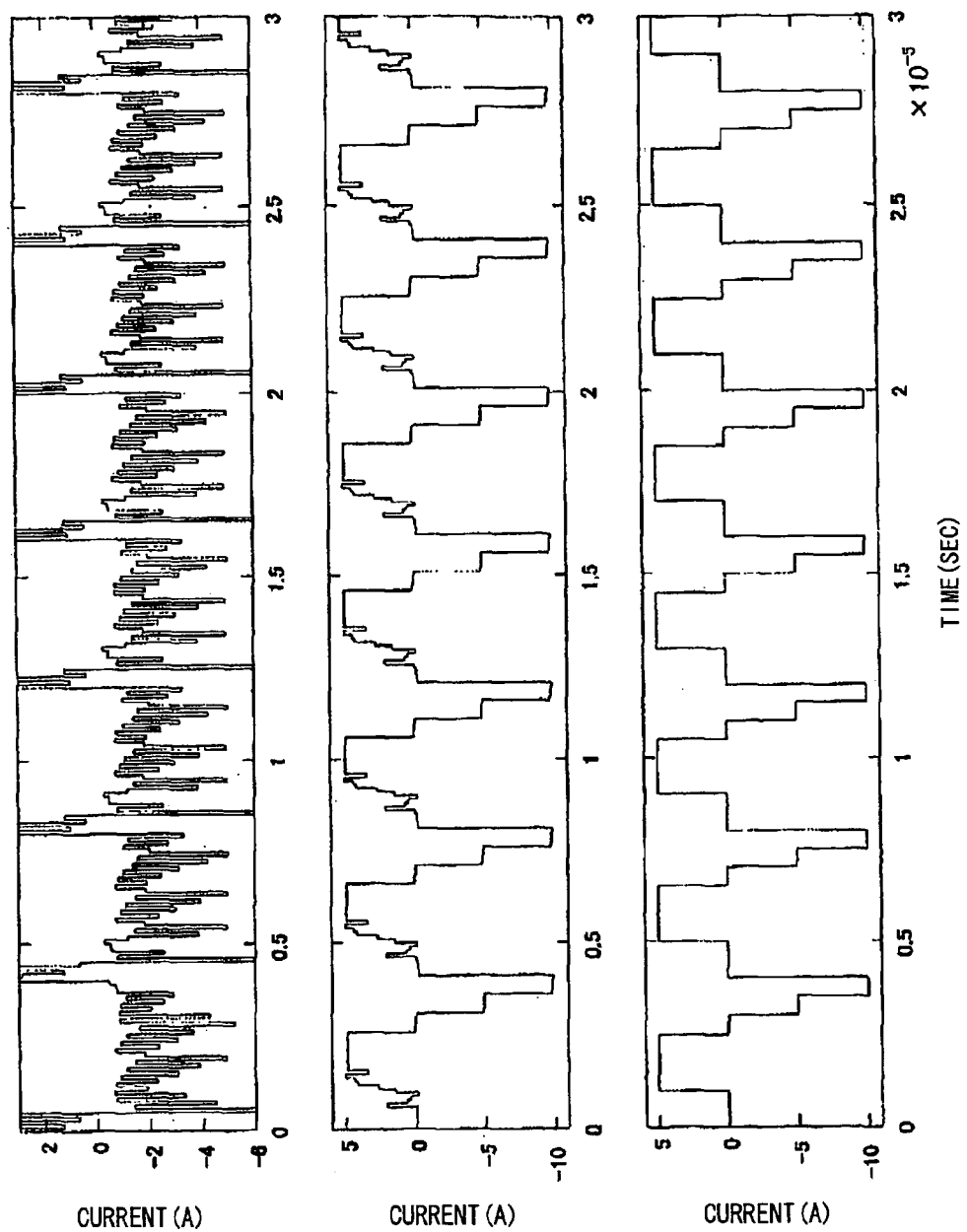
FIG. 111 is a diagram showing an $I_{CDMA}$ (A) (i.e., a sum of each signal current $i_k$ transmitted from each terminal chk), which is estimated by a current signal (A) and $ARX_{CDMA}$ at a base station (where the current is measured), and an $I_{CDMA}$ (A), which is transmitted from, and constituted by, each terminal channel.
Figure 112:
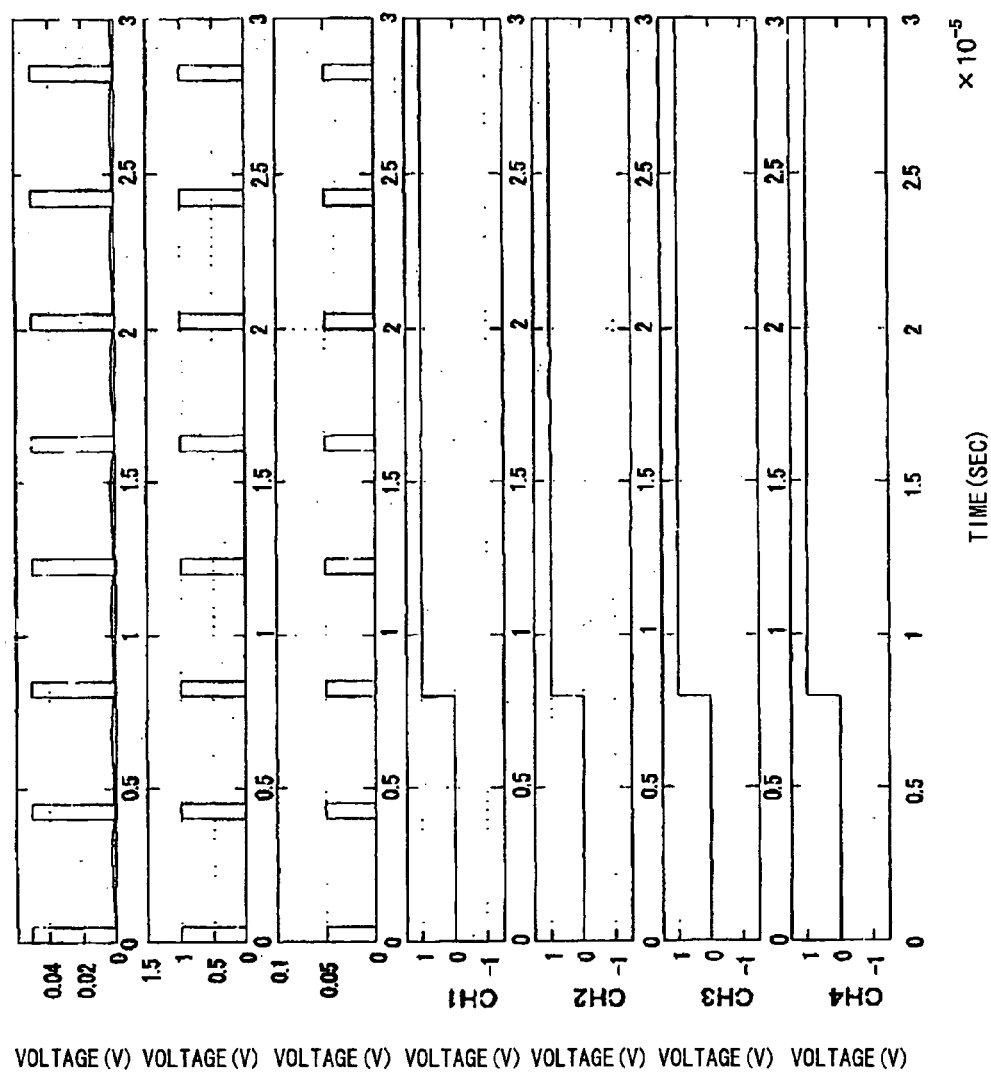
FIG. 112 is a diagram showing a voltage signal (V) at a terminal chk (where the voltage is measured), a pulse wave (V) (where $V_S$ is estimated at a terminal chk) which is converted by the above noted voltage signal, a $V_S$ (V) transmitted from a base station, and channels k (where k=1 through 4) which are modulated binary signals.

FIGS. 111 and 112 show a simulation result of a multiple telecommunication transmitted from a terminal station (i.e., ch 1 through ch 4) to a base station, where C6=5000000 pF, C7=10000 pF (e.g., all channels of transmitter is 1, the amplitude of synchronous pulse parameter is 1, the frequency is 4 (microsec), the pulse width is 12.5% of the frequency and the pulse interval is 4 (microsec)).

In order of the top toward the bottom of FIG. 111, shown are: a current signal (A) at the base station (where the current is measured), an $I_{CDMA}$ (A) estimated by the $ARX_{CDMA}$ and an $I_{CDMA}$ (A) constituted by compounding current signals transmitted from individual terminals ch (i.e., the sum of individual signal currents $i_k$ transmitted from the respective terminals chk), respectively.

In order of the top toward the bottom of FIG. 112, shown are: a voltage signal (V) at the channel k that is a terminal (where the voltage is measured), a pulse wave (V) converted by the above described voltage signal (with a $V_S$ being estimated from the channel k that is a terminal), a $V_S$ (V) transmitted from the base station and channels k (where k=1 through 4), that is, demodulated binary signals, respectively.

Despite there are noise disturbances by the environmental impedance, et cetera, the simulation model has confirmed the fact that the base station is enabled to receive accurately also unique signals of other channels, which are not shown in either FIG. 111 or 112, as in the case of FIGS. 111 and 112.

Figure 113:
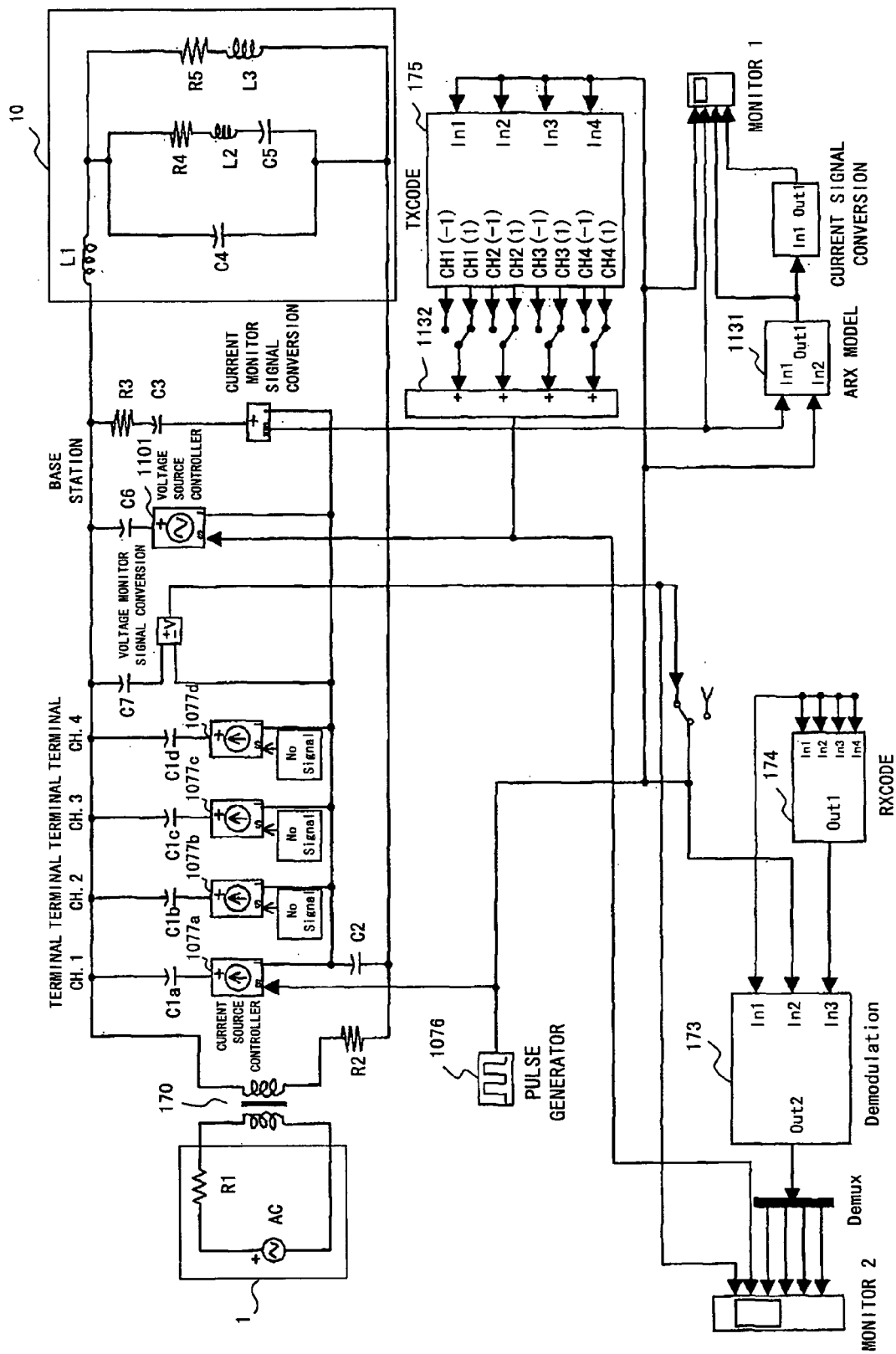
FIG. 113 is a simulation model of a multiple telecommunication transmitted from a terminal to a base station.

The next description is on a multiple communication transmitted from a base station to terminals. FIG. 113 is a simulation model of a multiple telecommunication transmitted from a terminal to a base station.

Figure 114:
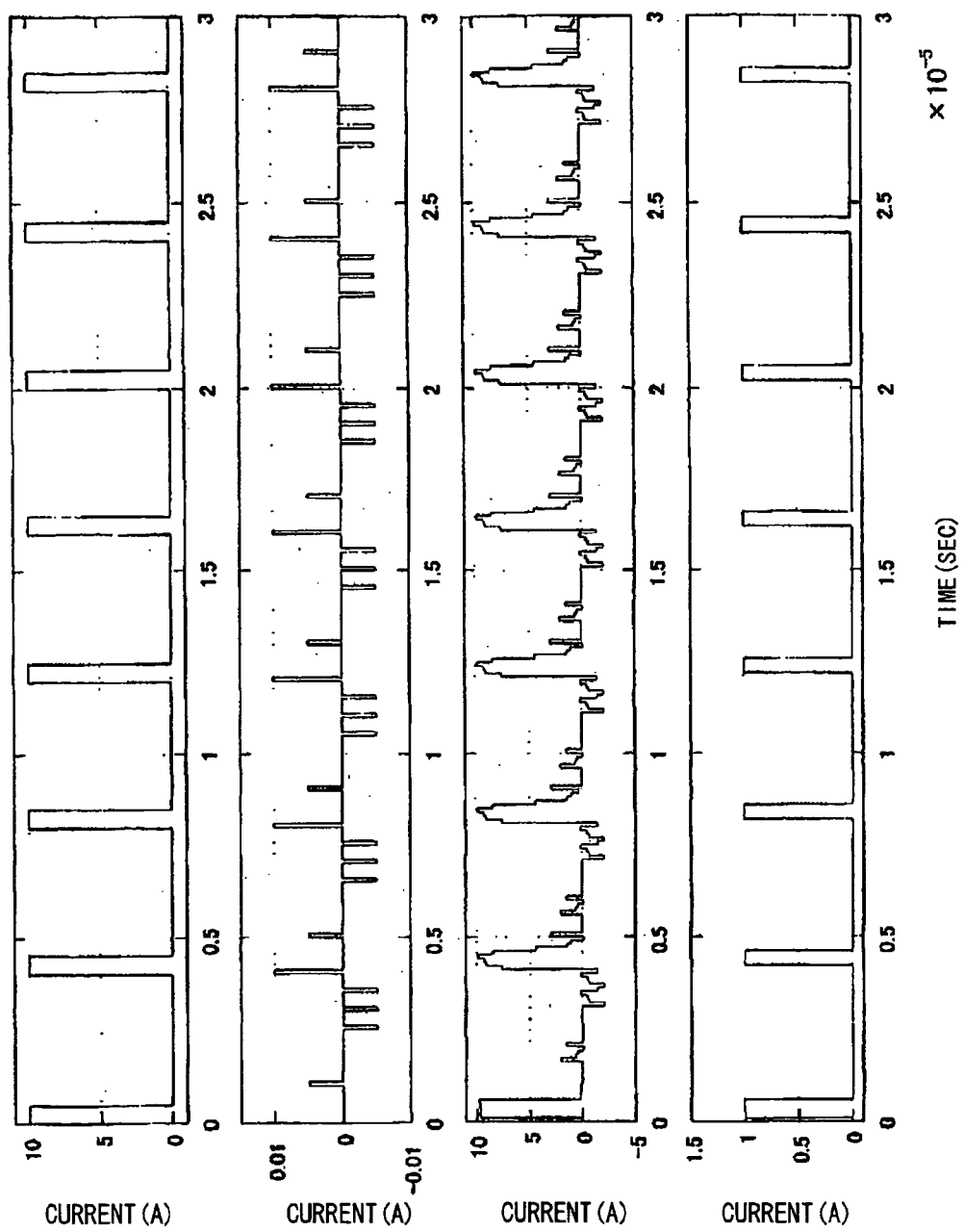
FIG. 114 is a diagram showing an $I_S$ (A), which is an $I_S$ (A) transmitted from each terminal ch estimated by a current signal (A) at a base station (where the current is measured) and by an $ARX_{CDMA}$, and a pulse wave (A) ($I_S$ (A) is received at the base station) converted by a current signal.
Figure 115:
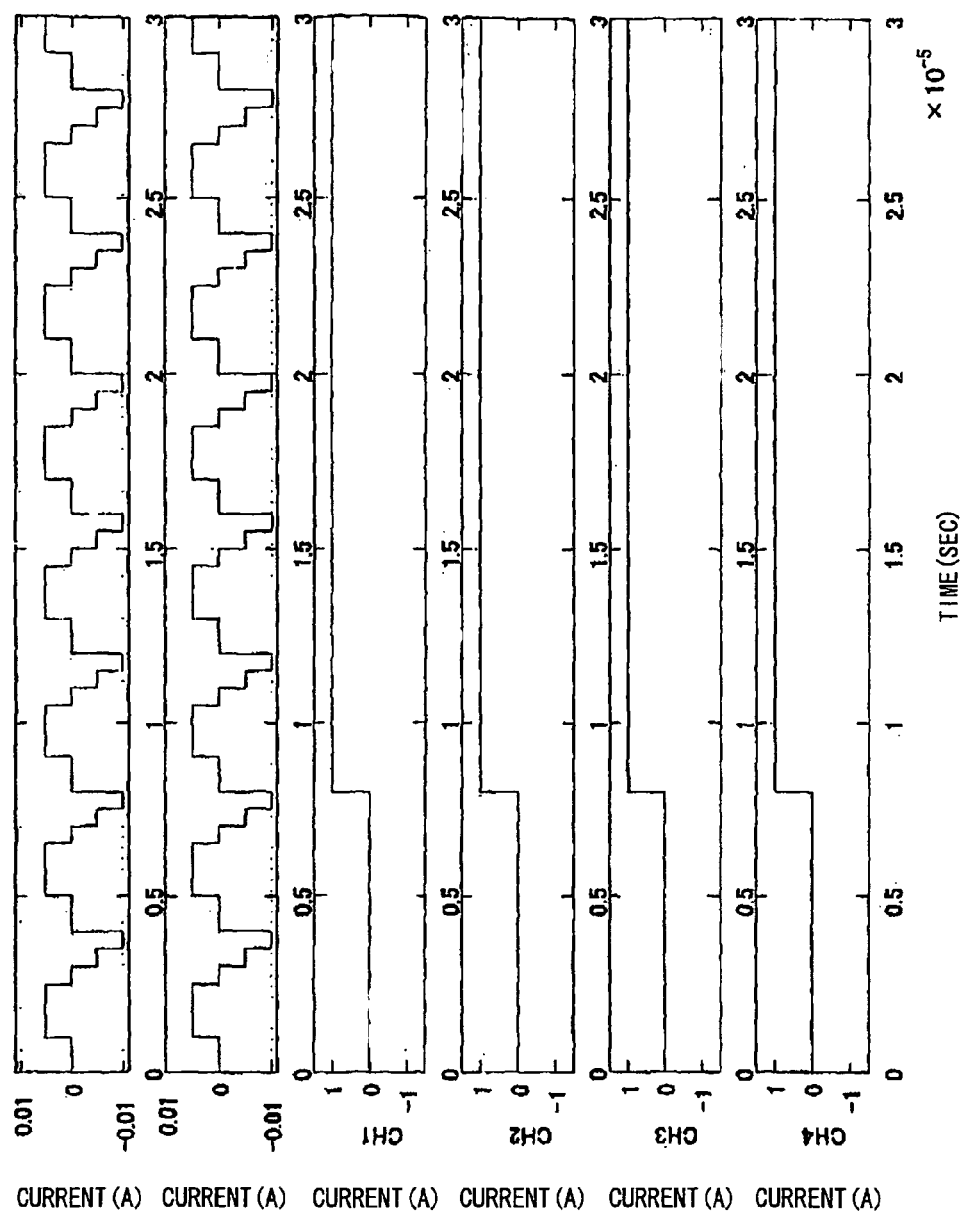
FIG. 115 is a diagram showing a voltage signal (V) actually measured at each channel k (where, k=1 through 4), i.e., a terminal (where the current is measured), and channels k which are binary signals modulated from $V_{CDMA}$ (V) transmitted from a base station.

FIGS. 114 and 115 show a simulation result of a multiple telecommunication transmitted from a base station to terminals, where C6=1000 pF, C7=1000 pF (e.g., all channels of transmitter is 1, the amplitude of synchronous pulse parameter is 1, the frequency is 4 (microsec), the pulse width is 12.5% of the frequency and the pulse interval is 4 (microsec)).

In order of the top toward the bottom of FIG. 114, respectively shown are: an $I_S$ (A) transmitted from each terminal ch, a current signal (A) at the base station (the voltage is measured thereat), an $I_S$ (A) estimated by the $ARX_S$, a pulse wave (A) converted from the above described current signal (the $I_S$ (A) is received at the base station.

In order of the top toward the bottom of FIG. 115, respectively shown are: a voltage signal actually measured at a channel k that is a terminal (where the voltage is measured), a $V_{CDMA}$ (V) transmitted from the base station and channels k (where k=1 through 4).

Despite there are noise disturbances by the environmental impedance, et cetera, the simulation model has confirmed the fact that the base station is enabled to receive accurately also unique signals of other channels, which are not shown in either FIG. 114 or 115, as in the case of FIGS. 114 and 115.

These simulation models are configured to optimize an initial value of an ARX model 1101. In order to optimize the initial value of an ARX model 1101, a peripheral signal process applying a Kalman filter, et cetera, is utilized.

Embodiment 17

The next is a description of a synchronization method by a marker-attached code.

As shown in the embodiment 16, a code and its synchronization reset input signal are ones having different quantities such as a voltage and a current.

The present embodiment describes a timing method in the case of a code and a synchronization reset input signal of a transmitter and of a receiver being the same amount by using a synchronization method by a marker-attached code.

First step adds a marker signal to the front or back of a CDMA code signal which is a multiplication of a positive or negative binary bipolar information signal, i.e., −1 or 1, and a code signal of each channel, followed by adding them, of the transmitter. It is then transmitted to the receiver.

Lastly, the marker signal is separated from the signal of the transmitter by the receiver. The positive and negative binary data of each channel is demodulated as a result of using a separation-use marker signal.

Now specifically shown is a method, by using an $ARX_{MS}$ for separating a marker signal from a marker-attached signal transmitted from the transmitter.

A marker signal is defined as a sine wave of 8 MHz between chip times of an M-series code in the following description.

Figure 116:
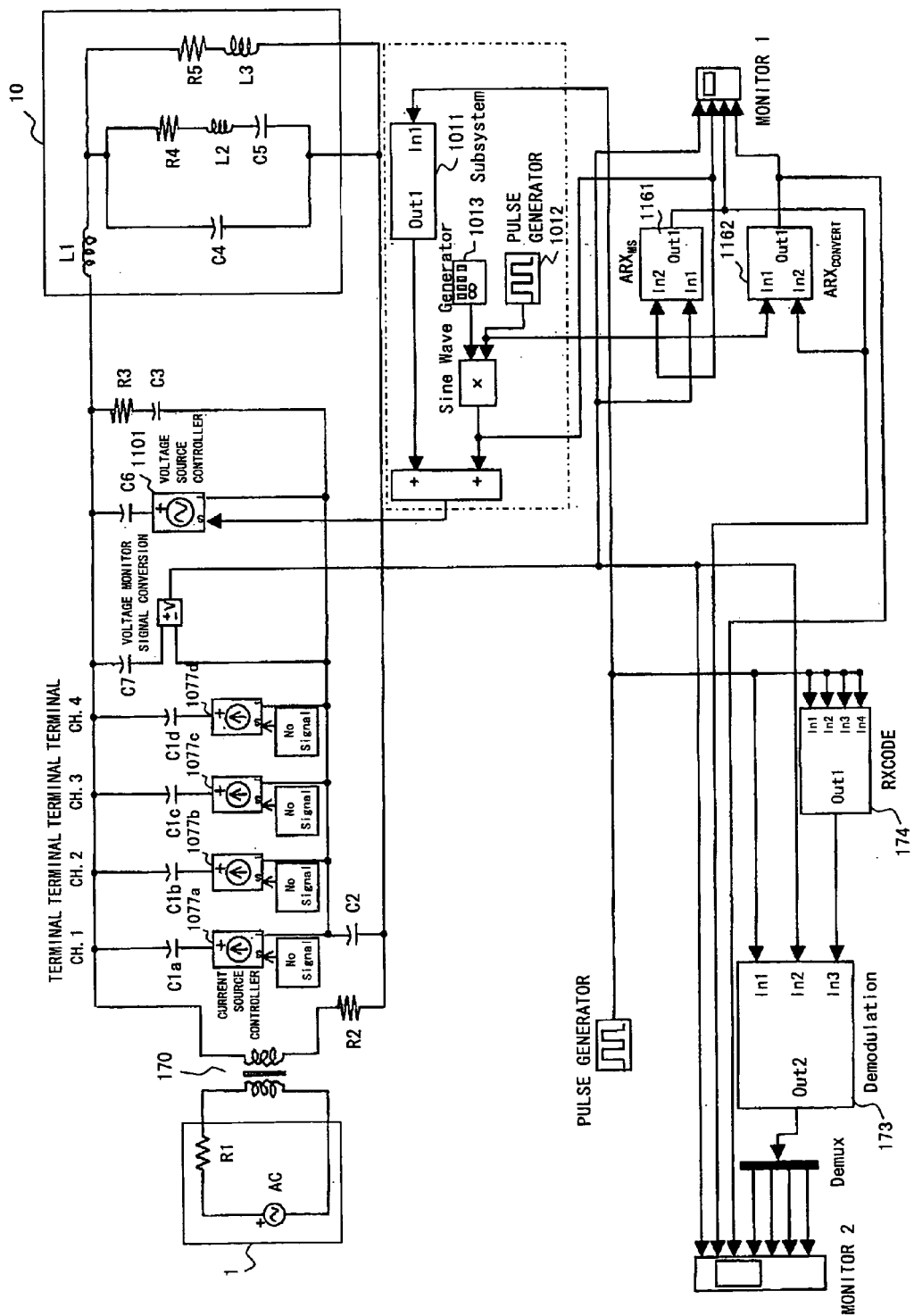
FIG. 116 is a diagram showing a simulation of a one-to-many access in a basic power line model.

In the basic power line model shown in FIG. 116, a base station adds a marker signal of an 8 MHz sine wave to a random M-series code signal (i.e., a CDMA code signal), and transmits the resultant. In this event, a marker signal that is a synchronization-use header code or signal is added to the front or back of a CDMA code signal of a transmitter by an addition to the CDMA code signal which is a multiplication of a signal waveform (that is a resultant of multiplying a pulse from the pulse generator 1012 and a sine wave from the sine wave generator 1013), the positive/negative binary bipolar information signal, i.e., −1 or 1, from a subsystem 1011, and a code signal of each channel, followed by adding, in the part (FIG. 101) enclosed by the dotted line in FIG. 116.

The base station inputs the marker signal-attached CDMA code signal to the voltage source controller of the numerical 1101 and superimpose on the power line. The terminal station measures by a voltage monitor conversion, inputs the $ARX_{MS}$ of the 1161, separates the marker signal, inputs to the $ARX_{CONVERT}$ of the 1162, obtains a synchronous signal, utilizes for a demodulation of the 173 of the receiver unit and for a synchronous signal of the RXCODE of the 174, followed by demodulating the positive/negative binary data of each channel sent from the transmitter by using the demodulation of the 173 of the receiver unit and the RXCODE of the 174.

FIG. 116 is a diagram showing a simulation of a one-to-many access in a basic power line model. This simulation is configured so as to optimize an initial value of an ARX model (i.e., the initial value is optimized by inputting, to an in2 of the $ARX_{MS}$ of the 1161, a signal waveform that is a resultant of multiplying a pulse from the pulse generator 1012 and a sine wave from the sine wave generator 1013 and by inputting, to an in1 of the $ARX_{CONVERT}$ of the 1162). Also configured is to input the obtained synchronous signal to the $ARX_{CONVERT}$ of the 1162, thereby not inputting it to a demodulation of the 173 of the receiver unit or an RXCODE of the 174 in order to shorten a simulation time. In order to optimize an initial value of an ARX model, a peripheral signal process applying a Kalman filter or such is utilized.

A power distribution transformer 170 uses a two-wire power line having a neutral wire (including a ground-connected wire). Also the distribution transformer 170 uses one having a characteristic of 1.5 KVA 100 to 200 volts, L1=143.5 mH, L2=38.7 mH and M=74.5 mH. Note that the present embodiment assumes AC 200 volts, 60 Hz for an AC power source 1 on the primary side of the distribution transformer.

Note that the internal parameters of the model are set at: R1=0.35 ohms, R2=0.15 ohms, R3=1 ohm, R4=4 ohms, R5=100 ohms, C1=C2=C3=1000 pF, C4=24800 pF, C5=62200 pF, L1=25 µH, L2=29.8 µH and L3=0.6 µH.

And are determined as C6=1000 µF, C7=1000 pF, and all channels of the transmitter to be 1.

Then, under the condition: the amplitude of synchronous pulse parameter is 1, the frequency is 4 (microsec), the pulse width is 12.5% of the frequency and the pulse interval is 4 (microsec), the derived is an $ARX_{MS}$ for separating a marker signal of a sine wave of 8 MHz from a voltage signal measured at a terminal station connected to a service outlet (noted as "service outlet-connected terminal station" hereinafter), of the basic power line model shown in FIG. 116.

A voltage signal as a result of measuring the random M series code signal (i.e., the CDMA code signal) attached by a marker signal of a sine wave of 8 MHz at the service outlet-connected terminal station is determined as an input u(t) of the $ARX_{MS}$ and a sine wave marker signal of 8 MHz between chip times of the M series code is determined as an output y(t) of the $ARX_{MS}$.

In this event, considering the above described AIC and stability related to identified models A(q) and B(q), the $ARX_{MS}$ model as represented by the following expression 27 is defined.

$A(q)y(t) = B(q)u(t) + e(t)$ $A(q) = 1 - 1.993q^{-1} + 0.996q^{-2}$ $B(q) = -3.927 * 10^{-6} q^{-1}$ (27);

where u(t) is an input signal measured in a discrete time, y(t) is an output signal measured in a discrete time, e(t) is an unknown input signal such as a white noise measured in a discrete time. The $q^{-1}$ shows a sampling time interval which is a backward shift operator in the interval of $10^{-9}$ sec.

Furthermore, in order to obtain a pulse waveform for a synchronization reset input signal from a separated marker signal of a sine wave of 8 MHz, the separated marker signal of a sine wave of 8 MHz is determined as an input u(t) to an $ARX_{CONVERT}$, and a pulse waveform for a synchronization reset input signal is determined as y(t). In this event, considering an AIC and stability related to identified models A(q) and B(q), the $ARX_{CONVERT}$ model as represented by the following expression 28 is defined.

$A(q)y(t) = B(q)u(t) + e(t)$ $A(q) = 1 - 0.9976q^{-1}$ $B(q) = -0.1391q^{-10} + 0.1432q^{-1}$ (28);

where u(t) is an input signal measured in a discrete time, y(t) is an output signal measured in a discrete time, e(t) is an unknown input signal such as a white noise measured in a discrete time. The $q^{-1}$ shows a sampling time interval which is a backward shift operator in the interval of $10^{-9}$ sec.

Next, FIG. 117 shows a simulation of one-to-many access utilizing a synchronism of a marker-attached diffusion signal under the condition: C6=1000 pF, C7=1000 pF, and all channels of the transmitter is 1, the amplitude of synchronous pulse parameter is 1, the frequency is 4 (microsec), the pulse width is 12.5% of the frequency and the initial delay of the pulse is 4 (microsec).

Referring to FIG. 117, in order of the top toward the bottom thereof, respectively shown are: a measured voltage signal (V) at a channel k that is a terminal (where the voltage is measured), a sine wave marker signal (i.e., the original) of 8 MHz between chip times of an M series code at the base station, and a pulse waveform for a synchronization reset input signal which is a conversion of the above estimated 8 MHz sine wave marker signal by applying an $ARX_{CONVERT}$ (the numerical 1162 indicated in FIG. 116) to a sine wave marker signal of 8 MHz estimated by the $ARX_{MS}$ (i.e., the numerical 1161 indicated in FIG. 116).

Figure 118:
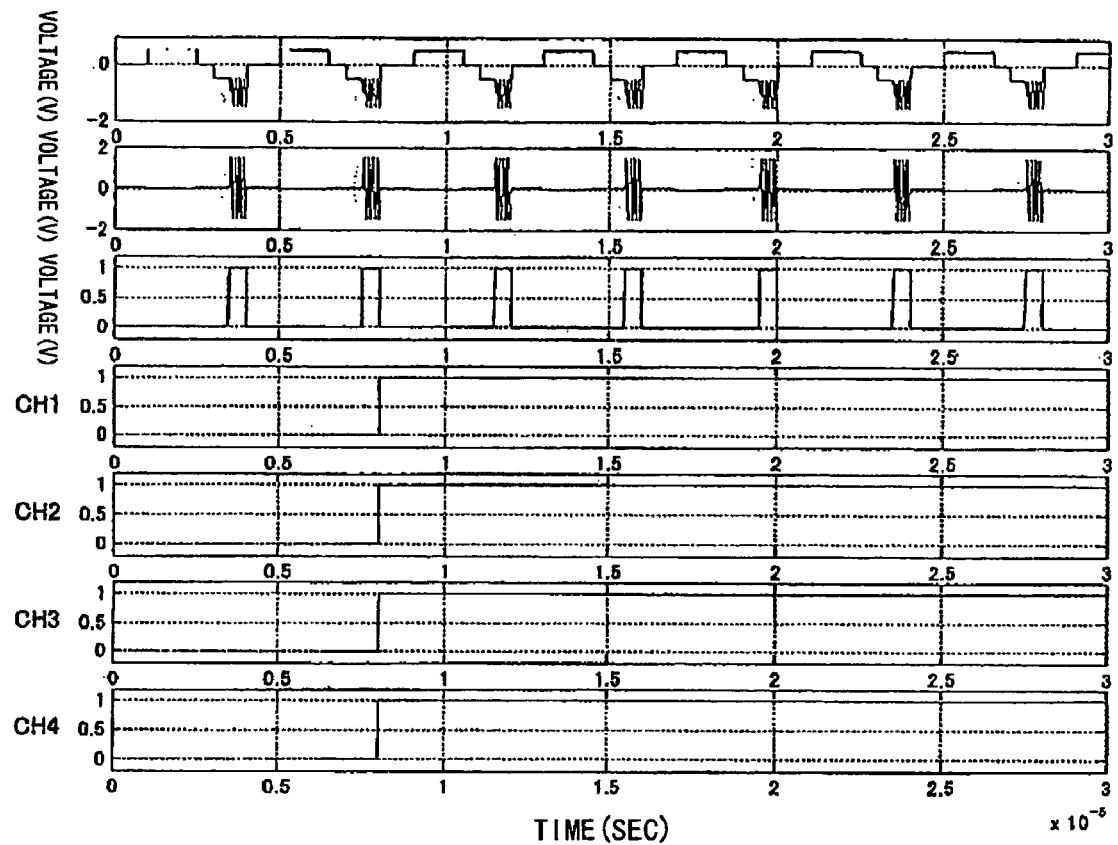

Referring to FIG. 118, in order of the top toward the bottom thereof, respectively shown are: a measured voltage signal (V) at a channel k that is a terminal (where the voltage is measured), an 8 MHz sine wave marker signal estimated by the $ARX_{MS}$, a pulse signal for a synchronization reset input signal which is a conversion of the above estimated 8 MHz sine wave marker signal, and channels k (where k=1 through 4) that is a demodulated binary signal.

Despite there are noise disturbances by the environmental impedance, et cetera, the terminal channels k are enabled to receive accurately also unique signals of other channels, which are not shown in either FIG. 117 or 118, as in the case

Embodiment 18

Figure 119:
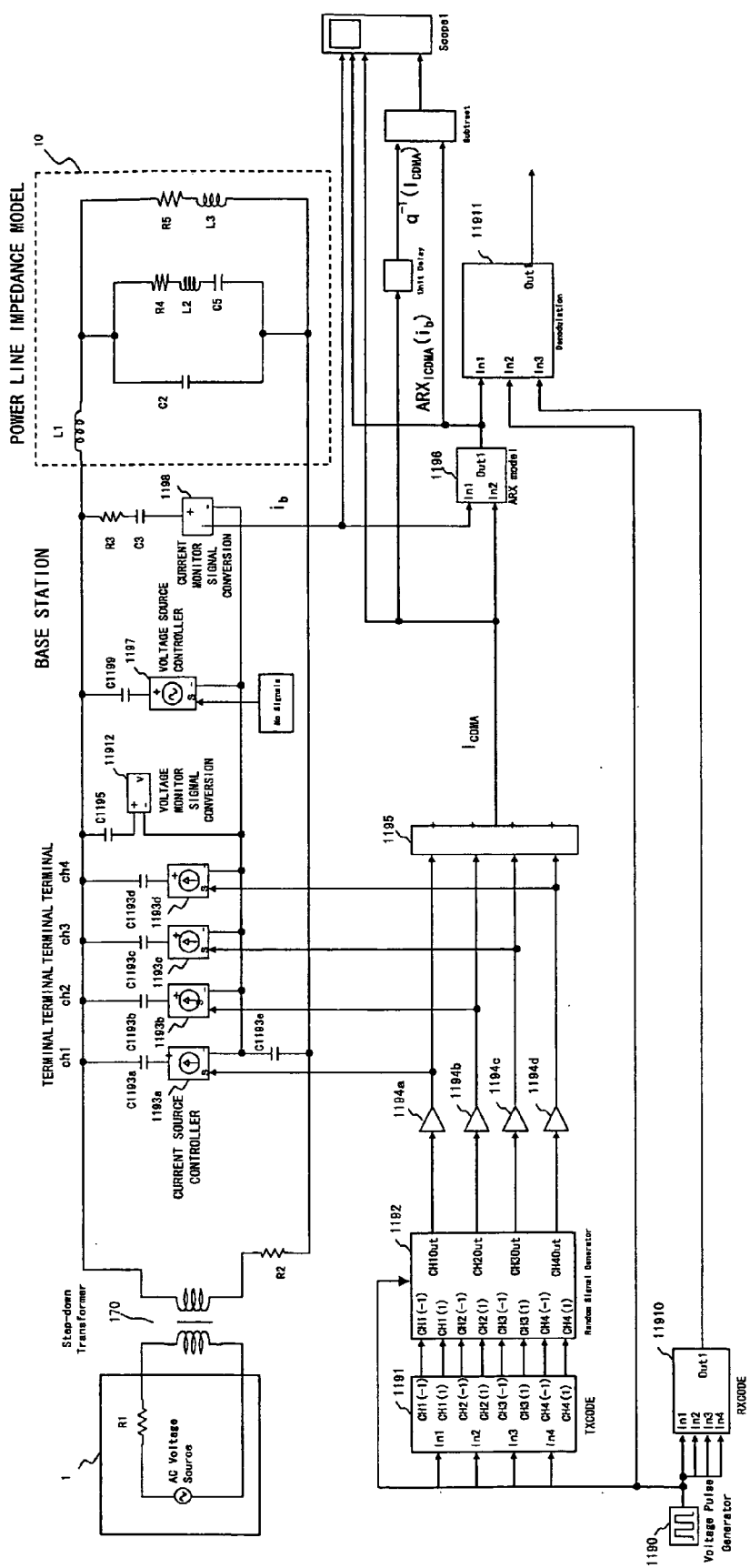

FIG. 119 is a model also considering an influence of a distribution constant of the power line on a power line impedance environment and a current signal imposing type code division multiple access simulation. It is a simultaneous clock time code division multiple access model enabling an uplink connection from terminal stations at the individual service outlets to a base station.

Figure 122:
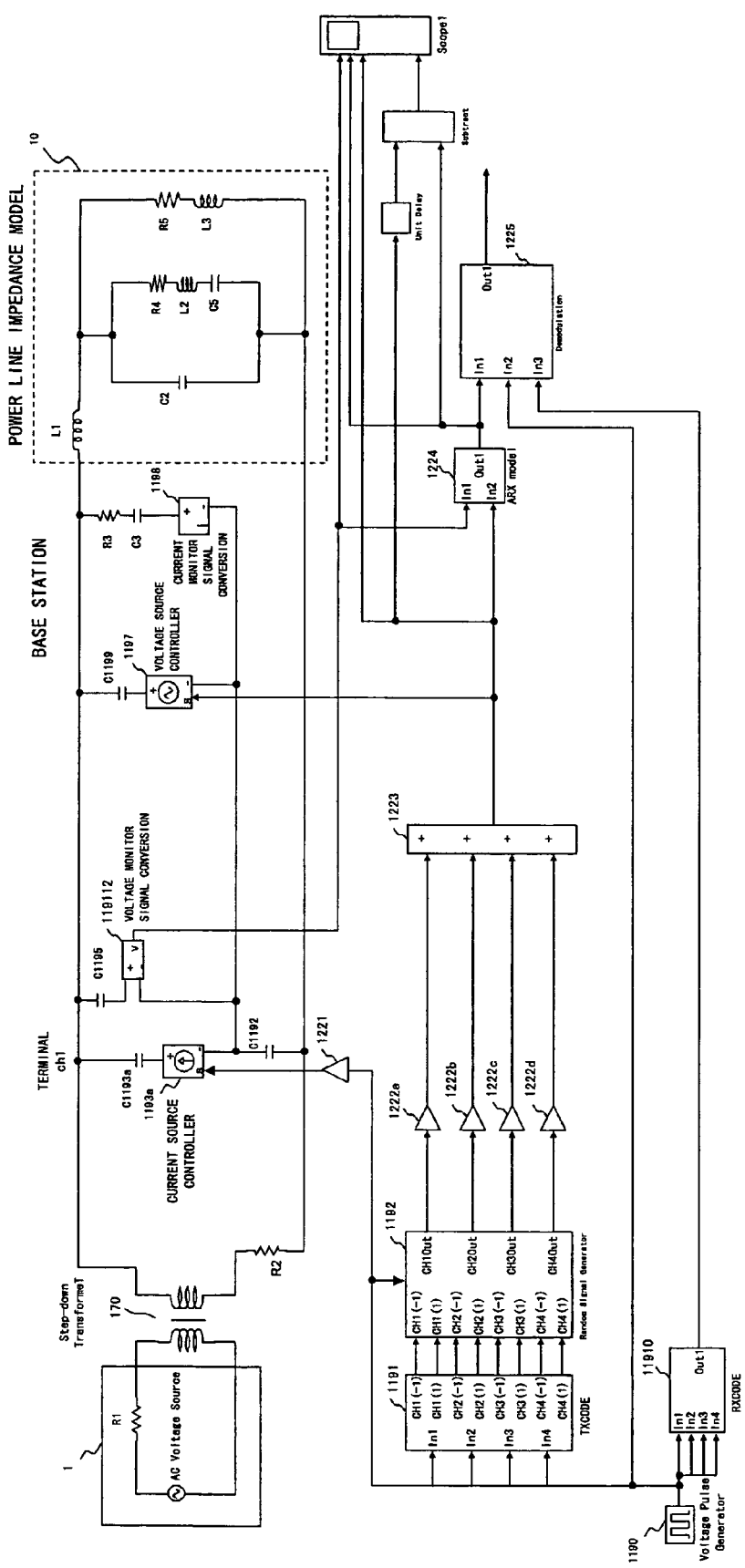

An AC voltage source is connected to the primary side of the step-down transformer of the present model, thereby supplying a power signal (e.g., 100 volts, 50 or 60 Hz). Meanwhile, the power line impedance models shown in FIGS. 119, 120 and 122 are constituted by the L1, C2, C3, R4, L2, C5, R5 and L3.

A TXCODE 1191 is a tracking function-attached diffusion code generator of a synchronous signal, likewise the each embodiment as described above. It generates a $C^{(k)}(t)$ (where k=1 through N) for inputting to a random signal generator 1192 at the time of a transmission.

Here, the $C^{(k)}(t)$ (where k=1 through N) has a chip cycle of a $D_c$ and a cycle of a diffusion code of a $T_c$. The $C^{(k)}(t)$ is a diffusion code for each terminal station. The $T_c$ is a cycle of a diffusion code which can be expressed as $T_c=D_d/D_c(\epsilon Z^+)$.

The $Z^+$ is a positive integer including a zero, and the $D_c[sec.]$ $(>T_q/T_s)$ is a chip cycle.

The $T_s$ is a sampling time [sec.] for a digital signal processing (where the $T_s$ is set substantially smaller than the $T_q$ and $D_c$ in consideration of a sampling theorem).

The $T_q$ $(>T_s)$ is a sampling time [sec.] of a parametric model (of an ARX model, or such).

The RXCODE 11910, likewise each embodiment described above, is a tracking function-attached diffusion code generator of a synchronous signal, and generates a $C^{(k)}(t)$ (where k=1 through N) for inputting to a random signal generator 11911 at the time of a transmission. In this event, the $C^{(k)}(t)$ (where k=1 through N) has a chip cycle of the $D_c$ and a cycle of the diffusion code of the $T_c$. The present embodiment is configured to output from an Out 1 of the RXCODE 11910.

A random signal generator 1192 has a tracking function for a synchronous signal, and internally determines $dp^{(k)}$ for each cycle of $D_d$ by random numbers of "uniform not repeatable", generates a $d^{(k)}(t)$ (i.e., an information signal), and outputs a $S^{(k)}(t)=C^{(k)}(t)*d^{(k)}(t)$ (where k=1 through N) by using the input $C^{(k)}(t)$.

The $S^{(k)}(t)$ is a waveform of an original signal for use in each terminal. The $d^{(k)}(t)$ is a waveform of a data signal (i.e., an information signal) for use in each terminal. A synchronous signal is a pulse wave of a time width of $D_c$ for each cycle $D_d$.

The demodulation 11911, comprising a tracking function for a synchronous signal, internally operates a scalar product arithmetic operation by using the $C^{(k)}(t)$ input at each cycle of $D_d$, and carries out a decryption.

The $D_d$ can be expressed by $D_d=D_c*T_c$ and is a cycle [sec.] of a data signal of each terminal station. And each signal described above can be expressed by the following expression:

$$S^{(k)}(t) = C^{(k)}(t) \cdot d^{(k)}(t) \tag{29}$$

$$d^{(k)}(t) = \sum_{p=-\infty}^{\infty} d_p^{(k)} \cdot u_{Dd}(t - pD_d), \ d_p^{(k)} \in \{1, -1\} \tag{30}$$

$$C^{(k)}(t) = \sum_{p=-\infty}^{\infty} c_p^{(k)} \cdot u_{Dc}(t - pD_c), \ c_p^{(k)} \in \{1, -1\} \tag{31}$$

$$U_D(t) = \begin{cases} 1, & 0 \leq t \leq D \\ 0, & 0 > t, D < t \end{cases} \tag{32}$$

Where $\{c_i^{(k)}\}_{k=0}^{Tc-1} = (c_0^{(k)}, c_1^{(k)}, \cdots, c_{Tc-1}^{(k)})$ is a cycle series of a cycle $T_c$.

And, an ideal code division multiplex current signal constituted by the N-number of terminal stations (which are connected to individual service outlets, et cetera) for an indoor power line (or, an ideal code division multiplex voltage signal transmitted from a base station to the N-number of individual terminal stations) can be expressed by the following expression 33:

$$I_{CDMA} = \sum_{k=1}^{N} i_k = \sum_{k=1}^{N} \lambda_{Ik} \cdot S^{(k)}(t) \tag{33}$$

$$\left( \text{or } V_{CDMA} = \sum_{k=1}^{N} v_k = \sum_{k=1}^{N} \lambda_{Vk} \cdot S^{(k)}(t) \right)$$

And, $r_1(t)=i_b$ (or, $r_v(t)=v_k$) can be expressed as a current (or voltage) measurement reception signal.

In the case of performing an uplink, an approximate relationship shown by the following expressions 34 and 35, $$i_b \approx I_{CDMA} - i_{SN}(V_S) \tag{34), and}$$

$$v_k \approx V_s' \approx V_s \tag{35}$$

in the relational expressions of 9 and 13.

Here, a description is on a method for improving accuracy of an approximation of the expressions 34 and 35. The expression 34 shows a method for estimating an $i_{SN}(V_S)$ by a parametric model 1196 (e.g., an ARX model). The first investigated is a state of the term of $i_{SN}(V_S)$ of the expression 34 not existing. The state of the term of $i_{SN}(V_S)$ of the expression 34 not existing is the case of a synchronous signal not being injected, and therefore a simulation is performed according to the case (FIG. 119).

FIG. 120 is a result of FIG. 119, and shows the $i_b$, ARX$_{ICDMA}(i_b)$, $q^{-1}(I_{CDMA})$, and Estimated Error=ARX$_{ICDMA}(i_b)$−$q^{-1}(I_{CDMA})$, from the upper part of the drawing.

The simulation result shown in FIG. 120 is approximated by $I_{CDMA} \approx ARX_{ICDMA}(i_b)$ (i.e., an output signal of an ARX model), and a time delay at the time of a reception is compared by correcting by a $q^{-1}$. Comparing between the $i_b$ and $q^{-1}(I_{CDMA})$ (i.e. an output signal $q^{-1}(I_{CDMA})$ when an output signal $I_{CDMA}$ of an adder 1195 passes a unity delay) discovers an existence of a substantial level of noise despite that there is no term of $i_{SN}(V_S)$ Note that a $q^{-m}$ is a backward shift operator of an interval of $mT_q$ [sec.].

A level of Estimated Error=ARX$_{ICDMA}(i_b)$−$q^{-1}(I_{CDMA})$ is an order of $10^{-2}$, and therefore a proper setup of a parametric model (i.e., ARX$_{ICDMA}(i_b)$ and such) can directly estimate an $I_{CDMA}$ by using $I_{CDMA} \approx ARX_{ICDMA}(i_b)$.

This is applicable also to the expression 35 similarly, and a $V_S$ can also be directly estimated by using $V_S \approx ARX_{VS}(v_k)$. It is also applicable to a downlink similarly. An approximate relationship of the relational expressions 17 and 13 can be expressed by the following expressions 36 and 37.

$$i_b \approx I_S - i_{SN}(V_{CDMA}) \qquad (36)$$

$$v_k = V_{CDMA}' \approx v_b = V_{CDMA} \qquad (37)$$

The expressions 36 and 37 can be directly estimated by using the $I_S \approx ARX_{IS}(i_b)$ and $V_{CDMA} \approx ARX_{CDMA}(v_k)$.

Meanwhile, when configuring the $I_S$ of the expression 14, although an electric current of another terminal station k' needs to be monitored since the other terminal station k' transmits a synchronous signal during the time a certain terminal station transmits a synchronous signal, it can be directly estimated by using $I_S \approx ARX_{IS}'(i_{k'})$ And, the following shows a method for improving accuracy of approximating the relationships of the expressions 34 through 37 and a signal to noise (S/N) ratio (SNR) and a bit error rate (BER).

The step 1 is to transmit and receive, between the base station and individual terminal stations chk (where k=1 through N; N=4 according to the present embodiment), an ideal code division multiplex signal $I_{CDMA}$ (from the individual terminal stations chk, where k=1 though N; $I_{CDMA}$ to the base station: $r_I(t)$) or $V_{CDMA}$ (from the base station to terminal stations chk, where k=1 though N; $I_{CDMA}$ to the base station: $r_V(t)$) and determine an $ARX_{IS}$ and an $ARX_{ICDMA}$ which correct a distortion due to an impedance or such of a target indoor power line, in place of superimposing a synchronous signal and a code multiplex signal simultaneously on the indoor power line as shown in FIG. 107.

Likewise, an $ARX_{VS}$ and $ARX_{VCDMA}$ and such are determined. Using a correction condition of the event as reference, amplifications in the reference state is set as $\lambda_{Ik}=1$ and $\lambda_{Vk}=1$. Here, the amplification ratios $\lambda_{Ik}$ are those of the amplifiers 1194a through 1194d shown in FIG. 119. And the $\lambda_{Vk}$ is the amplification ratios of amplifiers 1222a through 1222d shown in FIG. 122.

Figure 121:
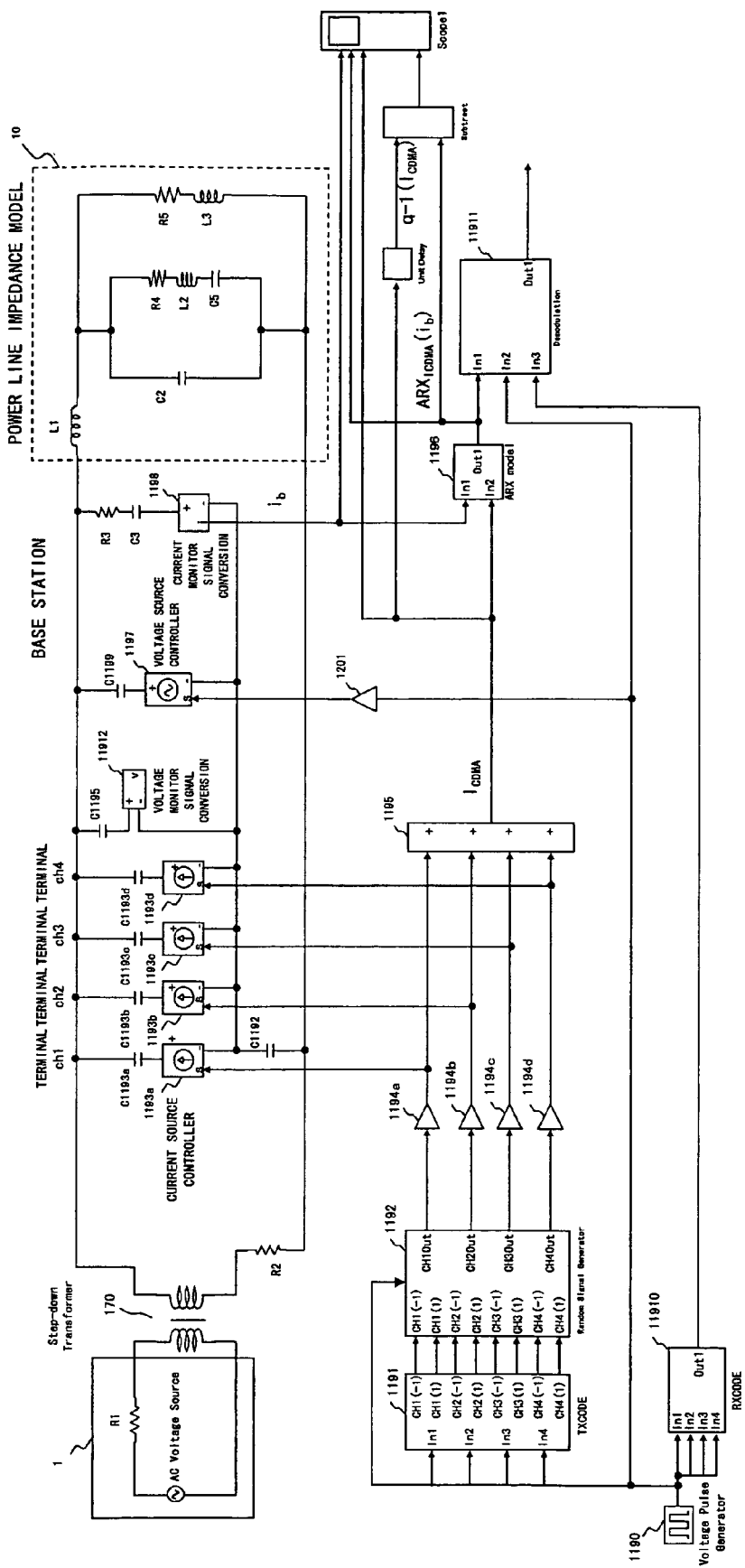

The step 2 is to input a diffusion code $C^{(i)}(t)$ from the TXCODE 1191 to a random signal generator 1192 (such as uniform not repeatable type random generator) which then generates $d^{(k)}(t)$ by a uniform not-repeatable type random generator and multiplies by $C^{(i)}(t)$, thereby making up $S^{(k)}(t)$, as in the case of the uplink shown in FIGS. 119 and 121. The next multiplies the $S^{(k)}(t)$ by amplification ratios $\lambda_{Ik}$ for making them as inputs to current source controllers 1193a through 1193d (i.e., terminal stations), or the current source controllers 1193a through 1193d inject amplified current signals of $\lambda_{Ik}$ times into the indoor power line.

Likewise for a downlink, a diffusion signal $C^{(i)}(t)$ from the TXCODE 1191 is input to the random signal generator 1192 (such as uniform not repeatable type random generator) which then generates $d^{(k)}(t)$ by a uniform not-repeatable type random generator and multiplies by $C^{(i)}(t)$, thereby making up $S^{(k)}(t)$ as shown in FIG. 122. The next multiplies the $S^{(k)}(t)$ by amplification ratios $\lambda_{Vk}$ and sums them up for making it as an input to a voltage source controller 1197 (i.e., the base station). Alternatively, the voltage source controller 1197 injects an amplified voltage signal of $\lambda_{Vk}$ times into the indoor power line.

The $\lambda_{Ik}$ (or $\lambda_{Vk}$) is an amplification ratio of a signal used for each terminal station to a dependent current source [amp.] (or dependent voltage source [volt]).

Also, an amplification of a voltage or current synchronous signal is carried out similar to the amplifier 1221. In this case,
each $\lambda_{Ik}$ and $\lambda_{Vk}$ are set so that an $SNR_Y$ (where Y=V or Y=I) of the following expression 40 indicating a sufficient SNR for a target application, and a $BER_Y$ (where Y=V or Y=I) of the following expression 38 indicating a sufficient BER therefor. As an embodiment, FIGS. 123, 124 and 125 respectively show simulation results of $BER_I$ and $SNR_I$ at a reference in the case of the uplink shown in FIG. 121. These simulation are configured to optimize an initial value of an ARX model (that is, the initial value is optimized by inputting an output of the adder 1195 to the in2 of the ARX model of the 1196). In order to optimize an initial value of an ARX model, a peripheral signal processing applying a Kalman filter or such is utilized.

Here, the diffusion code $C^{(i)}(t)$ within the $BER_Y$ of the expression 38 is provided from the RXCODE 11910 shown in FIG. 121.

The next is a description on a method for configuring a header marker signal of a current type diffusion code.

The fact that an influence of the term $i_{SN}(V_S)$ of the expression 34 is evident in a pulse wave at every end of a cycle series of an $i_b$ can be confirmed based on the measurement result of the $i_b$, and an enlarged $i_b$ and an $ARX_{ICDMA}(i_b)$ shown in FIG. 123. Considering that an $i_{SN}(V_S)$ which is a response of a $V_S$ is a marker signal at every end of a cycle series of a diffusion code, it then constitutes a method for making the individual terminal stations or the base station generate a cycle series of a header marker-attached diffusion code. As in the case of the embodiment 17, configured is an ARX model $ARX_{MS}(i_b)$ for separating a synchronous signal from the marker signal and for separating it. $BER_Y$ (where Y=V or Y=I) is a bit error rate of a voltage (or current) type code division multiplex signal.

$$BER_Y = \sum_{k=1}^{N}\left(\sum_{p=0}^{M} F\left(\int_{pDd}^{(p+1)Dd} ARX_{YCDMA}(r_Y(t)) \cdot C^{(k)}(t)dt\right) - \sum_{p=0}^{M}\int_{pDd}^{(p+1)Dd} S^{(k)}(t) \cdot C^{(k)}(t)\,dt\right) \qquad (38)$$

$$F(x) = \begin{cases} 1, & 0 < x \\ -1, & 0 > x \end{cases} \qquad (39)$$

Where Y=I or V; M: the number of bits of evaluation data $$SNR_Y = 10\log_{10}(S_Y/Noise_Y) \qquad (40)$$

$$Noise_Y = \int_0^{Te}\left(ARX_{YCDMA}(r_Y(t)) - q^{-m}\sum_{k=1}^{N}\lambda_{Yk}\cdot S^{(k)}(t)\right)^2 dt \qquad (41)$$

$$S_Y = \int_0^{Te}\left(\sum_{k=1}^{N}\lambda_{Yk}\cdot S^{(k)}(t)\right)^2 dt, \qquad (42)$$

where Y=I or V, Te is an evaluation period, and $t_k=kT_s$ (where k=1 through N) are sampling instants [sec.].

The above described configuration makes it possible to suppress a BER and increase an SNR.

Incidentally, the present invention can also be embodied by creating a control program for having a central processing unit (CPU) comprised by a standard computer execute the processes put forth in the above described embodiments and recording it in a computer readable recording medium, followed by having the computer read the program from the recording medium and the CPU execute it.

FIG. 126 exemplifies a recording medium allowing a computer to read the control program recorded therein. Such a recording medium can utilize a storage apparatus 1261 such as ROM and a hard disk apparatus which are equipped in a computer system 1260, either built therein or externally thereto; and a portable recording medium 1263, such as a flexible disk, magneto optical disk (MO), CD-ROM, DVD-ROM which allows a readout of the control program recorded therein by being inserted into a media drive apparatus 1262 comprised by a computer system; and the like apparatus.

The recording medium may be a storage apparatus 1266 comprised by a computer system functioning as program server 1265 which is connected to the computer system 1260 by way of a telecommunication line 1264. In this case, a comprisal is to transmit a transmission signal obtained by modulating a carrier wave by a data signal expressing the control program from the program server 1265 to the computer system 1260 by way of the telecommunication line 1264 that is a transmission medium so that the computer system 1260 demodulates the received transmission signal to reproduce the control program, thereby enabling the CPU comprised by the computer system 1260 to execute the control program.

Note that the present invention is completely represented by the embodiments of the accompanying drawings; various changes and modifications, however, shall be apparently comprehensible from the drawings. Therefore, it shall be understood that such changes and modifications are included in the scope of the present invention provided that they are within the scope thereof defined in the following.

What is claimed is:

1. A power line telecommunication system having a transformer with a primary side connected to power lines that supply power from outside and a secondary side connected to a two-wire power line with neutral line, and carrying out a power line telecommunication using the two-wire power line with neutral line, comprising:
a base station comprising:
a dependent voltage source connected between one of the power lines and the neutral line and used to transmit a signal to be used for the power line telecommunication;
an estimation unit for the base station for estimating an impedance determined in accordance with a circuit configuration of the power line telecommunication system by means of a parametric model;
a separation unit for the base station for separating the signal to be used for the power line telecommunication based on the estimated impedance; and
a unit for carrying out a telecommunication with an external device through an external telecommunication network; and
a terminal station comprising:
a dependent current source connected between the power line to which the base station is connected and the neutral line, and used to transmit a signal to be used for the power line telecommunication;
an estimation unit for the terminal station for estimating the impedance determined in accordance with the circuit configuration of the power line telecommunication system, by means of a parametric model; and
a separation unit for the terminal station for separating the signal to be used for the power line telecommunication based on the estimated impedance,
wherein
when an uplink is performed from the terminal station to the base station in the power line telecommunication,
by means of the dependent voltage source, the base station transmits a first synchronous signal to the power line to which the base station is connected and the neutral line, the first synchronous signal being for determining a transmission timing of a first information signal to be transmitted from the terminal station,
by means of the dependent current source, the terminal station transmits, to the base station, the first information signal synchronized with the first synchronous signal, via the power line to which the base station is connected and the neutral line, and
the base station extract the first information signal by means of the separation unit in the base station, and
when a downlink is performed from the base station to any one of the terminal stations in the power line telecommunication,
by means of the dependent current source, the terminal station transmits a second synchronous signal to the power line to which the base station is connected and the neutral line, the second synchronous signal being for determining a transmission timing of a second information signal to be transmitted from the base station,
by means of the dependent voltage source, the base station transmits, to the base station, the second information signal synchronized with the second synchronous signal, via the power line to which the base station is connected and the neutral line, and
the terminal station extract the second information signal by means of the separation unit in the terminal station,
wherein
said unit for separating a synchronous signal comprises a unit for performing an estimation by utilizing a parametric model, thereby extracting a synchronization-use marker signal superimposed, by a predetermined chip width, on a voltage signal or current signal that is said information signal, and making the extracted a synchronous signal.

2. The power line telecommunication system according to claim 1, wherein:
the power line to which said base station is connected to one of first elements having an impedance, the other of the first elements having the impedance is serially connected to one of the dependent voltage sources of the base station, and the other of the dependent voltage sources of the base station is connected to the neutral line; and
a second element having an impedance is connected between the other of the power lines and the neutral line.

3. The power line telecommunication system according to claim 1, wherein
said base station further comprises:
a dependent current source used to transmit a signal to be used for the power line telecommunication; and
a unit for changing over between the dependent voltage source and the dependent current source provided in the base station.

4. The power line telecommunication system according to claims 1, wherein
said base station comprises a unit for modulating the second information signal into a signal of a code division multiple access.

5. The power line telecommunication system according to claim 1, wherein:
the power line to which said terminal station is connected to one of third elements having an impedance, the other of the third elements having the impedance is serially connected to one of the dependent current sources of the terminal station, and the other of the dependent current sources of the terminal station is connected to the neutral line; and
a fourth element having an impedance is connected between the other of the power lines and the neutral line.

6. The power line telecommunication system according to claim 1, wherein said terminal station further comprises:
a unit for carrying out a telecommunication with an external device through an external telecommunication network;
a dependent voltage source used to transmit a signal to be used for the power line telecommunication; and
a unit for changing over between the dependent voltage source and the dependent current source provided in the terminal station.

7. The power line telecommunication system according to claim 1, wherein
said terminal station comprises a unit for modulating the first information signal into a signal of a code division multiple access.

8. The power line telecommunication system according to claim 2, wherein each of the first and the second elements is either a capacitor or a circuit that has an impedance and shuts off a low frequency.

9. The power line telecommunication system according to claim 5, wherein each of the third and the fourth elements is either a capacitor or a circuit that has an impedance and shuts off a low frequency.

10. A power line telecommunication method for carrying out a power line telecommunication using a two-wire power line with neutral line, the two-wire power line with neutral line having a transformer with a primary side connected to power lines that supply power from outside and a secondary side connected to the two-wire power line with neutral line, comprising:
a base station having:
a dependent voltage source connected between one of the power lines and the neutral line and used to transmit a signal to be used for the power line telecommunication;
an estimation unit for the base station for estimating an impedance determined in accordance with a circuit configuration of the power line telecommunication system, by means of a parametric model;
a separation unit for the base station for separating the signal to be used for the power line telecommunication based on the estimated impedance; and
a unit for carrying out a telecommunication with an external device through an external telecommunication network; and
a terminal station having:
a dependent current source connected between the power line to which the base station is connected and the neutral line, and used to transmit a signal to be used for the power line telecommunication;
an estimation unit for the terminal station for estimating the impedance determined in accordance with the circuit configuration of the power line telecommunication system by means of a parametric model;
and
a separation unit for the terminal station for separating the signal to be used for the power line telecommunication based on the estimated impedance,
wherein
the power line to which said base station is connected to one of first elements having an impedance, the other of the first elements having the impedance is serially connected to one of the dependent voltage sources of the base station, the other of the dependent voltage sources of the base station is connected to the neutral line, and a second element having an impedance is connected between the other of the power lines and the neutral line,
the power line to which said terminal station is connected to one of third elements having an impedance, the other of the third elements having the impedance is serially connected to one of the dependent current sources of the terminal station, the other of the dependent current sources of the terminal station is connected to the neutral line, and a fourth element having an impedance is connected between the other of the power lines and the neutral line,
and
wherein
when an uplink is performed from the terminal station to the base station in the power line telecommunication,
by means of the dependent current source, the base station transmits a first synchronous signal to the power line to which the base station is connected and the neutral line, the first synchronous signal being for determining a transmission timing of a first information signal to be transmitted from the terminal station,
by means of the dependent current source, the terminal station transmits, to the base station, the first information signal synchronized with the first synchronous signal, via the power line to which the base station is connected and the neutral line,
the base station extracts the first information signal by means of the separation unit for the base station, and
when a downlink is performed from the base station to any one of the terminal stations in the power line telecommunication,
by means of the dependent current source, the terminal station transmits a second synchronous signal to the power line to which the base station is connected and the neutral line, the second synchronous signal being for determining a transmission timing of a second information signal to be transmitted from the base station,
by means of the dependent voltage source, the base station transmits, to the base station, the second information signal synchronized with the second synchronous signal, via the power line to which the base station is connected and the neutral line, and
the terminal station extract the second information signal by means of the separation unit for the terminal station,
wherein
said unit for separating a synchronous signal comprises a unit for performing an estimation by utilizing a parametric model, thereby extracting a synchronization-use marker signal superimposed, by a predetermined chip width, on a voltage signal or current signal that is said information signal, and making the extracted a synchronous signal.

11. The power line telecommunication method according to claim 10, wherein
said base station further comprises a dependent current source used to transmit a signal to be used for the power line telecommunication, and changes over between the dependent voltage source and dependent current source provided in the base station.

12. The power line telecommunication method according to claim 10 wherein
the second information signal transmitted by the base station is a signal of a code division multiple access.

13. The power line telecommunication method according to claim 10, wherein
said terminal station further comprises:
a unit for carrying out a telecommunication with an external device through an external telecommunication network,
a dependent voltage source used to transmit a signal to be used for the power line telecommunication, and
said terminal changes over between the dependent voltage source and the dependent current source-provided in the terminal station.

14. The power line telecommunication method according to claim 10, wherein
the first information signal transmitted by the terminal station is a signal of a code division multiple access.

15. A base station used in power line telecommunication system having a transformer with primary side connected to power lines that supply power from outside and secondary side connected to a two-wire power line with neutral line, and carrying out a power line telecommunication using the two-wire power line with neutral line, comprising:
the base station comprising;
a dependent voltage source connected between one of the power lines and the neutral line and used to transmit a signal to be used for the power line telecommunication;
an estimation unit for the base station for estimating an impedance determined in accordance with a circuit configuration of the power line telecommunication system by means of a parametric model;
a separation unit for the base station for separating the signal to be used for the power line telecommunication based on the estimated impedance; and
a unit for carrying out a telecommunication with an external device through an external telecommunication network, and
the base station carries out the power line telecommunication with a terminal station, the terminal station comprising;
a dependent current source connected between the power line to which the base station is connected and the neutral line, and used to transmit a signal to be used for the power line telecommunication;
an estimation unit for the terminal station for estimating the impedance determined in accordance with the circuit configuration of the power line telecommunication system by means of a parametric model; and
a separation unit for the terminal station for separating the signal to be used for the power line telecommunication, based on the estimated impedance,
wherein
when an uplink is performed from the terminal station to the base station in the power line telecommunication,
by means of the dependent voltage source, the base station transmits a first synchronous signal to the power line to which the base station is connected and the neutral line, the first synchronous signal being for determining a transmission timing of a first information signal to be transmitted from the terminal station,
by means of the dependent current source, the terminal station transmits, to the base station, the first information signal synchronized with the first synchronous signal, via the power line to which the base station is connected and the neutral line, and
the base station extract the first information signal by means of the separation unit for the base station, and
when a downlink is performed from the base station to any one of the terminal stations in the power line telecommunication,
by means of the dependent current source, the terminal station transmits a second synchronous signal to the power line to which the base station is connected and the neutral line, the second synchronous signal being for determining a transmission timing of a second information signal to be transmitted from the base station,
by means of the dependent voltage, source, the base station transmits, to the base station, the second information signal synchronized with the second synchronous signal, via the power line to which the base station is connected and the neutral line, and
the terminal station extract the second information signal by means of the separation unit for the terminal station, so as to perform demodulation.

16. A terminal station used in a power line telecommunication system having a transformer with a primary side connected to power lines that supply power from outside and a secondary side connected to a two-wire power line with neutral line, and carrying out a power line telecommunication using the two-wire power line with neutral line, comprising:
the terminal station having:
a dependent current source connected between one of the power lines and the neutral line and used to transmit a signal to be used for the power line telecommunication;
an estimation unit for the terminal station for estimating an impedance determined in accordance with a circuit configuration of the power line telecommunication system by means of a parametric model;
and
a separation unit for the terminal station for separating the signal to be used for the power line telecommunication based on the estimated impedance,
the terminal station carrying out the power line telecommunication with a base station, and
the base station having:
a dependent voltage source connected between the power line to which the terminal station is connected and the neutral line, and used to transmit a signal to be used for the power line telecommunication;
an estimation unit for the base station for estimating the impedance determined in accordance with the circuit configuration of the power line telecommunication system by means of a parametric model;
a separation unit for the base station for separating the signal to be used for the power line telecommunication, based on the estimated impedance; and
a unit for carrying out a telecommunication with an external device through an external telecommunication network,
wherein
when an uplink is performed from the terminal station to the base station in the power line telecommunication, by means of the dependent voltage source, the base station transmits a first synchronous signal to the power line to which the base station is connected and the neutral line, the first synchronous signal being for determining a transmission timing of a first information signal to be transmitted from the terminal station, by means of the dependent current source, the terminal station transmits, to the base station, the first information signal synchronized with the first synchronous signal, via the power line to which the base station is connected and the neutral line, and the base station extracts the first information signal by means of the separation unit for the base station, and when a downlink is performed from the base station to any one of the terminal stations in the power line telecommunication, by means of the dependent current source, the terminal station transmits a second synchronous signal to the power line to which the base station is connected and the neutral line, the second synchronous signal being for determining a transmission timing of a second information signal to be transmitted from the base station, by means of the dependent voltage source, the base station transmits, to the base station, the second information signal synchronized with the second synchronous signal via the power line to which the base station is connected and the neutral line, and the terminal station extracts the second information signal by means of the separation unit for the terminal station.

* * * * *